US011782598B2

(12) United States Patent
Carrigan et al.

(10) Patent No.: US 11,782,598 B2
(45) Date of Patent: Oct. 10, 2023

(54) METHODS AND INTERFACES FOR MEDIA CONTROL WITH DYNAMIC FEEDBACK

(71) Applicant: Apple Inc., Cupertino, CA (US)

(72) Inventors: Taylor G. Carrigan, San Francisco, CA (US); Pedro Mari, Santa Cruz, CA (US); Camille Moussette, Los Gatos, CA (US); Gemma Alexandria Roper, San Francisco, CA (US); Peter C. Tsoi, San Jose, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/867,317

(22) Filed: Jul. 18, 2022

(65) Prior Publication Data

US 2022/0350482 A1    Nov. 3, 2022

Related U.S. Application Data

(63) Continuation of application No. 17/168,069, filed on Feb. 4, 2021, now Pat. No. 11,392,291.
(Continued)

(51) Int. Cl.
*G06F 3/0484*    (2022.01)
*G06F 3/04886*   (2022.01)
*G06F 3/16*      (2006.01)

(52) U.S. Cl.
CPC ........ *G06F 3/04886* (2013.01); *G06F 3/0484* (2013.01); *G06F 3/165* (2013.01); *G06F 2203/04803* (2013.01)

(58) Field of Classification Search
CPC ........ G06F 1/163; G06F 3/0414; G06F 3/041; G06F 3/1423; G06F 3/167; G06F 9/4856;
(Continued)

(56) References Cited

U.S. PATENT DOCUMENTS 5,202,961 A    4/1993 Mills et al.
5,305,435 A    4/1994 Bronson
(Continued)

FOREIGN PATENT DOCUMENTS

AR        060465 A1    6/2008
AU    2007100826 A4    9/2007
(Continued)

OTHER PUBLICATIONS

Brief Communication Regarding Oral Proceedings received for European Patent Application No. 18728002.9, dated Nov. 28, 2022, 7 pages.
(Continued)

*Primary Examiner* — Rinna Yi
(74) *Attorney, Agent, or Firm* — DLA Piper LLP (US)

(57) ABSTRACT

The present disclosure generally relates to techniques and interfaces for managing media playback devices. In some embodiments, the techniques include varying a feedback based on movement of a computer system toward or away from an external device. In some embodiments, the techniques include displaying an interface that includes controls for controlling media playback on an external device when the computer system and the external device are playing media. In some embodiments, the techniques include performing operations at a computer system in response to an input having a size that is less than or greater than a size threshold. In some embodiments, the techniques include performing different operations at a computer system when status lights have states that indicate different states of the computer system.

51 Claims, 66 Drawing Sheets

Related U.S. Application Data

(60) Provisional application No. 63/083,820, filed on Sep. 25, 2020.

(58) Field of Classification Search
CPC .... G06F 21/31; G06F 3/04842; G06F 3/0488;
G06F 3/04892; G06F 3/04817; G06F
3/0482; G06F 3/0484; G06F 3/04883;
G06F 2203/04108; G06F 3/048; G06F
9/44; H04L 67/025; H04M 1/72403
See application file for complete search history.

(56) References Cited

U.S. PATENT DOCUMENTS

| | | |
|---|---|---|
| 5,347,628 A | 9/1994 | Welch et al. |
| 5,404,316 A | 4/1995 | Klingler et al. |
| 5,463,725 A | 10/1995 | Henckel et al. |
| 5,495,566 A | 2/1996 | Kwatinetz |
| 5,513,342 A | 4/1996 | Leong et al. |
| 5,519,828 A | 5/1996 | Rayner |
| 5,521,841 A | 5/1996 | Arman et al. |
| 5,557,724 A | 9/1996 | Sampat et al. |
| 5,568,603 A | 10/1996 | Chen et al. |
| 5,611,060 A | 3/1997 | Belfiore et al. |
| 5,614,940 A | 3/1997 | Cobbley et al. |
| 5,682,326 A | 10/1997 | Klingler et al. |
| 5,684,970 A | 11/1997 | Asuma et al. |
| 5,692,213 A | 11/1997 | Harrison et al. |
| 5,726,687 A | 3/1998 | Belfiore et al. |
| 5,732,184 A | 3/1998 | Chao et al. |
| 5,745,096 A | 4/1998 | Ludolph et al. |
| 5,751,260 A | 5/1998 | Nappi et al. |
| 5,754,174 A | 5/1998 | Carpenter et al. |
| 5,758,180 A | 5/1998 | Duffy et al. |
| 5,760,767 A | 6/1998 | Shore et al. |
| 5,760,772 A | 6/1998 | Austin |
| 5,778,053 A | 7/1998 | Skarbo et al. |
| 5,793,366 A | 8/1998 | Mano et al. |
| 5,841,971 A | 11/1998 | Longginou et al. |
| 5,864,868 A | 1/1999 | Contois |
| 5,872,566 A | 2/1999 | Bates et al. |
| 5,872,922 A | 2/1999 | Hogan et al. |
| 5,874,958 A | 2/1999 | Ludolph |
| 5,880,725 A | 3/1999 | Southgate |
| 5,880,733 A | 3/1999 | Horvitz et al. |
| 5,892,507 A | 4/1999 | Moorby |
| 5,936,623 A | 8/1999 | Amro |
| 5,999,173 A | 12/1999 | Ubillos |
| 6,011,537 A | 1/2000 | Slotznick |
| 6,016,248 A | 1/2000 | Anzai et al. |
| 6,023,275 A | 2/2000 | Horvitz et al. |
| 6,026,389 A | 2/2000 | Nakajima et al. |
| 6,031,529 A | 2/2000 | Migos et al. |
| 6,061,062 A | 5/2000 | Venolia |
| 6,072,503 A | 6/2000 | Tani et al. |
| 6,081,256 A | 6/2000 | Martin et al. |
| 6,094,197 A | 7/2000 | Buxton et al. |
| 6,115,037 A | 9/2000 | Sumiyoshi et al. |
| 6,118,450 A | 9/2000 | Proehl et al. |
| 6,140,987 A | 10/2000 | Stein et al. |
| 6,166,736 A | 12/2000 | Hugh |
| 6,204,840 B1 | 3/2001 | Petelycky et al. |
| 6,208,342 B1 | 3/2001 | Mugura et al. |
| 6,236,400 B1 | 5/2001 | Guerrero |
| 6,262,724 B1 | 7/2001 | Crow et al. |
| 6,308,187 B1 | 10/2001 | Destefano |
| 6,310,613 B1 | 10/2001 | Tanaka et al. |
| 6,317,784 B1 | 11/2001 | Mackintosh et al. |
| 6,323,846 B1 | 11/2001 | Westerman et al. |
| 6,332,147 B1 | 12/2001 | Moran et al. |
| 6,351,765 B1 | 2/2002 | Pietropaolo et al. |
| 6,362,837 B1 | 3/2002 | Ginn |
| 6,363,395 B1 | 3/2002 | Tanaka et al. |
| 6,366,296 B1 | 4/2002 | Boreczky et al. |
| 6,369,835 B1 | 4/2002 | Lin |
| 6,393,430 B1 | 5/2002 | Van et al. |
| 6,393,462 B1 | 5/2002 | Mullen-Schultz |
| 6,446,080 B1 | 9/2002 | Van Ryzin et al. |
| 6,452,609 B1 | 9/2002 | Katinsky et al. |
| 6,456,305 B1 | 9/2002 | Qureshi et al. |
| 6,477,117 B1 | 11/2002 | Narayanaswami et al. |
| 6,489,951 B1 | 12/2002 | Wong et al. |
| 6,504,934 B1 | 1/2003 | Kasai et al. |
| 6,515,681 B1 | 2/2003 | Knight |
| 6,515,988 B1 | 2/2003 | Eldridge et al. |
| 6,538,665 B2 | 3/2003 | Crow et al. |
| 6,544,295 B1 | 4/2003 | Bodnar et al. |
| 6,556,222 B1 | 4/2003 | Narayanaswami |
| 6,570,557 B1 | 5/2003 | Westerman et al. |
| 6,577,330 B1 | 6/2003 | Tsuda et al. |
| 6,584,479 B2 | 6/2003 | Chang et al. |
| 6,587,127 B1 | 7/2003 | Stojakovic et al. |
| 6,600,936 B1 | 7/2003 | Kärkkäinen et al. |
| 6,674,452 B1 | 1/2004 | Kraft et al. |
| 6,677,932 B1 | 1/2004 | Westerman |
| 6,677,965 B1 | 1/2004 | Ullmann et al. |
| 6,725,427 B2 | 4/2004 | Freeman et al. |
| 6,833,848 B1 | 12/2004 | Wolff et al. |
| 6,834,371 B1 | 12/2004 | Jensen et al. |
| 6,850,256 B2 | 2/2005 | Crow et al. |
| 6,922,147 B1 | 7/2005 | Viksnins et al. |
| 6,975,306 B2 | 12/2005 | Hinckley et al. |
| 7,081,905 B1 | 7/2006 | Raghunath |
| 7,091,964 B2 | 8/2006 | Wong et al. |
| 7,111,240 B2 | 9/2006 | Crow et al. |
| 7,191,411 B2 | 3/2007 | Moehrle |
| 7,240,297 B1 | 7/2007 | Anderson et al. |
| 7,315,984 B2 | 1/2008 | Crow et al. |
| 7,318,196 B2 | 1/2008 | Crow et al. |
| 7,370,244 B2 | 5/2008 | Breitling et al. |
| 7,415,720 B2 | 8/2008 | Jung |
| 7,441,207 B2 | 10/2008 | Filner |
| 7,454,192 B1 | 11/2008 | Zhu |
| 7,458,025 B2 | 11/2008 | Crow et al. |
| 7,479,949 B2 | 1/2009 | Jobs et al. |
| 7,492,350 B2 | 2/2009 | Fabre et al. |
| 7,526,728 B2 | 4/2009 | Apparao et al. |
| 7,546,470 B2 | 6/2009 | Schultz |
| 7,571,014 B1 | 8/2009 | Lambourne et al. |
| 7,581,186 B2 | 8/2009 | Dowdy et al. |
| 7,596,761 B2 | 9/2009 | Lemay et al. |
| 7,656,393 B2 | 2/2010 | King et al. |
| 7,710,393 B2 | 5/2010 | Tsuk et al. |
| 7,730,223 B1 | 6/2010 | Bavor et al. |
| 7,750,893 B2 | 7/2010 | Hashimoto et al. |
| 7,831,054 B2 | 11/2010 | Ball et al. |
| 7,860,936 B1 | 12/2010 | Newstadt et al. |
| 7,996,792 B2 | 8/2011 | Anzures et al. |
| 8,028,323 B2 | 9/2011 | Weel |
| 8,042,157 B2 | 10/2011 | Bennett et al. |
| 8,046,804 B2 | 10/2011 | Kelts |
| 8,060,571 B2 | 11/2011 | Rao |
| 8,060,825 B2 | 11/2011 | Chaudhri et al. |
| 8,077,157 B2 | 12/2011 | Sengupta et al. |
| 8,116,807 B2 | 2/2012 | Matas |
| 8,146,019 B2 | 3/2012 | Kim et al. |
| 8,171,137 B1 | 5/2012 | Parks et al. |
| 8,196,043 B2 | 6/2012 | Crow et al. |
| 8,217,906 B2 | 7/2012 | Sinclair |
| 8,224,894 B1 | 7/2012 | Parks et al. |
| 8,225,191 B1 | 7/2012 | Kalman |
| 8,234,395 B2 | 7/2012 | Millington |
| 8,260,879 B2 | 9/2012 | Chan |
| 8,264,465 B2 | 9/2012 | Grant et al. |
| 8,280,539 B2 | 10/2012 | Jehan et al. |
| 8,290,603 B1 | 10/2012 | Lambourne |
| 8,305,356 B1 | 11/2012 | Jang |
| 8,386,563 B2 | 2/2013 | Parks et al. |
| 8,392,259 B2 | 3/2013 | Macgillivray et al. |
| 8,392,617 B1 | 3/2013 | Weber et al. |
| 8,434,133 B2 | 4/2013 | Kulkarni et al. |
| 8,458,780 B1 | 6/2013 | Takkallapally et al. |
| 8,467,766 B2 | 6/2013 | Rackley, III et al. |
| 8,478,363 B2 | 7/2013 | Levien et al. |

(56) References Cited

U.S. PATENT DOCUMENTS

| | | |
|---|---|---|
| 8,478,816 B2 | 7/2013 | Parks et al. |
| 8,531,427 B2 | 9/2013 | Jang |
| 8,564,543 B2 | 10/2013 | Chaudhri |
| 8,572,513 B2 | 10/2013 | Chaudhri et al. |
| 8,587,528 B2 | 11/2013 | Chaudhri |
| 8,589,823 B2 | 11/2013 | Lemay et al. |
| 8,613,070 B1 | 12/2013 | Borzycki et al. |
| 8,624,836 B1 | 1/2014 | Miller et al. |
| 8,682,722 B1 | 3/2014 | Des Jardins et al. |
| 8,689,128 B2 | 4/2014 | Chaudhri et al. |
| 8,698,762 B2 | 4/2014 | Wagner et al. |
| 8,718,556 B2 | 5/2014 | Lee et al. |
| 8,736,557 B2 | 5/2014 | Chaudhri et al. |
| 8,769,624 B2 | 7/2014 | Cotterill |
| 8,812,601 B2 | 8/2014 | Hsieh et al. |
| 8,830,181 B1 | 9/2014 | Clark et al. |
| 8,860,674 B2 | 10/2014 | Lee et al. |
| 8,875,046 B2 | 10/2014 | Jitkoff |
| 8,884,874 B1 | 11/2014 | Kim et al. |
| 8,886,710 B2 | 11/2014 | Evans et al. |
| 8,914,752 B1 | 12/2014 | Spiegel |
| 8,914,840 B2 | 12/2014 | Reisman |
| 8,943,410 B2 | 1/2015 | Ubillos |
| 8,984,431 B2 | 3/2015 | Newman et al. |
| 9,002,322 B2 | 4/2015 | Cotterill |
| 9,042,556 B2 | 5/2015 | Kallai et al. |
| 9,084,003 B1 | 7/2015 | Sanio et al. |
| 9,095,779 B2 | 8/2015 | Chan et al. |
| 9,112,849 B1 | 8/2015 | Werkelin Ahlin et al. |
| 9,134,902 B2 | 9/2015 | Kang et al. |
| 9,185,062 B1 | 11/2015 | Yang et al. |
| 9,195,219 B2 | 11/2015 | Hong et al. |
| 9,202,509 B2 | 12/2015 | Kallai et al. |
| 9,244,584 B2 | 1/2016 | Fino |
| 9,247,363 B2 | 1/2016 | Triplett et al. |
| 9,251,787 B1 | 2/2016 | Hart et al. |
| 9,269,083 B1 | 2/2016 | Jarajapu et al. |
| 9,294,476 B1 | 3/2016 | Lurey et al. |
| 9,294,853 B1 | 3/2016 | Dhaundiyal |
| 9,319,782 B1 | 4/2016 | Crump et al. |
| 9,374,607 B2 | 6/2016 | Bates et al. |
| 9,395,905 B2 | 7/2016 | Wherry |
| D765,118 S | 8/2016 | Bachman et al. |
| 9,431,021 B1 | 8/2016 | Scalise et al. |
| 9,450,812 B2 | 9/2016 | Lee et al. |
| 9,489,106 B2 | 11/2016 | Chaudhri et al. |
| D773,510 S | 12/2016 | Foss et al. |
| 9,519,413 B2 | 12/2016 | Bates |
| 9,549,323 B2 | 1/2017 | Lee et al. |
| 9,582,178 B2 | 2/2017 | Grant et al. |
| 9,628,414 B1 | 4/2017 | Umapathy et al. |
| D789,381 S | 6/2017 | Okumura et al. |
| 9,680,927 B2 | 6/2017 | Miller et al. |
| 9,680,982 B2 | 6/2017 | Fiedler |
| 9,710,639 B1 | 7/2017 | Saini |
| 9,727,749 B2 | 8/2017 | Tzeng et al. |
| 9,794,720 B1 | 10/2017 | Kadri |
| 9,798,443 B1 | 10/2017 | Gray |
| 9,820,323 B1 | 11/2017 | Young et al. |
| 9,846,685 B2 | 12/2017 | Li |
| 9,847,999 B2 | 12/2017 | Van Os et al. |
| 9,898,250 B1 | 2/2018 | Williams et al. |
| 9,922,317 B2 | 3/2018 | Bak |
| 9,954,989 B2 | 4/2018 | Zhou |
| 9,967,401 B2 | 5/2018 | Coffman et al. |
| 10,055,094 B2 | 8/2018 | Li et al. |
| 10,089,607 B2 | 10/2018 | Ziat et al. |
| 10,096,015 B2 | 10/2018 | Bak |
| 10,104,089 B2 | 10/2018 | Kim et al. |
| 10,129,044 B2 | 11/2018 | Kangshang et al. |
| 10,142,122 B1 | 11/2018 | Hill et al. |
| 10,178,234 B2 | 1/2019 | Coffman et al. |
| 10,182,138 B2 | 1/2019 | Motika et al. |
| 10,198,563 B2 | 2/2019 | Wang et al. |
| 10,200,468 B2 | 2/2019 | Leban et al. |
| 10,225,711 B2 | 3/2019 | Parks et al. |
| 10,237,141 B2 | 3/2019 | Sasaki et al. |
| 10,248,779 B2 | 4/2019 | Song et al. |
| 10,284,980 B1 | 5/2019 | Woo et al. |
| 10,299,300 B1 | 5/2019 | Young |
| 10,303,422 B1 | 5/2019 | Woo et al. |
| 10,310,725 B2 | 6/2019 | Smith et al. |
| 10,334,054 B2 | 6/2019 | Van Os et al. |
| 10,374,804 B2 | 8/2019 | Lee et al. |
| 10,417,037 B2 | 9/2019 | Gruber et al. |
| 10,436,977 B2 | 10/2019 | Bergman et al. |
| 10,454,781 B2 | 10/2019 | Sasaki et al. |
| 10,511,456 B2 | 12/2019 | Smith et al. |
| 10,523,625 B1 | 12/2019 | Allen et al. |
| 10,524,300 B2 | 12/2019 | Ueda et al. |
| 10,705,701 B2 | 7/2020 | Pisula et al. |
| 10,713,699 B1 | 7/2020 | Lien et al. |
| 10,732,819 B2 | 8/2020 | Wang et al. |
| 10,742,645 B2 | 8/2020 | Hevizi et al. |
| 10,742,648 B2 | 8/2020 | Magyar et al. |
| 10,749,967 B2 | 8/2020 | Van Os et al. |
| 10,779,085 B1 | 9/2020 | Carrigan |
| 10,824,299 B2 | 11/2020 | Bai |
| 10,833,887 B2 | 11/2020 | Wu |
| 10,924,446 B1 | 2/2021 | Paul |
| 10,963,145 B1 | 3/2021 | Voss et al. |
| 11,079,913 B1 | 8/2021 | Kim et al. |
| 11,281,711 B2 | 3/2022 | Sanders et al. |
| 11,343,370 B1 | 5/2022 | Gordon et al. |
| 11,431,834 B1 | 8/2022 | Gordon et al. |
| 11,463,576 B1 | 10/2022 | Gordon et al. |
| 2001/0030597 A1 | 10/2001 | Inoue et al. |
| 2001/0031622 A1 | 10/2001 | Kivela et al. |
| 2001/0039497 A1 | 11/2001 | Hubbard |
| 2001/0043514 A1 | 11/2001 | Kita et al. |
| 2001/0049627 A1 | 12/2001 | Simpson |
| 2001/0050687 A1 | 12/2001 | Iida et al. |
| 2002/0002039 A1 | 1/2002 | Qureshey et al. |
| 2002/0015024 A1 | 2/2002 | Westerman et al. |
| 2002/0026442 A1 | 2/2002 | Lipscomb et al. |
| 2002/0048224 A1 | 4/2002 | Dygert et al. |
| 2002/0054158 A1 | 5/2002 | Asami |
| 2002/0054164 A1 | 5/2002 | Uemura |
| 2002/0057262 A1 | 5/2002 | Patrick et al. |
| 2002/0059295 A1 | 5/2002 | Ludtke et al. |
| 2002/0068600 A1 | 6/2002 | Chihara et al. |
| 2002/0080151 A1 | 6/2002 | Venolia |
| 2002/0116276 A1 | 8/2002 | Ottley |
| 2002/0122066 A1 | 9/2002 | Bates et al. |
| 2002/0137565 A1 | 9/2002 | Blanco |
| 2002/0142734 A1 | 10/2002 | Wickstead |
| 2002/0154173 A1 | 10/2002 | Etgen et al. |
| 2002/0168938 A1 | 11/2002 | Chang |
| 2002/0191028 A1 | 12/2002 | Senechalle et al. |
| 2002/0198909 A1 | 12/2002 | Huynh et al. |
| 2003/0028382 A1 | 2/2003 | Chambers et al. |
| 2003/0028639 A1 | 2/2003 | Yamamoto et al. |
| 2003/0030673 A1 | 2/2003 | Ho |
| 2003/0052901 A1 | 3/2003 | Fukuchi |
| 2003/0055977 A1 | 3/2003 | Miller |
| 2003/0067908 A1 | 4/2003 | Mattaway et al. |
| 2003/0076301 A1 | 4/2003 | Tsuk et al. |
| 2003/0079057 A1 | 4/2003 | Ruskin et al. |
| 2003/0097358 A1 | 5/2003 | Mendez et al. |
| 2003/0097413 A1 | 5/2003 | Vishik et al. |
| 2003/0112938 A1 | 6/2003 | Kanakubo et al. |
| 2003/0122787 A1 | 7/2003 | Zimmerman et al. |
| 2003/0128192 A1 | 7/2003 | Van Os |
| 2003/0160861 A1 | 8/2003 | Barlow et al. |
| 2003/0182139 A1 | 9/2003 | Harris et al. |
| 2003/0188183 A1 | 10/2003 | Lee et al. |
| 2003/0229900 A1 | 12/2003 | Reisman |
| 2004/0019640 A1 | 1/2004 | Bartram et al. |
| 2004/0027371 A1 | 2/2004 | Jaeger |
| 2004/0032955 A1 | 2/2004 | Hashimoto et al. |
| 2004/0046638 A1 | 3/2004 | Kawasaki |
| 2004/0055446 A1 | 3/2004 | Robbin et al. |
| 2004/0056837 A1 | 3/2004 | Koga et al. |
| 2004/0073432 A1 | 4/2004 | Stone |

(56) References Cited

U.S. PATENT DOCUMENTS

| | | |
|---|---|---|
| 2004/0100479 A1 | 5/2004 | Nakano et al. |
| 2004/0104896 A1 | 6/2004 | Suraqui |
| 2004/0122683 A1 | 6/2004 | Grossman et al. |
| 2004/0125088 A1 | 7/2004 | Zimmerman et al. |
| 2004/0130581 A1 | 7/2004 | Howard et al. |
| 2004/0139398 A1 | 7/2004 | Testa et al. |
| 2004/0140956 A1 | 7/2004 | Kushler et al. |
| 2004/0155907 A1 | 8/2004 | Yamaguchi et al. |
| 2004/0168118 A1 | 8/2004 | Wong et al. |
| 2004/0181695 A1 | 9/2004 | Walker et al. |
| 2004/0189714 A1 | 9/2004 | Fox et al. |
| 2004/0235520 A1 | 11/2004 | Cadiz et al. |
| 2004/0237048 A1 | 11/2004 | Tojo et al. |
| 2004/0242200 A1 | 12/2004 | Maeoka et al. |
| 2004/0250217 A1 | 12/2004 | Tojo et al. |
| 2004/0261010 A1 | 12/2004 | Matsuishi |
| 2004/0264916 A1 | 12/2004 | Van et al. |
| 2004/0268400 A1 | 12/2004 | Barde et al. |
| 2005/0012723 A1 | 1/2005 | Pallakoff |
| 2005/0021418 A1 | 1/2005 | Marcus et al. |
| 2005/0024341 A1 | 2/2005 | Gillespie et al. |
| 2005/0052458 A1 | 3/2005 | Lambert |
| 2005/0071188 A1 | 3/2005 | Thuerk |
| 2005/0093868 A1 | 5/2005 | Hinckley |
| 2005/0096009 A1 | 5/2005 | Ackley |
| 2005/0097135 A1 | 5/2005 | Epperson et al. |
| 2005/0117752 A1 | 6/2005 | Iima et al. |
| 2005/0144247 A1 | 6/2005 | Christensen et al. |
| 2005/0144452 A1 | 6/2005 | Lynch et al. |
| 2005/0144568 A1 | 6/2005 | Gruen et al. |
| 2005/0146534 A1 | 7/2005 | Fong et al. |
| 2005/0160372 A1 | 7/2005 | Gruen et al. |
| 2005/0162402 A1 | 7/2005 | Watanachote |
| 2005/0177445 A1 | 8/2005 | Church |
| 2005/0181774 A1 | 8/2005 | Miyata |
| 2005/0192924 A1 | 9/2005 | Drucker et al. |
| 2005/0210412 A1 | 9/2005 | Matthews et al. |
| 2005/0216839 A1 | 9/2005 | Salvucci |
| 2005/0220304 A1 | 10/2005 | Lenoir et al. |
| 2005/0229112 A1 | 10/2005 | Clay et al. |
| 2005/0240756 A1 | 10/2005 | Mayer |
| 2005/0251566 A1 | 11/2005 | Weel |
| 2005/0275628 A1 | 12/2005 | Balakrishnan et al. |
| 2005/0278587 A1 | 12/2005 | Breitling et al. |
| 2006/0001645 A1 | 1/2006 | Drucker et al. |
| 2006/0002523 A1 | 1/2006 | Bettis et al. |
| 2006/0020637 A1 | 1/2006 | Kedem |
| 2006/0020904 A1 | 1/2006 | Aaltonen et al. |
| 2006/0026535 A1 | 2/2006 | Hotelling et al. |
| 2006/0026536 A1 | 2/2006 | Hotelling et al. |
| 2006/0038796 A1 | 2/2006 | Hinckley et al. |
| 2006/0050054 A1 | 3/2006 | Liang et al. |
| 2006/0085751 A1 | 4/2006 | O'brien et al. |
| 2006/0085766 A1 | 4/2006 | Dominowska et al. |
| 2006/0125799 A1 | 6/2006 | Hillis et al. |
| 2006/0132456 A1 | 6/2006 | Anson |
| 2006/0132460 A1 | 6/2006 | Kolmykov-Zotov et al. |
| 2006/0132469 A1 | 6/2006 | Lai et al. |
| 2006/0146074 A1 | 7/2006 | Harrison |
| 2006/0148455 A1 | 7/2006 | Kim |
| 2006/0156239 A1 | 7/2006 | Jobs et al. |
| 2006/0160090 A1 | 7/2006 | Macina et al. |
| 2006/0161621 A1 | 7/2006 | Rosenberg |
| 2006/0161870 A1 | 7/2006 | Hotelling et al. |
| 2006/0161871 A1 | 7/2006 | Hotelling et al. |
| 2006/0176278 A1 | 8/2006 | Mathews et al. |
| 2006/0178110 A1 | 8/2006 | Nurminen et al. |
| 2006/0185005 A1 | 8/2006 | Graves et al. |
| 2006/0197753 A1 | 9/2006 | Hotelling |
| 2006/0206709 A1 | 9/2006 | Labrou et al. |
| 2006/0217104 A1 | 9/2006 | Cho |
| 2006/0224882 A1 | 10/2006 | Chin |
| 2006/0227106 A1 | 10/2006 | Hashimoto et al. |
| 2006/0236847 A1 | 10/2006 | Withop |
| 2006/0246874 A1 | 11/2006 | Sullivan |
| 2006/0250578 A1 | 11/2006 | Pohl et al. |
| 2006/0256090 A1 | 11/2006 | Huppi |
| 2006/0258289 A1 | 11/2006 | Dua |
| 2006/0268020 A1 | 11/2006 | Han |
| 2006/0271425 A1 | 11/2006 | Goodman et al. |
| 2006/0271864 A1 | 11/2006 | Satterfield et al. |
| 2006/0271867 A1 | 11/2006 | Wang et al. |
| 2006/0279541 A1 | 12/2006 | Kim et al. |
| 2006/0281449 A1 | 12/2006 | Kun et al. |
| 2006/0286971 A1 | 12/2006 | Maly et al. |
| 2006/0288226 A1 | 12/2006 | Kowal |
| 2007/0011614 A1 | 1/2007 | Crow et al. |
| 2007/0013671 A1 | 1/2007 | Zadesky et al. |
| 2007/0027682 A1 | 2/2007 | Bennett |
| 2007/0033295 A1 | 2/2007 | Marriott |
| 2007/0048714 A1 | 3/2007 | Plastina et al. |
| 2007/0053268 A1 | 3/2007 | Crandall et al. |
| 2007/0070045 A1 | 3/2007 | Sung et al. |
| 2007/0070066 A1 | 3/2007 | Bakhash |
| 2007/0073649 A1 | 3/2007 | Kikkoji et al. |
| 2007/0085841 A1 | 4/2007 | Tsuk et al. |
| 2007/0097090 A1 | 5/2007 | Battles |
| 2007/0097093 A1 | 5/2007 | Ohshita et al. |
| 2007/0113294 A1 | 5/2007 | Field et al. |
| 2007/0115933 A1 | 5/2007 | Muhamed et al. |
| 2007/0124680 A1 | 5/2007 | Robbin et al. |
| 2007/0126715 A1 | 6/2007 | Funamoto |
| 2007/0136679 A1 | 6/2007 | Yang |
| 2007/0136778 A1 | 6/2007 | Birger et al. |
| 2007/0143495 A1 | 6/2007 | Porat |
| 2007/0150842 A1 | 6/2007 | Chaudhri et al. |
| 2007/0152979 A1 | 7/2007 | Jobs et al. |
| 2007/0157089 A1 | 7/2007 | Van Os et al. |
| 2007/0157094 A1 | 7/2007 | Lemay et al. |
| 2007/0157103 A1 | 7/2007 | Arneson et al. |
| 2007/0162963 A1 | 7/2007 | Penet et al. |
| 2007/0168369 A1 | 7/2007 | Bruns |
| 2007/0168413 A1 | 7/2007 | Barletta et al. |
| 2007/0180492 A1 | 8/2007 | Hassan et al. |
| 2007/0186106 A1 | 8/2007 | Ting et al. |
| 2007/0186235 A1 | 8/2007 | Jarman et al. |
| 2007/0191008 A1 | 8/2007 | Bucher et al. |
| 2007/0192744 A1 | 8/2007 | Reponen |
| 2007/0198111 A1 | 8/2007 | Oetzel et al. |
| 2007/0226645 A1 | 9/2007 | Kongqiao et al. |
| 2007/0226778 A1 | 9/2007 | Pietruszka |
| 2007/0229221 A1 | 10/2007 | Saotome |
| 2007/0260547 A1 | 11/2007 | Little |
| 2007/0283011 A1 | 12/2007 | Rakowski et al. |
| 2007/0294182 A1 | 12/2007 | Hammad |
| 2008/0011827 A1 | 1/2008 | Little et al. |
| 2008/0016368 A1 | 1/2008 | Adams |
| 2008/0016468 A1 | 1/2008 | Chambers et al. |
| 2008/0016537 A1 | 1/2008 | Little et al. |
| 2008/0017721 A1 | 1/2008 | Zehnacker |
| 2008/0027947 A1 | 1/2008 | Pritchett et al. |
| 2008/0034011 A1 | 2/2008 | Cisler et al. |
| 2008/0034289 A1 | 2/2008 | Doepke et al. |
| 2008/0036743 A1 | 2/2008 | Westerman et al. |
| 2008/0037951 A1 | 2/2008 | Cho et al. |
| 2008/0040786 A1 | 2/2008 | Chang et al. |
| 2008/0042866 A1 | 2/2008 | Morse et al. |
| 2008/0055264 A1 | 3/2008 | Anzures et al. |
| 2008/0062141 A1 | 3/2008 | Chaudhri |
| 2008/0065505 A1 | 3/2008 | Plastina et al. |
| 2008/0066016 A1 | 3/2008 | Dowdy et al. |
| 2008/0075368 A1 | 3/2008 | Kuzmin |
| 2008/0081558 A1 | 4/2008 | Dunko et al. |
| 2008/0082939 A1 | 4/2008 | Nash et al. |
| 2008/0084400 A1 | 4/2008 | Rosenberg |
| 2008/0091717 A1 | 4/2008 | Garbow et al. |
| 2008/0094367 A1 | 4/2008 | Van De Ven et al. |
| 2008/0109764 A1 | 5/2008 | Linnamaki |
| 2008/0114678 A1 | 5/2008 | Bennett et al. |
| 2008/0114980 A1 | 5/2008 | Sridhar |
| 2008/0122794 A1 | 5/2008 | Koiso et al. |
| 2008/0122796 A1 | 5/2008 | Jobs et al. |
| 2008/0126935 A1 | 5/2008 | Blomgren |
| 2008/0147735 A1 | 6/2008 | Sloe |

(56) References Cited

U.S. PATENT DOCUMENTS

| | | |
|---|---|---|
| 2008/0155413 A1 | 6/2008 | Ubillos et al. |
| 2008/0155417 A1 | 6/2008 | Vallone et al. |
| 2008/0155474 A1 | 6/2008 | Duhig et al. |
| 2008/0158170 A1 | 7/2008 | Herz et al. |
| 2008/0160974 A1 | 7/2008 | Vartiainen et al. |
| 2008/0163127 A1 | 7/2008 | Newell et al. |
| 2008/0165141 A1 | 7/2008 | Christie |
| 2008/0165152 A1 | 7/2008 | Forstall et al. |
| 2008/0165153 A1 | 7/2008 | Platzer et al. |
| 2008/0168185 A1 | 7/2008 | Robbin et al. |
| 2008/0168384 A1 | 7/2008 | Platzer et al. |
| 2008/0168395 A1 | 7/2008 | Ording et al. |
| 2008/0168403 A1 | 7/2008 | Westerman et al. |
| 2008/0190266 A1 | 8/2008 | Kim et al. |
| 2008/0201454 A1 | 8/2008 | Softer |
| 2008/0208762 A1 | 8/2008 | Arthur et al. |
| 2008/0214163 A1 | 9/2008 | Onyon et al. |
| 2008/0222546 A1 | 9/2008 | Mudd et al. |
| 2008/0225007 A1 | 9/2008 | Nakadaira et al. |
| 2008/0225013 A1 | 9/2008 | Muylkens et al. |
| 2008/0229409 A1 | 9/2008 | Miller et al. |
| 2008/0250319 A1 | 10/2008 | Lee et al. |
| 2008/0259829 A1 | 10/2008 | Rosenblatt |
| 2008/0273712 A1 | 11/2008 | Eichfeld et al. |
| 2008/0273713 A1 | 11/2008 | Hartung et al. |
| 2008/0282202 A1 | 11/2008 | Sunday |
| 2008/0285772 A1 | 11/2008 | Haulick et al. |
| 2008/0292074 A1 | 11/2008 | Boni et al. |
| 2008/0305742 A1 | 12/2008 | Basir |
| 2008/0313257 A1 | 12/2008 | Allen et al. |
| 2008/0320391 A1 | 12/2008 | Lemay et al. |
| 2009/0002335 A1 | 1/2009 | Chaudhri |
| 2009/0002396 A1 | 1/2009 | Andrews et al. |
| 2009/0006846 A1 | 1/2009 | Rosenblatt |
| 2009/0006958 A1 | 1/2009 | Pohjola et al. |
| 2009/0007188 A1 | 1/2009 | Omernick |
| 2009/0031375 A1 | 1/2009 | Sullivan et al. |
| 2009/0054044 A1 | 2/2009 | Ikemori et al. |
| 2009/0055377 A1 | 2/2009 | Hedge et al. |
| 2009/0058822 A1 | 3/2009 | Chaudhri |
| 2009/0060170 A1 | 3/2009 | Coughlan et al. |
| 2009/0061837 A1 | 3/2009 | Chaudhri et al. |
| 2009/0063851 A1 | 3/2009 | Nijdam |
| 2009/0075694 A1 | 3/2009 | Kim et al. |
| 2009/0077491 A1 | 3/2009 | Kim |
| 2009/0094681 A1 | 4/2009 | Sadler et al. |
| 2009/0100383 A1 | 4/2009 | Sunday et al. |
| 2009/0119754 A1 | 5/2009 | Schubert |
| 2009/0122149 A1 | 5/2009 | Ishii |
| 2009/0125571 A1 | 5/2009 | Kiilerich et al. |
| 2009/0128500 A1 | 5/2009 | Sinclair |
| 2009/0135678 A1 | 5/2009 | Godat |
| 2009/0140960 A1 | 6/2009 | Mahowald et al. |
| 2009/0140991 A1 | 6/2009 | Takasaki et al. |
| 2009/0144391 A1 | 6/2009 | Jung et al. |
| 2009/0144451 A1 | 6/2009 | Cabezas et al. |
| 2009/0144623 A1 | 6/2009 | Jung |
| 2009/0153289 A1 | 6/2009 | Hope et al. |
| 2009/0158390 A1 | 6/2009 | Guan |
| 2009/0164581 A1 | 6/2009 | Bove et al. |
| 2009/0165107 A1 | 6/2009 | Tojo et al. |
| 2009/0174677 A1 | 7/2009 | Gehani et al. |
| 2009/0174680 A1 | 7/2009 | Anzures et al. |
| 2009/0174763 A1 | 7/2009 | Bengtsson et al. |
| 2009/0177966 A1 | 7/2009 | Chaudhri |
| 2009/0187423 A1 | 7/2009 | Kim |
| 2009/0187981 A1 | 7/2009 | Pan et al. |
| 2009/0193514 A1 | 7/2009 | Adams et al. |
| 2009/0195497 A1 | 8/2009 | Fitzgerald et al. |
| 2009/0198359 A1 | 8/2009 | Chaudhri |
| 2009/0199119 A1 | 8/2009 | Park et al. |
| 2009/0199130 A1 | 8/2009 | Tsern et al. |
| 2009/0199188 A1 | 8/2009 | Fujimaki |
| 2009/0204920 A1 | 8/2009 | Beverley et al. |
| 2009/0204929 A1 | 8/2009 | Baurmann et al. |
| 2009/0228938 A1 | 9/2009 | White et al. |
| 2009/0231960 A1 | 9/2009 | Hutcheson |
| 2009/0241169 A1 | 9/2009 | Dhand et al. |
| 2009/0244015 A1 | 10/2009 | Sengupta et al. |
| 2009/0248737 A1 | 10/2009 | Shukla et al. |
| 2009/0249244 A1 | 10/2009 | Robinson et al. |
| 2009/0265417 A1 | 10/2009 | Svendsen et al. |
| 2009/0271744 A1 | 10/2009 | Anders |
| 2009/0304205 A1 | 12/2009 | Hardacker et al. |
| 2009/0307633 A1 | 12/2009 | Haughay et al. |
| 2009/0311993 A1 | 12/2009 | Horodezky |
| 2009/0322695 A1 | 12/2009 | Cho et al. |
| 2009/0327449 A1 | 12/2009 | Silverman et al. |
| 2010/0001967 A1 | 1/2010 | Yoo |
| 2010/0004031 A1 | 1/2010 | Kim |
| 2010/0005421 A1 | 1/2010 | Yoshioka |
| 2010/0023449 A1 | 1/2010 | Skowronek et al. |
| 2010/0042654 A1 | 2/2010 | Heller et al. |
| 2010/0042835 A1 | 2/2010 | Lee et al. |
| 2010/0054497 A1 | 3/2010 | Bull et al. |
| 2010/0058228 A1 | 3/2010 | Park |
| 2010/0058253 A1 | 3/2010 | Son |
| 2010/0070490 A1 | 3/2010 | Amidon et al. |
| 2010/0075656 A1 | 3/2010 | Howarter et al. |
| 2010/0082481 A1 | 4/2010 | Lin et al. |
| 2010/0085379 A1 | 4/2010 | Hishikawa et al. |
| 2010/0088634 A1 | 4/2010 | Tsuruta et al. |
| 2010/0088639 A1 | 4/2010 | Yach et al. |
| 2010/0094834 A1 | 4/2010 | Svendsen |
| 2010/0106647 A1 | 4/2010 | Raman |
| 2010/0107229 A1 | 4/2010 | Najafi et al. |
| 2010/0121636 A1 | 5/2010 | Burke et al. |
| 2010/0122195 A1 | 5/2010 | Hwang |
| 2010/0125785 A1 | 5/2010 | Moore et al. |
| 2010/0131978 A1 | 5/2010 | Friedlander et al. |
| 2010/0138780 A1 | 6/2010 | Marano et al. |
| 2010/0159995 A1 | 6/2010 | Stallings et al. |
| 2010/0174644 A1 | 7/2010 | Rosano et al. |
| 2010/0174993 A1 | 7/2010 | Pennington et al. |
| 2010/0178873 A1 | 7/2010 | Lee et al. |
| 2010/0205563 A1 | 8/2010 | Haapsaari et al. |
| 2010/0223542 A1 | 9/2010 | Vuong et al. |
| 2010/0229094 A1 | 9/2010 | Nakajima et al. |
| 2010/0231534 A1 | 9/2010 | Chaudhri et al. |
| 2010/0231535 A1 | 9/2010 | Chaudhri et al. |
| 2010/0231536 A1 | 9/2010 | Chaudhri et al. |
| 2010/0231537 A1 | 9/2010 | Pisula et al. |
| 2010/0235729 A1 | 9/2010 | Kocienda et al. |
| 2010/0248823 A1 | 9/2010 | Smith |
| 2010/0250376 A1 | 9/2010 | Nandiraju |
| 2010/0251304 A1 | 9/2010 | Donoghue et al. |
| 2010/0257484 A1 | 10/2010 | Nakamura et al. |
| 2010/0259482 A1 | 10/2010 | Ball |
| 2010/0269156 A1 | 10/2010 | Hohlfeld et al. |
| 2010/0272250 A1 | 10/2010 | Yap et al. |
| 2010/0283743 A1 | 11/2010 | Coddington |
| 2010/0284389 A1 | 11/2010 | Ramsay et al. |
| 2010/0293598 A1 | 11/2010 | Collart et al. |
| 2010/0295803 A1 | 11/2010 | Kim et al. |
| 2010/0296678 A1 | 11/2010 | Kuhn-Rahloff et al. |
| 2010/0299436 A1 | 11/2010 | Khalid et al. |
| 2010/0299639 A1 | 11/2010 | Ramsay et al. |
| 2010/0302172 A1 | 12/2010 | Wilairat et al. |
| 2010/0306657 A1 | 12/2010 | Derbyshire et al. |
| 2010/0318908 A1 | 12/2010 | Neuman et al. |
| 2010/0318917 A1 | 12/2010 | Holladay et al. |
| 2010/0318928 A1 | 12/2010 | Neuman et al. |
| 2010/0318939 A1 | 12/2010 | Moon |
| 2010/0321201 A1 | 12/2010 | Huang et al. |
| 2010/0325239 A1 | 12/2010 | Khedouri et al. |
| 2011/0010470 A1 | 1/2011 | Hulbert et al. |
| 2011/0016089 A1 | 1/2011 | Freedman et al. |
| 2011/0029750 A1 | 2/2011 | Jang et al. |
| 2011/0029891 A1 | 2/2011 | Kim et al. |
| 2011/0035799 A1 | 2/2011 | Handler |
| 2011/0041102 A1 | 2/2011 | Kim |
| 2011/0054268 A1 | 3/2011 | Fidacaro et al. |
| 2011/0059769 A1 | 3/2011 | Brunolli |
| 2011/0065384 A1 | 3/2011 | Cader et al. |

(56) References Cited

U.S. PATENT DOCUMENTS

| | | |
|---|---|---|
| 2011/0071656 A1 | 3/2011 | Mckiel, Jr. |
| 2011/0081923 A1 | 4/2011 | Bednar et al. |
| 2011/0082902 A1 | 4/2011 | Rottler et al. |
| 2011/0087431 A1 | 4/2011 | Gupta et al. |
| 2011/0088086 A1 | 4/2011 | Swink et al. |
| 2011/0106671 A1 | 5/2011 | Minnis et al. |
| 2011/0126148 A1 | 5/2011 | Krishnaraj et al. |
| 2011/0130168 A1 | 6/2011 | Vendrow et al. |
| 2011/0131537 A1 | 6/2011 | Cho et al. |
| 2011/0138166 A1 | 6/2011 | Peszek et al. |
| 2011/0138295 A1 | 6/2011 | Momchilov et al. |
| 2011/0142234 A1 | 6/2011 | Rogers |
| 2011/0149874 A1 | 6/2011 | Reif |
| 2011/0159469 A1 | 6/2011 | Hwang et al. |
| 2011/0159927 A1 | 6/2011 | Choi |
| 2011/0163971 A1 | 7/2011 | Wagner et al. |
| 2011/0164042 A1 | 7/2011 | Chaudhri |
| 2011/0164269 A1 | 7/2011 | Kamishiro |
| 2011/0179386 A1 | 7/2011 | Shaffer et al. |
| 2011/0187497 A1 | 8/2011 | Chin |
| 2011/0191695 A1 | 8/2011 | Dinka et al. |
| 2011/0209099 A1 | 8/2011 | Hinckley et al. |
| 2011/0214158 A1 | 9/2011 | Pasquero et al. |
| 2011/0215921 A1 | 9/2011 | Ben et al. |
| 2011/0225426 A1 | 9/2011 | Agarwal et al. |
| 2011/0231914 A1 | 9/2011 | Hung |
| 2011/0242002 A1 | 10/2011 | Kaplan et al. |
| 2011/0246942 A1 | 10/2011 | Misawa |
| 2011/0250895 A1 | 10/2011 | Wohlert et al. |
| 2011/0254683 A1 | 10/2011 | Soldan et al. |
| 2011/0273526 A1 | 11/2011 | Mehin et al. |
| 2011/0275358 A1 | 11/2011 | Faenger |
| 2011/0279852 A1 | 11/2011 | Oda et al. |
| 2011/0281568 A1 | 11/2011 | Le |
| 2011/0291971 A1 | 12/2011 | Masaki et al. |
| 2011/0302493 A1 | 12/2011 | Runstedler et al. |
| 2011/0314398 A1 | 12/2011 | Yano et al. |
| 2011/0319056 A1 | 12/2011 | Toy et al. |
| 2011/0320450 A1 | 12/2011 | Liu et al. |
| 2012/0004920 A1 | 1/2012 | Kelly et al. |
| 2012/0005708 A1 | 1/2012 | Kelts |
| 2012/0011437 A1 | 1/2012 | James et al. |
| 2012/0016678 A1 | 1/2012 | Gruber et al. |
| 2012/0024947 A1 | 2/2012 | Naelon et al. |
| 2012/0033028 A1 | 2/2012 | Murphy et al. |
| 2012/0036556 A1 | 2/2012 | Lebeau et al. |
| 2012/0040719 A1 | 2/2012 | Lee et al. |
| 2012/0044062 A1 | 2/2012 | Jersa et al. |
| 2012/0050185 A1 | 3/2012 | Davydov et al. |
| 2012/0051560 A1 | 3/2012 | Sanders |
| 2012/0054278 A1 | 3/2012 | Taleb et al. |
| 2012/0059813 A1 | 3/2012 | Sejnoha et al. |
| 2012/0066632 A1 | 3/2012 | Sundermeyer et al. |
| 2012/0066731 A1 | 3/2012 | Vasquez et al. |
| 2012/0079126 A1 | 3/2012 | Evans et al. |
| 2012/0084697 A1 | 4/2012 | Reeves |
| 2012/0088477 A1 | 4/2012 | Cassidy et al. |
| 2012/0089951 A1 | 4/2012 | Cassidy |
| 2012/0096069 A1 | 4/2012 | Chan |
| 2012/0096076 A1 | 4/2012 | Chan et al. |
| 2012/0096386 A1 | 4/2012 | Baumann et al. |
| 2012/0105358 A1 | 5/2012 | Momeyer et al. |
| 2012/0110455 A1 | 5/2012 | Sharma et al. |
| 2012/0115608 A1 | 5/2012 | Pfeifer et al. |
| 2012/0129496 A1 | 5/2012 | Park et al. |
| 2012/0131459 A1 | 5/2012 | Ilama-Vaquero et al. |
| 2012/0136998 A1 | 5/2012 | Hough et al. |
| 2012/0143694 A1 | 6/2012 | Zargahi et al. |
| 2012/0178431 A1 | 7/2012 | Gold |
| 2012/0197419 A1 | 8/2012 | Dhruv et al. |
| 2012/0210226 A1 | 8/2012 | Mccoy et al. |
| 2012/0214458 A1 | 8/2012 | Levien et al. |
| 2012/0215684 A1 | 8/2012 | Kidron |
| 2012/0222092 A1 | 8/2012 | Rabii |
| 2012/0223890 A1 | 9/2012 | Borovsky et al. |
| 2012/0223959 A1 | 9/2012 | Lengeling et al. |
| 2012/0260169 A1 | 10/2012 | Schwartz et al. |
| 2012/0269361 A1 | 10/2012 | Bhow et al. |
| 2012/0272145 A1 | 10/2012 | Ryan et al. |
| 2012/0272230 A1 | 10/2012 | Lee |
| 2012/0284185 A1 | 11/2012 | Mettler et al. |
| 2012/0284297 A1 | 11/2012 | Aguera-Areas et al. |
| 2012/0284673 A1 | 11/2012 | Lamb et al. |
| 2012/0290657 A1 | 11/2012 | Parks et al. |
| 2012/0290943 A1 | 11/2012 | Toney |
| 2012/0294118 A1 | 11/2012 | Haulick et al. |
| 2012/0297017 A1 | 11/2012 | Livshits et al. |
| 2012/0304111 A1 | 11/2012 | Queru et al. |
| 2012/0311444 A1 | 12/2012 | Chaudhri |
| 2012/0323868 A1 | 12/2012 | Robbin et al. |
| 2012/0324390 A1 | 12/2012 | Tao et al. |
| 2013/0002589 A1 | 1/2013 | Jang |
| 2013/0005487 A1 | 1/2013 | Frazzini et al. |
| 2013/0007203 A1 | 1/2013 | Szu |
| 2013/0007617 A1 | 1/2013 | Mackenzie et al. |
| 2013/0017846 A1 | 1/2013 | Schoppe |
| 2013/0022221 A1 | 1/2013 | Kallai et al. |
| 2013/0024932 A1 | 1/2013 | Toebes et al. |
| 2013/0027289 A1 | 1/2013 | Choi et al. |
| 2013/0027341 A1 | 1/2013 | Mastandrea |
| 2013/0031217 A1 | 1/2013 | Rajapakse |
| 2013/0041790 A1 | 2/2013 | Murugesan et al. |
| 2013/0046893 A1 | 2/2013 | Hauser et al. |
| 2013/0047084 A1 | 2/2013 | Sanders et al. |
| 2013/0047233 A1 | 2/2013 | Fisk et al. |
| 2013/0051755 A1 | 2/2013 | Brown et al. |
| 2013/0053107 A1 | 2/2013 | Kang et al. |
| 2013/0054697 A1 | 2/2013 | Cha et al. |
| 2013/0055082 A1 | 2/2013 | Fino et al. |
| 2013/0055150 A1 | 2/2013 | Galor |
| 2013/0060687 A1 | 3/2013 | Bak |
| 2013/0061155 A1 | 3/2013 | Hon |
| 2013/0063364 A1 | 3/2013 | Moore |
| 2013/0073286 A1 | 3/2013 | Bastea-Forte et al. |
| 2013/0073584 A1 | 3/2013 | Kuper et al. |
| 2013/0074194 A1 | 3/2013 | White et al. |
| 2013/0080177 A1 | 3/2013 | Chen |
| 2013/0080516 A1 | 3/2013 | Bologh |
| 2013/0080525 A1 | 3/2013 | Aoki et al. |
| 2013/0080955 A1 | 3/2013 | Reimann et al. |
| 2013/0082819 A1 | 4/2013 | Cotterill |
| 2013/0086637 A1 | 4/2013 | Cotterill et al. |
| 2013/0091205 A1 | 4/2013 | Kotler et al. |
| 2013/0094666 A1 | 4/2013 | Haaff et al. |
| 2013/0094770 A1 | 4/2013 | Lee et al. |
| 2013/0102281 A1 | 4/2013 | Kanda et al. |
| 2013/0102298 A1 | 4/2013 | Goodman et al. |
| 2013/0103797 A1 | 4/2013 | Park et al. |
| 2013/0111407 A1 | 5/2013 | Mullen |
| 2013/0113822 A1 | 5/2013 | Putrevu et al. |
| 2013/0115932 A1 | 5/2013 | Williams et al. |
| 2013/0117693 A1 | 5/2013 | Anderson et al. |
| 2013/0120254 A1 | 5/2013 | Mun et al. |
| 2013/0124207 A1 | 5/2013 | Sarin et al. |
| 2013/0132865 A1 | 5/2013 | Li |
| 2013/0138272 A1 | 5/2013 | Louise-Babando et al. |
| 2013/0141514 A1 | 6/2013 | Chao et al. |
| 2013/0145303 A1 | 6/2013 | Prakash et al. |
| 2013/0159858 A1 | 6/2013 | Joffray et al. |
| 2013/0162411 A1 | 6/2013 | Moses et al. |
| 2013/0166332 A1 | 6/2013 | Hammad |
| 2013/0173699 A1 | 7/2013 | Parks et al. |
| 2013/0173794 A1 | 7/2013 | Agerbak et al. |
| 2013/0174044 A1 | 7/2013 | Hill |
| 2013/0189963 A1 | 7/2013 | Epp et al. |
| 2013/0191220 A1 | 7/2013 | Dent et al. |
| 2013/0191454 A1 | 7/2013 | Oliver et al. |
| 2013/0191911 A1 | 7/2013 | Dellinger et al. |
| 2013/0194476 A1 | 8/2013 | Shimosato |
| 2013/0205375 A1 | 8/2013 | Woxblom et al. |
| 2013/0212212 A1 | 8/2013 | Addepalli et al. |
| 2013/0222270 A1 | 8/2013 | Winkler et al. |
| 2013/0223821 A1 | 8/2013 | Issa et al. |
| 2013/0231127 A1 | 9/2013 | Kildal et al. |

(56) References Cited

U.S. PATENT DOCUMENTS

| | | |
|---|---|---|
| 2013/0239202 A1 | 9/2013 | Adams et al. |
| 2013/0244615 A1 | 9/2013 | Miller |
| 2013/0246522 A1 | 9/2013 | Bilinski et al. |
| 2013/0246916 A1 | 9/2013 | Reimann et al. |
| 2013/0254574 A1 | 9/2013 | Zacchio et al. |
| 2013/0262857 A1 | 10/2013 | Neuman et al. |
| 2013/0282180 A1 | 10/2013 | Layton |
| 2013/0283161 A1 | 10/2013 | Reimann et al. |
| 2013/0283199 A1 | 10/2013 | Selig et al. |
| 2013/0298024 A1 | 11/2013 | Rhee et al. |
| 2013/0304758 A1 | 11/2013 | Gruber et al. |
| 2013/0305354 A1 | 11/2013 | King et al. |
| 2013/0311597 A1 | 11/2013 | Arrouye et al. |
| 2013/0311986 A1 | 11/2013 | Arrouye et al. |
| 2013/0311997 A1 | 11/2013 | Gruber et al. |
| 2013/0314302 A1 | 11/2013 | Jeung et al. |
| 2013/0318158 A1 | 11/2013 | Teng et al. |
| 2013/0318249 A1 | 11/2013 | Mcdonough et al. |
| 2013/0322634 A1 | 12/2013 | Bennett et al. |
| 2013/0324081 A1 | 12/2013 | Gargi et al. |
| 2013/0325967 A1 | 12/2013 | Parks et al. |
| 2013/0329924 A1 | 12/2013 | Fleizach et al. |
| 2013/0332162 A1 | 12/2013 | Keen |
| 2013/0332560 A1 | 12/2013 | Knight et al. |
| 2013/0333006 A1 | 12/2013 | Tapling et al. |
| 2013/0339343 A1 | 12/2013 | Hierons et al. |
| 2013/0346068 A1 | 12/2013 | Solem et al. |
| 2013/0346859 A1 | 12/2013 | Bates et al. |
| 2013/0347022 A1 | 12/2013 | Bates et al. |
| 2014/0003597 A1 | 1/2014 | Lazaridis et al. |
| 2014/0006562 A1 | 1/2014 | Handa et al. |
| 2014/0026188 A1 | 1/2014 | Gubler |
| 2014/0032706 A1 | 1/2014 | Kuscher et al. |
| 2014/0033035 A1 | 1/2014 | Crow et al. |
| 2014/0037107 A1 | 2/2014 | Marino et al. |
| 2014/0040742 A1 | 2/2014 | Park et al. |
| 2014/0043424 A1 | 2/2014 | Gava et al. |
| 2014/0047020 A1 | 2/2014 | Matus et al. |
| 2014/0047382 A1 | 2/2014 | Kim et al. |
| 2014/0049447 A1 | 2/2014 | Choi |
| 2014/0058860 A1 | 2/2014 | Roh et al. |
| 2014/0064155 A1 | 3/2014 | Evans et al. |
| 2014/0068751 A1 | 3/2014 | Last |
| 2014/0072282 A1 | 3/2014 | Cho |
| 2014/0075130 A1 | 3/2014 | Bansal et al. |
| 2014/0075311 A1 | 3/2014 | Boettcher et al. |
| 2014/0080416 A1* | 3/2014 | Seo .............. H04W 76/14 455/41.2 |
| 2014/0082136 A1 | 3/2014 | Garcia Puga et al. |
| 2014/0082715 A1 | 3/2014 | Grajek et al. |
| 2014/0089196 A1 | 3/2014 | Paya et al. |
| 2014/0095965 A1 | 4/2014 | Li |
| 2014/0104178 A1 | 4/2014 | Jo |
| 2014/0114966 A1 | 4/2014 | Bilinski et al. |
| 2014/0122730 A1 | 5/2014 | Burch et al. |
| 2014/0136481 A1 | 5/2014 | Quan et al. |
| 2014/0136986 A1 | 5/2014 | Martin et al. |
| 2014/0139637 A1 | 5/2014 | Mistry et al. |
| 2014/0143737 A1 | 5/2014 | Mistry et al. |
| 2014/0149884 A1 | 5/2014 | Flynn et al. |
| 2014/0155031 A1 | 6/2014 | Lee et al. |
| 2014/0157160 A1 | 6/2014 | Cudak et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0173447 A1 | 6/2014 | Das et al. |
| 2014/0176298 A1 | 6/2014 | Kumar et al. |
| 2014/0181202 A1 | 6/2014 | Gossain |
| 2014/0181654 A1 | 6/2014 | Kumar et al. |
| 2014/0189589 A1 | 7/2014 | Kim et al. |
| 2014/0207707 A1 | 7/2014 | Na et al. |
| 2014/0215413 A1 | 7/2014 | Calkins et al. |
| 2014/0223490 A1 | 8/2014 | Pan et al. |
| 2014/0229835 A1 | 8/2014 | Ravine |
| 2014/0236325 A1 | 8/2014 | Sasaki et al. |
| 2014/0237361 A1 | 8/2014 | Martin et al. |
| 2014/0247229 A1 | 9/2014 | Cho et al. |
| 2014/0258292 A1 | 9/2014 | Thramann et al. |
| 2014/0267002 A1 | 9/2014 | Luna |
| 2014/0267911 A1 | 9/2014 | Grant et al. |
| 2014/0270183 A1 | 9/2014 | Luna |
| 2014/0282103 A1 | 9/2014 | Jerry |
| 2014/0282240 A1 | 9/2014 | Flynn et al. |
| 2014/0283018 A1 | 9/2014 | Dadu et al. |
| 2014/0298432 A1 | 10/2014 | Brown |
| 2014/0310348 A1 | 10/2014 | Keskitalo et al. |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0334644 A1* | 11/2014 | Selig .............. G06F 3/165 381/108 |
| 2014/0335789 A1 | 11/2014 | Cohen et al. |
| 2014/0337791 A1 | 11/2014 | Agnetta et al. |
| 2014/0337931 A1 | 11/2014 | Cotterill |
| 2014/0344904 A1 | 11/2014 | Venkataramani et al. |
| 2014/0354759 A1 | 12/2014 | Cranfill et al. |
| 2014/0359140 A1 | 12/2014 | Shankarraman |
| 2014/0359454 A1 | 12/2014 | Lee et al. |
| 2014/0359637 A1 | 12/2014 | Yan |
| 2014/0359709 A1 | 12/2014 | Nassar et al. |
| 2014/0363024 A1 | 12/2014 | Apodaca |
| 2014/0364056 A1 | 12/2014 | Belk et al. |
| 2014/0365904 A1 | 12/2014 | Kim et al. |
| 2014/0372309 A1 | 12/2014 | Bullard et al. |
| 2014/0375577 A1 | 12/2014 | Yeh et al. |
| 2014/0380187 A1 | 12/2014 | Gardenfors et al. |
| 2014/0380234 A1 | 12/2014 | Shim et al. |
| 2015/0012435 A1 | 1/2015 | Wright et al. |
| 2015/0019944 A1 | 1/2015 | Kalgi |
| 2015/0020081 A1 | 1/2015 | Cho et al. |
| 2015/0032812 A1 | 1/2015 | Dudley |
| 2015/0033361 A1 | 1/2015 | Choi et al. |
| 2015/0039494 A1 | 2/2015 | Sinton et al. |
| 2015/0049591 A1 | 2/2015 | Adams et al. |
| 2015/0051913 A1 | 2/2015 | Choi |
| 2015/0052222 A1 | 2/2015 | Farrell et al. |
| 2015/0058744 A1 | 2/2015 | Dhingra et al. |
| 2015/0067803 A1 | 3/2015 | Alduaiji |
| 2015/0081072 A1 | 3/2015 | Kallai et al. |
| 2015/0089359 A1 | 3/2015 | Brisebois |
| 2015/0095175 A1 | 4/2015 | Dua |
| 2015/0095804 A1 | 4/2015 | Grossman et al. |
| 2015/0111559 A1 | 4/2015 | Leaver et al. |
| 2015/0113407 A1 | 4/2015 | Hoffert et al. |
| 2015/0120545 A1 | 4/2015 | Fiore et al. |
| 2015/0130737 A1 | 5/2015 | Im et al. |
| 2015/0135049 A1 | 5/2015 | Murphy |
| 2015/0135282 A1 | 5/2015 | Kong et al. |
| 2015/0138101 A1 | 5/2015 | Park et al. |
| 2015/0143419 A1 | 5/2015 | Bhagwat et al. |
| 2015/0148927 A1 | 5/2015 | Georges et al. |
| 2015/0149599 A1 | 5/2015 | Gaunter et al. |
| 2015/0154589 A1 | 6/2015 | Li |
| 2015/0154676 A1 | 6/2015 | Matousek et al. |
| 2015/0160856 A1 | 6/2015 | Jang et al. |
| 2015/0163188 A1 | 6/2015 | Faaborg et al. |
| 2015/0177914 A1 | 6/2015 | Coyner et al. |
| 2015/0179008 A1 | 6/2015 | Sung et al. |
| 2015/0186892 A1 | 7/2015 | Zhang et al. |
| 2015/0189426 A1 | 7/2015 | Pang |
| 2015/0193069 A1 | 7/2015 | Di Censo et al. |
| 2015/0193130 A1 | 7/2015 | Cho et al. |
| 2015/0193196 A1 | 7/2015 | Lin et al. |
| 2015/0193392 A1 | 7/2015 | Greenblatt et al. |
| 2015/0195133 A1 | 7/2015 | Sheets et al. |
| 2015/0199967 A1 | 7/2015 | Reddy et al. |
| 2015/0200715 A1 | 7/2015 | Oiwa et al. |
| 2015/0205511 A1 | 7/2015 | Vinna et al. |
| 2015/0205971 A1 | 7/2015 | Sanio et al. |
| 2015/0208158 A1 | 7/2015 | Sanders |
| 2015/0212681 A1 | 7/2015 | Shinozaki et al. |
| 2015/0213542 A1 | 7/2015 | Wallaja |
| 2015/0215128 A1 | 7/2015 | Pal |
| 2015/0215382 A1 | 7/2015 | Arora et al. |

(56) References Cited

U.S. PATENT DOCUMENTS

| | | |
|---|---|---|
| 2015/0215398 A1 | 7/2015 | Murphy et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229750 A1 | 8/2015 | Zhou et al. |
| 2015/0229782 A1 | 8/2015 | Zuidema et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0248200 A1 | 9/2015 | Cho et al. |
| 2015/0248268 A1 | 9/2015 | Kumar et al. |
| 2015/0249540 A1 | 9/2015 | Khalil et al. |
| 2015/0253960 A1 | 9/2015 | Lin et al. |
| 2015/0254661 A1 | 9/2015 | Lane |
| 2015/0256957 A1 | 9/2015 | Kim et al. |
| 2015/0261493 A1 | 9/2015 | Lemmon et al. |
| 2015/0262183 A1 | 9/2015 | Gervais et al. |
| 2015/0264304 A1 | 9/2015 | Chastney et al. |
| 2015/0271120 A1 | 9/2015 | Langholz |
| 2015/0278799 A1 | 10/2015 | Palanisamy |
| 2015/0286360 A1 | 10/2015 | Wachter |
| 2015/0286694 A1 | 10/2015 | Kaplinger et al. |
| 2015/0295921 A1 | 10/2015 | Cao |
| 2015/0302856 A1 | 10/2015 | Kim et al. |
| 2015/0304330 A1 | 10/2015 | Soamboonsrup et al. |
| 2015/0309768 A1 | 10/2015 | Van Der Heide |
| 2015/0312299 A1 | 10/2015 | Chen |
| 2015/0319006 A1 | 11/2015 | Plummer et al. |
| 2015/0319046 A1 | 11/2015 | Plummer et al. |
| 2015/0324552 A1 | 11/2015 | Beckhardt |
| 2015/0339466 A1 | 11/2015 | Gao et al. |
| 2015/0347010 A1 | 12/2015 | Yang et al. |
| 2015/0347738 A1 | 12/2015 | Ulrich et al. |
| 2015/0348002 A1 | 12/2015 | Van et al. |
| 2015/0350296 A1 | 12/2015 | Yang et al. |
| 2015/0350297 A1 | 12/2015 | Yang et al. |
| 2015/0350448 A1 | 12/2015 | Coffman et al. |
| 2015/0355816 A1* | 12/2015 | Shim ................ H04L 67/02 715/745 |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0358304 A1 | 12/2015 | Beckhardt et al. |
| 2015/0365400 A1 | 12/2015 | Cox |
| 2015/0370426 A1 | 12/2015 | Carrigan et al. |
| 2015/0373172 A1 | 12/2015 | Boesen |
| 2015/0378522 A1 | 12/2015 | Butts |
| 2016/0004393 A1 | 1/2016 | Faaborg et al. |
| 2016/0004417 A1 | 1/2016 | Bates |
| 2016/0004499 A1 | 1/2016 | Kim et al. |
| 2016/0005024 A1 | 1/2016 | Harrell |
| 2016/0006745 A1 | 1/2016 | Furuichi et al. |
| 2016/0012417 A1 | 1/2016 | Mizon |
| 2016/0014266 A1 | 1/2016 | Bhatt |
| 2016/0026429 A1 | 1/2016 | Triplett |
| 2016/0026779 A1 | 1/2016 | Grigg et al. |
| 2016/0028869 A1 | 1/2016 | Bhatt |
| 2016/0029146 A1 | 1/2016 | Bey et al. |
| 2016/0034887 A1 | 2/2016 | Lee |
| 2016/0037345 A1 | 2/2016 | Margadoudakis |
| 2016/0043962 A1 | 2/2016 | Kim et al. |
| 2016/0048705 A1 | 2/2016 | Yang |
| 2016/0050199 A1 | 2/2016 | Ganesan |
| 2016/0050476 A1 | 2/2016 | Patil |
| 2016/0054710 A1 | 2/2016 | Jo et al. |
| 2016/0062487 A1 | 3/2016 | Foss |
| 2016/0062567 A1 | 3/2016 | Yang et al. |
| 2016/0062589 A1 | 3/2016 | Wan et al. |
| 2016/0062606 A1 | 3/2016 | Vega et al. |
| 2016/0070244 A1 | 3/2016 | Cipollo et al. |
| 2016/0073197 A1 | 3/2016 | Hammer et al. |
| 2016/0073482 A1 | 3/2016 | Fok et al. |
| 2016/0077734 A1 | 3/2016 | Buxton et al. |
| 2016/0086176 A1 | 3/2016 | Henrique et al. |
| 2016/0088039 A1 | 3/2016 | Millington et al. |
| 2016/0092072 A1 | 3/2016 | So et al. |
| 2016/0092665 A1 | 3/2016 | Cowan et al. |
| 2016/0097651 A1 | 4/2016 | Jung et al. |
| 2016/0099901 A1 | 4/2016 | Allen et al. |
| 2016/0127799 A1 | 5/2016 | Alsina et al. |
| 2016/0132864 A1 | 5/2016 | Shah et al. |
| 2016/0134488 A1 | 5/2016 | Straub et al. |
| 2016/0134942 A1 | 5/2016 | Lo |
| 2016/0139752 A1 | 5/2016 | Shim et al. |
| 2016/0142763 A1 | 5/2016 | Kim et al. |
| 2016/0150624 A1 | 5/2016 | Meerbeek et al. |
| 2016/0156687 A1 | 6/2016 | Leung |
| 2016/0156992 A1 | 6/2016 | Kuper |
| 2016/0162252 A1 | 6/2016 | Di Censo et al. |
| 2016/0171482 A1 | 6/2016 | Muncey et al. |
| 2016/0173318 A1 | 6/2016 | Ha et al. |
| 2016/0173617 A1 | 6/2016 | Allinson |
| 2016/0183046 A1 | 6/2016 | Kwon |
| 2016/0189451 A1 | 6/2016 | Yoo et al. |
| 2016/0196042 A1* | 7/2016 | Laute ................ G06F 3/017 715/845 |
| 2016/0196106 A1 | 7/2016 | Hammer et al. |
| 2016/0202866 A1 | 7/2016 | Zambetti |
| 2016/0209939 A1 | 7/2016 | Zambetti et al. |
| 2016/0210602 A1 | 7/2016 | Siddique et al. |
| 2016/0210983 A1 | 7/2016 | Amada et al. |
| 2016/0231902 A1 | 8/2016 | Sirpal et al. |
| 2016/0239167 A1 | 8/2016 | Reimann et al. |
| 2016/0241543 A1 | 8/2016 | Jung et al. |
| 2016/0241983 A1 | 8/2016 | Lambourne et al. |
| 2016/0246566 A1 | 8/2016 | Fullerton et al. |
| 2016/0253145 A1 | 9/2016 | Lee et al. |
| 2016/0259656 A1 | 9/2016 | Sumner et al. |
| 2016/0259936 A1 | 9/2016 | Mukherjee et al. |
| 2016/0267319 A1* | 9/2016 | Murillo ................ G06V 40/166 |
| 2016/0267779 A1 | 9/2016 | Kuang |
| 2016/0277708 A1 | 9/2016 | Rintel et al. |
| 2016/0277903 A1 | 9/2016 | Poosala et al. |
| 2016/0291924 A1 | 10/2016 | Bierbower et al. |
| 2016/0295340 A1 | 10/2016 | Baker et al. |
| 2016/0299669 A1 | 10/2016 | Bates |
| 2016/0299736 A1 | 10/2016 | Bates et al. |
| 2016/0314451 A1 | 10/2016 | Martin |
| 2016/0320849 A1 | 11/2016 | Koo |
| 2016/0335041 A1 | 11/2016 | Wachter et al. |
| 2016/0336531 A1 | 11/2016 | Yokoyama |
| 2016/0342386 A1 | 11/2016 | Kallai et al. |
| 2016/0345039 A1 | 11/2016 | Billmeyer |
| 2016/0345172 A1 | 11/2016 | Cotterill |
| 2016/0351191 A1 | 12/2016 | Vilermo et al. |
| 2016/0352661 A1 | 12/2016 | Yang et al. |
| 2016/0360344 A1 | 12/2016 | Shim et al. |
| 2016/0364600 A1 | 12/2016 | Shah et al. |
| 2016/0366481 A1 | 12/2016 | Lim et al. |
| 2016/0366531 A1 | 12/2016 | Popova |
| 2016/0373884 A1 | 12/2016 | Peterson et al. |
| 2016/0378961 A1 | 12/2016 | Park |
| 2016/0381476 A1 | 12/2016 | Gossain et al. |
| 2017/0003931 A1 | 1/2017 | Dvortsov et al. |
| 2017/0010782 A1 | 1/2017 | Chaudhri et al. |
| 2017/0010794 A1 | 1/2017 | Cho et al. |
| 2017/0013562 A1 | 1/2017 | Lim et al. |
| 2017/0017531 A1 | 1/2017 | Choi et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0031648 A1 | 2/2017 | So et al. |
| 2017/0041727 A1 | 2/2017 | Reimann |
| 2017/0046025 A1 | 2/2017 | Dascola et al. |
| 2017/0054731 A1 | 2/2017 | Cotterill |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083285 A1 | 3/2017 | Meyers et al. |

(56) References Cited

U.S. PATENT DOCUMENTS

| | | |
|---|---|---|
| 2017/0083494 A1 | 3/2017 | Kim et al. |
| 2017/0092085 A1 | 3/2017 | Agarwal |
| 2017/0092270 A1 | 3/2017 | Newendorp et al. |
| 2017/0097621 A1 | 4/2017 | Ackmann et al. |
| 2017/0099270 A1 | 4/2017 | Anson |
| 2017/0115940 A1 | 4/2017 | Byeon |
| 2017/0127145 A1 | 5/2017 | Rajapakse |
| 2017/0134553 A1 | 5/2017 | Jeon et al. |
| 2017/0134567 A1 | 5/2017 | Jeon et al. |
| 2017/0134872 A1 | 5/2017 | Silva et al. |
| 2017/0142087 A1 | 5/2017 | Maninder et al. |
| 2017/0142584 A1 | 5/2017 | Oh et al. |
| 2017/0148010 A1 | 5/2017 | Bak |
| 2017/0180843 A1 | 6/2017 | Perianu et al. |
| 2017/0185373 A1 | 6/2017 | Kim et al. |
| 2017/0192730 A1 | 7/2017 | Yang et al. |
| 2017/0193813 A1* | 7/2017 | Carroll .................. A63F 13/211 |
| 2017/0195772 A1 | 7/2017 | Han et al. |
| 2017/0206779 A1 | 7/2017 | Lee et al. |
| 2017/0227935 A1 | 8/2017 | Su et al. |
| 2017/0235545 A1 | 8/2017 | Millington et al. |
| 2017/0235926 A1 | 8/2017 | Fyke et al. |
| 2017/0242653 A1 | 8/2017 | Lang et al. |
| 2017/0251314 A1 | 8/2017 | Pye et al. |
| 2017/0285788 A1 | 10/2017 | Park et al. |
| 2017/0289249 A1 | 10/2017 | Knight et al. |
| 2017/0322713 A1 | 11/2017 | Hwang et al. |
| 2017/0339151 A1 | 11/2017 | Van Os et al. |
| 2017/0357420 A1 | 12/2017 | Dye et al. |
| 2017/0357421 A1 | 12/2017 | Dye et al. |
| 2017/0357425 A1 | 12/2017 | Smith et al. |
| 2017/0357434 A1 | 12/2017 | Coffman et al. |
| 2017/0357439 A1 | 12/2017 | Lemay et al. |
| 2017/0357477 A1 | 12/2017 | Im et al. |
| 2017/0357973 A1 | 12/2017 | Van Os et al. |
| 2017/0359189 A1 | 12/2017 | Smith et al. |
| 2017/0359191 A1 | 12/2017 | Smith et al. |
| 2017/0363436 A1 | 12/2017 | Eronen et al. |
| 2018/0039916 A1 | 2/2018 | Ravindra |
| 2018/0040324 A1 | 2/2018 | Wilberding |
| 2018/0067712 A1 | 3/2018 | Behzadi et al. |
| 2018/0067904 A1 | 3/2018 | Li |
| 2018/0069957 A1 | 3/2018 | Mushikabe et al. |
| 2018/0070187 A1 | 3/2018 | Drinkwater et al. |
| 2018/0075439 A1 | 3/2018 | Bak |
| 2018/0101297 A1 | 4/2018 | Yang et al. |
| 2018/0109629 A1 | 4/2018 | Van Os et al. |
| 2018/0124128 A1 | 5/2018 | Faulkner et al. |
| 2018/0131732 A1 | 5/2018 | Aronoff et al. |
| 2018/0139292 A1 | 5/2018 | Koren et al. |
| 2018/0190279 A1 | 7/2018 | Anderson et al. |
| 2018/0205797 A1 | 7/2018 | Faulkner |
| 2018/0227341 A1 | 8/2018 | Rizzi |
| 2018/0228003 A1 | 8/2018 | O'driscoll et al. |
| 2018/0234549 A1 | 8/2018 | Coffman et al. |
| 2018/0267773 A1 | 9/2018 | Kim et al. |
| 2018/0302790 A1 | 10/2018 | Cotterill |
| 2018/0308480 A1 | 10/2018 | Jang et al. |
| 2018/0329585 A1 | 11/2018 | Carrigan et al. |
| 2018/0329586 A1 | 11/2018 | Sundstrom et al. |
| 2018/0332559 A1 | 11/2018 | Gudivada et al. |
| 2018/0335903 A1 | 11/2018 | Coffman et al. |
| 2018/0337924 A1 | 11/2018 | Graham et al. |
| 2018/0341448 A1 | 11/2018 | Behzadi et al. |
| 2018/0351762 A1 | 12/2018 | Iyengar et al. |
| 2018/0357631 A1 | 12/2018 | Bak |
| 2018/0364665 A1 | 12/2018 | Clymer et al. |
| 2018/0375676 A1 | 12/2018 | Bader-Natal et al. |
| 2019/0012069 A1 | 1/2019 | Bates |
| 2019/0012073 A1 | 1/2019 | Hwang |
| 2019/0012966 A1 | 1/2019 | Shi |
| 2019/0025943 A1 | 1/2019 | Jobs et al. |
| 2019/0028419 A1 | 1/2019 | Sullivan |
| 2019/0056854 A1 | 2/2019 | Azzolin et al. |
| 2019/0056907 A1 | 2/2019 | So et al. |
| 2019/0102145 A1 | 4/2019 | Wilberding et al. |
| 2019/0124203 A1 | 4/2019 | Coffman et al. |
| 2019/0124510 A1 | 4/2019 | Cotterill |
| 2019/0129661 A1 | 5/2019 | Hirota et al. |
| 2019/0138951 A1 | 5/2019 | Brownhill et al. |
| 2019/0149972 A1 | 5/2019 | Parks et al. |
| 2019/0163329 A1 | 5/2019 | Yang et al. |
| 2019/0199963 A1 | 6/2019 | Ahn et al. |
| 2019/0222775 A1 | 7/2019 | Ahn |
| 2019/0278900 A1 | 9/2019 | Yang et al. |
| 2019/0289079 A1 | 9/2019 | Van Os et al. |
| 2019/0294406 A1 | 9/2019 | Bierbower et al. |
| 2019/0306607 A1 | 10/2019 | Clayton et al. |
| 2019/0342519 A1 | 11/2019 | Van Os et al. |
| 2019/0361575 A1 | 11/2019 | Ni et al. |
| 2019/0361729 A1 | 11/2019 | Gruber et al. |
| 2020/0050426 A1* | 2/2020 | Jung ...................... G06N 5/041 |
| 2020/0050502 A1 | 2/2020 | Ghafourifar et al. |
| 2020/0104018 A1 | 4/2020 | Coffman et al. |
| 2020/0120503 A1 | 4/2020 | Cotterill |
| 2020/0135191 A1 | 4/2020 | Nourbakhsh |
| 2020/0152186 A1 | 5/2020 | Koh et al. |
| 2020/0154583 A1* | 5/2020 | Lee ...................... H05K 5/0247 |
| 2020/0186378 A1 | 6/2020 | Six et al. |
| 2020/0192627 A1 | 6/2020 | Jang et al. |
| 2020/0201491 A1 | 6/2020 | Coffman et al. |
| 2020/0201495 A1 | 6/2020 | Coffman et al. |
| 2020/0213437 A1 | 7/2020 | Bhatt |
| 2020/0213530 A1 | 7/2020 | Ahn |
| 2020/0218486 A1 | 7/2020 | Behzadi et al. |
| 2020/0225817 A1 | 7/2020 | Coffman et al. |
| 2020/0302913 A1 | 9/2020 | Marcinkiewicz |
| 2020/0366742 A1 | 11/2020 | Van Os et al. |
| 2020/0379711 A1 | 12/2020 | Graham et al. |
| 2020/0379712 A1 | 12/2020 | Carrigan |
| 2020/0379713 A1 | 12/2020 | Carrigan |
| 2020/0379714 A1 | 12/2020 | Graham et al. |
| 2020/0379716 A1 | 12/2020 | Carrigan et al. |
| 2020/0379729 A1 | 12/2020 | Graham et al. |
| 2020/0379730 A1 | 12/2020 | Graham et al. |
| 2020/0382332 A1 | 12/2020 | Carrigan et al. |
| 2020/0383157 A1 | 12/2020 | Lee et al. |
| 2020/0395012 A1 | 12/2020 | Kim et al. |
| 2020/0413197 A1 | 12/2020 | Carrigan et al. |
| 2021/0011588 A1 | 1/2021 | Coffman et al. |
| 2021/0011613 A1 | 1/2021 | Pisula et al. |
| 2021/0014610 A1 | 1/2021 | Carrigan et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0099829 A1 | 4/2021 | Soto et al. |
| 2021/0158830 A1 | 5/2021 | Boehlke |
| 2021/0173431 A1 | 6/2021 | Yang et al. |
| 2021/0181903 A1 | 6/2021 | Carrigan et al. |
| 2021/0255816 A1 | 8/2021 | Behzadi et al. |
| 2021/0255819 A1 | 8/2021 | Graham et al. |
| 2021/0263702 A1 | 8/2021 | Carrigan |
| 2021/0266274 A1 | 8/2021 | Liu et al. |
| 2021/0272118 A1 | 9/2021 | Van Os et al. |
| 2021/0323406 A1 | 10/2021 | So et al. |
| 2021/0349680 A1 | 11/2021 | Kim et al. |
| 2021/0352172 A1 | 11/2021 | Kim et al. |
| 2021/0392223 A1 | 12/2021 | Coffman et al. |
| 2022/0004356 A1 | 1/2022 | Kim et al. |
| 2022/0043626 A1 | 2/2022 | Carrigan |
| 2022/0058257 A1 | 2/2022 | Cotterill |
| 2022/0100367 A1 | 3/2022 | Carrigan et al. |
| 2022/0100841 A1 | 3/2022 | Yang et al. |
| 2022/0137759 A1 | 5/2022 | Yang et al. |
| 2022/0163996 A1 | 5/2022 | Yang et al. |
| 2022/0277037 A1 | 9/2022 | Sanders et al. |
| 2022/0279063 A1 | 9/2022 | Coffman et al. |
| 2022/0286549 A1 | 9/2022 | Coffman et al. |
| 2022/0303383 A1 | 9/2022 | Coffman et al. |
| 2022/0326817 A1 | 10/2022 | Carrigan et al. |
| 2022/0391166 A1 | 12/2022 | Sanders |
| 2023/0041125 A1 | 2/2023 | Kim et al. |
| 2023/0073844 A1 | 3/2023 | Coffman et al. |
| 2023/0084551 A1 | 3/2023 | Coffman et al. |

(56) References Cited

U.S. PATENT DOCUMENTS

| | | | |
|---|---|---|---|
| 2023/0098814 | A1 | 3/2023 | Carrigan et al. |
| 2023/0104819 | A1 | 4/2023 | Coffman et al. |
| 2023/0106600 | A1 | 4/2023 | Coffman et al. |
| 2023/0106761 | A1 | 4/2023 | Coffman et al. |
| 2023/0168797 | A1 | 6/2023 | Chaudhri |
| 2023/0179700 | A1 | 6/2023 | Bhatt |

FOREIGN PATENT DOCUMENTS

| | | | |
|---|---|---|---|
| AU | 2008100011 | A4 | 2/2008 |
| AU | 2014100584 | A4 | 7/2014 |
| CA | 2876587 | A1 | 2/2014 |
| CN | 1263425 | A | 8/2000 |
| CN | 1274439 | A | 11/2000 |
| CN | 1341889 | A | 3/2002 |
| CN | 1452739 | A | 10/2003 |
| CN | 1525723 | A | 9/2004 |
| CN | 1620677 | A | 5/2005 |
| CN | 1663174 | A | 8/2005 |
| CN | 1741104 | A | 3/2006 |
| CN | 1797295 | A | 7/2006 |
| CN | 1813240 | A | 8/2006 |
| CN | 1846221 | A | 10/2006 |
| CN | 1863281 | A | 11/2006 |
| CN | 1908981 | A | 2/2007 |
| CN | 101002167 | A | 7/2007 |
| CN | 101022395 | A | 8/2007 |
| CN | 101047521 | A | 10/2007 |
| CN | 101107668 | A | 1/2008 |
| CN | 101188506 | A | 5/2008 |
| CN | 101243426 | A | 8/2008 |
| CN | 101268470 | A | 9/2008 |
| CN | 101299694 | A | 11/2008 |
| CN | 101321156 | A | 12/2008 |
| CN | 101340274 | A | 1/2009 |
| CN | 101341718 | A | 1/2009 |
| CN | 101341727 | A | 1/2009 |
| CN | 101350938 | A | 1/2009 |
| CN | 101359291 | A | 2/2009 |
| CN | 101409743 | A | 4/2009 |
| CN | 101485128 | A | 7/2009 |
| CN | 101488138 | A | 7/2009 |
| CN | 100530059 | C | 8/2009 |
| CN | 101501657 | A | 8/2009 |
| CN | 101517563 | A | 8/2009 |
| CN | 101610155 | A | 12/2009 |
| CN | 101625620 | A | 1/2010 |
| CN | 101673207 | A | 3/2010 |
| CN | 101673298 | A | 3/2010 |
| CN | 101854278 | A | 10/2010 |
| CN | 101861562 | A | 10/2010 |
| CN | 101877748 | A | 11/2010 |
| CN | 101882409 | A | 11/2010 |
| CN | 101931655 | A | 12/2010 |
| CN | 101976171 | A | 2/2011 |
| CN | 102065148 | A | 5/2011 |
| CN | 102077191 | A | 5/2011 |
| CN | 102164213 | A | 8/2011 |
| CN | 102202192 | A | 9/2011 |
| CN | 102209321 | A | 10/2011 |
| CN | 102262506 | A | 11/2011 |
| CN | 102281294 | A | 12/2011 |
| CN | 102301323 | A | 12/2011 |
| CN | 102396205 | A | 3/2012 |
| CN | 102508707 | A | 6/2012 |
| CN | 102707994 | A | 10/2012 |
| CN | 102737313 | A | 10/2012 |
| CN | 102740146 | A | 10/2012 |
| CN | 102750066 | A | 10/2012 |
| CN | 102754071 | A | 10/2012 |
| CN | 102859480 | | 1/2013 |
| CN | 102866828 | A | 1/2013 |
| CN | 102902453 | A | 1/2013 |
| CN | 102905181 | A | 1/2013 |
| CN | 102982401 | A | 3/2013 |
| CN | 103067625 | A | 4/2013 |
| CN | 103069378 | A | 4/2013 |
| CN | 103139370 | A | 6/2013 |
| CN | 103250138 | A | 8/2013 |
| CN | 103260079 | A | 8/2013 |
| CN | 103425451 | | 12/2013 |
| CN | 103458215 | A | 12/2013 |
| CN | 103558916 | A | 2/2014 |
| CN | 103582873 | A | 2/2014 |
| CN | 103593154 | A | 2/2014 |
| CN | 103765385 | A | 4/2014 |
| CN | 103793138 | A | 5/2014 |
| CN | 103853328 | A | 6/2014 |
| CN | 103870255 | A | 6/2014 |
| CN | 104106036 | A | 10/2014 |
| CN | 104166458 | A | 11/2014 |
| CN | 104335234 | A | 2/2015 |
| CN | 105374192 | A | 3/2016 |
| CN | 105388998 | A | 3/2016 |
| CN | 105474580 | A | 4/2016 |
| CN | 105549947 | A | 5/2016 |
| CN | 105794231 | A | 7/2016 |
| CN | 105900376 | A | 8/2016 |
| CN | 105940678 | A | 9/2016 |
| CN | 106030700 | A | 10/2016 |
| CN | 106062810 | A | 10/2016 |
| CN | 106383645 | A | 2/2017 |
| CN | 106797415 | A | 5/2017 |
| CN | 107533368 | A | 1/2018 |
| CN | 107637073 | A | 1/2018 |
| CN | 107819928 | A | 3/2018 |
| CN | 104012150 | B | 5/2018 |
| CN | 108292203 | A | 7/2018 |
| CN | 109117078 | A | 1/2019 |
| CN | 109196825 | A | 1/2019 |
| CN | 109287140 | A | 1/2019 |
| CN | 109302531 | A | 2/2019 |
| CN | 109347581 | A | 2/2019 |
| CN | 109348052 | A | 2/2019 |
| CN | 109688441 | A | 4/2019 |
| CN | 109688442 | A | 4/2019 |
| CN | 108683798 | B | 4/2021 |
| EP | 0459174 | A2 | 12/1991 |
| EP | 0564247 | A1 | 10/1993 |
| EP | 0684543 | A1 | 11/1995 |
| EP | 0844555 | A2 | 5/1998 |
| EP | 0871177 | A2 | 10/1998 |
| EP | 0880091 | A2 | 11/1998 |
| EP | 0881563 | A2 | 12/1998 |
| EP | 1079371 | A1 | 2/2001 |
| EP | 1133119 | A2 | 9/2001 |
| EP | 1186987 | A2 | 3/2002 |
| EP | 1215575 | A2 | 6/2002 |
| EP | 1357458 | A2 | 10/2003 |
| EP | 1469374 | A1 | 10/2004 |
| EP | 1615109 | A2 | 1/2006 |
| EP | 1705883 | A1 | 9/2006 |
| EP | 1760584 | A1 | 3/2007 |
| EP | 1942401 | A1 | 7/2008 |
| EP | 2018032 | A1 | 1/2009 |
| EP | 2180665 | A1 | 4/2010 |
| EP | 2247087 | A1 | 11/2010 |
| EP | 2409214 | A1 | 1/2012 |
| EP | 2420925 | A2 | 2/2012 |
| EP | 2523109 | A1 | 11/2012 |
| EP | 2568693 | A2 | 3/2013 |
| EP | 2629291 | A1 | 8/2013 |
| EP | 2632193 | A2 | 8/2013 |
| EP | 2674889 | A2 | 12/2013 |
| EP | 2725473 | A1 | 4/2014 |
| EP | 2733579 | A2 | 5/2014 |
| EP | 2750062 | A2 | 7/2014 |
| EP | 2770673 | A1 | 8/2014 |
| EP | 2770708 | A1 | 8/2014 |
| EP | 2891049 | A1 | 7/2015 |
| EP | 2892240 | A1 | 7/2015 |
| EP | 2891049 | A4 | 3/2016 |
| EP | 3032537 | A2 | 6/2016 |
| EP | 3038427 | A1 | 6/2016 |

(56) References Cited

FOREIGN PATENT DOCUMENTS

| | | |
|---|---|---|
| EP | 2568693 A3 | 7/2016 |
| EP | 3057342 A1 | 8/2016 |
| EP | 3073703 A1 | 9/2016 |
| EP | 3138300 A1 | 3/2017 |
| EP | 3163495 A1 | 5/2017 |
| EP | 3276905 A1 | 1/2018 |
| EP | 3379853 A1 | 9/2018 |
| EP | 2632193 B1 | 10/2018 |
| EP | 3445058 A1 | 2/2019 |
| EP | 2568693 B1 | 12/2019 |
| EP | 3038427 B1 | 12/2019 |
| EP | 3633963 A1 | 4/2020 |
| GB | 2402105 A | 12/2004 |
| GB | 2466038 A | 6/2010 |
| GB | 2505476 A | 3/2014 |
| IN | 1038/MUM/2005 | 6/2007 |
| JP | 5-266169 A | 10/1993 |
| JP | 8-147138 A | 6/1996 |
| JP | 8-166783 A | 6/1996 |
| JP | 9-97154 A | 4/1997 |
| JP | 9-258947 A | 10/1997 |
| JP | 10-198517 A | 7/1998 |
| JP | 10-232757 A | 9/1998 |
| JP | 11-272391 A | 10/1999 |
| JP | 2000-101879 A | 4/2000 |
| JP | 2000-105772 A | 4/2000 |
| JP | 2000-122957 A | 4/2000 |
| JP | 2000-163193 A | 6/2000 |
| JP | 2000-200092 A | 7/2000 |
| JP | 2000-231371 A | 8/2000 |
| JP | 2000-259477 A | 9/2000 |
| JP | 2000-284879 A | 10/2000 |
| JP | 2000-347921 A | 12/2000 |
| JP | 2001-202176 A | 7/2001 |
| JP | 2001-306375 A | 11/2001 |
| JP | 2001-331758 A | 11/2001 |
| JP | 2002-82745 A | 3/2002 |
| JP | 2002-288125 A | 10/2002 |
| JP | 2002-288690 A | 10/2002 |
| JP | 2002-342356 A | 11/2002 |
| JP | 2002-351768 A | 12/2002 |
| JP | 2003-30245 A | 1/2003 |
| JP | 2003-43978 A | 2/2003 |
| JP | 2003-52019 A | 2/2003 |
| JP | 2003-62975 A | 3/2003 |
| JP | 2003-264621 A | 9/2003 |
| JP | 2003-330586 A | 11/2003 |
| JP | 2003-330613 A | 11/2003 |
| JP | 2004-38895 A | 2/2004 |
| JP | 2004-104813 A | 4/2004 |
| JP | 2004-192573 A | 7/2004 |
| JP | 2004-348601 A | 12/2004 |
| JP | 2004-356816 A | 12/2004 |
| JP | 2005044036 A | 2/2005 |
| JP | 2005-507112 A | 3/2005 |
| JP | 2005-190108 A | 7/2005 |
| JP | 2006-166248 A | 6/2006 |
| JP | 2006-295753 A | 10/2006 |
| JP | 2007-41976 A | 2/2007 |
| JP | 2007-304854 A | 11/2007 |
| JP | 2007-534009 A | 11/2007 |
| JP | 2008-26439 A | 2/2008 |
| JP | 2008-99330 A | 4/2008 |
| JP | 2009-17486 A | 1/2009 |
| JP | 2009-93206 A | 4/2009 |
| JP | 2009-239867 A | 10/2009 |
| JP | 2009-296577 A | 12/2009 |
| JP | 2009-543166 A | 12/2009 |
| JP | 2009-543228 A | 12/2009 |
| JP | 2010-503082 A | 1/2010 |
| JP | 2010-503922 A | 2/2010 |
| JP | 2010-245940 A | 10/2010 |
| JP | 2010-257118 A | 11/2010 |
| JP | 2010-271779 A | 12/2010 |
| JP | 2011-65590 A | 3/2011 |
| JP | 2011-118662 A | 6/2011 |
| JP | 2011-209786 A | 10/2011 |
| JP | 2011-237857 A | 11/2011 |
| JP | 2012-168966 A | 9/2012 |
| JP | 2012-215938 A | 11/2012 |
| JP | 2013-506225 A | 2/2013 |
| JP | 2013-93699 A | 5/2013 |
| JP | 2013-98613 A | 5/2013 |
| JP | 2013-105468 A | 5/2013 |
| JP | 2013-530433 A | 7/2013 |
| JP | 2013-530458 A | 7/2013 |
| JP | 2013-175188 A | 9/2013 |
| JP | 2014-503861 A | 2/2014 |
| JP | 2014-71835 A | 4/2014 |
| JP | 2014-87126 A | 5/2014 |
| JP | 2014-512044 A | 5/2014 |
| JP | 2014-110638 A | 6/2014 |
| JP | 2014-131359 A | 7/2014 |
| JP | 2014-170982 A | 9/2014 |
| JP | 2015-8001 A | 1/2015 |
| JP | 2015-14923 A | 1/2015 |
| JP | 2015-501022 A | 1/2015 |
| JP | 2015-61318 A | 3/2015 |
| JP | 2015-520456 A | 7/2015 |
| JP | 2015-524974 A | 8/2015 |
| JP | 2015-526776 A | 9/2015 |
| JP | 6023162 B2 | 11/2016 |
| JP | 2017-41008 A | 2/2017 |
| JP | 2018-7158 A | 1/2018 |
| KR | 2003-0030384 A | 4/2003 |
| KR | 10-2005-0072071 A | 7/2005 |
| KR | 10-2007-0101893 A | 10/2007 |
| KR | 10-2007-0120125 A | 12/2007 |
| KR | 10-0805341 B1 | 2/2008 |
| KR | 10-2009-0089472 A | 8/2009 |
| KR | 10-2010-0036351 A | 4/2010 |
| KR | 10-2012-0003323 A | 1/2012 |
| KR | 10-2012-0088746 A | 8/2012 |
| KR | 10-2012-0100433 A | 9/2012 |
| KR | 10-1253392 B1 | 4/2013 |
| KR | 10-2013-0063019 A | 6/2013 |
| KR | 10-2013-0075783 A | 7/2013 |
| KR | 10-2013-0082190 A | 7/2013 |
| KR | 10-2013-0108563 A | 10/2013 |
| KR | 10-2013-0141688 A | 12/2013 |
| KR | 10-1342208 B1 | 12/2013 |
| KR | 10-2014-0016244 A | 2/2014 |
| KR | 10-2014-0031283 A | 3/2014 |
| KR | 10-2014-0043370 A | 4/2014 |
| KR | 10-2014-0137400 A | 12/2014 |
| KR | 10-2014-0148289 A | 12/2014 |
| KR | 10-2015-0031010 A | 3/2015 |
| KR | 10-2015-0121177 A | 10/2015 |
| KR | 10-2016-0012008 A | 2/2016 |
| KR | 10-2016-0045633 A | 4/2016 |
| KR | 10-2016-0092363 A | 8/2016 |
| KR | 10-2016-0141847 A | 12/2016 |
| KR | 10-2017-0008601 A | 1/2017 |
| KR | 10-2017-0027435 A | 3/2017 |
| KR | 10-2017-0027999 A | 3/2017 |
| KR | 10-2017-0082022 A | 7/2017 |
| KR | 10-2017-0100358 A | 9/2017 |
| KR | 10-2017-0124954 A | 11/2017 |
| KR | 10-1820573 B1 | 1/2018 |
| KR | 10-2018-0034637 A | 4/2018 |
| KR | 10-2018-0085931 A | 7/2018 |
| KR | 10-2019-0002658 A | 1/2019 |
| KR | 10-2019-0014495 A | 2/2019 |
| KR | 10-2019-0022883 A | 3/2019 |
| KR | 10-2019-0057414 A | 5/2019 |
| KR | 10-2011177 B1 | 8/2019 |
| KR | 10-2020-0039030 A | 4/2020 |
| MX | 336834 B | 2/2016 |
| TW | 201131471 A | 9/2011 |
| TW | 201137722 A | 11/2011 |
| TW | 201316247 A | 4/2013 |
| TW | 201324310 A | 6/2013 |
| TW | 201403363 A | 1/2014 |
| TW | 201409345 A | 3/2014 |

(56) References Cited

FOREIGN PATENT DOCUMENTS

| | | |
|---|---|---|
| TW | 201415345 A | 4/2014 |
| TW | 201416959 A | 5/2014 |
| WO | 1999/44114 A1 | 9/1999 |
| WO | 2002/01864 A1 | 1/2002 |
| WO | 2003/036457 A2 | 5/2003 |
| WO | 2003/054832 A1 | 7/2003 |
| WO | 2003/062975 A1 | 7/2003 |
| WO | 2003/062976 A1 | 7/2003 |
| WO | 2004/095414 A1 | 11/2004 |
| WO | 2004/104813 A1 | 12/2004 |
| WO | 2005/031608 A2 | 4/2005 |
| WO | 2005/053225 A1 | 6/2005 |
| WO | 2005/109829 A1 | 11/2005 |
| WO | 2006/011139 A2 | 2/2006 |
| WO | 2006/020304 A2 | 2/2006 |
| WO | 2006/020305 A2 | 2/2006 |
| WO | 2006/113834 A2 | 10/2006 |
| WO | 2006/130234 A2 | 12/2006 |
| WO | 2007/073422 A1 | 6/2007 |
| WO | 2007/102110 A2 | 9/2007 |
| WO | 2007/142703 A1 | 12/2007 |
| WO | 2007/149731 A1 | 12/2007 |
| WO | 2008/027924 A2 | 3/2008 |
| WO | 2008/030976 A2 | 3/2008 |
| WO | 2008/033853 A2 | 3/2008 |
| WO | 2008/085742 A2 | 7/2008 |
| WO | 2008/151229 A1 | 12/2008 |
| WO | 2009/005563 A1 | 1/2009 |
| WO | 2009/067670 A1 | 5/2009 |
| WO | 2009/086599 A1 | 7/2009 |
| WO | 2009/097592 A1 | 8/2009 |
| WO | 2010/087988 A1 | 8/2010 |
| WO | 2010/107661 A1 | 9/2010 |
| WO | 2010/120972 A1 | 10/2010 |
| WO | 2010/128442 A2 | 11/2010 |
| WO | 2011/027964 A1 | 3/2011 |
| WO | 2011/041427 A2 | 4/2011 |
| WO | 2011/084857 A1 | 7/2011 |
| WO | 2011/126502 A1 | 10/2011 |
| WO | 2011/149231 A2 | 12/2011 |
| WO | 2012/004288 A1 | 1/2012 |
| WO | 2012/006494 A1 | 1/2012 |
| WO | 2012/028773 A1 | 3/2012 |
| WO | 2012/050927 A2 | 4/2012 |
| WO | 2012/051052 A1 | 4/2012 |
| WO | 2012/104288 A1 | 8/2012 |
| WO | 2012/126078 A1 | 9/2012 |
| WO | 2012/154748 A1 | 11/2012 |
| WO | 2012/166352 A1 | 12/2012 |
| WO | 2012/170446 A2 | 12/2012 |
| WO | 2013/000150 A1 | 1/2013 |
| WO | 2013/026023 A1 | 2/2013 |
| WO | 2013/048880 A1 | 4/2013 |
| WO | 2013/049346 A1 | 4/2013 |
| WO | 2013/097882 A1 | 7/2013 |
| WO | 2013/097895 A1 | 7/2013 |
| WO | 2013/097896 A1 | 7/2013 |
| WO | 2013/111239 A1 | 8/2013 |
| WO | 2013/132144 A1 | 9/2013 |
| WO | 2013/135270 A1 | 9/2013 |
| WO | 2013/137503 A1 | 9/2013 |
| WO | 2013/153405 A2 | 10/2013 |
| WO | 2013/169842 A2 | 11/2013 |
| WO | 2013/169846 A1 | 11/2013 |
| WO | 2013/169875 A2 | 11/2013 |
| WO | 2013/173504 A1 | 11/2013 |
| WO | 2013/173838 A2 | 11/2013 |
| WO | 2013/176847 A1 | 11/2013 |
| WO | 2014/021967 A1 | 2/2014 |
| WO | 2014/030320 A1 | 2/2014 |
| WO | 2014/032461 A1 | 3/2014 |
| WO | 2014/057795 A1 | 4/2014 |
| WO | 2014/078965 A1 | 5/2014 |
| WO | 2014/105274 | 7/2014 |
| WO | 2014/107469 A2 | 7/2014 |
| WO | 2014/115605 A1 | 7/2014 |
| WO | 2014/128800 A1 | 8/2014 |
| WO | 2014/147297 A1 | 9/2014 |
| WO | 2014/151089 A1 | 9/2014 |
| WO | 2013/173504 A8 | 12/2014 |
| WO | 2014/197279 A1 | 12/2014 |
| WO | 2015/008409 A1 | 1/2015 |
| WO | 2015/062410 A1 | 5/2015 |
| WO | 2015/076930 A1 | 5/2015 |
| WO | 2015/124831 A1 | 8/2015 |
| WO | 2015/134692 A1 | 9/2015 |
| WO | 2015/185123 A1 | 12/2015 |
| WO | 2016/033400 A1 | 3/2016 |
| WO | 2016/036472 A1 | 3/2016 |
| WO | 2016/036541 A2 | 3/2016 |
| WO | 2016/057117 A1 | 4/2016 |
| WO | 2016/200603 A1 | 12/2016 |
| WO | 2016/204186 A1 | 12/2016 |
| WO | 2017/027526 A1 | 2/2017 |
| WO | 2017/058293 A1 | 4/2017 |
| WO | 2017/058442 A1 | 4/2017 |
| WO | 2017/112003 A1 | 6/2017 |
| WO | 2017/147081 A1 | 8/2017 |
| WO | 2017/218143 A1 | 12/2017 |
| WO | 2017/218192 A1 | 12/2017 |
| WO | 2018/048510 A1 | 3/2018 |
| WO | 2018/084802 A1 | 5/2018 |
| WO | 2018/098136 A1 | 5/2018 |
| WO | 2018/144339 A2 | 8/2018 |
| WO | 2018/213401 A1 | 11/2018 |
| WO | 2018/213415 A1 | 11/2018 |
| WO | 2018/232333 A1 | 12/2018 |
| WO | 2020/063762 A1 | 4/2020 |
| WO | 2020/243691 A1 | 12/2020 |
| WO | 2021/010993 A1 | 1/2021 |

OTHER PUBLICATIONS

Extended European Search Report received for European Patent Application No. 22198071.7, dated Dec. 5, 2022, 8 pages.
International Preliminary Report on Patentability received for PCT Patent Application No. PCT/US2021/031760, dated Nov. 24, 2022, 11 pages.
Invitation to Pay Search Fees received for European Patent Application No. 21728781.2, dated Dec. 2, 2022, 3 pages.
Non-Final Office Action received for U.S. Appl. No. 17/666,971, dated Dec. 8, 2022, 26 pages.
Notice of Allowance received for U.S. Appl. No. 16/917,659, dated Dec. 1, 2022, 11 pages.
Office Action received for Australian Patent Application No. 2022241590, dated Nov. 18, 2022, 8 pages.
Office Action received for Chinese Patent Application No. 201811377642.8, dated Oct. 27, 2022, 20 pages (8 pages of English Translation and 12 pages of Official Copy).
Office Action received for Chinese Patent Application No. 201811379281.0, dated Oct. 27, 2022, 21 pages (8 pages of English Translation and 13 pages of Official Copy).
Applicant-Initiated Interview Summary received for U.S. Appl. No. 17/509,356, dated Feb. 3, 2023, 3 pages.
Corrected Notice of Allowance received for U.S. Appl. No. 16/922,675, dated Jan. 20, 2023, 3 pages.
Notice of Allowance received for Japanese Patent Application No. 2022-014389, dated Jan. 27, 2023, 4 pages (1 page of English Translation and 3 pages of Official Copy).
Notice of Allowance received for Japanese Patent Application No. 2022-125792, dated Jan. 27, 2023, 4 pages (1 page of English Translation and 3 pages of Official Copy).
Notice of Allowance received for Korean Patent Application No. 10-2022-7006175, dated Jan. 12, 2023, 7 pages (2 pages of English Translation and 5 pages of Official Copy).
Office Action received for European Patent Application No. 20719301.2, dated Jan. 24, 2023, 9 pages.
Applicant-Initiated Interview Summary received for U.S. Appl. No. 17/181,089, dated Oct. 7, 2022, 4 pages.

(56) References Cited

OTHER PUBLICATIONS

Decision to Refuse received for European Patent Application No. 17813737.8, dated Sep. 30, 2022, 5 pages.
Notice of Allowance received for Chinese Patent Application No. 202011450203.2, dated Sep. 30, 2022, 4 pages (1 page of English Translation and 3 pages of Official Copy).
Notice of Allowance received for U.S. Appl. No. 17/027,373, dated Oct. 3, 2022, 5 pages.
Office Action received for Chinese Patent Application No. 202080039642.6, dated Sep. 5, 2022, 12 pages (6 pages of English Translation and 6 pages of Official Copy).
Office Action received for Chinese Patent Application No. 202111652452.4, dated Aug. 29, 2022, 23 pages (12 pages of English Translation and 11 pages of Official Copy).
Office Action received for European Patent Application No. 20720310.0, dated Oct. 4, 2022, 9 pages.
Applicant-Initiated Interview Summary received for U.S. Appl. No. 16/922,675, dated Nov. 15, 2022, 2 pages.
Applicant-Initiated Interview Summary received for U.S. Appl. No. 17/181,089, dated Nov. 22, 2022, 3 pages.
Decision to Grant received for Danish Patent Application No. PA202170320, dated Nov. 10, 2022, 2 pages.
Office Action received for Australian Patent Application No. 2021261941, dated Nov. 3, 2022, 3 pages.
Office Action received for Australian Patent Application No. 2022200515, dated Nov. 2, 2022, 2 pages.
Board Decision received for Chinese Patent Application No. 201811367893.8, dated Aug. 25, 2022, 2 pages (1 page of English Translation and 1 page of Official Copy).
Brief Communication Regarding Oral Proceedings received for European Patent Application No. 19150528.8, dated Sep. 5, 2022, 2 pages.
Intention to Grant received for European Patent Application No. 20158824.1, dated Aug. 11, 2022, 10 pages.
Notice of Allowance received for Japanese Patent Application No. 2022-102840, dated Aug. 19, 2022, 4 pages (1 page of English Translation and 3 pages of Official Copy).
Office Action received for Chinese Patent Application No. 202111612841.4, dated Jul. 22, 2022, 13 pages (7 pages of English Translation and 6 pages of Official Copy).
Office Action received for European Patent Application No. 21197457.1, dated Sep. 2, 2022, 8 pages.
Applicant-Initiated Interview Summary received for U.S. Appl. No. 17/314,948, dated Oct. 21, 2022, 6 pages.
Corrected Notice of Allowance received for U.S. Appl. No. 17/027,373, dated Oct. 26, 2022, 2 pages.
Extended European Search Report received for European Patent Application No. 22188377.0, dated Oct. 27, 2022, 8 pages.
Final Office Action received for U.S. Appl. No. 17/181,089, dated Oct. 21, 2022, 15 pages.
Notice of Allowance received for Korean Patent Application No. 10-2022-0091730, dated Oct. 4, 2022, 5 pages (2 pages of English Translation and 3 pages of Official Copy).
Notice of Allowance received for U.S. Appl. No. 16/679,967, dated Nov. 2, 2022, 7 pages.
Notice of Allowance received for U.S. Appl. No. 16/888,775, dated Oct. 19, 2022, 6 pages.
Office Action received for Chinese Patent Application No. 202110235995.X, dated Sep. 30, 2022, 13 pages (7 pages of English Translation and 6 pages of Official Copy).
Office Action received for Danish Patent Application No. PA202270464, dated Oct. 25, 2022, 9 pages.
Summons to Attend Oral Proceedings received for European Patent Application No. 21160991.2, dated Oct. 19, 2022, 10 pages.
Decision to Refuse received for European Patent Application No. 18208881.5, dated Dec. 23, 2022, 12 pages.
Invitation to Pay Search Fees received for European Patent Application No. 20760624.5, dated Jan. 2, 2023, 3 pages.
Minutes of Oral Proceedings received for European Patent Application No. 18208881.5, dated Dec. 22, 2022, 4 pages.
Minutes of Oral Proceedings received for European Patent Application No. 18728002.9, dated Dec. 22, 2022, 7 pages.
Non-Final Office Action received for U.S. Appl. No. 17/320,900, dated Dec. 22, 2022, 30 pages.
Non-Final Office Action received for U.S. Appl. No. 17/509,356, dated Dec. 22, 2022, 16 pages.
Notice of Acceptance received for Australian Patent Application No. 2022200515, dated Dec. 21, 2022, 3 pages.
Office Action received for Danish Patent Application No. PA202270464, dated Dec. 20, 2022, 3 pages.
Office Action received for Korean Patent Application No. 10-2022-0053111, dated Dec. 12, 2022, 9 pages (4 pages of English Translation and 5 pages of Official Copy).
Advisory Action received for U.S. Appl. No. 17/181,089, dated Dec. 20, 2022, 4 pages.
Applicant-Initiated Interview Summary received for U.S. Appl. No. 17/476,404, dated Dec. 20, 2022, 2 pages.
Brief Communication Regarding Oral Proceedings received for European Patent Application No. 18728002.9, dated Dec. 7, 2022, 1 page.
Cohn, Emily, "Sonos Just Fixed the Most Annoying Thing About Its iPhone App", online available at: https://www.businessinsider.com/sonos-mobile-app-works-on-lock-screen-2016-6, Jun. 27, 2016, 2 pages.
Decision to Grant received for European Patent Application No. 20158824.1, dated Dec. 15, 2022, 3 pages.
Fingas, Jon, "Sonos Puts Speaker Controls On Your iPhone's Lock Screen", online available at https://www.engadget.com/2016-06-21-sonos-ios-lock-screen-controls.html, Jun. 21, 2016, 3 pages.
International Search Report and Written Opinion received for PCT Patent Application No. PCT/US2022/031252, dated Oct. 7, 2022, 18 pages.
Invitation to Pay Search Fees received for European Patent Application No. 15714698.6, dated Dec. 16, 2022, 4 pages.
Kazmucha, Allyson, "Sonos Controller App for iPhone and iPad Review", online available at https://www.imore.com/sonos-controller-app-iphone-and-ipad-review, Mar. 1, 2018, 4 pages.
Notice of Allowance received for U.S. Appl. No. 16/922,675, dated Dec. 8, 2022, 9 pages.
Office Action received for Australian Patent Application No. 2021201243, dated Dec. 12, 2022, 3 pages.
Office Action received for Australian Patent Application No. 2022200901, dated Dec. 19, 2022, 4 pages.
Office Action received for Australian Patent Application No. 2022201532, dated Dec. 19, 2022, 5 pages.
Office Action received for Japanese Patent Application No. 2020-184605, dated Dec. 12, 2022, 9 pages (4 pages of English Translation and 5 pages of Official Copy).
Result of Consultation received for European Patent Application No. 18208881.5, dated Dec. 6, 2022, 10 pages.
Supplemental Notice of Allowance received for U.S. Appl. No. 16/917,659, dated Dec. 21, 2022, 3 pages.
"13 questions and answers about using Apple Pay online", Online available at: http://www.it528.com/apple/1356.html, Feb. 18, 2016, 5 pages.
Advisory Action received for U.S. Appl. No. 10/308,315, dated Jul. 10, 2006, 3 pages.
Advisory Action received for U.S. Appl. No. 12/395,537, dated Apr. 26, 2012, 4 pages.
Advisory Action received for U.S. Appl. No. 12/566,673, dated Jun. 12, 2013, 3 pages.
Advisory Action received for U.S. Appl. No. 13/038,217, dated Dec. 8, 2014, 3 pages.
Advisory Action received for U.S. Appl. No. 13/587,850, dated May 15, 2015, 2 pages.
Advisory Action received for U.S. Appl. No. 14/863,099, dated Sep. 8, 2016, 3 pages.
Advisory Action received for U.S. Appl. No. 15/250,152, dated Mar. 25, 2019, 5 pages.
Advisory Action received for U.S. Appl. No. 15/730,610, dated Oct. 24, 2019, 5 pages.
Advisory Action received for U.S. Appl. No. 16/422,736, dated Mar. 12, 2021, 3 pages.

(56) References Cited

OTHER PUBLICATIONS

Advisory Action received for U.S. Appl. No. 16/583,989, dated Sep. 22, 2020, 5 pages.
Akhgari, Ehsan, "Don't Leave a Trace: Private Browsing in Firefox", available online at "http://ehsanakhgari.org/blog/2008-11-04/dont-leave-trace-private-browsing-firefox", Nov. 4, 2008, 71 pages.
Akshay, "Control your SmartThings compatible devices on the Gear S2 and S3 with the Smarter Things app", Online available at https://iotgadgets.com/2017/09/control-smartthings-compatible-devices-gear-s2-s3-smarter-things-app/, Sep. 7, 2017, 4 pages.
Alba, Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.
Appeal Brief received for U.S. Appl. No. 11/522,167, dated Nov. 23, 2010, 65 pages.
Apple, "Iphone User's Guide", iPhone first generation, Available at: <http://pocketpccentral.net/iphone/products/1 g_iphone.htm>, Jun. 29, 2007, 124 pages.
Applicant-Initiated Interview Summary received for U.S. Appl. No. 14/641,304, dated Dec. 2, 2019, 5 pages.
Applicant-Initiated Interview Summary received for U.S. Appl. No. 14/641,304, dated Jul. 28, 2020, 5 pages.
Applicant-Initiated Interview Summary received for U.S. Appl. No. 15/433,320, dated Feb. 11, 2020, 5 pages.
Applicant-Initiated Interview Summary received for U.S. Appl. No. 15/433,320, dated Nov. 25, 2020, 4 pages.
Applicant-Initiated Interview Summary received for U.S. Appl. No. 15/730,610, dated Aug. 25, 2020, 6 pages.
Applicant-Initiated Interview Summary received for U.S. Appl. No. 15/910,263, dated Nov. 18, 2020, 6 pages.
Applicant-Initiated Interview Summary received for U.S. Appl. No. 16/263,280, dated Apr. 26, 2021, 2 pages.
Applicant-Initiated Interview Summary received for U.S. Appl. No. 16/263,280, dated Nov. 25, 2020, 3 pages.
Applicant-Initiated Interview Summary received for U.S. Appl. No. 16/422,736, dated Feb. 24, 2021, 3 pages.
Applicant-Initiated Interview Summary received for U.S. Appl. No. 16/422,736, dated Sep. 28, 2020, 3 pages.
Applicant-Initiated Interview Summary received for U.S. Appl. No. 16/583,981, dated Mar. 9, 2020, 5 pages.
Applicant-Initiated Interview Summary received for U.S. Appl. No. 16/583,981, dated Sep. 14, 2020, 6 pages.
Applicant-Initiated Interview Summary received for U.S. Appl. No. 16/583,989, dated Aug. 3, 2020, 6 pages.
Applicant-Initiated Interview Summary received for U.S. Appl. No. 16/583,989, dated Mar. 25, 2020, 4 pages.
Applicant-Initiated Interview Summary received for U.S. Appl. No. 16/583,994, dated Apr. 3, 2020, 5 pages.
Applicant-Initiated Interview Summary received for U.S. Appl. No. 16/583,994, dated May 28, 2021, 5 pages.
Applicant-Initiated Interview Summary received for U.S. Appl. No. 16/583,994, dated Nov. 24, 2020, 4 pages.
Applicant-Initiated Interview Summary received for U.S. Appl. No. 16/584,490, dated Jan. 31, 2020, 4 pages.
Applicant-Initiated Interview Summary received for U.S. Appl. No. 16/584,490, dated Jul. 28, 2020, 4 pages.
Applicant-Initiated Interview Summary received for U.S. Appl. No. 16/584,743, dated May 1, 2020, 5 pages.
Applicant-Initiated Interview Summary received for U.S. Appl. No. 16/586,002, dated Apr. 28, 2020, 5 pages.
Applicant-Initiated Interview Summary received for U.S. Appl. No. 16/670,949, dated Apr. 6, 2021, 2 pages.
Applicant-Initiated Interview Summary received for U.S. Appl. No. 16/679,967, dated Feb. 10, 2022, 2 pages.
Applicant-Initiated Interview Summary received for U.S. Appl. No. 16/679,967, dated Oct. 25, 2021, 2 pages.
Applicant-Initiated Interview Summary received for U.S. Appl. No. 16/702,968, dated Jul. 1, 2020, 5 pages.
Applicant-Initiated Interview Summary received for U.S. Appl. No. 16/702,968, dated Sep. 28, 2020, 6 pages.
Applicant-Initiated Interview Summary received for U.S. Appl. No. 16/723,583, dated Dec. 28, 2020, 6 pages.
Applicant-Initiated Interview Summary received for U.S. Appl. No. 16/803,849, dated Aug. 21, 2020, 5 pages.
Applicant-Initiated Interview Summary received for U.S. Appl. No. 16/803,849, dated Dec. 21, 2020, 5 pages.
Applicant-Initiated Interview Summary received for U.S. Appl. No. 16/803,849, dated Feb. 28, 2022, 9 pages.
Applicant-Initiated Interview Summary received for U.S. Appl. No. 16/803,849, dated Oct. 12, 2021, 6 pages.
Applicant-Initiated Interview Summary received for U.S. Appl. No. 16/807,604, dated Dec. 21, 2020, 7 pages.
Applicant-Initiated Interview Summary received for U.S. Appl. No. 16/807,604, dated Jul. 24, 2020, 5 pages.
Applicant-Initiated Interview Summary received for U.S. Appl. No. 16/836,571, dated Jul. 7, 2021, 6 pages.
Applicant-Initiated Interview Summary received for U.S. Appl. No. 16/917,659, dated Jan. 28, 2022, 2 pages.
Applicant-Initiated Interview Summary received for U.S. Appl. No. 16/922,675, dated Dec. 16, 2020, 3 pages.
Applicant-Initiated Interview Summary received for U.S. Appl. No. 16/922,675, dated Nov. 2, 2020, 3 pages.
Applicant-Initiated Interview Summary received for U.S. Appl. No. 16/922,675, dated Sep. 3, 2021, 2 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Applicant-Initiated Interview Summary received for U.S. Appl. No. 17/031,833, dated Dec. 21, 2020, 5 pages.
Applicant-Initiated Interview Summary received for U.S. Appl. No. 17/031,833, dated May 24, 2021, 6 pages.
Applicant-Initiated Interview Summary received for U.S. Appl. No. 17/168,069, dated Nov. 17, 2021, 2 pages.
Applicant-Initiated Interview Summary received for U.S. Appl. No. 17/223,794, dated Sep. 7, 2021, 3 pages.
Applicant-Initiated Interview Summary received for U.S. Appl. No. 17/461,103, dated Jan. 26, 2022, 6 pages.
Beard, Chris, "Mozilla Labs Introducing Weave", available online at <https://blog.mozilla.org/labs/2007/12/introducing-weave/>, Dec. 21, 2007, 57 pages.
Bell, Killian, "Twitter Notifications, iCloud Tabs & Location-Based Reminders Appear In Latest OS X 10.8 Beta", available online at "http://www.cultofmac.com/154522/twitter-notifications-icloud-tabs-location-based-reminders-appear-in-latest-os-x-10-8-beta/", Mar. 19, 2012, 10 pages.
Benjamin, Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
Bennett, Stephen, "ES2: Logic's Most Sophisticated Virtual Analogue Synth", Logic Notes & Techniques, Jun. 2007, 6 pages.
Board Decision received for Chinese Patent Application No. 201510288981.9, dated May 6, 2021, 31 pages.
Board Decision received for Chinese Patent Application No. 201580043701.6, dated Aug. 19, 2021, 2 pages.
Board Decision received for Chinese Patent Application No. 201580046339.8, dated Jun. 22, 2021, 12 pages.
Board Opinion received for Chinese Patent Application No. 201510288981.9, dated Jan. 4, 2021, 21 pages.
Board Opinion received for Chinese Patent Application No. 201580046339.8, dated Mar. 19, 2021, 11 pages.
Board Opinion received for Chinese Patent Application No. 201810338826.7, dated Jan. 19, 2022, 18 pages.
Board Opinion received for Chinese Patent Application No. 201910164962.3, dated Sep. 16, 2021, 16 pages.

(56) References Cited

OTHER PUBLICATIONS

Bove, Tony, "iPod & iTunes For Dummies", Wiley Publishing, Inc., 6th Edition, 2008, pp. 143-182.
Boxer, David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Brief Communication Regarding Oral Proceedings received for European Patent Application No. 18197583.0, dated Feb. 18, 2021, 2 pages.
Brief Communication Regarding Oral Proceedings received for European Patent Application No. 19169980.0, dated Jun. 17, 2021, 2 pages.
Brumberg, et al., "The Unlock Project: A Python-based framework for practical brain-computer interface communication "app" development", Conf Proc IEEE Eng Med Biol Soc. 2012, doi:10.1109/EMBC.2012.6346473, Institute of Electrical and Electronics Engineers, 2012, 11 pages.
Butler, Travis, "Portable MPS: The Nomad Jukebox", available at <http://tidbits.com/article/6261>, Jan. 8, 2001, 4 pages.
Call Me, "Samsung R3 speaker gives you a delicious 360-degree sound experience—with WiFi and Bluetooth | Call me", 0:24 / 3:22, Available Online at: <https://www.youtube.com/watch?v=4Uv_sOhrlro>, Sep. 22, 2016, 3 pages.
Certificate of Examination received for Australian Patent Application No. 2017100553, dated Jan. 17, 2018, 2 pages.
Certificate of Examination received for Australian Patent Application No. 2018101014, dated Mar. 20, 2019, 2 pages.
Chan, Christine, "Handoff Your Browser to Your iPhone or iPad! Plus A Chance To Win A Copy!", Apr. 12, 2011, 2 pages.
Cipriani, Jason, "How to use Spotify's Offline mode on iPhone", XP055533907, Available online at: https://www.cnet.com/how-to/how-to-use-spotifys-offline-mode-on-iphone/, Aug. 1, 2011, 5 pages.
Computeradv, "Sonos App Navigation & Menu on iPhone", Available online at: https://www.youtube.com/watch?v=Jhz9XvWQ204, Aug. 4, 2015, 1 page.
Corrected Notice of Allowance received for U.S. Appl. No. 13/587,850, dated Apr. 1, 2020, 2 pages.
Corrected Notice of Allowance received for U.S. Appl. No. 13/587,850, dated Mar. 23, 2020, 2 pages.
Corrected Notice of Allowance received for U.S. Appl. No. 14/641,298, dated Dec. 9, 2021, 5 pages.
Corrected Notice of Allowance received for U.S. Appl. No. 14/719,217, dated Apr. 22, 2019, 2 pages.
Corrected Notice of Allowance received for U.S. Appl. No. 14/719,217, dated Mar. 20, 2019, 2 pages.
Corrected Notice of Allowance received for U.S. Appl. No. 14/830,629, dated Feb. 13, 2019, 3 pages.
Corrected Notice of Allowance received for U.S. Appl. No. 15/269,801, dated Oct. 3, 2017, 4 pages.
Corrected Notice of Allowance received for U.S. Appl. No. 15/730,610, dated Nov. 27, 2020, 3 pages.
Corrected Notice of Allowance received for U.S. Appl. No. 15/845,794, dated Feb. 25, 2019, 2 pages.
Corrected Notice of Allowance received for U.S. Appl. No. 15/910,263, dated Feb. 10, 2021, 3 pages.
Corrected Notice of Allowance received for U.S. Appl. No. 15/910,263, dated Mar. 17, 2021, 3 pages.
Corrected Notice of Allowance received for U.S. Appl. No. 15/910,263, dated Mar. 18, 2021, 3 pages.
Corrected Notice of Allowance received for U.S. Appl. No. 15/952,736, dated Nov. 19, 2018, 2 pages.
Corrected Notice of Allowance received for U.S. Appl. No. 16/229,959, dated Mar. 3, 2020, 3 pages.
Corrected Notice of Allowance received for U.S. Appl. No. 16/263,280, dated Aug. 5, 2021, 4 pages.
Corrected Notice of Allowance received for U.S. Appl. No. 16/422,736, dated Jul. 9, 2021, 2 pages.
Corrected Notice of Allowance received for U.S. Appl. No. 16/434,865, dated Apr. 28, 2020, 2 pages.
Corrected Notice of Allowance received for U.S. Appl. No. 16/434,865, dated Jun. 4, 2020, 2 pages.
Corrected Notice of Allowance received for U.S. Appl. No. 16/583,981, dated Apr. 6, 2021, 3 pages.
Corrected Notice of Allowance received for U.S. Appl. No. 16/583,981, dated May 17, 2021, 3 pages.
Corrected Notice of Allowance received for U.S. Appl. No. 16/583,994, dated Jul. 6, 2021, 3 pages.
Corrected Notice of Allowance received for U.S. Appl. No. 16/584,743, dated Dec. 30, 2020, 3 pages.
Corrected Notice of Allowance received for U.S. Appl. No. 16/670,949, dated Sep. 8, 2021, 2 pages.
Corrected Notice of Allowance received for U.S. Appl. No. 16/702,968, dated Jun. 8, 2021, 3 pages.
Corrected Notice of Allowance received for U.S. Appl. No. 16/702,968, dated Jun. 16, 2021, 4 pages.
Corrected Notice of Allowance received for U.S. Appl. No. 16/702,968, dated Jun. 28, 2021, 4 pages.
Corrected Notice of Allowance received for U.S. Appl. No. 16/702,968, dated May 26, 2021, 4 pages.
Corrected Notice of Allowance received for U.S. Appl. No. 16/702,968, dated May 28, 2021, 4 pages.
Corrected Notice of Allowance received for U.S. Appl. No. 16/807,604, dated Jul. 26, 2021, 3 pages.
Corrected Notice of Allowance received for U.S. Appl. No. 16/807,604, dated Jun. 28, 2021, 3 pages.
Corrected Notice of Allowance received for U.S. Appl. No. 16/807,604, dated May 28, 2021, 3 pages.
Corrected Notice of Allowance received for U.S. Appl. No. 16/807,604, dated Oct. 4, 2021, 5 pages.
Corrected Notice of Allowance received for U.S. Appl. No. 16/807,604, dated Oct. 14, 2021, 3 pages.
Corrected Notice of Allowance received for U.S. Appl. No. 16/807,604, dated Oct. 22, 2021, 3 pages.
Corrected Notice of Allowance received for U.S. Appl. No. 16/836,571, dated Dec. 6, 2021, 5 pages.
Corrected Notice of Allowance received for U.S. Appl. No. 16/836,571, dated Nov. 4, 2021, 4 pages.
Corrected Notice of Allowance received for U.S. Appl. No. 16/836,571, dated Nov. 18, 2021, 3 pages.
Corrected Notice of Allowance received for U.S. Appl. No. 16/836,571, dated Oct. 12, 2021, 4 pages.
Corrected Notice of Allowance received for U.S. Appl. No. 16/921,551, dated Feb. 9, 2022, 2 pages.
Corrected Notice of Allowance received for U.S. Appl. No. 16/921,551, dated Jan. 26, 2022, 3 pages.
Corrected Notice of Allowance received for U.S. Appl. No. 16/922,675, dated Mar. 4, 2022, 6 pages.
Corrected Notice of Allowance received for U.S. Appl. No. 16/987,003, dated Sep. 1, 2021, 3 pages.
Corrected Notice of Allowance received for U.S. Appl. No. 17/031,833, dated Aug. 2, 2021, 3 pages.
Corrected Notice of Allowance received for U.S. Appl. No. 17/168,069, dated Feb. 9, 2022, 2 pages.
Crutnacker, "Amazon Echo Tips and Tricks: Playing Music Demonstration", Available Online at: https://www.youtube.com/watch?v=W_bqq2ynUII, Nov. 4, 2015, 1 page.
"Customize Notifications and Content on Your Galaxy Phone's Lock Screen", Online Available at: https://www.samsung.com/US/support/answer/ANS00062636, Oct. 4, 2017, 5 pages.
Decision on Appeal received for U.S. Appl. No. 12/566,673, dated Dec. 18, 2019, 10 pages.
Decision on Appeal received for U.S. Appl. No. 13/587,850, dated Aug. 28, 2019, 21 pages.
Decision on Appeal received for U.S. Appl. No. 13/587,850, dated Oct. 21, 2019, 3 pages.
Decision on Appeal received for U.S. Appl. No. 14/641,298, dated Nov. 1, 2021, 9 pages.
Decision on Appeal received for U.S. Appl. No. 14/774,664, dated Sep. 12, 2019, 8 pages.

(56) References Cited

OTHER PUBLICATIONS

Decision on Appeal received for U.S. Appl. No. 14/863,099, dated Aug. 22, 2019, 9 pages.
Decision on Appeal received for U.S. Appl. No. 15/128,952, dated Dec. 28, 2020, 23 pages.
Decision to Grant received for Danish Patent Application No. PA201670628, dated Nov. 20, 2017, 2 pages.
Decision to Grant received for Danish Patent Application No. PA201770392, dated Oct. 24, 2018, 2 pages.
Decision to Grant received for Danish Patent Application No. PA201770401, dated Oct. 24, 2018, 2 pages.
Decision to Grant received for Danish Patent Application No. PA201770403, dated Oct. 24, 2018, 2 pages.
Decision to Grant received for Danish Patent Application No. PA201770404, dated Nov. 11, 2019, 3 pages.
Decision to Grant received for Danish Patent Application No. PA201770406, dated May 15, 2020, 2 pages.
Decision to Grant received for Danish Patent Application No. PA201770782, dated Oct. 25, 2019, 2 pages.
Decision to Grant received for Danish Patent Application No. PA202070560, dated Oct. 21, 2021, 2 pages.
Decision to Grant received for European Patent Application No. 10712824.1, dated May 17, 2018, 3 pages.
Decision to Grant received for European Patent Application No. 12181537.7, dated Mar. 3, 2016, 2 pages.
Decision to Grant received for European Patent Application No. 12773460.6, dated Jun. 27, 2019, 2 pages.
Decision to Grant received for European Patent Application No. 13171047.7, dated Jun. 27, 2019, 2 pages.
Decision to Grant received for European Patent Application No. 15711969.4, dated Sep. 26, 2019, 2 pages.
Decision to Grant received for European Patent Application No. 15713062.6, dated Apr. 11, 2019, 2 pages.
Decision to Grant received for European Patent Application No. 15719347.5, dated Jun. 24, 2021, 2 pages.
Decision to Grant received for European Patent Application No. 15724160.5, dated Jun. 14, 2018, 2 pages.
Decision to Grant received for European Patent Application No. 16710590.7, dated Oct. 28, 2021, 2 pages.
Decision to Grant received for European Patent Application No. 18197583.0, dated Feb. 3, 2022, 3 pages.
Decision to Grant received for European Patent Application No. 18197589.7, dated Jun. 10, 2021, 2 pages.
Decision to Grant received for German Patent Application No. 102015208532.5, dated Sep. 22, 2020, 10 pages.
Decision to Grant received for Japanese Patent Application No. 2014-017726, dated Dec. 7, 2015, 6 pages.
Decision to Grant received for Japanese Patent Application No. 2017-075031, dated Jul. 1, 2019, 3 pages.
Decision to Grant received for Japanese Patent Application No. 2019-124728, dated Apr. 2, 2021, 4 pages.
Decision to Refuse received for European Patent Application No. 07842262.3, dated Dec. 21, 2018, 8 pages.
Decision to Refuse received for European Patent Application No. 10177096.4, dated Feb. 13, 2019, 4 pages.
Decision to Refuse received for European Patent Application No. 12753631.6, dated Feb. 20, 2019, 20 pages.
Decision to Refuse received for European Patent Application No. 12770400.5, dated Nov. 8, 2018, 12 pages.
Decision to Refuse received for European Patent Application No. 19169980.0, dated Jul. 15, 2021, 4 pages.
Detroitborg, "Apple Music: Walkthrough", YouTube Video, online available at: "https://www.youtube.com/watch?v=NLgjodiAtbQ", Jun. 30, 2015, 1 page.
Dharmasena, Anusha, "iMessage-send as text message Option", YouTube, Available online at: <https://www.youtube.com/watch7?v=hXG-MdlW6FA>, Feb. 18, 2013, 1 page.
"Digital Video Editor", IBM Technical Disclosure Bulletin, vol. 35, No. 2, Jul. 1, 1992, 6 pages.

Dybwad, Barb, "Google Chrome Gets Bookmark Syncing", available online at "http://mashable.com/2009/11/02/chrome-bookmark-sync/", Nov. 3, 2009, 6 pages.
Enright, Andrew Coulter., "Dissatisfaction Sows Innovation", Available at <http://web.archive.org/web/20051225123312/http://thetreehouseandthecave.blogspot.com/2004/12/dissatisfaction-sows-innovation.html>, Dec. 29, 2004, 6 pages.
Enright, Andrew Coulter., "Meet Cover Flow", Available online at <http://web.archive.org/web/20060111073239/thetreehouseandthecave.blogspot.com/2005/08/meet-coverflow.html>, retrieved on Feb. 19, 2008, Aug. 13, 2005, 2 pages.
Enright, Andrew Coulter., "Visual Browsing on an iBook Ds", Available online at <http://web.archive.org/web/20060111175609/thetreehouseandthecave.blogspot.com/2004/12/visual-browsing-on-i book-ds.html>, Dec. 29, 2004, 2 pages.
Evaluation Report for Utility Model Patent received for Chinese Patent Application No. 201620051290.7, completed on Sep. 19, 2016, 11 pages.
Examiner's Answer to Appeal Brief received for U.S. Appl. No. 11/522,167, dated Feb. 15, 2011, 13 pages.
Examiner's Answer to Appeal Brief received for U.S. Appl. No. 12/566,673, dated Nov. 17, 2017, 10 pages.
Examiner's Answer to Appeal Brief received for U.S. Appl. No. 14/641,298, dated Mar. 22, 2021, 19 pages.
Examiner's Answer to Appeal Brief received for U.S. Appl. No. 14/774,664, dated May 31, 2018, 28 pages.
Examiner's Answer to Appeal Brief received for U.S. Appl. No. 14/863,099, dated Jul. 28, 2017, 31 pages.
Examiner's Answer to Appeal Brief received for U.S. Appl. No. 15/128,952, dated Jan. 8, 2020, 9 pages.
Examiner's Initiated Interview Summary received for U.S. Appl. No. 14/641,298, dated Mar. 10, 2020, 4 pages.
Examiner's Pre-Review Report received for Japanese Patent Application No. 2018-080122, dated Feb. 25, 2020, 6 pages.
Extended European Search Report (includes Partial European Search Report and European Search Opinion) received for European Patent Application No. 12181537.7, dated Mar. 27, 2014, 7 pages.
Extended European Search Report (includes Partial European Search Report and European Search Opinion) received for European Patent Application No. 13184872.3, dated Dec. 5, 2013, 9 pages.
Extended European Search Report for European Patent Application No. 10177099.8, dated Oct. 18, 2010, 7 pages.
Extended European Search Report for European Patent Application No. 17813737.8, dated Nov. 22, 2019, 9 pages.
Extended European Search Report received for European Patent Application No. 10177096.4, dated Oct. 18, 2010, 9 pages.
Extended European Search Report received for European Patent Application No. 13171047.7, dated Oct. 29, 2014, 8 pages.
Extended European Search Report received for European Patent Application No. 17799904.2, dated Jul. 30, 2018, 7 pages.
Extended European Search Report received for European Patent Application No. 18178147.7, dated Oct. 4, 2018, 8 pages.
Extended European Search Report received for European Patent Application No. 18197583.0, dated Jun. 4, 2019, 20 pages.
Extended European Search Report received for European Patent Application No. 18197589.7, dated Jan. 7, 2019, 9 pages.
Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19169980.0, dated Jul. 2, 2019, 8 pages.
Extended European Search Report received for European Patent Application No. 19186538.5, dated Oct. 9, 2019, 10 pages.
Extended European Search Report received for European Patent Application No. 19203942.8, dated Apr. 1, 2020, 10 pages.
Extended European Search Report received for European Patent Application No. 19207753.5, dated Dec. 18, 2019, 9 pages.
Extended European Search Report received for European Patent Application No. 20158824.1, dated Aug. 10, 2020, 13 pages.
Extended European Search Report received for European Patent Application No. 21160991.2, dated Jul. 16, 2021, 14 pages.

(56) References Cited

OTHER PUBLICATIONS

Extended European Search Report received for European Patent Application No. 21166718.3, dated Jul. 6, 2021, 11 pages.
Extended European Search Report received for European Patent Application No. 21197457.1, dated Nov. 15, 2021, 8 pages.
Extended European Search Report received for European Patent Application No. 21207736.6, dated Feb. 22, 2022, 11 pages.
Feng, Lipeng, "Bound for computer lovers", Dec. 31, 2009, 2 pages.
Final Office Action received for U.S. Appl. No. 09/293,507, dated Apr. 24, 2002, 12 pages.
Final Office Action received for U.S. Appl. No. 09/293,507, dated Feb. 14, 2001, 10 pages.
Final Office Action received for U.S. Appl. No. 10/308,315, dated Apr. 6, 2005, 10 pages.
Final Office Action received for U.S. Appl. No. 10/308,315, dated Mar. 9, 2006, 10 pages.
Final Office Action received for U.S. Appl. No. 10/308,315, dated Mar. 23, 2007, 12 pages.
Final Office Action received for U.S. Appl. No. 11/459,591, dated Jan. 13, 2009, 11 pages.
Final Office Action received for U.S. Appl. No. 11/522,167, dated Aug. 5, 2009, 9 pages.
Final Office Action received for U.S. Appl. No. 11/522,167, dated Jul. 23, 2010, 11 pages.
Final Office Action received for U.S. Appl. No. 11/522,167, dated Jun. 3, 2013, 18 pages.
Final Office Action received for U.S. Appl. No. 11/522,167, dated Oct. 15, 2008, 10 pages.
Final Office Action received for U.S. Appl. No. 11/767,409, dated Jul. 17, 2012, 24 pages.
Final Office Action received for U.S. Appl. No. 11/767,409, dated Mar. 16, 2011, 16 pages.
Final Office Action received for U.S. Appl. No. 11/960,674, dated May 12, 2011, 10 pages.
Final Office Action received for U.S. Appl. No. 11/983,059, dated Jun. 6, 2011, 11 pages.
Final Office Action received for U.S. Appl. No. 12/215,651, dated Jul. 6, 2012, 27 pages.
Final Office Action received for U.S. Appl. No. 12/395,537, dated Feb. 3, 2012, 15 pages.
Final Office Action received for U.S. Appl. No. 12/395,537, dated Jun. 29, 2015, 17 pages.
Final Office Action received for U.S. Appl. No. 12/395,537, dated Nov. 14, 2013, 22 pages.
Final Office Action received for U.S. Appl. No. 12/395,541, dated Dec. 28, 2011, 16 pages.
Final Office Action received for U.S. Appl. No. 12/547,401, dated Jun. 28, 2010, 19 pages.
Final Office Action received for U.S. Appl. No. 12/566,669, dated Nov. 23, 2012, 29 pages.
Final Office Action received for U.S. Appl. No. 12/566,671, dated Dec. 20, 2012, 20 pages.
Final Office Action received for U.S. Appl. No. 12/566,673, dated Aug. 12, 2016,, 28 pages.
Final Office Action received for U.S. Appl. No. 12/566,673, dated Jan. 17, 2013, 22 pages.
Final Office Action received for U.S. Appl. No. 12/566,673, dated Mar. 25, 2014, 19 pages.
Final Office Action received for U.S. Appl. No. 13/038,217, dated May 6, 2014, 11 pages.
Final Office Action received for U.S. Appl. No. 13/248,882, dated Dec. 4, 2013, 22 pages.
Final Office Action received for U.S. Appl. No. 13/333,890, dated Feb. 13, 2014, 19 pages.
Final Office Action received for U.S. Appl. No. 13/333,890, dated Oct. 2, 2015, 21 pages.
Final Office Action received for U.S. Appl. No. 13/333,900, dated Dec. 19, 2014, 15 pages.
Final Office Action received for U.S. Appl. No. 13/333,900, dated Nov. 7, 2013, 14 pages.
Final Office Action received for U.S. Appl. No. 13/489,245, dated Mar. 28, 2014, 23 pages.
Final Office Action received for U.S. Appl. No. 13/489,245, dated Oct. 16, 2019, 25 pages.
Final Office Action received for U.S. Appl. No. 13/489,245, dated Sep. 27, 2018, 25 pages.
Final Office Action received for U.S. Appl. No. 13/492,057, dated Apr. 8, 2016, 29 pages.
Final Office Action received for U.S. Appl. No. 13/492,057, dated Mar. 30, 2015, 18 pages.
Final Office Action received for U.S. Appl. No. 13/587,850, dated May 3, 2016, 31 pages.
Final Office Action received for U.S. Appl. No. 13/587,850, dated Nov. 28, 2014, 22 pages.
Final Office Action received for U.S. Appl. No. 14/045,544, dated May 6, 2016, 26 pages.
Final Office Action received for U.S. Appl. No. 14/285,378, dated Jul. 23, 2015, 19 pages.
Final Office Action received for U.S. Appl. No. 14/503,327, dated May 18, 2017, 10 pages.
Final Office Action received for U.S. Appl. No. 14/641,289, dated Jul. 1, 2016, 32 pages.
Final Office Action received for U.S. Appl. No. 14/641,298, dated Jun. 26, 2020, 50 pages.
Final Office Action received for U.S. Appl. No. 14/641,298, dated May 16, 2019, 50 pages.
Final Office Action received for U.S. Appl. No. 14/641,298, dated Oct. 4, 2017, 30 pages.
Final Office Action received for U.S. Appl. No. 14/641,304, dated Jul. 24, 2018, 19 pages.
Final Office Action received for U.S. Appl. No. 14/641,304, dated Oct. 15, 2019, 21 pages.
Final Office Action received for U.S. Appl. No. 14/719,217, dated Feb. 23, 2017, 37 pages.
Final Office Action received for U.S. Appl. No. 14/774,664, dated Aug. 25, 2017, 23 pages.
Final Office Action received for U.S. Appl. No. 14/830,629, dated Apr. 16, 2018, 27 pages.
Final Office Action received for U.S. Appl. No. 14/841,455, dated Nov. 6, 2018, 14 Pages.
Final Office Action received for U.S. Appl. No. 14/863,099, dated Apr. 21, 2016, 20 pages.
Final Office Action received for U.S. Appl. No. 15/128,952, dated Jul. 18, 2018, 19 pages.
Final Office Action received for U.S. Appl. No. 15/250,152, dated Aug. 23, 2017, 24 pages.
Final Office Action received for U.S. Appl. No. 15/250,152, dated Nov. 16, 2018, 30 pages.
Final Office Action received for U.S. Appl. No. 15/433,320, dated Dec. 31, 2019, 30 pages.
Final Office Action received for U.S. Appl. No. 15/730,610, dated Aug. 6, 2019, 28 pages.
Final Office Action received for U.S. Appl. No. 15/910,263, dated Aug. 28, 2019, 32 pages.
Final Office Action received for U.S. Appl. No. 16/263,280, dated Mar. 4, 2021, 13 pages.
Final Office Action received for U.S. Appl. No. 16/422,736, dated Jan. 11, 2021, 39 pages.
Final Office Action received for U.S. Appl. No. 16/583,981, dated Apr. 16, 2020, 19 pages.
Final Office Action received for U.S. Appl. No. 16/583,989, dated Jul. 10, 2020, 23 pages.
Final Office Action received for U.S. Appl. No. 16/583,994, dated Jul. 23, 2020, 16 pages.
Final Office Action received for U.S. Appl. No. 16/584,490, dated May 1, 2020, 48 pages.
Final Office Action received for U.S. Appl. No. 16/679,967, dated Nov. 10, 2021, 14 pages.
Final Office Action received for U.S. Appl. No. 16/702,968, dated Jul. 27, 2020, 21 pages.
Final Office Action received for U.S. Appl. No. 16/723,583, dated Feb. 5, 2021, 15 pages.

(56) References Cited

OTHER PUBLICATIONS

Final Office Action received for U.S. Appl. No. 16/803,849, dated Nov. 2, 2021, 37 pages.
Final Office Action received for U.S. Appl. No. 16/803,849, dated Sep. 24, 2020, 29 pages.
Final Office Action received for U.S. Appl. No. 16/807,604, dated Aug. 19, 2020, 35 pages.
Final Office Action received for U.S. Appl. No. 16/922,675, dated Dec. 3, 2020, 21 pages.
Final Office Action received for U.S. Appl. No. 16/922,675, dated Nov. 30, 2020, 12 pages.
Final Office Action received for U.S. Appl. No. 17/026,818, dated Jan. 29, 2021, 21 pages.
Final Office Action received for U.S. Appl. No. 17/031,833, dated Jan. 26, 2021, 17 pages.
Finkelstein, Ellen, "Temporarily Override Object Snap Settings", AutoCAD Tips Blog, Apr. 9, 2007, 4 pages.
"Firefox Sync—Take Your Bookmarks, Tabs and Personal Information with You", available online at: https://web.archive.org/web/20120601020556/http://support.mozilla.org/en-US/kb/firefox-sync-take-your-bookmarks-and-tabs-with-you?redirectlocale=en-US&redirectslug=what-firefox-sync, Jun. 1, 2012, 3 pages.
FOX 11 Los Angeles, "Review: Samsung Radiant R3 Wireless Speakers", Available Online at: <https://www.youtube.com/watch?v=ZBICVE1WdKE>, Jan. 19, 2016, 3 pages.
Frakes, Dan, "How to Get Started with Airplay", availble at: https://www.macworld.com/article/2039770/how-to-get-started-with-airplay.html, Macworld, May 27, 2013, 8 pages.
"Free Virtual Classic Analogue Mono Synth", Samsara Cycle Audio Releases DEISK-O, Jan. 2, 2011, 3 pages.
"G Pad, LG's latest UIs that shine even more on the G-Pad", Online available at : http://bungq.com/1014., Nov. 19, 2013, 49 pages.
Google Labs, "Google Browser Sync", available online at "https://web.archive.org/web/20120518050142/http://www.google.com/tools/firefox/browsersync/faq.html", May 18, 2012, 5 pages.
Google, "Google Home Help, Listen to music", Datasheet [online], Available Online at: <https://web.archive.org/web/20170326051235/https:/support.google.com/googlehome/answer/7030379?hl=en&ref_topic=7030084>, Mar. 26, 2017, 3 pages.
Gookin, Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
Han, Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages.
Hein, Buster, "iOS 5 Allows Users to Delete Music Directly From iPhone/iPad", Online available at: https://www.cultofmac.com/99990/ios-5-allows-users-to-delete-music-directly-from-iphoneipad/, Jun. 9, 2011, 7 pages.
Hoffberger, Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
Howcast, "How to Create and Edit Playlists on iPhone", Youtube, Available online at: https://www.youtube.com/watch?v=YPOnKUvcso4, Mar. 13, 2014, 3 pages.
"How-To: iTunes in the Cloud", available at <http://y2kemo.com/2011/06/how-to-itunes-in-the-cloud/>, Jun. 9, 2011, 4 pages.
Hughes, Neil, "Apple Explores Merging Cloud Content with Locally Stored Media Library", Available at <http://appleinsider.com/articles/11/02/10/apple_explores_merging_cloud_content_with_locally_stored_media_library.html>, Feb. 10, 2011, 2 pages.
Intention to Grant received for Danish Patent Application No. PA201670628, dated Aug. 28, 2017, 2 pages.
Intention to Grant received for Danish Patent Application No. PA201770392, dated Aug. 31, 2018, 2 pages.
Intention to Grant received for Danish Patent Application No. PA201770392, dated Jul. 2, 2018, 2 pages.
Intention to Grant received for Danish Patent Application No. PA201770401, dated Jun. 14, 2018, 2 Pages.
Intention to Grant received for Danish Patent Application No. PA201770401, dated Sep. 17, 2018, 2 pages.
Intention to Grant received for Danish Patent Application No. PA201770403, dated May 7, 2018, 2 pages.
Intention to Grant received for Danish Patent Application No. PA201770403, dated Oct. 3, 2018, 2 pages.
Intention to Grant received for Danish Patent Application No. PA201770404, dated Sep. 23, 2019, 3 pages.
Intention to Grant received for Danish Patent Application No. PA201770406, dated Feb. 6, 2020, 3 pages.
Intention to Grant received for Danish Patent Application No. PA201770408, dated Nov. 30, 2018, 3 pages.
Intention to Grant received for Danish Patent Application No. PA201770782, dated Aug. 8, 2019, 2 pages.
Intention to Grant received for Danish Patent Application No. PA202070560, dated Apr. 26, 2021, 2 pages.
Intention to Grant received for Danish Patent Application No. PA202070617, dated Nov. 15, 2021, 2 pages.
Intention to Grant received for European Patent Application No. 10712824.1, dated Jan. 5, 2018, 9 pages.
Intention to Grant received for European Patent Application No. 12181537.7, dated Sep. 22, 2015, 7 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
Intention to Grant received for European Patent Application No. 13171047.7, dated Jan. 23, 2019, 8 pages.
Intention to Grant received for European Patent Application No. 13184872.3, dated Feb. 11, 2019, 7 pages.
Intention to Grant received for European Patent Application No. 15711969.4, dated May 29, 2019, 11 pages.
Intention to Grant received for European Patent Application No. 15713062.6, dated Mar. 25, 2019, 7 pages.
Intention to Grant received for European Patent Application No. 15713062.6, dated Oct. 8, 2018, 8 pages.
Intention to Grant received for European Patent Application No. 15719347.5, dated Dec. 8, 2020, 7 pages.
Intention to Grant received for European Patent Application No. 15719347.5, dated Jun. 8, 2021, 7 pages.
Intention to Grant received for European Patent Application No. 15719347.5, dated May 11, 2021, 8 pages.
Intention to Grant received for European Patent Application No. 15724160.5, dated Mar. 7, 2018, 8 pages.
Intention to Grant received for European Patent Application No. 16710590.7, dated Jun. 14, 2021, 8 pages.
Intention to Grant received for European Patent Application No. 18197583.0, dated Jan. 17, 2022, 9 pages.
Intention to Grant received for European Patent Application No. 18197583.0, dated Jul. 23, 2021, 9 pages.
Intention to Grant received for European Patent Application No. 18197589.7, dated Jan. 21, 2021, 8 pages.
Intention to Grant received for European Patent Application No. 19207753.5, dated Jan. 28, 2022, 8 pages.
Intention to Grant received for European Patent Application No. 19207753.5, dated Sep. 3, 2021, 8 pages.
International Preliminary Report on Patentability received for PCT Patent Application No. PCT/US00/010441, dated Feb. 14, 2001, 3 pages.
International Preliminary Report on Patentability received for PCT Patent Application No. PCT/US2006/062714, dated Jul. 8, 2008, 6 pages.
International Preliminary Report on Patentability received for PCT Patent Application No. PCT/US2007/078180, dated Mar. 17, 2009, 6 pages.
International Preliminary Report on Patentability received for PCT Patent Application No. PCT/US2007/088914, dated Jul. 7, 2009, 8 pages.
International Preliminary Report on Patentability received for PCT Patent Application No. PCT/US2010/027088, dated Sep. 29, 2011, 7 pages.

(56) References Cited

OTHER PUBLICATIONS

International Preliminary Report on Patentability received for PCT Patent Application No. PCT/US2012/025314, dated Sep. 12, 2013, 8 pages.
International Preliminary Report on Patentability received for PCT Patent Application No. PCT/US2012/051432, dated Feb. 27, 2014, 10 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2013/044710, dated Dec. 18, 2014, 11 pages.
International Preliminary Report on Patentability received for PCT Patent Application No. PCT/US2014/027882, dated Sep. 24, 2015, 8 pages.
International Preliminary Report on Patentability Received for PCT Patent Application No. PCT/US2015/019306, dated Dec. 15, 2016, 10 pages.
International Preliminary Report on Patentability Received for PCT Patent Application No. PCT/US2015/019309, dated Dec. 15, 2016, 10 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2016/021012, dated Sep. 21, 2017, 11 Pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/032240, dated Nov. 29, 2018, 29 pages.
International Preliminary Report on Patentability received for PCT Patent Application No. PCT/US2018/032158, dated Nov. 21, 2019, 12 pages.
International Preliminary Report on Patentability received for PCT Patent Application No. PCT/US2018/032904, dated Nov. 28, 2019, 14 pages.
International Preliminary Report on Patentability received for PCT Patent Application No. PCT/US2020/024390, dated Dec. 9, 2021, 20 pages.
International Preliminary Report on Patentability received for PCT Patent Application No. PCT/US2020/026044, dated Dec. 9, 2021, 18 pages.
International Preliminary Report on Patentability received for PCT Patent Application No. PCT/US2020/035446, dated Dec. 9, 2021, 14 pages.
International Preliminary Report on Patentability received for PCT Patent Application No. PCT/US2020/035488, dated Dec. 9, 2021, 16 pages.
International Search Report and Written Opinion received for PCT Patent Application No. PCT/US00/10441, dated Jul. 11, 2000, 2 pages.
International Search Report and Written Opinion received for PCT Patent Application No. PCT/US17/31086, dated Sep. 8, 2017, 15 pages.
International Search Report and Written Opinion received for PCT Patent Application No. PCT/US2007/078180, dated Mar. 3, 2008, 8 pages.
International Search Report and Written Opinion received for PCT Patent Application No. PCT/US2007/088914, dated Jun. 23, 2008, 10 pages.
International Search Report and Written Opinion received for PCT Patent Application No. PCT/US2010/027088, dated Jun. 18, 2010, 8 pages.
International Search Report and Written Opinion received for PCT Patent Application No. PCT/US2012/025314, dated May 14, 2012, 10 pages.
International Search Report and Written Opinion received for PCT Patent Application No. PCT/US2012/051432, dated Oct. 29, 2012, 12 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2013/044710, dated Aug. 15, 2013, 11 pages.
International Search Report and Written Opinion received for PCT Patent Application No. PCT/US2014/027882, dated Oct. 10, 2014, 11 pages.
International Search Report and Written Opinion received for PCT Patent Application No. PCT/US2015/019306, dated Jun. 17, 2015, 15 pages.
International Search Report and Written Opinion received for PCT Patent Application No. PCT/US2015/019309, dated Jun. 25, 2015, 15 pages.
International Search Report and Written Opinion received for PCT Patent Application No. PCT/US2015/019317, dated Aug. 25, 2015, 24 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2015/045965, dated Feb. 1, 2016, 20 pages.
International Search Report and Written Opinion received for PCT Patent Application No. PCT/US2016/021012, dated Jun. 2, 2016, 15 pages.
International Search Report and Written Opinion received for PCT Patent Application No. PCT/US2017/032240, dated Sep. 21, 2017, 33 pages.
International Search Report and Written Opinion received for PCT Patent Application No. PCT/US2018/032158, dated Nov. 2, 2018, 19 pages.
International Search Report and Written Opinion received for PCT Patent Application No. PCT/US2018/032904, dated Oct. 1, 2018, 21 pages.
International Search Report and written Opinion received for PCT Patent Application No. PCT/US2020/024390, dated Aug. 17, 2020, 22 pages.
International Search Report and Written Opinion received for PCT Patent Application No. PCT/US2020/024390, dated Oct. 23, 2020, 26 pages.
International Search Report and Written Opinion received for PCT Patent Application No. PCT/US2020/026044, dated Sep. 9, 2020, 26 pages.
International Search Report and Written Opinion received for PCT Patent Application No. PCT/US2020/035446, dated Nov. 10, 2020, 20 pages.

(56) References Cited

OTHER PUBLICATIONS

International Search Report and Written Opinion received for PCT Patent Application No. PCT/US2020/035488, dated Nov. 17, 2020, 21 pages.
International Search Report and Written Opinion received for PCT Patent Application No. PCT/US2021/031760, dated Sep. 16, 2021, 18 pages.
International Search Report and Written Opinion received for PCT Patent Application No. PCT/US2021/048358, dated Feb. 24, 2022, 21 pages.
Invitation to Pay Addition Fees and Partial International Search Report received for PCT Patent Application No. PCT/US2018/032904, dated Jul. 31, 2018, 18 pages.
Invitation to Pay Additional Fees received for PCT Patent Application No. PCT/US 17/31086, dated Jul. 14, 2017, 2 pages.
Invitation to Pay Additional Fees received for PCT Patent Application No. PCT/US17/32240, dated Jul. 12, 2017, 2 pages.
Invitation to Pay Additional Fees received for PCT Patent Application No. PCT/US2014/027882, dated Aug. 5, 2014, 2 pages.
Invitation to Pay Additional Fees received for PCT Patent Application No. PCT/US2015/019317, dated May 22, 2015, 7 pages.
Invitation to Pay Additional Fees received for PCT Patent Application No. PCT/US2018/032158, dated Sep. 10, 2018, 16 pages.
Invitation to Pay Additional Fees received for PCT Patent Application No. PCT/US2020/024390, dated Jun. 26, 2020, 15 pages.
Invitation to Pay Additional Fees received for PCT Patent Application No. PCT/US2020/026044, dated Jun. 25, 2020, 12 pages.
Invitation to Pay Additional Fees received for PCT Patent Application No. PCT/US2020/035446, dated Sep. 11, 2020, 12 pages.
Invitation to Pay Additional Fees received for PCT Patent Application No. PCT/US2020/035488, dated Sep. 23, 2020, 15 pages.
Invitation to Pay Additional Fees received for PCT Patent Application No. PCT/US2021/048358, dated Dec. 23, 2021, 14 pages.
Invitation to Pay Search Fees received for European Patent Application No. 18728002.9, dated Sep. 2, 2020, 8 pages.
Invitation to Pay Search Fees received for European Patent Application No. 18733381.0, dated Jun. 30, 2021, 4 pages.
Invitation to Pay Search Fees received for European Patent Application No. 20719301.2, dated Dec. 17, 2020, 5 pages.
ITJungles, "iPhone 6: How to Pair with Another Bluetooth Device", Available Online at: https://www.youtube.com/watch?v=9setanYtHAk, Aug. 5, 2015, 3 pages.
Jarvie, "Alexa plays me music", Available online at: https://www.youtube.com/watch?v=bR2ZC8Sy8YQ, Feb. 23, 2015, 1 page.
Kanter, David, "Start Download Automatically Sync Your (New) Music, Apps, And iBooks Across Your iDevices With iCloud", Available online at: https://appadvice.com/appnn/2011/06/automatically-sync-music-apps-ibooks-idevices-icloud, Jun. 8, 2011, 6 pages.
Kim, et al., "An Energy Efficient Transmission Scheme for Real-Time Data in Wireless Sensor Networks", Sensors, vol. 15, May 20, 2015, 25 pages.
Kimura, Ryoji, "Keynote presentation practice guide for iPad & iPhone", K.K. Rutles, first edition, Feb. 29, 2012, 4 pages.
"Kinect Gesture Commands—Kinect Voice Commands", Xbox Wire, Available Online At: <https://hwcdn.libsyn.eom/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b >, 2013, 2 pages.
"LG G Pad 8.3 Tablet Q Remote User", Available at:—<https://mushroomprincess.tistory.com/1320>, Dec. 26, 2013, 37 pages.
Locklear, Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low, Cherlynn, "So you bought a smartwatch. Now what?", Online available at: https://www.engadget.com/2018-02-06-how-to-set-up-your-smartwatch.html, Feb. 6, 2018, 19 pages.

Mac Fan, "Chapter 4: The True Character of Apple's Genuine Cloud—Your Personal Data Always Exist In There, Regardless Of Your Location", Mainichi Communications Inc., vol. 19, No. 8, Aug. 1, 2011, 8 pages.
Mackie, Simon, "Emulate Safari's Reader Mode in Other Browsers With Readability", available online at "https://gigaom.com/2010/06/21/emulate-safaris-reader-mode-in-other-browsers-with-readability/", Jun. 21, 2010, 5 pages.
McElhearn, Kirk, "iTunes 10.3 Offers Automatic Downloads and Access to Purchases", Available at <http://web.archive.org/web/20110613084837/http://www.tidbits.com/article/12235>, Jun. 8, 2011, 5 pages.
Minutes of Oral Hearing received for German Patent Application No. 102015208532.5, dated Dec. 13, 2019, 21 pages.
Minutes of the Oral Proceedings received for European Patent Application No. 00923491.5, dated May 11, 2011, 69 pages.
Minutes of the Oral Proceedings received for European Patent Application No. 12753631.6, dated Feb. 20, 2019, 3 pages.
Minutes of the Oral Proceedings received for European Patent Application No. 12770400.5, dated Nov. 6, 2018, 7 pages.
Minutes of the Oral Proceedings received for European Patent Application No. 15711969.4, dated May 16, 2019, 7 pages.
Minutes of the Oral Proceedings received for European Patent Application No. 18197583.0, dated Mar. 9, 2021, 6 pages.
Miser, Brad, "Sams Teach Yourself iTunes® 10 in 10 Minutes", SAMS Publishing, Dec. 30, 2010, pp. 65 and 67-69.
Mozilla Services, "Firefox Sync Terms of Service (for versions prior to Firefox 29)", available online at <https://services.mozilla.com/tos/>, Aug. 19, 2010, 4 pages.
NBC, News, "NBC News—YouTube Democratic Debate (full)", Online available at:—https://www.youtube.com/watch?v=ti2Nokoq1J4, Jan. 17, 2016, 1 page.
Non-Final Office Action received for U.S. Appl. No. 16/679,967, dated Sep. 2, 2021, 12 pages.
Non-Final Office Action received for U.S. Appl. No. 09/293,507, dated Aug. 1, 2001, 13 pages.
Non-Final Office Action received for U.S. Appl. No. 09/293,507, dated Jun. 22, 2000, 11 pages.
Non-Final Office Action received for U.S. Appl. No. 09/293,508, dated Jun. 30, 2000, 10 pages.
Non-Final Office Action received for U.S. Appl. No. 10/308,315, dated Aug. 8, 2005, 12 pages.
Non-Final Office Action received for U.S. Appl. No. 10/308,315, dated Jul. 28, 2004, 10 pages.
Non-Final Office Action received for U.S. Appl. No. 10/374,013, dated Feb. 1, 2007, 8 pages.
Non-Final Office Action received for U.S. Appl. No. 11/459,591, dated Jul. 29, 2008, 15 pages.
Non-Final Office Action received for U.S. Appl. No. 11/521,740, dated Dec. 27, 2007, 8 pages.
Non-Final Office Action received for U.S. Appl. No. 11/522,167, dated Dec. 6, 2012, 15 pages.
Non-Final Office Action received for U.S. Appl. No. 11/522,167, dated Feb. 5, 2009, 9 pages.
Non-Final Office Action received for U.S. Appl. No. 11/522,167, dated Jan. 20, 2010, 10 pages.
Non-Final Office Action received for U.S. Appl. No. 11/522,167, dated May 2, 2007, 8 pages.
Non-Final Office Action received for U.S. Appl. No. 11/522,167, dated Oct. 19, 2007, 10 pages.
Non-Final Office Action received for U.S. Appl. No. 11/767,409, dated Aug. 29, 2011, 18 pages.
Non-Final Office Action received for U.S. Appl. No. 11/767,409, dated Feb. 9, 2012, 20 pages.
Non-Final Office Action received for U.S. Appl. No. 11/767,409, dated Nov. 23, 2010, 12 pages.
Non-Final Office Action received for U.S. Appl. No. 11/960,674, dated Oct. 27, 2010, 7 pages.
Non-Final Office Action received for U.S. Appl. No. 11/983,059, dated Dec. 30, 2010, 11 pages.
Non-Final Office Action received for U.S. Appl. No. 12/215,651, dated Aug. 15, 2013, 27 pages.

(56) References Cited

OTHER PUBLICATIONS

Non-Final Office Action received for U.S. Appl. No. 12/215,651, dated Feb. 2, 2012, 18 pages.
Non-Final Office Action received for U.S. Appl. No. 12/395,537, dated Aug. 15, 2011, 17 pages.
Non-Final Office Action received for U.S. Appl. No. 12/395,537, dated Dec. 14, 2015, 18 pages.
Non-Final Office Action received for U.S. Appl. No. 12/395,537, dated Jan. 5, 2015, 20 pages.
Non-Final Office Action received for U.S. Appl. No. 12/395,537, dated Jul. 8, 2013, 22 pages.
Non-Final Office Action received for U.S. Appl. No. 12/395,541, dated Jul. 26, 2011, 15 pages.
Non-Final Office Action received for U.S. Appl. No. 12/395,541, dated Mar. 14, 2013, 23 pages.
Non-Final Office Action received for U.S. Appl. No. 12/547,401, dated Feb. 11, 2013, 13 pages.
Non-Final Office Action received for U.S. Appl. No. 12/547,401, dated Jan. 8, 2010, 12 pages.
Non-Final Office Action received for U.S. Appl. No. 12/566,669, dated Apr. 17, 2014, 27 pages.
Non-Final Office Action received for U.S. Appl. No. 12/566,669, dated Jun. 19, 2012, 30 pages.
Non-Final Office Action received for U.S. Appl. No. 12/566,671, dated May 23, 2012, 21 pages.
Non-Final Office Action received for U.S. Appl. No. 12/566,672, dated Nov. 8, 2012, 11 pages.
Non-Final Office Action received for U.S. Appl. No. 12/566,673, dated Dec. 16, 2015, 23 pages.
Non-Final Office Action received for U.S. Appl. No. 12/566,673, dated Jun. 7, 2012, 17 pages.
Non-Final Office Action received for U.S. Appl. No. 12/566,673, dated Mar. 26, 2015, 19 pages.
Non-Final Office Action received for U.S. Appl. No. 12/566,673, dated Sep. 13, 2013, 18 pages.
Non-Final Office Action received for U.S. Appl. No. 13/038,217, dated Sep. 13, 2013, 16 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 13/333,890, dated Aug. 30, 2013, 20 pages.
Non-Final Office Action received for U.S. Appl. No. 13/333,890, dated Jun. 5, 2015, 20 pages.
Non-Final Office Action received for U.S. Appl. No. 13/333,890, dated May 1, 2013, 26 pages.
Non-Final Office Action received for U.S. Appl. No. 13/333,900, dated Mar. 19, 2013, 17 pages.
Non-Final Office Action received for U.S. Appl. No. 13/333,900, dated May 23, 2014, 19 pages.
Non-Final Office Action received for U.S. Appl. No. 13/489,245, dated Apr. 8, 2019, 27 pages.
Non-Final Office Action received for U.S. Appl. No. 13/489,245, dated Dec. 27, 2017, 22 pages.
Non-Final Office Action received for U.S. Appl. No. 13/489,245, dated Nov. 20, 2013, 25 Pages.
Non-Final Office Action received for U.S. Appl. No. 13/492,057, dated Dec. 17, 2015, 25 pages.
Non-Final Office Action received for U.S. Appl. No. 13/492,057, dated Jul. 8, 2014, 14 pages.
Non-Final Office Action received for U.S. Appl. No. 13/587,850, dated Apr. 7, 2014, 18 pages.
Non-Final Office Action received for U.S. Appl. No. 13/587,850, dated Oct. 8, 2015, 29 pages.
Non-Final Office Action received for U.S. Appl. No. 14/045,544, dated Oct. 6, 2015, 20 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/503,327, dated Sep. 12, 2016, 10 pages.
Non-Final Office Action received for U.S. Appl. No. 14/641,289, dated Jul. 16, 2015, 31 pages.
Non-Final Office Action received for U.S. Appl. No. 14/641,289, dated Mar. 11, 2016, 26 pages.
Non-Final Office Action received for U.S. Appl. No. 14/641,298, dated Mar. 6, 2017, 26 pages.
Non-Final Office Action received for U.S. Appl. No. 14/641,298, dated Nov. 29, 2019, 47 pages.
Non-Final Office Action received for U.S. Appl. No. 14/641,298, dated Sep. 19, 2018, 41 pages.
Non-Final Office Action received for U.S. Appl. No. 14/641,304, dated Feb. 27, 2019, 18 pages.
Non-Final Office Action received for U.S. Appl. No. 14/641,304, dated Mar. 4, 2020, 21 pages.
Non-Final Office Action received for U.S. Appl. No. 14/641,304, dated Sep. 11, 2017, 18 pages.
Non-Final Office Action received for U.S. Appl. No. 14/642,366, dated Aug. 24, 2015, 7 pages.
Non-Final Office Action received for U.S. Appl. No. 14/719,217, dated Jul. 26, 2018, 40 pages.
Non-Final Office Action received for U.S. Appl. No. 14/719,217, dated Jul. 28, 2016, 28 pages.
Non-Final Office Action received for U.S. Appl. No. 14/774,664, dated Mar. 7, 2017, 23 pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 14/841,455, dated Apr. 11, 2019, 13 pages.
Non-Final Office Action received for U.S. Appl. No. 14/841,455, dated Apr. 25, 2018, 13 pages.
Non-Final Office Action received for U.S. Appl. No. 14/863,099, dated Dec. 2, 2015, 12 pages.
Non-Final Office Action received for U.S. Appl. No. 15/128,952, dated Apr. 1, 2019, 20 pages.
Non-Final Office Action received for U.S. Appl. No. 15/128,952, dated Dec. 29, 2017, 13 pages.
Non-Final Office Action received for U.S. Appl. No. 15/134,638, dated Sep. 20, 2016, 6 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/269,801, dated Dec. 30, 2016, 17 pages.
Non-Final Office Action received for U.S. Appl. No. 15/274,963, dated Mar. 13, 2018, 23 pages.
Non-Final Office Action received for U.S. Appl. No. 15/433,320, dated Jul. 31, 2020, 13 pages.
Non-Final Office Action received for U.S. Appl. No. 15/433,320, dated May 2, 2019, 27 pages.
Non-Final Office Action received for U.S. Appl. No. 15/620,666, dated Mar. 28, 2018, 14 pages.
Non-Final Office Action received for U.S. Appl. No. 15/730,610, dated Apr. 15, 2020, 36 pages.
Non-Final Office Action received for U.S. Appl. No. 15/730,610, dated Feb. 1, 2019, 22 pages.
Non-Final Office Action received for U.S. Appl. No. 15/845,794, dated Oct. 15, 2018, 8 pages.
Non-Final Office Action received for U.S. Appl. No. 15/910,263, dated Jun. 15, 2020, 38 pages.
Non-Final Office Action received for U.S. Appl. No. 15/910,263, dated Mar. 4, 2019, 26 pages.
Non-Final Office Action received for U.S. Appl. No. 15/945,610, dated Sep. 20, 2018, 9 pages.
Non-Final Office Action received for U.S. Appl. No. 15/952,736, dated Jun. 1, 2018, 12 pages.

(56) References Cited

OTHER PUBLICATIONS

Non-Final Office Action received for U.S. Appl. No. 16/229,959, dated Oct. 31, 2019, 10 pages.
Non-Final Office Action received for U.S. Appl. No. 16/263,280, dated Jul. 27, 2020, 11 pages.
Non-Final Office Action received for U.S. Appl. No. 16/422,736, dated Jun. 23, 2020, 24 pages.
Non-Final Office Action received for U.S. Appl. No. 16/434,865, dated Jan. 16, 2020, 9 pages.
Non-Final Office Action received for U.S. Appl. No. 16/583,981, dated Dec. 6, 2019, 14 pages.
Non-Final Office Action received for U.S. Appl. No. 16/583,989, dated Jan. 24, 2020, 20 pages.
Non-Final Office Action received for U.S. Appl. No. 16/583,994, dated Dec. 23, 2020, 17 pages.
Non-Final Office Action received for U.S. Appl. No. 16/583,994, dated Dec. 30, 2019, 14 pages.
Non-Final Office Action received for U.S. Appl. No. 16/584,490, dated Dec. 10, 2019, 27 pages.
Non-Final Office Action received for U.S. Appl. No. 16/584,743, dated Feb. 6, 2020, 15 pages.
Non-Final Office Action received for U.S. Appl. No. 16/586,002, dated Feb. 20, 2020, 15 pages.
Non-Final Office Action received for U.S. Appl. No. 16/670,949, dated Dec. 9, 2020, 11 pages.
Non-Final Office Action received for U.S. Appl. No. 16/702,968, dated Apr. 8, 2020, 20 pages.
Non-Final Office Action received for U.S. Appl. No. 16/723,583, dated Aug. 13, 2020, 13 pages.
Non-Final Office Action received for U.S. Appl. No. 16/803,849, dated Jul. 13, 2020, 23 pages.
Non-Final Office Action received for U.S. Appl. No. 16/803,849, dated May 14, 2021, 34 pages.
Non-Final Office Action received for U.S. Appl. No. 16/807,604, dated Jun. 2, 2020, 28 pages.
Non-Final Office Action received for U.S. Appl. No. 16/836,571, dated Mar. 25, 2021, 28 pages.
Non-Final Office Action received for U.S. Appl. No. 16/917,659, dated Jan. 14, 2022, 10 pages.
Non-Final Office Action received for U.S. Appl. No. 16/921,551, dated Sep. 8, 2021, 7 pages.
Non-Final Office Action received for U.S. Appl. No. 16/922,675, dated Aug. 13, 2020, 17 pages.
Non-Final Office Action received for U.S. Appl. No. 16/922,675, dated May 4, 2021, 23 pages.
Non-Final Office Action received for U.S. Appl. No. 16/987,003, dated May 10, 2021, 20 pages.
Non-Final Office Action received for U.S. Appl. No. 17/026,818, dated Nov. 25, 2020, 20 pages.
Non-Final Office Action received for U.S. Appl. No. 17/027,373, dated Feb. 2, 2022, 17 pages.
Non-Final Office Action received for U.S. Appl. No. 17/031,833, dated Dec. 7, 2020, 13 pages.
Non-Final Office Action received for U.S. Appl. No. 17/168,069, dated Jul. 21, 2021, 17 pages.
Non-Final Office Action received for U.S. Appl. No. 17/176,908, dated Feb. 24, 2022, 28 pages.
Non-Final Office Action received for U.S. Appl. No. 17/223,794, dated Jun. 16, 2021, 32 pages.
Non-Final Office Action received for U.S. Appl. No. 17/461,103, dated Nov. 22, 2021, 15 pages.
Non-Final Office Action received for U.S. Appl. No. 17/476,404, dated Feb. 8, 2022, 26 pages.
Noriega, Josh, "How to Store and Listen to Music Directly from Your Android Wear Smartwatch", Guiding Tech, Available online at: https://www.guidingtech.com/55254/listen-music-android-wear-smartwatch, Jan. 15, 2016, 16 pages.
Notice of Acceptance received for Australian Patent Application No. 2015201884, dated Oct. 4, 2016, 3 pages.
Notice of Acceptance received for Australian Patent Application No. 2015267671, dated Apr. 4, 2018, 3 pages.
Notice of Acceptance received for Australian Patent Application No. 2016201454, dated Mar. 1, 2018, 3 Pages.
Notice of Acceptance received for Australian Patent Application No. 2016230001, dated May 25, 2018, 3 pages.
Notice of Acceptance received for Australian Patent Application No. 2017266867, dated Mar. 6, 2019, 3 pages.
Notice of Acceptance received for Australian Patent Application No. 2017284013, dated Aug. 26, 2020, 3 pages.
Notice of Acceptance received for Australian Patent Application No. 2018202751, dated Sep. 4, 2019, 3 pages.
Notice of Acceptance received for Australian Patent Application No. 2018220115, dated Jun. 29, 2020, 3 pages.
Notice of Acceptance received for Australian Patent Application No. 2018223051, dated Oct. 30, 2018, 3 Pages.
Notice of Acceptance received for Australian Patent Application No. 2018229544, dated May 4, 2020, 3 pages.
Notice of Acceptance received for Australian Patent Application No. 2018236872, dated Jul. 9, 2019, 3 pages.
Notice of Acceptance received for Australian Patent Application No. 2019203473, dated Nov. 7, 2019, 3 pages.
Notice of Acceptance received for Australian Patent Application No. 2019268111, dated Feb. 18, 2021, 3 pages.
Notice of Acceptance received for Australian Patent Application No. 2020239711, dated Dec. 16, 2021, 3 pages.
Notice of Acceptance received for Australian Patent Application No. 2020257092, dated Aug. 27, 2021, 3 pages.
Notice of Acceptance received for Australian Patent Application No. 2020273355, dated Jan. 17, 2022, 3 pages.
Notice of Acceptance received for Australian Patent Application No. 2020282362, dated Jan. 4, 2022, 3 pages.
Notice of Acceptance received for Australian Patent Application No. 2020285524, dated Dec. 17, 2021, 3 pages.
Notice of Acceptance received for Australian Patent Application No. 2021201403, dated Oct. 22, 2021, 3 pages.
Notice of Acceptance received for Australian Patent Application No. 2021204454, dated Feb. 25, 2022, 3 pages.
Notice of Allowance and Search Report received for Taiwanese Patent Application No. 104128687, dated Jun. 7, 2016, 4 pages.
Notice of Allowance received for Brazilian Patent Application No. BR112014003009-0, dated Jun. 15, 2021, 3 pages.
Notice of Allowance received for Canadian Patent Application No. 2,661,200, dated Aug. 20, 2014, 1 page.
Notice of Allowance received for Canadian Patent Application No. 2,882,403, dated Oct. 31, 2018, 1 page.
Notice of Allowance received for Chinese Patent Application No. 201210308569.5, dated May 31, 2016, 4 pages.
Notice of Allowance received for Chinese Patent Application No. 201280040169.9, dated Sep. 4, 2018, 3 pages.
Notice of Allowance received for Chinese Patent Application No. 201280047459.6, dated Jan. 31, 2018, 2 pages.
Notice of Allowance received for Chinese Patent Application No. 201410449822.8, dated Mar. 5, 2019, 2 pages.
Notice of Allowance received for Chinese Patent Application No. 201520364847.8, dated Nov. 5, 2015, 9 pages.
Notice of Allowance received for Chinese Patent Application No. 201580028491.3, dated Mar. 29, 2019, 2 pages.
Notice of Allowance received for Chinese Patent Application No. 201580028505.1, dated Sep. 19, 2019, 2 pages.
Notice of Allowance received for Chinese Patent Application No. 201580043701.6, dated Jan. 26, 2022, 2 pages.
Notice of Allowance received for Chinese Patent Application No. 201620051290.7, dated Jun. 22, 2016, 2 Pages.
Notice of Allowance received for Chinese Patent Application No. 201680011682.3, dated Aug. 5, 2020, 2 pages.
Notice of Allowance received for Chinese Patent Application No. 201780002398.4, dated Jun. 17, 2019, 2 pages.
Notice of Allowance received for Chinese Patent Application No. 201780033899.9, dated Feb. 8, 2022, 2 pages.
Notice of Allowance received for Chinese Patent Application No. 201810338038.8, dated Jun. 30, 2020, 2 pages.

(56) References Cited

OTHER PUBLICATIONS

Notice of Allowance received for Chinese Patent Application No. 201811460172.1, dated Jan. 11, 2021, 2 pages.
Notice of Allowance received for Chinese Patent Application No. 201811539260.0, dated Mar. 15, 2021, 2 pages.
Notice of Allowance received for Chinese Patent Application No. 201880001436.9, dated May 8, 2020, 3 pages.
Notice of Allowance received for Chinese Patent Application No. 201910475434.X, dated Mar. 10, 2021, 2 pages.
Notice of Allowance received for Chinese Patent Application No. 202010125114.4, dated Nov. 24, 2021, 2 pages.
Notice of Allowance received for Danish Patent Application No. PA201770408, dated Feb. 8, 2019, 2 pages.
Notice of Allowance received for Japanese Patent Application No. 2012-500842, dated Jun. 20, 2014, 3 pages.
Notice of Allowance received for Japanese Patent Application No. 2014-148065, dated Jan. 12, 2016, 6 pages.
Notice of Allowance received for Japanese Patent Application No. 2014-526255, dated Jan. 7, 2016, 6 pages.
Notice of Allowance received for Japanese Patent Application No. 2015-095183, dated Apr. 21, 2017, 3 pages.
Notice of Allowance received for Japanese Patent Application No. 2016-001259, dated Jul. 27, 2018, 4 pages.
Notice of Allowance received for Japanese Patent Application No. 2016-017400, dated Dec. 16, 2016, 3 pages of Official Copy Only.
Notice of Allowance received for Japanese Patent Application No. 2016-022175, dated Jan. 12, 2018, 4 pages.
Notice of Allowance received for Japanese Patent Application No. 2016-569669, dated Mar. 19, 2018, 4 pages.
Notice of Allowance received for Japanese Patent Application No. 2017-101107, dated Jun. 3, 2019, 5 pages.
Notice of Allowance received for Japanese Patent Application No. 2017-507413, dated Jul. 22, 2019, 4 pages.
Notice of Allowance received for Japanese Patent Application No. 2017-543762, dated Mar. 30, 2020, 4 pages.
Notice of Allowance received for Japanese Patent Application No. 2018-080122, dated May 7, 2021, 28 pages.
Notice of Allowance received for Japanese Patent Application No. 2018-560107, dated Dec. 6, 2019, 4 pages.
Notice of Allowance received for Japanese Patent Application No. 2019-116580, dated Oct. 2, 2020, 4 pages.
Notice of Allowance received for Japanese Patent Application No. 2019-238894, dated Oct. 5, 2020, 4 pages.
Notice of Allowance received for Japanese Patent Application No. 2020-183773, dated Dec. 23, 2021, 4 pages.
Notice of Allowance received for Japanese Patent Application No. 2020-558885, dated Jul. 26, 2021, 4 pages.
Notice of Allowance received for Japanese Patent Application No. 2021-026630, dated Jan. 7, 2022, 4 pages.
Notice of allowance received for Korean Patent Application No. 10-2013-7028489, dated Jan. 25, 2016, 5 pages.
Notice of Allowance received for Korean Patent Application No. 10-2014-7006538, dated May 19, 2016, 3 pages.
Notice of Allowance received for Korean Patent Application No. 10-2014-7008348, dated Feb. 21, 2019, 5 pages.
Notice of Allowance received for Korean Patent Application No. 10-2015-0072162, dated Dec. 27, 2017, 4 pages.
Notice of Allowance received for Korean Patent Application No. 10-2016-7025395, dated Oct. 26, 2016, 5 pages.
Notice of Allowance received for Korean Patent Application No. 10-2016-7032902, dated Sep. 7, 2018, 3 pages.
Notice of Allowance received for Korean Patent Application No. 10-2016-7035555, dated Sep. 23, 2019, 3 pages.
Notice of Allowance received for Korean Patent Application No. 10-2017-7012145, dated Oct. 30, 2019, 3 pages.
Notice of Allowance received for Korean Patent Application No. 10-2017-7022905, dated Jul. 31, 2019, 4 pages.
Notice of Allowance received for Korean Patent Application No. 10-2017-7035057, dated May 31, 2018, 4 pages.
Notice of Allowance received for Korean Patent Application No. 10-2018-0035949, dated Nov. 28, 2019, 3 pages.
Notice of Allowance received for Korean Patent Application No. 10-2018-7033301, dated Feb. 20, 2019, 5 pages.
Notice of Allowance received for Korean Patent Application No. 10-2018-7035747, dated Dec. 9, 2020, 5 pages.
Notice of Allowance received for Korean Patent Application No. 10-2019-7014494, dated Mar. 19, 2020, 4 pages.
Notice of Allowance received for Korean Patent Application No. 10-2020-0024632, dated Jul. 26, 2021, 3 pages.
Notice of Allowance received for Korean Patent Application No. 10-2020-7002929, dated Nov. 26, 2020, 3 pages.
Notice of Allowance received for Korean Patent Application No. 10-2020-7017803, dated Nov. 5, 2020, 6 pages.
Notice of Allowance received for Korean Patent Application No. 10-2020-7031319, dated Apr. 6, 2021, 5 pages.
Notice of Allowance received for Korean Patent Application No. 10-2021-0143923, dated Jan. 27, 2022, 4 pages.
Notice of Allowance received for Korean Patent Application No. 10-2021-7005691, dated Mar. 29, 2021, 3 pages.
Notice of Allowance received for Korean Patent Application No. 10-2021-7020549, dated Jul. 13, 2021, 3 pages.
Notice of Allowance received for Korean Patent Application No. 10-2021-7021047, dated Dec. 6, 2021, 3 pages.
Notice of Allowance received for Korean Patent Application No. 10-2021-7035472, dated Nov. 23, 2021, 4 pages.
Notice of Allowance received for Korean Patent Application No. 10-2021-7039234, dated Dec. 20, 2021, 4 pages.
Notice of Allowance received for Mexican Patent Application No. MX/a/2014/001761, dated Sep. 11, 2015, 3 pages.
Notice of Allowance received for Mexican Patent Application No. MX/a/2016/001209, dated Mar. 26, 2018, 3 pages.
Notice of Allowance received for Taiwanese Patent Application No. 102120412, dated Oct. 28, 2015, 5 pages.
Notice of Allowance received for Taiwanese Patent Application No. 104108223, dated Jan. 10, 2017, 3 pages.
Notice of Allowance received for Taiwanese Patent Application No. 104114953, dated Oct. 17, 2017, 3 pages.
Notice of Allowance Received for Taiwanese Patent Application No. 104117041, dated Feb. 24, 2017, 3 pages.
Notice of Allowance received for Taiwanese Patent Application No. 104117042, dated Nov. 17, 2017, 5 pages.
Notice of Allowance received for Taiwanese Patent Application No. 106144804, dated Jun. 27, 2018, 6 pages.
Notice of Allowance received for U.S. Appl. No. 09/293,507, dated Jul. 25, 2002, 6 pages.
Notice of Allowance received for U.S. Appl. No. 09/293,508, dated Feb. 13, 2001, 5 pages.
Notice of Allowance received for U.S. Appl. No. 10/308,315, dated Aug. 27, 2007, 6 pages.
Notice of Allowance received for U.S. Appl. No. 10/374,013, dated Aug. 27, 2007, 6 pages.
Notice of Allowance received for U.S. Appl. No. 10/374,445, dated May 5, 2006, 7 pages.
Notice of Allowance received for U.S. Appl. No. 10/374,831, dated Sep. 10, 2004, 8 pages.
Notice of Allowance received for U.S. Appl. No. 11/459,591, dated May 21, 2009, 9 pages.
Notice of Allowance received for U.S. Appl. No. 11/521,740, dated Jul. 24, 2008, 7 pages.
Notice of Allowance received for U.S. Appl. No. 11/767,409, dated Jun. 12, 2013, 14 pages.
Notice of Allowance received for U.S. Appl. No. 11/960,674, dated Sep. 2, 2011, 7 pages.
Notice of Allowance received for U.S. Appl. No. 11/983,059, dated Feb. 10, 2012, 8 pages.
Notice of Allowance received for U.S. Appl. No. 12/215,651, dated Feb. 6, 2014, 5 pages.
Notice of Allowance received for U.S. Appl. No. 12/395,537 dated Jun. 29, 2016, 14 pages.
Notice of Allowance received for U.S. Appl. No. 12/395,541, dated Aug. 22, 2013, 8 pages.

(56) References Cited

OTHER PUBLICATIONS

Notice of Allowance received for U.S. Appl. No. 12/395,541, dated Sep. 12, 2013, 2 pages.
Notice of Allowance received for U.S. Appl. No. 12/547,401, dated Jul. 22, 2013, 8 pages.
Notice of Allowance received for U.S. Appl. No. 12/566,669, dated Nov. 6, 2014, 12 pages.
Notice of Allowance received for U.S. Appl. No. 12/566,671, dated Apr. 12, 2013, 11 pages.
Notice of Allowance received for U.S. Appl. No. 12/566,671, dated Dec. 18, 2013, 11 pages.
Notice of Allowance received for U.S. Appl. No. 12/566,672, dated Jun. 24, 2013, 8 pages.
Notice of Allowance received for U.S. Appl. No. 12/566,672, dated Mar. 1, 2013, 7 pages.
Notice of Allowance received for U.S. Appl. No. 12/566,673, dated Feb. 26, 2020, 7 pages.
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 13/333,900, dated Apr. 13, 2015, 9 pages.
Notice of Allowance received for U.S. Appl. No. 13/333,900, dated Dec. 1, 2015, 2 pages.
Notice of Allowance received for U.S. Appl. No. 13/333,900, dated Sep. 15, 2015, 7 pages.
Notice of Allowance received for U.S. Appl. No. 13/492,057, dated Jan. 3, 2017, 5 pages.
Notice of Allowance received for U.S. Appl. No. 13/492,057, dated May 18, 2017, 3 pages.
Notice of Allowance received for U.S. Appl. No. 13/587,850, dated Feb. 27, 2020, 5 pages.
Notice of Allowance received for U.S. Appl. No. 13/587,850, dated Nov. 8, 2019, 6 pages.
Notice of Allowance received for U.S. Appl. No. 14/285,378, dated May 19, 2016, 10 pages.
Notice of Allowance received for U.S. Appl. No. 14/503,327, dated Mar. 22, 2018, 5 pages.
Notice of Allowance received for U.S. Appl. No. 14/503,327, dated Nov. 30, 2017, 5 pages.
Notice of Allowance received for U.S. Appl. No. 14/641,289, dated Aug. 24, 2017, 6 Pages.
Notice of Allowance received for U.S. Appl. No. 14/641,289, dated Dec. 12, 2017, 5 pages.
Notice of Allowance received for U.S. Appl. No. 14/641,298, dated Nov. 29, 2021, 8 pages.
Notice of Allowance received for U.S. Appl. No. 14/641,304, dated Sep. 9, 2020, 15 pages.
Notice of Allowance received for U.S. Appl. No. 14/642,366, dated Jan. 14, 2016, 8 pages.
Notice of Allowance received for U.S. Appl. No. 14/719,217, dated Feb. 13, 2019, 13 pages.
Notice of Allowance received for U.S. Appl. No. 14/830,629, dated Oct. 17, 2018, 8 pages.
Notice of Allowance received for U.S. Appl. No. 14/841,455, dated Oct. 22, 2019, 10 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/274,963, dated Jul. 6, 2018, 10 pages.
Notice of Allowance received for U.S. Appl. No. 15/433,320, dated Apr. 1, 2021, 19 pages.
Notice of Allowance received for U.S. Appl. No. 15/730,610, dated Oct. 21, 2020, 29 pages.
Notice of Allowance received for U.S. Appl. No. 15/845,794, dated Feb. 14, 2019, 6 pages.
Notice of Allowance received for U.S. Appl. No. 15/910,263, dated Feb. 18, 2021, 3 pages.
Notice of Allowance received for U.S. Appl. No. 15/910,263, dated Jan. 22, 2021, 33 pages.
Notice of Allowance received for U.S. Appl. No. 15/945,610, dated May 20, 2019, 7 pages.
Notice of Allowance received for U.S. Appl. No. 15/952,736, dated Sep. 11, 2018,16 pages.
Notice of Allowance received for U.S. Appl. No. 16/131,767, dated Sep. 6, 2019, 7 pages.
Notice of Allowance received for U.S. Appl. No. 16/229,959, dated Dec. 4, 2019, 6 pages.
Notice of Allowance received for U.S. Appl. No. 16/263,280, dated Jun. 8, 2021, 8 pages.
Notice of Allowance received for U.S. Appl. No. 16/263,280, dated Sep. 17, 2021, 8 pages.
Notice of Allowance received for U.S. Appl. No. 16/422,736, dated Apr. 20, 2021, 12 pages.
Notice of Allowance received for U.S. Appl. No. 16/422,736, dated Jun. 15, 2021, 13 pages.
Notice of Allowance received for U.S. Appl. No. 16/434,865, dated Apr. 7, 2020, 5 pages.
Notice of Allowance received for U.S. Appl. No. 16/583,981, dated Mar. 26, 2021, 10 pages.
Notice of Allowance received for U.S. Appl. No. 16/583,989, dated Apr. 1, 2021,5 pages.
Notice of Allowance received for U.S. Appl. No. 16/583,989, dated Dec. 24, 2020, 7 pages.
Notice of Allowance received for U.S. Appl. No. 16/583,994, dated Jun. 24, 2021, 10 pages.
Notice of Allowance received for U.S. Appl. No. 16/584,490, dated Aug. 27, 2020, 13 pages.
Notice of Allowance received for U.S. Appl. No. 16/584,490, dated Mar. 26, 2021, 13 pages.
Notice of Allowance received for U.S. Appl. No. 16/584,743, dated Aug. 7, 2020, 8 pages.
Notice of Allowance received for U.S. Appl. No. 16/584,743, dated Nov. 16, 2020, 7 pages.
Notice of Allowance received for U.S. Appl. No. 16/586,002, dated Jun. 9, 2020, 5 pages.
Notice of Allowance received for U.S. Appl. No. 16/670,949, dated May 27, 2021, 7 pages.
Notice of Allowance received for U.S. Appl. No. 16/670,949, dated Sep. 14, 2021, 7 pages.
Notice of Allowance received for U.S. Appl. No. 16/702,968, dated Apr. 21, 2021, 20 pages.
Notice of Allowance received for U.S. Appl. No. 16/807,604, dated Apr. 30, 2021, 25 pages.
Notice of Allowance received for U.S. Appl. No. 16/836,571, dated Feb. 14, 2022, 31 pages.
Notice of Allowance received for U.S. Appl. No. 16/836,571, dated Sep. 8, 2021, 25 pages.
Notice of Allowance received for U.S. Appl. No. 16/888,775, dated Jan. 12, 2022, 5 pages.
Notice of Allowance received for U.S. Appl. No. 16/888,775, dated Jul. 26, 2021, 5 pages.
Notice of Allowance received for U.S. Appl. No. 16/888,775, dated Jun. 3, 2021, 11 pages.
Notice of Allowance received for U.S. Appl. No. 16/921,551, dated Jan. 13, 2022, 6 pages.
Notice of Allowance received for U.S. Appl. No. 16/922,675, dated Feb. 10, 2022, 8 pages.
Notice of Allowance received for U.S. Appl. No. 16/922,675, dated Jan. 21, 2021, 7 pages.
Notice of Allowance received for U.S. Appl. No. 16/922,675, dated Sep. 27, 2021, 10 pages.

(56) References Cited

OTHER PUBLICATIONS

Notice of Allowance received for U.S. Appl. No. 16/987,003, dated Aug. 18, 2021, 9 pages.
Notice of Allowance received for U.S. Appl. No. 17/026,818, dated May 13, 2021, 10 pages.
Notice of Allowance received for U.S. Appl. No. 17/031,833, dated Jun. 25, 2021, 15 pages.
Notice of Allowance received for U.S. Appl. No. 17/031,833, dated Sep. 20, 2021, 6 pages.
Notice of Allowance received for U.S. Appl. No. 17/168,069, dated Jan. 19, 2022, 12 pages.
Notice of Allowance received for U.S. Appl. No. 17/168,069, dated Mar. 22, 2022, 5 pages.
Notice of Grant received for Chinese Patent Application No. 200780033722.5, dated Jun. 19, 2014, 4 pages.
Notice of Hearing received for Indian Patent Application No. 717/CHENP/2014, dated May 5, 2021, 3 pages.
Notice of Non-Compliant Amendment received for U.S. Appl. No. 11/522,167 dated May 14, 2008, 4 pages.
Office Action received for Australian Patent Application No. 2012296381, dated Jan. 21, 2016, 5 pages.
Office Action received for Australian Patent Application No. 2012296381, dated Mar. 4, 2016, 4 pages.
Office Action received for Australian Patent Application No. 2012296381, dated Mar. 6, 2015, 4 pages.
Office Action received for Australian Patent Application No. 2015100490, dated Jun. 9, 2015, 6 pages.
Office Action received for Australian Patent Application No. 2015100490, dated Dec. 15, 2016, 2 pages.
Office Action received for Australian Patent Application No. 2015201884, dated Oct. 12, 2015, 4 pages.
Office Action received for Australian Patent Application No. 2015267671, dated Apr. 5, 2017, 2 pages.
Office Action received for Australian Patent Application No. 2015302298, dated Apr. 4, 2018, 3 pages.
Office Action received for Australian Patent Application No. 2015302298, dated Jul. 20, 2018, 3 pages.
Office Action received for Australian Patent Application No. 2015302298, dated Sep. 14, 2017, 3 pages.
Office Action received for Australian Patent Application No. 2015302298, dated Sep. 4, 2018, 5 pages.
Office Action received for Australian Patent Application No. 2016201454, dated Mar. 29, 2017, 3 Pages.
Office Action received for Australian Patent Application No. 2016230001, dated Feb. 7, 2018, 3 pages.
Office Action received for Australian Patent Application No. 2016266010, dated Aug. 23, 2018, 4 pages.
Office Action received for Australian Patent Application No. 2016266010, dated May 4, 2018, 4 pages.
Office Action received for Australian Patent Application No. 2016266010, dated Nov. 28, 2018, 5 pages.
Office Action received for Australian Patent Application No. 2016266010, dated Nov. 30, 2017, 5 pages.
Office Action received for Australian Patent Application No. 2017100553, dated Aug. 4, 2017, 5 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017266867, dated Dec. 6, 2018, 3 pages.
Office Action received for Australian Patent Application No. 2017284013, dated Mar. 19, 2020, 3 pages.
Office Action received for Australian Patent Application No. 2018101014, dated Jan. 18, 2019, 5 pages.
Office Action received for Australian Patent Application No. 2018101014, dated Sep. 19, 2018, 4 pages.
Office Action received for Australian Patent Application No. 2018202751, dated Apr. 2, 2019, 4 pages.
Office Action received for Australian Patent Application No. 2018203624, dated Feb. 5, 2020, 4 pages.
Office Action received for Australian Patent Application No. 2018203624, dated Mar. 11, 2020, 5 pages.
Office Action received for Australian Patent Application No. 2018203624, dated Mar. 15, 2019, 6 pages.
Office Action received for Australian Patent Application No. 2018203624, dated Oct. 30, 2019, 5 pages.
Office Action received for Australian Patent Application No. 2018220115, dated Apr. 21, 2020, 3 pages.
Office Action received for Australian Patent Application No. 2018220115, dated Oct. 4, 2019, 3 pages.
Office Action received for Australian Patent Application No. 2018229544, dated Nov. 15, 2019, 4 pages.
Office Action received for Australian Patent Application No. 2018236870, dated Jul. 29, 2019, 7 pages.
Office Action received for Australian Patent Application No. 2018236870, dated Nov. 21, 2018, 10 pages.
Office Action received for Australian Patent Application No. 2018236870, dated Oct. 31, 2019, 8 pages.
Office Action received for Australian Patent Application No. 2018236872, dated Nov. 23, 2018, 4 pages.
Office Action received for Australian Patent Application No. 2018271366, dated Feb. 25, 2020, 5 pages.
Office Action received for Australian Patent Application No. 2018271366, dated Jan. 19, 2021, 5 pages.
Office Action received for Australian Patent Application No. 2018271366, dated Oct. 26, 2020, 5 pages.
Office Action received for Australian Patent Application No. 2019203473, dated Oct. 25, 2019, 2 pages.
Office Action received for Australian Patent Application No. 2019268111, dated Oct. 27, 2020, 7 pages.
Office Action received for Australian Patent Application No. 2020207785, dated Dec. 14, 2021, 5 pages.
Office Action received for Australian Patent Application No. 2020207785, dated Jul. 13, 2021, 3 pages.
Office Action received for Australian Patent Application No. 2020239711, dated Sep. 13, 2021, 5 pages.
Office Action received for Australian Patent Application No. 2020257092, dated Mar. 3, 2021, 7 pages.
Office Action received for Australian Patent Application No. 2020257092, dated Nov. 30, 2020, 6 pages.
Office Action received for Australian Patent Application No. 2020273355, dated Jul. 6, 2021, 3 pages.
Office Action received for Australian Patent Application No. 2020273355, dated Nov. 23, 2021, 6 pages.
Office Action received for Australian Patent Application No. 2020282362, dated Nov. 25, 2021, 3 pages.
Office Action received for Australian Patent Application No. 2021201243, dated Feb. 17, 2022, 4 pages.
Office Action received for Australian Patent Application No. 2021201403, dated Mar. 16, 2021, 3 pages.
Office Action received for Australian Patent Application No. 2021204454, dated Aug. 9, 2021, 7 pages.
Office Action received for Brazilian Patent Application No. BR112014003009-0, dated Oct. 29, 2019, 6 pages.
Office Action Received for Canadian Patent Application No. 2,661,200, dated Jan. 3, 2013, 5 pages.
Office Action received for Canadian Patent Application No. 2,661,200, dated Jun. 9, 2010, 3 pages.
Office Action Received for Canadian Patent Application No. 2,661,200, dated Nov. 1, 2011, 4 pages.
Office Action received for Canadian Patent Application No. 2,661,200, dated Nov. 14, 2013, 2 pages.
Office Action received for Canadian Patent Application No. 2,882,403, dated Apr. 2, 2015, 5 pages.
Office Action received for Canadian Patent Application No. 2,882,403, dated Sep. 15, 2017, 5 pages.
Office Action received for Chinese Patent Application No. 201210308569.5, dated Feb. 5, 2016, 3 pages.
Office Action received for Chinese Patent Application No. 201210308569.5, dated Nov. 19, 2014, 24 pages.

(56) References Cited

OTHER PUBLICATIONS

Office Action received for Chinese Patent Application No. 201210308569.5, dated Sep. 1, 2015, 39 pages.
Office Action received for Chinese Patent Application No. 201280040169.9, dated Jun. 1, 2016, 10 pages.
Office Action received for Chinese Patent Application No. 201280040169.9, dated Mar. 31, 2017, 13 pages.
Office Action received for Chinese Patent Application No. 201280040169.9, dated May 14, 2018, 6 pages.
Office Action received for Chinese Patent Application No. 201280040169.9, dated Sep. 20, 2017, 14 pages.
Office Action received for Chinese Patent Application No. 201410449822.8, dated Dec. 2, 2016, 9 pages.
Office Action received for Chinese Patent Application No. 201410449822.8, dated May 4, 2018, 12 pages.
Office Action received for Chinese Patent Application No. 201410449822.8, dated Nov. 20, 2018, 11 pages.
Office Action received for Chinese Patent Application No. 201410449822.8, dated Sep. 30, 2017, 20 Pages.
Office Action received for Chinese Patent Application No. 201510288981.9, dated Jul. 1, 2019, 16 pages.
Office Action received for Chinese Patent Application No. 201510288981.9, dated Jul. 3, 2018, 19 pages.
Office Action received for Chinese Patent Application No. 201510288981.9, dated Mar. 6, 2019, 20 pages.
Office Action received for Chinese Patent Application No. 201580028491.3, dated Oct. 8, 2018, 9 pages.
Office Action received for Chinese Patent Application No. 201580028505.1, dated Jan. 16, 2019, 15 pages.
Office Action received for Chinese Patent Application No. 201580028505.1, dated Jun. 20, 2019, 7 pages.
Office Action received for Chinese Patent Application No. 201580043701.6, dated Dec. 24, 2018, 20 pages.
Office Action received for Chinese Patent Application No. 201580043701.6, dated May 8, 2021, 10 pages.
Office Action received for Chinese Patent Application No. 201580043701.6, dated Nov. 4, 2019, 20 pages.
Office Action received for Chinese Patent Application No. 201580043701.6, dated Oct. 12, 2020, 22 pages.
Office Action received for Chinese Patent Application No. 201580043701.6, dated Sep. 10, 2021, 10 pages.
Office Action received for Chinese Patent Application No. 201580046339.8, dated Feb. 26, 2019, 18 pages.
Office Action received for Chinese Patent Application No. 201580046339.8, dated Jun. 3, 2020, 19 pages.
Office Action received for Chinese Patent Application No. 201580046339.8, dated Oct. 19, 2020, 12 pages.
Office Action received for Chinese Patent Application No. 201580046339.8, dated Oct. 31, 2019, 9 pages.
Office Action received for Chinese Patent Application No. 201680011682.3, dated Dec. 2, 2019, 14 pages.
Office Action received for Chinese Patent Application No. 201711292804.3, dated Aug. 5, 2020, 26 pages.
Office Action received for Chinese Patent Application No. 201711292804.3, dated Feb. 23, 2021, 17 pages.
Office Action received for Chinese Patent Application No. 201711292804.3, dated Sep. 10, 2021, 19 pages.
Office Action received for Chinese Patent Application No. 201780002398.4, dated Feb. 27, 2019, 6 pages.
Office Action received for Chinese Patent Application No. 201780002398.4, dated Sep. 12, 2018, 17 pages.
Office Action received for Chinese Patent Application No. 201780033899.9, dated Sep. 3, 2021, 12 pages.
Office Action received for Chinese Patent Application No. 201810338038.8, dated Jan. 21, 2020, 26 pages.
Office Action received for Chinese Patent Application No. 201810338038.8, dated May 14, 2019, 26 pages.
Office Action received for Chinese Patent Application No. 201810338040.5, dated Jun. 3, 2021, 25 pages.
Office Action received for Chinese Patent Application No. 201810338040.5, dated Oct. 25, 2021, 22 pages.
Office Action received for Chinese Patent Application No. 201810338826.7, dated Apr. 3, 2019, 21 pages.
Office Action received for Chinese Patent Application No. 201810338826.7, dated Jan. 16, 2020, 16 Pages.
Office Action received for Chinese Patent Application No. 201810338826.7, dated Oct. 21, 2019, 19 pages.
Office Action received for Chinese Patent Application No. 201810339290.0, dated Jun. 4, 2021, 20 pages.
Office Action received for Chinese Patent Application No. 201810339290.0, dated Oct. 18, 2021, 20 pages.
Office Action received for Chinese Patent Application No. 201811367893.8, dated Jun. 21, 2021, 18 pages.
Office Action received for Chinese Patent Application No. 201811367893.8, dated Nov. 29, 2021, 6 pages.
Office Action received for Chinese Patent Application No. 201811460172.1, dated Jan. 21, 2020, 17 pages.
Office Action received for Chinese Patent Application No. 201811460172.1, dated Oct. 14, 2020, 7 pages.
Office Action received for Chinese Patent Application No. 201811539259.8, dated Apr. 3, 2020, 10 pages.
Office Action received for Chinese Patent Application No. 201811539259.8, dated Sep. 3, 2020, 10 pages.
Office Action received for Chinese Patent Application No. 201811539259.8, dated Sep. 18, 2019, 12 pages.
Office Action received for Chinese Patent Application No. 201811539260.0, dated Jun. 3, 2020, 8 pages.
Office Action received for Chinese Patent Application No. 201811539260.0, dated Nov. 4, 2020, 9 pages.
Office Action received for Chinese Patent Application No. 201811539260.0, dated Oct. 8, 2019, 14 pages.
Office Action received for Chinese Patent Application No. 201880001436.9, dated Apr. 28, 2019, 19 pages.
Office Action received for Chinese Patent Application No. 201880001436.9, dated Nov. 6, 2019, 24 pages.
Office Action received for Chinese Patent Application No. 201910164962.3, dated Apr. 8, 2020, 25 pages.
Office Action received for Chinese Patent Application No. 201910164962.3, dated Jan. 12, 2021, 14 pages.
Office Action received for Chinese Patent Application No. 201910164962.3, dated Sep. 18, 2020, 19 pages.
Office Action received for Chinese Patent Application No. 201910475434.X, dated Dec. 4, 2019, 14 pages.
Office Action received for Chinese Patent Application No. 201910475434.X, dated Jun. 3, 2020, 9 pages.
Office Action received for Chinese Patent Application No. 201910475434.X, dated Oct. 30, 2020, 9 pages.
Office Action received for Chinese Patent Application No. 201911128105.4, dated Apr. 8, 2021, 10 pages.
Office Action received for Chinese Patent Application No. 201911128105.4, dated Jan. 4, 2021, 14 pages.
Office Action received for Chinese Patent Application No. 201911128105.4, dated Jul. 3, 2020, 18 pages.
Office Action received for Chinese Patent Application No. 202010125114.4, dated Aug. 21, 2020, 16 pages.
Office Action received for Chinese Patent Application No. 202010125114.4, dated Jun. 7, 2021, 7 pages.
Office Action received for Chinese Patent Application No. 202010125114.4, dated Mar. 1, 2021, 15 pages.
Office Action received for Chinese Patent Application No. 202011450203.2, dated Sep. 1, 2021, 12 pages.
Office Action received for Danish Patent Application No. PA201570256, dated Jul. 7, 2015, 2 pages.
Office Action received for Danish Patent Application No. PA201570256, dated Mar. 17, 2016, 5 pages.
Office Action received for Danish Patent Application No. PA201570256, dated May 23, 2017, 3 pages.
Office Action received for Danish Patent Application No. PA201570256, dated Oct. 10, 2016, 3 pages.
Office Action received for Danish Patent Application No. PA201670622, dated Aug. 17, 2018, 4 pages.

(56) References Cited

OTHER PUBLICATIONS

Office Action Received for Danish Patent Application No. PA201670622, dated May 30, 2017, 4 pages.
Office Action received for Danish Patent Application No. PA201670622, dated Nov. 1, 2017, 5 pages.
Office Action Received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770392, dated Apr. 17, 2018, 2 pages.
Office Action received for Danish Patent Application No. PA201770392, dated Dec. 8, 2017, 4 pages.
Office Action received for Danish Patent Application No. PA201770392, dated Jun. 20, 2017, 11 pages.
Office Action received for Danish Patent Application No. PA201770401, dated Jan. 31, 2018, 3 pages.
Office Action received for Danish Patent Application No. PA201770401, dated May 17, 2018, 3 Pages.
Office Action received for Danish Patent Application No. PA201770402, dated Apr. 16, 2018, 5 pages.
Office Action received for Danish Patent Application No. PA201770402, dated Dec. 18, 2017, 6 pages.
Office Action received for Danish Patent Application No. PA201770402, dated Jun. 19, 2017, 11 pages.
Office Action received for Danish Patent Application No. PA201770403, dated Dec. 12, 2017, 3 pages.
Office Action received for Danish Patent Application No. PA201770403, dated Jun. 16, 2017, 8 pages.
Office Action received for Danish Patent Application No. PA201770404, dated Aug. 8, 2018, 4 pages.
Office Action received for Danish Patent Application No. PA201770404, dated Dec. 1, 2017, 5 pages.
Office Action received for Danish Patent Application No. PA201770404, dated Feb. 21, 2019, 2 pages.
Office Action received for Danish Patent Application No. PA201770404, dated May 1, 2019, 2 pages.
Office Action received for Danish Patent Application No. PA201770406, dated Feb. 27, 2018, 7 pages.
Office Action received for Danish Patent Application No. PA201770406, dated Jan. 25, 2019, 8 pages.
Office Action received for Danish Patent Application No. PA201770406, dated Jun. 22, 2017, 11 pages.
Office Action received for Danish Patent Application No. PA201770406, dated Mar. 26, 2019, 3 pages.
Office Action received for Danish Patent Application No. PA201770406, dated Nov. 11, 2019, 4 pages.
Office Action received for Danish Patent Application No. PA201770408, dated Dec. 21, 2017, 6 pages.
Office Action received for Danish Patent Application No. PA201770408, dated Jun. 20, 2017, 9 pages.
Office Action received for Danish Patent Application No. PA201770408, dated May 3, 2018, 7 pages.
Office Action received for Danish Patent Application No. PA201770410, dated Apr. 9, 2018, 5 pages.
Office Action received for Danish Patent Application No. PA201770410, dated Jun. 23, 2017, 9 pages.
Office Action received for Danish Patent Application No. PA201770410, dated Nov. 22, 2018, 5 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for Danish Patent Application No. PA201870060, dated Jan. 15, 2019, 4 pages.
Office Action received for Danish Patent Application No. PA201870060, dated Jul. 25, 2019, 2 pages.
Office Action received for Danish Patent Application No. PA201870419, dated Feb. 27, 2020, 8 pages.
Office Action received for Danish Patent Application No. PA201870419, dated Sep. 30, 2019, 4 pages.
Office Action received for Danish Patent Application No. PA201870598, dated May 1, 2019, 3 pages.
Office Action received for Danish Patent Application No. PA201870598, dated Nov. 8, 2019, 4 pages.
Office Action received for Danish Patent Application No. PA201970533, dated Apr. 20, 2021, 2 pages.
Office Action received for Danish Patent Application No. PA201970533, dated Jul. 17, 2020, 6 pages.
Office Action received for Danish Patent Application No. PA202070560, dated Dec. 11, 2020, 7 pages.
Office Action received for Danish Patent Application No. PA202070560, dated Mar. 10, 2021, 7 pages.
Office Action received for Danish Patent Application No. PA202070617, dated Sep. 24, 2021, 4 pages.
Office Action received for European Patent Application No. 00923491.5, dated Jan. 11, 2010, 6 pages.
Office Action received for European Patent Application No. 00923491.5, dated Mar. 12, 2007, 9 pages.
Office Action received for European Patent Application No. 00923491.5, dated Sep. 11, 2007, 5 pages.
Office Action received for European Patent Application No. 07842262.3, dated Feb. 16, 2017, 6 Pages.
Office Action received for European Patent Application No. 07842262.3, dated Sep. 8, 2011, 5 pages.
Office Action received for European Patent Application No. 10177096.4, dated Feb. 20, 2012, 6 pages.
Office Action received for European Patent Application No. 10177096.4, dated Jul. 26, 2017, 8 pages.
Office Action received for European Patent Application No. 10177096.4, dated Jun. 7, 2018, 14 pages.
Office Action received for European Patent Application No. 10177096.4, dated Mar. 21, 2013, 9 pages.
Office Action received for European Patent Application No. 10177099.8, dated Feb. 20, 2012, 5 pages.
Office Action received for European Patent Application No. 10712824.1, dated Jun. 23, 2014, 7 pages.
Office Action received for European Patent Application No. 10712824.1, dated Mar. 1, 2016, 11 pages.
Office Action received for European Patent Application No. 12753631.6, dated Jul. 10, 2017, 6 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action received for European Patent Application No. 13171047.7, dated May 24, 2017, 7 pages.
Office Action received for European Patent Application No. 13184872.3, dated May 18, 2018, 8 pages.
Office Action received for European Patent Application No. 15711969.4, dated Nov. 17, 2017, 9 pages.
Office Action received for European Patent Application No. 15713062.6, dated Dec. 6, 2017, 7 pages.
Office Action received for European Patent Application No. 15714698.6, dated Oct. 13, 2021, 2 pages.
Office Action received for European Patent Application No. 15719347.5, dated Apr. 9, 2020, 4 pages.
Office Action received for European Patent Application No. 15719347.5, dated Jun. 17, 2019, 4 pages.
Office Action received for European Patent Application No. 16710590.7, dated Mar. 15, 2019, 10 pages.
Office Action received for European Patent Application No. 17799904.2, dated Oct. 21, 2020, 6 pages.
Office Action received for European Patent Application No. 17813737.8, dated Apr. 16, 2021, 7 pages.
Office Action received for European Patent Application No. 18178147.7, dated Mar. 20, 2020, 4 pages.
Office Action received for European Patent Application No. 18197583.0, dated Feb. 28, 2020, 8 pages.

(56) References Cited

OTHER PUBLICATIONS

Office Action received for European Patent Application No. 18197589.7, dated Oct. 1, 2019, 5 pages.
Office Action received for European Patent Application No. 18208881.5, dated Jun. 11, 2019, 5 pages.
Office Action received for European Patent Application No. 18208881.5, dated May 7, 2021, 6 pages.
Office Action received for European Patent Application No. 18728002.9, dated Dec. 14, 2020, 15 pages.
Office Action received for European Patent Application No. 18733381.0, dated Oct. 29, 2021, 9 pages.
Office Action received for European Patent Application No. 19150528.8, dated Jul. 1, 2020, 6 pages.
Office Action received for European Patent Application No. 19169980.0, dated Mar. 4, 2020, 6 pages.
Office Action received for European Patent Application No. 19186538.5, dated Oct. 12, 2020, 7 pages.
Office Action received for European Patent Application No. 19186538.5, dated Oct. 22, 2021, 7 pages.
Office Action received for European Patent Application No. 19203942.8, dated Oct. 29, 2021, 6 pages.
Office Action received for European Patent Application No. 19207753.5, dated May 10, 2021, 4 pages.
Office Action received for European Patent Application No. 19207753.5, dated Nov. 12, 2020, 5 pages.
Office Action received for European Patent Application No. 20158824.1, dated May 18, 2021, 10 pages.
Office Action received for European Patent Application No. 20719301.2, dated Feb. 21, 2022, 9 pages.
Office Action received for European Patent Application No. 20719301.2, dated Jan. 28, 2021, 15 pages.
Office Action received for German Patent Application No. 102015208532.5, dated Apr. 1, 2019, 20 pages.
Office Action received for German Patent Application No. 102015208532.5, dated Apr. 21, 2020, 3 pages.
Office Action received for German Patent Application No. 102015208532.5, dated Aug. 21, 2019, 15 pages.
Office Action received for Hong Kong Patent Application No. 151051633, dated Jun. 5, 2015, 11 pages.
Office Action received for Indian Patent Application No. 202014041529, dated Dec. 6, 2021, 6 pages.
Office Action Received for Indian Patent Application No. 717/CHENP/2014, dated Feb. 7, 2019, 5 pages.
Office Action Received for Japanese Patent Application No. 2012500842, dated Jan. 31, 2014, 5 pages.
Office Action received for Japanese Patent Application No. 2014-148065, dated Sep. 7, 2015, 5 pages.
Office Action received for Japanese Patent Application No. 2014-17726, dated Feb. 9, 2015, 4 pages.
Office Action received for Japanese Patent Application No. 2014-526255, dated Jun. 12, 2015, 5 pages.
Office Action received for Japanese Patent Application No. 2015-095183, dated Jun. 3, 2016, 13 pages.
Office Action received for Japanese Patent Application No. 2016-001259, dated Feb. 23, 2018, 11 pages.
Office Action received for Japanese Patent Application No. 2016-001259, dated Jan. 6, 2017, 6 pages.
Office Action received for Japanese Patent Application No. 2016-001259, dated Nov. 13, 2017, 10 Pages.
Office Action received for Japanese Patent Application No. 2016-022175, dated Apr. 10, 2017, 11 pages.
Office Action received for Japanese Patent Application No. 2017-075031, dated Jul. 30, 2018, 16 pages.
Office Action received for Japanese Patent Application No. 2017-101107, dated Sep. 7, 2018, 14 pages.
Office Action received for Japanese Patent Application No. 2017-507413, dated Feb. 22, 2019, 11 pages.
Office Action received for Japanese Patent Application No. 2017-507413, dated May 25, 2018, 14 pages.
Office Action received for Japanese Patent Application No. 2017-543762, dated Apr. 8, 2019, 5 pages.
Office Action received for Japanese Patent Application No. 2017-543762, dated Jul. 9, 2018, 8 pages.
Office Action received for Japanese Patent Application No. 2018-080122, dated Aug. 9, 2019, 5 pages.
Office Action received for Japanese Patent Application No. 2018-080122, dated Jan. 28, 2019, 11 pages.
Office Action received for Japanese Patent Application No. 2018-080122, dated Nov. 27, 2020, 16 pages.
Office Action received for Japanese Patent Application No. 2018-119170, dated May 10, 2019, 8 pages.
Office Action received for Japanese Patent Application No. 2018-560107, dated Jun. 14, 2019, 26 pages.
Office Action received for Japanese Patent Application No. 2019-124728, dated Dec. 14, 2020, 4 pages.
Office Action received for Japanese Patent Application No. 2019-124728, dated Sep. 18, 2020, 6 pages.
Office Action received for Japanese Patent Application No. 2019-238894, dated Mar. 6, 2020, 7 pages.
Office Action received for Japanese Patent Application No. 2020-159840, dated Dec. 10, 2021, 13 pages.
Office Action received for Japanese Patent Application No. 2020-184605, dated Feb. 14, 2022, 24 pages.
Office Action received for Japanese Patent Application No. 2021-026630, dated Aug. 20, 2021, 7 pages.
Office Action received for Korean Patent Application No. 10-2013-7028487, dated Feb. 18, 2016, 8 pages.
Office Action Received for Korean Patent Application No. 10-2013-7028487, dated Jun. 5, 2015, 9 pages.
Office Action received for Korean Patent Application No. 10-2013-7028487, dated Jun. 13, 2016, 6 pages.
Office Action received for Korean Patent Application No. 10-2013-7028489, dated Jun. 4, 2015, 4 pages.
Office Action received for Korean Patent Application No. 10-2014-7006538, dated Jul. 31, 2015, 8 pages.
Office Action received for Korean Patent Application No. 10-2014-7008348, dated Jan. 22, 2019, 16 pages.
Office Action received for Korean Patent Application No. 10-2015-0072162, dated Apr. 20, 2016, 11 pages.
Office Action received for Korean Patent Application No. 10-2015-0072162, dated Feb. 27, 2017, 12 pages.
Office Action received for Korean Patent Application No. 10-2016-7022902, dated Sep. 4, 2017, 3 pages.
Office Action received for Korean Patent Application No. 10-2016-7035555, dated Dec. 26, 2017, 5 pages.
Office Action received for Korean Patent Application No. 10-2016-7035555, dated Jul. 18, 2019, 9 pages.
Office Action received for Korean Patent Application No. 10-2016-7035555, dated Sep. 18, 2018, 9 pages.
Office Action received for Korean Patent Application No. 10-2017-7012145, dated Jul. 18, 2019, 5 pages.
Office Action received for Korean Patent Application No. 10-2017-7012145, dated Sep. 13, 2018, 6 pages.
Office Action received for Korean Patent Application No. 10-2017-7022905, dated Oct. 22, 2018, 9 pages.
Office Action received for Korean Patent Application No. 10-2017-7035057, dated Mar. 21, 2018, 10 pages.
Office Action received for Korean Patent Application No. 10-2018-0035949, dated Apr. 24, 2019, 9 pages.
Office Action received for Korean Patent Application No. 10-2018-0035949, dated Dec. 24, 2018, 7 pages.
Office Action received for Korean Patent Application No. 10-2018-0035949, dated Jun. 20, 2018, 9 pages.
Office Action received for Korean Patent Application No. 10-2018-7033301, dated Dec. 14, 2018, 6 pages.
Office Action received for Korean Patent Application No. 10-2018-7035747, dated Apr. 9, 2020, 11 pages.
Office Action received for Korean Patent Application No. 10-2018-7035747, dated Oct. 14, 2020, 6 pages.
Office Action received for Korean Patent Application No. 10-2019-7014494, dated Jun. 14, 2019, 11 pages.

(56) References Cited

OTHER PUBLICATIONS

Office Action received for Korean Patent Application No. 10-2020-0024632, dated Dec. 29, 2020, 11 pages.
Office Action received for Korean Patent Application No. 10-2020-0024632, dated May 18, 2020, 11 pages.
Office Action received for Korean Patent Application No. 10-2020-7002929, dated Mar. 22, 2020, 5 pages.
Office Action received for Korean Patent Application No. 10-2020-7031319, dated Dec. 8, 2020, 14 pages.
Office Action received for Korean Patent Application No. 10-2021-7021047, dated Aug. 13, 2021, 5 pages.
Office Action received for Korean Patent Application No. 10-2021-7032984, dated Feb. 22, 2022, 8 pages.
Office Action received for Mexican Patent Application No. MX/a/2016/001209, dated Apr. 20, 2017, 5 pages.
Office Action received for Mexican Patent Application No. MX/a/2016/001209, dated Aug. 25, 2016, 4 pages.
Office Action received for Mexican Patent Application No. MX/a/2016/001209, dated Sep. 13, 2017, 5 pages.
Office Action received for Taiwanese Patent Application No. 102120412, dated Feb. 25, 2015, 15 pages.
Office Action received for Taiwanese Patent Application No. 104108223, dated Apr. 25, 2016, 10 pages.
Office Action received for Taiwanese Patent Application No. 104114953, dated Feb. 18, 2017, 9 pages.
Office Action received for Taiwanese Patent Application No. 104114953, dated Jun. 8, 2016, 11 pages.
Office Action Received for Taiwanese Patent Application No. 104117041, dated Aug. 22, 2016, 6 pages.
Office Action received for Taiwanese Patent Application No. 104117042, dated Apr. 20, 2017, 18 pages.
"On-Line Definition for "Playback"", American Heritage Dictionary of the English Language, 4th Edition, 2000, 1 page.
Partial European Search Report received for European Patent Application No. 18197583.0, dated Jan. 14, 2019, 18 pages.
Partial European Search Report received for European Patent Application No. 20158824.1, dated May 8, 2020, 14 pages.
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.
Plaisant, et al., "Touchscreen Toggle Switches: Push or slide? Design Issues and Usability Study", Technical Report CAR-TR-521, CS-TR-2557, Nov. 1990, pp. 1-10.
Planet Quark, "See Everything Your Mac Printed", XP055533938, retrieved from the Internet: URL: https://www.planetquark.com/2011/05/19/see-everything-your-mac-printed/#.XjkfQsgzZGM, May 19, 2011, 7 pages.
Pu, Fang, "Research on Location-aware Service in Pervasive Computing", Issue No. 7, Information Technology Series, China Doctoral Dissertations, Jul. 15, 2008, 140 pages.
Punchkick Interactive, "Punchkick hands-on review: Fitbit Surge", URL: https://www.youtube.com/watch?v=K2G7aebUYcA, Mar. 25, 2015, 3 pages.
"Q Pair, When I connected to LG G Pad 8.3 Q pair G Flex . -G Pad 8.3 review", Posting of a blog, Online Available at: <http://www.leaderyou.co.kr/2595>, Dec. 7, 2013, 28 pages.
"QPair", online available at: http://mongri.net/entry/G-Pad-83-Qpair, Dec. 20, 2013, 22 pages.
"Quick Time Movie Player Ver. 2.1.2.59, Current Time Indicator Dragging Operation", Ver. 2.1.2.59, 1996, 1 page.
"RealOne Player Version 2.0 Screen Dumps", 2002, 4 pages.
Record of Oral Hearing received for U.S. Appl. No. 14/641,298, dated Oct. 8, 2021, 17 pages.
Restriction Requirement received for U.S. Appl. No. 10/374,013, dated Oct. 6, 2006, 4 pages.
Restriction Requirement received for U.S. Appl. No. 11/767,409, dated Sep. 21, 2010, 8 pages.
Restriction Requirement received for U.S. Appl. No. 12/215,651, dated Sep. 28, 2011, 11 pages.
Restriction Requirement received for U.S. Appl. No. 12/395,537, dated May 9, 2011, 6 pages.
Restriction Requirement received for U.S. Appl. No. 12/395,541, dated May 27, 2011, 6 pages.
Result of Consultation received for European Patent Application No. 16710590.7, dated Dec. 7, 2020, 4 pages.
Result of Consultation received for European Patent Application No. 18197583.0, dated Feb. 24, 2021, 3 pages.
Result of Consultation received for European Patent Application No. 18197589.7, dated Dec. 1, 2020, 9 pages.
Result of Consultation received for European Patent Application No. 18197589.7, dated Dec. 17, 2020, 6 pages.
Rev. Some Culture, "It's super easy for middle-aged and elderly people to learn compute", Jul. 31, 2013, 2 pages.
Richards, "TN Audio Mixer and Master Volume Control with Automatic Configuration", Technical Disclosure Bulletin, vol. 37, No. 01, Jan. 1, 1994, pp. 485-486.
Ricker, Thomas, "iTunes (in the Cloud) 10.3 beta available for download, we go hands-on", retrieved from the internet: https://www.engadget.com/2011/06/07/itunes-in-the-cloud-10-3-beta-available-for-download-we-go-ha/, 2011, 12 pages.
Rossignol, Joe, "iOS 10 Concept Simplifies Lock Screen With Collapsed Notifications", Available online at : https://www.macrumors.com/2016/06/16/ios-10-collapsed-notifications-concept/, Jun. 16, 2016, 10 pages.
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.
Sandrahoutz, "How Do I Delete a Playlist From a Synced Ipod but Not Remove it From the Library in itunes", Apple Communities Website, Available online at: https://discussions.apple.com/thread/7503609, Mar. 23, 2016, 2 pages.
Sangeet007, "PartyShare—turn your Xperia into a jukebox", Available at: https://forum.xda-developers.com/crossdevice-dev/sony/app-partyshare-xperia-jukebox-t2877807, Sep. 15, 2014, 5 pages.
Sawyer, Brian, "Get with the CoverFlow", Available online at <https://briansawyer.net/2005/12/08/get-with-the-coverflow/>, Dec. 9, 2005, pp. 1-2.
Search Report received for European Patent Application No. 00923491.5, dated Mar. 6, 2006, 4 pages.
Search Report and Opinion received for Danish Patent Application No. PA201770401, dated Jun. 19, 2017, 6 pages.
Search Report and Opinion received for Danish Patent Application No. PA201870060 dated Apr. 30, 2018, 7 pages.
Search Report and Opinion received for Danish Patent Application No. PA201870419, dated Aug. 27, 2018, 7 pages.
Search Report and Opinion received for Danish Patent Application No. PA201870419, dated Sep. 10, 2018, 9 pages.
Search Report and Opinion received for Danish Patent Application No. PA201870598, dated Dec. 5, 2018, 8 pages.
Search Report and Opinion received for Danish Patent Application No. PA201970533, dated Oct. 25, 2019, 9 pages.
Search Report and Opinion received for Danish Patent Application No. PA202070617, dated Dec. 23, 2020, 8 pages.
Search Report and Opinion received for Danish Patent Application No. PA202170320, dated Oct. 6, 2021, 9 pages.
Search Report received for Danish Patent Application No. PA201770404, dated Jun. 20, 2017, 8 Pages.
Search Report received for Danish Patent Application No. PA201770409, dated Jun. 20, 2017, 9 Pages.
Search Report received for European Patent Application No. 00923491.5, dated Jun. 2, 2006, 6 pages.

(56) References Cited

OTHER PUBLICATIONS

Search Report received For Netherlands Patent Application No. 2014737, dated Oct. 29, 2015, 9 pages.
Seifert, Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.
Seifi, Joe, "Pianist Pro Review", available at <http://www.appsafari.com/productivity/11529/pianist-pro/>, Apr. 24, 2010, 9 pages.
Senicar, B., et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Shankland, Stephen, "Chrome OS Gets 'OK Google' Voice Search Control", available online at <http://www.cnet.com/news/chrome-os-gets-ok-google-voice-search-control/>, May 21, 2014, 4 pages.
Sharepoint at Rackspace, "Sharepoint 2013: How to Edit a List or Library Using Quick Edit", Available online at: https://www.youtube.com/watch?v=foZXcFC1k80, Oct. 10, 2014, 1 page.
"Smart Home App—What is the Widget", Online Available at: https://support.vivint.com/s/article/Vivint-Smart-Home-App-What-is-the-Widget, Jan. 26, 2019, 4 pages.
Smarttricks, "Top 3 Music Player For Android", Available online at: <https://www.youtube.com/watch?v=He7RTn4CL34>, Feb. 22, 2017, 4 pages.
Smith, Eddie, "The expert's guide to Instapaper", available online at "http://www.macworld.com/article/1166898/the_experts_guide_to_instapaper.html", May 23, 2012, 8 pages.
Sonos, "Sonos Controller App for iPad Product Guide", Available online at:—https://www.sonos.com/documents/productguides/en/iPadGuide_EN.pdf, Nov. 2014, 47 pages.
Stroud, Forrest, "Screen Lock Meaning & Definition", Online Available at: https://www.webopedia.com/definitions/screen-lock, Jan. 30, 2014, 3 pages.
Summons to Attend Oral Proceeding received for European Patent Application No. 10177099.8 dated Mar. 20, 2013, 9 Pages.
Summons to Attend Oral Proceedings received for European Patent Application 20158824.1, dated Dec. 7, 2021, 6 pages.
Summons to Attend oral proceedings received for European Patent Application No. 00923491.5, dated Jan. 27, 2011, 10 pages.
Summons to Attend Oral Proceedings received for European Patent Application No. 07842262.3, dated Jun. 25, 2018, 9 pages.
Summons to Attend Oral Proceedings received for European Patent Application No. 10177096.4, dated Sep. 21, 2018, 12 pages.
Summons to Attend Oral Proceedings received for European Patent Application No. 12753631.6, dated Jul. 6, 2018, 5 pages.
Summons to Attend Oral Proceedings received for European Patent Application No. 12753631.6, dated May 8, 2018, 9 pages.
Summons to Attend Oral Proceedings received for European Patent Application No. 12770400.5, dated Mar. 19, 2018, 10 pages.
Summons to Attend Oral Proceedings received for European Patent Application No. 13171047.7, dated Jul. 9, 2018, 12 pages.
Summons to Attend Oral Proceedings received for European Patent Application No. 15711969.4, dated Oct. 22, 2018, 12 pages.
Summons to Attend Oral Proceedings received for European Patent Application No. 17799904.2, dated Dec. 20, 2021, 8 pages.
Summons to Attend Oral Proceedings received for European Patent Application No. 17813737.8, dated Jan. 4, 2022, 12 pages.
Summons to Attend Oral Proceedings received for European Patent Application No. 18178147.7, dated Jun. 28, 2021, 8 pages.
Summons to Attend Oral Proceedings received for European Patent Application No. 18197583.0, dated Aug. 14, 2020, 12 pages.
Summons to Attend Oral proceedings received for European Patent Application No. 18197589.7, dated Apr. 9, 2020, 7 pages.
Summons to Attend Oral Proceedings received for European Patent Application No. 19169980.0, dated Dec. 3, 2020, 8 pages.
Summons to Attend Oral Proceedings received for German Patent Application No. 112007002143.8, dated Nov. 28, 2018, 13 pages.
Supertunetv, "Ipod Nano 6G—Sync Selected Playlist iTunes", Youtube, Available online at: https://www.youtube.com/watch?v=xU_3rYRabt_1, Sep. 10, 2012, 3 pages.
Supplemental Notice of Allowance received for U.S. Appl. No. 16/584,490, dated Apr. 13, 2021, 2 pages.
Supplemental Notice of Allowance received for U.S. Appl. No. 16/584,743, dated Nov. 25, 2020, 2 pages.
Supplemental Notice of Allowance received for U.S. Appl. No. 17/168,069, dated Apr. 20, 2022, 2 pages.
Supplemental Notice of Allowance received for U.S. Appl. No. 17/168,069, dated Feb. 2, 2022, 2 pages.
Tedeschi, Bob, "Stoking a Music Fan's Fancy With Apps That Rock", available at <http://www.nytimes.com/2010/05/20/technology/personaltech/20smart.html>, May 19, 2010, 3 pages.
"The Single Keyboard Piano", available at <http://moocowmusic.com/PianistPro/Manual/ManualSingleKeyboardPiano.html>, Sep. 26, 2010, 4 pages.
Vanhemert, Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.
Whitehouse, Ben, "Coverflow: Better Digital Music Navigation", Whitehouse&Company, Online Available at <http://wandco.com/2005/08/coverflow-better-digital-music-navigation/>, Aug. 15, 2005, pp. 1-3.
Whitwam, Ryan, "How to Sync and Play Music on Your Android Wear Watch", Available online at: https://www.greenbot.com/article/2997520/how-to-sync-and-play-music-on-your-android-wear-watch.html, Nov. 2, 2015, 4 pages.
Wikipedia, "QR code", Available online at: https://en.wikipedia.org/w/index.php?title=OR_code&oldid=452939488, Sep. 28, 2011, pp. 1-9.
"Windows Media Player for Windows XP version 8.0", 2001, 2 pages.
Woolsey, Amanda, "Apple Watch Tips—How To Add and Play Music", Available online at: <https://www.youtube.com/watch?v=E0QEuqMaoi8>, Apr. 26, 2015, 3 pages.
WZ Science Alliance, "Very simple geriatrics computer and Internet bestselling upgrade", Sep. 30, 2013, 3 pages.
Yamaguchi, Yuu, "Useful Freeware and Shareware Information", Pick Up Onlineware, 23rd, MdN, vol. 146, MdN Corporation, Jun. 6, 2006, 4 pages.
Corrected Notice of Allowance received for U.S. Appl. No. 16/922,675, dated Jan. 9, 2023, 3 pages.
Extended European Search Report received for European Patent Application No. 22195584.2, dated Jan. 5, 2023, 13 pages.
Extended European Search Report received for European Patent Application No. 22201007.6, dated Jan. 12, 2023, 7 pages.
Notice of Allowance received for Chinese Patent Application No. 202111612841.4, dated Jan. 5, 2023, 3 pages (2 pages of English Translation & 1 page of Official Copy).
Office Action received for Korean Patent Application No. 10-2022-7001521, dated Dec. 26, 2022, 13 pages (6 pages of English Translation and 7 pages of Official Copy).
Applicant Initiated Interview Summary received for U.S. Appl. No. 17/176,908, dated Jun. 14, 2022, 6 pages.
Applicant-Initiated Interview Summary received for U.S. Appl. No. 16/679,967, dated Jun. 1, 2022, 2 pages.
Applicant-Initiated Interview Summary received for U.S. Appl. No. 17/476,404, dated Jul. 27, 2022, 6 pages.
Applicant-Initiated Interview Summary received for U.S. Appl. No. 17/476,404, dated Mar. 18, 2022, 2 pages.
Board Decision received for Chinese Patent Application No. 201810338826.7, dated May 30, 2022, 20 pages (2 pages of English Translation and 18 pages of Official Copy).
Brief Communication Regarding Oral Proceedings received for European Patent Application No. 20158824.1, dated May 30, 2022, 1 page.
Corrected Notice of Allowance received for U.S. Appl. No. 16/803,849, dated Jul. 7, 2022, 3 pages.
Corrected Notice of Allowance received for U.S. Appl. No. 16/803,849, dated Jun. 8, 2022, 3 pages.

(56) References Cited

OTHER PUBLICATIONS

Corrected Notice of Allowance received for U.S. Appl. No. 16/836,571, dated Mar. 25, 2022, 2 pages.
Corrected Notice of Allowance received for U.S. Appl. No. 17/027,373, dated Jul. 12, 2022, 2 pages.
Corrected Notice of Allowance received for U.S. Appl. No. 17/461,103, dated Apr. 14, 2022, 2 pages.
Corrected Notice of Allowance received for U.S. Appl. No. 17/461,103, dated Aug. 3, 2022, 2 pages.
Corrected Notice of Allowance received for U.S. Appl. No. 17/461,103, dated May 10, 2022, 2 pages.
Decision to Grant received for European Patent Application No. 19207753.5, dated Jun. 2, 2022, 3 pages.
Examiner-Initiated Interview Summary received for U.S. Appl. No. 17/027,373, dated Mar. 31, 2022, 4 pages.
Farmboyreef, "Apple watch controlling your tv", Available online at: https://www.youtube.com/watch?v=xaJPG0Wm3Tg, Jun. 23, 2015, 3 pages.
Final Office Action received for U.S. Appl. No. 17/476,404, dated May 5, 2022, 30 pages.
Gil, Lory, "How to control Apple TV with your Apple Watch", Available online at: https://www.imore.com/how-control-your-apple-tv-remote-app%ADapple-watch], Jun. 6, 2016, 24 pages.
Hobbyist Software Ltd., "VLC Remote", Online available at: https://watchaware.com/watch-apps/297244048, 2016, 7 pages.
Intention to Grant received for Danish Patent Application No. PA202170320, dated Jul. 27, 2022, 2 pages.
Klein, Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Nikolov, Anton, "Design principle: Consistency", Available online at: https://uxdesign.cc/design-principle-consistency-6b0cf7e7339f, Apr. 8, 2017, 9 pages.
Non-Final Office Action received for U.S. Appl. No. 16/679,967, dated Apr. 19, 2022, 13 pages.
Non-Final Office Action received for U.S. Appl. No. 16/922,675, dated Jun. 8, 2022, 21 pages.
Non-Final Office Action received for U.S. Appl. No. 17/181,089, dated May 13, 2022, 12 pages.
Non-Final Office Action received for U.S. Appl. No. 17/314,948, dated Aug. 1, 2022, 33 pages.
Notice of Acceptance received for Australian Patent Application No. 2020207785, dated May 4, 2022, 3 pages.
Notice of Acceptance received for Australian Patent Application No. 2021203669, dated May 25, 2022, 3 pages.
Notice of Acceptance received for Australian Patent Application No. 2022201369, dated Mar. 17, 2022, 3 pages.
Notice of Acceptance received for Australian Patent Application No. 2022202458, dated May 6, 2022, 3 pages.
Notice of Allowance received for Chinese Patent Application No. 201810338040.5, dated Mar. 30, 2022, 6 pages (2 pages of English Translation and 4 pages of Official Copy).
Notice of Allowance received for Chinese Patent Application No. 201810339290.0, dated Mar. 9, 2022, 2 pages (1 page of English Translation and 1 page of Official Copy).
Notice of Allowance received for Japanese Patent Application No. 2020-159840, dated Jul. 8, 2022, 4 pages (1 page of English Translation and 3 pages of Official Copy).
Notice of Allowance received for Japanese Patent Application No. 2021-074395, dated Jun. 27, 2022, 4 pages (1 page of English Translation and 3 pages of Official Copy).
Notice of Allowance received for Japanese Patent Application No. 2021-563716, dated Mar. 14, 2022, 4 pages (1 page of English Translation and 3 pages of Official Copy).
Notice of Allowance received for Japanese Patent Application No. 2021-571464, dated May 30, 2022, 4 pages (1 page of English Translation and 3 pages of Official Copy).
Notice of Allowance received for Japanese Patent Application No. 2022-079682, dated Jul. 15, 2022, 4 pages (1 page of English Translation and 3 pages of Official Copy).
Notice of Allowance received for Korean Patent Application No. 10-2020-0123805, dated Jun. 19, 2022, 5 pages (2 pages of English Translation and 3 pages of Official Copy).
Notice of Allowance received for Korean Patent Application No. 10-2021-7032984, dated Jun. 29, 2022, 5 pages (2 pages of English Translation and 3 pages of Official Copy).
Notice of Allowance received for Korean Patent Application No. 10-2022-7008567, dated Jul. 4, 2022, 9 pages (2 pages of English Translation and 7 pages of Official Copy).
Notice of Allowance received for U.S. Appl. No. 16/679,967, dated Jun. 15, 2022, 7 pages.
Notice of Allowance received for U.S. Appl. No. 16/803,849, dated May 17, 2022, 12 pages.
Notice of Allowance received for U.S. Appl. No. 16/917,659, dated Jul. 8, 2022, 11 pages.
Notice of Allowance received for U.S. Appl. No. 17/027,373, dated Aug. 2, 2022, 2 pages.
Notice of Allowance received for U.S. Appl. No. 17/027,373, dated Jun. 3, 2022, 8 pages.
Notice of Allowance received for U.S. Appl. No. 17/461,103, dated Jun. 20, 2022, 6 pages.
Notice of Allowance received for U.S. Appl. No. 17/461,103, dated Mar. 17, 2022, 10 pages.
Office Action received for Australian Patent Application No. 2018271366, dated May 17, 2021, 5 pages.
Office Action received for Australian Patent Application No. 2021201243, dated Jun. 1, 2022, 5 pages.
Office Action received for Australian Patent Application No. 2021203669, dated Apr. 5, 2022, 3 pages.
Office Action received for Chinese Patent Application No. 201811367893.8, dated Apr. 27, 2022, 11 pages (5 pages of English Translation and 6 pages of Official Copy).
Office Action received for Chinese Patent Application No. 201811367893.8, dated Feb. 15, 2022, 14 pages (6 pages of English Translation and 8 pages of Official Copy).
Office Action received for Chinese Patent Application No. 202011450203.2, dated Apr. 20, 2022, 9 pages (5 pages of English Translation and 4 pages of Official Copy).
Office Action received for Chinese Patent Application No. 202110235995.X, dated Mar. 22, 2022, 17 pages (9 pages of English Translation and 8 pages of Official Copy).
Office Action received for Danish Patent Application No. PA202170320, dated May 3, 2022, 3 pages.
Office Action received for European Patent Application No. 20158824.1, dated Jun. 13, 2022, 5 pages.
Office Action received for European Patent Application No. 21160991.2, dated Mar. 24, 2022, 11 pages.
Office Action received for Japanese Patent Application No. 2020-159840, dated Mar. 28, 2022, 6 pages (3 pages of English Translation and 3 pages of Official Copy).
Office Action received for Korean Patent Application No. 10-2022-7006175, dated May 27, 2022, 7 pages (3 pages of English Translation and 4 pages of Official Copy).
Office Action received for Korean Patent Application No. 10-2022-7008567, dated Mar. 28, 2022, 5 pages (2 pages of English Translation and 3 pages of Official Copy).
Ojeda-Zapata, Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Qiye Wang, "Design and Implementation of SAN Device Access Control in Unified Storage Platform", Master's Theses, Huazhong University of Science & Technology, Wuhan, Jun. 2008, 63 pages (Official Copy Only). {See communication under 37 CFR § 1.98(a) (3)}.
Result of Consultation received for European Patent Application No. 20158824.1, dated May 17, 2022, 7 pages.
Sgt.Gizmos, "Pairing Your Apple Watch With Your Apple TV", Available online at: https://www.youtube.com/watch?v=C4t8YFSJ-UY, Apr. 27, 2015, 3 pages.

(56) References Cited

OTHER PUBLICATIONS

Singh, Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Summons to Attend Oral Proceedings received for European Patent Application No. 18208881.5, dated Jun. 29, 2022, 9 pages.
Summons to Attend Oral Proceedings received for European Patent Application No. 18728002.9, dated Jun. 3, 2022, 15 pages.
Summons to Attend Oral Proceedings received for European Patent Application No. 19150528.8, dated Mar. 15, 2022, 7 pages.
Whitney, Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.
Brief Communication Regarding Oral Proceedings received for European Patent Application No. 17799904.2, dated Sep. 13, 2022, 1 page.
Brief Communication Regarding Oral Proceedings received for European Patent Application No. 17813737.8, dated Sep. 19, 2022, 1 page.
Decision to Refuse received for European Patent Application No. 17799904.2, dated Sep. 19, 2022, 4 pages.
Decision to Refuse received for European Patent Application No. 19150528.8, dated Sep. 9, 2022, 4 pages.
Non-Final Office Action received for U.S. Appl. No. 17/476,404, dated Sep. 14, 2022, 31 pages.
Notice of Allowance received for Chinese Patent Application No. 201811367893.8, dated Sep. 2, 2022, 2 pages (1 page of English Translation and 1 page of Official Copy).
Non-Final Office Action received for U.S. Appl. No. 17/181,089, dated Feb. 17, 2023, 14 pages.
Non-Final Office Action received for U.S. Appl. No. 17/479,974, dated Feb. 22, 2023, 30 pages.
Notice of Acceptance received for Australian Patent Application No. 2021201243, dated Feb. 23, 2023, 3 pages.
Notice of Allowance received for U.S. Appl. No. 16/888,775, dated Feb. 21, 2023, 5 pages.
Office Action received for Australian Patent Application No. 2022204555, dated Feb. 17, 2023, 5 pages.
Office Action received for Chinese Patent Application No. 201911288715.0, dated Jan. 20, 2023, 23 pages (11 pages of English Translation and 12 pages of Official Copy).
Office Action received for European Patent Application No. 21166718.3, dated Feb. 20, 2023, 7 pages.
Applicant-Initiated Interview Summary received for U.S. Appl. No. 17/320,900, dated Apr. 17, 2023, 4 pages.
Applicant-Initiated Interview Summary received for U.S. Appl. No. 17/752,582, dated Apr. 17, 2023, 3 pages.
Corrected Notice of Allowance received for U.S. Appl. No. 16/922,675, dated Apr. 14, 2023, 6 pages.
Corrected Notice of Allowance received for U.S. Appl. No. 18/077,905, dated Apr. 19, 2023, 2 pages.
Extended European Search Report received for European Patent Application No. 23157906.1, dated Apr. 6, 2023, 10 pages.
Final Office Action received for U.S. Appl. No. 17/181,089, dated Apr. 19, 2023, 13 pages.
Intention to Grant received for European Patent Application No. 18728002.9, dated Apr. 12, 2023, 9 pages.
Notice of Allowance received for Japanese Patent Application No. 2022-007217, dated Apr. 10, 2023, 4 pages (1 page of English Translation and 3 pages of Official Copy).
Office Action received for European Patent Application No. 20720310.0, dated Apr. 11, 2023, 8 pages.
Applicant-Initiated Interview Summary received for U.S. Appl. No. 17/181,089, dated Apr. 7, 2023, 5 pages.
Corrected Notice of Allowance received for U.S. Appl. No. 18/077,905, dated Apr. 10, 2023, 2 pages.
International Preliminary Report on Patentability received for PCT Patent Application No. PCT/US2021/048358, dated Apr. 6, 2023, 15 pages.
Notice of Acceptance received for Australian Patent Application No. 2018271366, dated Mar. 31, 2023, 3 pages.
Notice of Allowance received for U.S. Appl. No. 17/509,356, dated Apr. 7, 2023, 11 pages.
Office Action received for Indian Patent Application No. 202215025361, dated Mar. 29, 2023, 6 pages.
Applicant-Initiated Interview Summary received for U.S. Appl. No. 17/476,404, dated Jun. 2, 2023, 2 pages.
Applicant-Initiated Interview Summary received for U.S. Appl. No. 17/747,804, dated May 31, 2023, 4 pages.
Corrected Notice of Allowance received for U.S. Appl. No. 17/509,356, dated May 24, 2023, 2 pages.
Non-Final Office Action received for U.S. Appl. No. 17/306,354, dated Jun. 2, 2023, 21 pages.
Non-Final Office Action received for U.S. Appl. No. 17/824,510, dated May 22, 2023, 15 pages.
Notice of Acceptance received for Australian Patent Application No. 2022201532, dated May 22, 2023, 3 pages.
Notice of Allowance received for U.S. Appl. No. 17/019,845, dated Jun. 5, 2023, 10 pages.
Notice of Allowance received for U.S. Appl. No. 17/848,845, dated May 24, 2023, 26 pages.
Office Action received for Chinese Patent Application No. 201811539259.8, dated May 24, 2023, 22 pages (2 pages of English Translation and 20 pages of Official Copy).
Office Action received for European Patent Application No. 21197457.1, dated May 30, 2023, 8 pages.
Mitroff Sarah, "8 things you should know about Apple Music for Android", CNET website, downloaded from https://www.cnet.com/tech/services-and-software/apple-music-for-android-what-to-know/, Nov. 11, 2015, 4 pages.
Ochs Susie, "Getting Started with Apple Music: 12 Things to Do First", Macworld website, downloaded from https://www.macworld.com/article/225812/getting-started-with-apple-music-12-things-to-do-first.html, Jun. 30, 2015, 12 pages.
Applicant-Initiated Interview Summary received for U.S. Appl. No. 17/181,089, dated May 16, 2023, 4 pages.
Decision to Grant received for Danish Patent Application No. PA202270464, dated May 9, 2023, 1 page.
Final Office Action received for U.S. Appl. No. 17/666,971, dated May 12, 2023, 29 pages.
Notice of Acceptance received for Australian Patent Application No. 2022204555, dated May 11, 2023, 3 pages.
Office Action received for Australian Patent Application No. 2022218517, dated Apr. 27, 2023, 7 pages.
Office Action received for Chinese Patent Application No. 201911099970.0, dated Feb. 23, 2023, 15 pages (05 pages of English Translation and 10 pages of Official Copy).
Decision on Opposition received for Australian Patent Application No. 2018271366, dated Mar. 3, 2023, 3 pages.
Final Office Action received for U.S. Appl. No. 17/314,948, dated Mar. 7, 2023, 31 pages.
Intention to Grant received for Danish Patent Application No. PA202270464, dated Feb. 20, 2023, 2 pages.
Non-Final Office Action received for U.S. Appl. No. 17/747,804, dated Mar. 1, 2023, 14 pages.
Non-Final Office Action received for U.S. Appl. No. 17/752,582, dated Mar. 6, 2023, 17 pages.
Notice of Acceptance received for Australian Patent Application No. 2022200901, dated Mar. 9, 2023, 3 pages.
Notice of Allowance received for U.S. Appl. No. 17/519,025, dated Mar. 2, 2023, 8 pages.
Office Action received for Chinese Patent Application No. 202111652452.4, dated Feb. 11, 2023, 28 pages (13 pages of English Translation and 15 pages of Official Copy).
Office Action received for European Patent Application No. 20760624.5, dated Mar. 7, 2023, 13 pages.
Office Action received for European Patent Application No. 21728781.2, dated Mar. 1, 2023, 13 pages.

(56) References Cited

OTHER PUBLICATIONS

Supplemental Notice of Allowance received for U.S. Appl. No. 16/888,775, dated Mar. 1, 2023, 2 pages.
Philips Support Website, "How to switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.
Corrected Notice of Allowance received for U.S. Appl. No. 18/077,905, dated Apr. 26, 2023, 3 pages.
Corrected Notice of Allowance received for U.S. Appl. No. 18/077,905, dated May 4, 2023, 2 pages.
Final Office Action received for U.S. Appl. No. 17/747,804, dated Apr. 28, 2023, 17 pages.
International Search Report and Written Opinion received for PCT Patent Application No. PCT/US2022/043733, dated Jan. 3, 2023, 12 pages.
Notice of Allowance received for Chinese Patent Application No. 202080039642.6, dated Apr. 17, 2023, 6 pages (2 pages of English Translation and 4 pages of Official Copy).
Office Action received for European Patent Application No. 15714698.6, dated Apr. 18, 2023, 14 pages.
Applicant-Initiated Interview Summary received for U.S. Appl. No. 17/479,974, dated Apr. 4, 2023, 2 pages.
Applicant-Initiated Interview Summary received for U.S. Appl. No. 17/747,804, dated Mar. 17, 2023, 4 pages.
Non-Final Office Action received for U.S. Appl. No. 17/476,404, dated Mar. 30, 2023, 29 pages.
Non-Final Office Action received for U.S. Appl. No. 17/835,110, dated Apr. 3, 2023, 28 pages.
Non-Final Office Action received for U.S. Appl. No. 18/077,971, dated Apr. 3, 2023, 24 pages.
Notice of Acceptance received for Australian Patent Application No. 2021261941, dated Mar. 15, 2023, 3 pages.
Notice of Allowance received for U.S. Appl. No. 16/922,675, dated Mar. 22, 2023, 8 pages.
Notice of Allowance received for U.S. Appl. No. 18/077,905, dated Mar. 24, 2023, 18 pages.
Office Action received for Australian Patent Application No. 2022241590, dated Mar. 17, 2023, 5 pages.
Office Action received for Chinese Patent Application No. 201811539259.8, dated Mar. 13, 2023, 16 pages (8 pages of English Translation and 8 pages of Official Copy).
Office Action received for Indian Patent Application No. 202215025360, dated Mar. 29, 2023, 6 pages.
Office Action received for Indian Patent Application No. 202215025363, dated Mar. 29, 2023, 6 pages.
Office Action received for Indian Patent Application No. 202215025364, dated Mar. 29, 2023, 6 pages.
Advisory Action received for U.S. Appl. No. 17/747,804, dated Jun. 23, 2023, 6 pages.
Applicant Initiated Interview Summary received for U.S. Appl. No. 17/666,971, dated Jun. 9, 2023, 2 pages.
Applicant Initiated Interview Summary received for U.S. Appl. No. 17/824,510, dated Jun. 16, 2023, 4 pages.
Applicant-Initiated Interview Summary received for U.S. Appl. No. 17/306,354, dated Jun. 28, 2023, 3 pages.
Applicant-Initiated Interview Summary received for U.S. Appl. No. 17/479,974, dated Jul. 21, 2023, 2 pages.
Corrected Notice of Allowance received for U.S. Appl. No. 17/509,356, dated Jun. 13, 2023, 2 pages.
Corrected Notice of Allowance received for U.S. Appl. No. 17/752,582, dated Jul. 17, 2023, 3 pages.
Final Office Action received for U.S. Appl. No. 17/479,974, dated Jun. 28, 2023, 32 pages.
Non-Final Office Action received for U.S. Appl. No. 17/699,492, dated Jul. 27, 2023, 8 pages.
Notice of Allowance received for Chinese Patent Application No. 201911099970.0, dated Jun. 25, 2023, 4 pages (1 page of English Translation and 3 pages of Official Copy).
Notice of Allowance received for Chinese Patent Application No. 201911288715.0, dated Jul. 12, 2023, 5 pages (1 page of English Translation and 4 pages of Official Copy).
Notice of Allowance received for U.S. Appl. No. 16/922,675, dated Jul. 19, 2023, 13 pages.
Notice of Allowance received for U.S. Appl. No. 17/306,354, dated Jul. 24, 2023, 7 pages.
Notice of Allowance received for U.S. Appl. No. 17/519,025, dated Jun. 22, 2023, 7 pages.
Notice of Allowance received for U.S. Appl. No. 17/752,582, dated Jun. 13, 2023, 18 pages.
Notice of Allowance received for U.S. Appl. No. 17/824,510, dated Jul. 19, 2023, 9 pages.
Office Action received for Australian Patent Application No. 2022235591, dated Jun. 6, 2023, 3 pages.
Office Action received for Australian Patent Application No. 2022235591, dated Jun. 28, 2023, 3 pages.
Office Action received for Australian Patent Application No. 2022241590, dated Jun. 7, 2023, 7 pages.
Office Action received for Chinese Patent Application No. 201811377642.8, dated Jun. 10, 2023, 13 pages (4 pages of English Translation and 9 pages of Official Copy).
Office Action received for Chinese Patent Application No. 201811379281.0, dated May 16, 2023, 16 pages (6 pages of English Translation and 10 pages of Official Copy).
Office Action received for Chinese Patent Application No. 202111652452.4, dated May 19, 2023, 15 pages (8 pages of English Translation and 7 pages of Official Copy).
Office Action received for Japanese Patent Application No. 2020-184605, dated Jul. 3, 2023, 6 pages (3 pages of English Translation and 3 pages of Official Copy).
Office Action received for Korean Patent Application No. 10-2022-0053111, dated Jun. 29, 2023, 7 pages (3 pages of English Translation and 4 pages of Official Copy).
Office Action received for Korean Patent Application No. 10-2022-7001521, dated Jun. 21, 2023, 10 pages (5 page of English Translation and 5 pages of Official Copy).
Corrected Notice of Allowance received for U.S. Appl. No. 17/019,845, dated Aug. 7, 2023, 4 pages.
Corrected Notice of Allowance received for U.S. Appl. No. 17/848,845, dated Aug. 9, 2023, 4 pages.
Intention to Grant received for European Patent Application No. 19203942.8, dated Aug. 1, 2023, 8 pages.
Non-Final Office Action received for U.S. Appl. No. 17/181,089, dated Aug. 4, 2023, 15 pages.
Notice of Allowance received for U.S. Appl. No. 17/666,971, dated Aug. 16, 2023, 8 pages.
Office Action received for Australian Patent Application No. 2022218540, dated Aug. 3, 2023, 5 pages.
Office Action received for Korean Patent Application No. 10-2022-7033655, dated Jul. 27, 2023, 5 pages (2 pages of English Translation and 3 pages of Official Copy).
Extended European Search Report received for European Patent Application No. 23168537.1, dated Jul. 25, 2023, 13 pages.
Intention to Grant received for European Patent Application No. 21728781.2, dated Jul. 28, 2023, 9 pages.
Office Action received for Australian Patent Application No. 2022218517, dated Jul. 24, 2023, 6 pages.
Office Action received for European Patent Application No. 20720310.0, dated Jul. 25, 2023, 11 pages.
Summons to Attend Oral Proceedings received for European Patent Application No. 18733381.0, dated Jul. 25, 2023, 7 pages.

\* cited by examiner

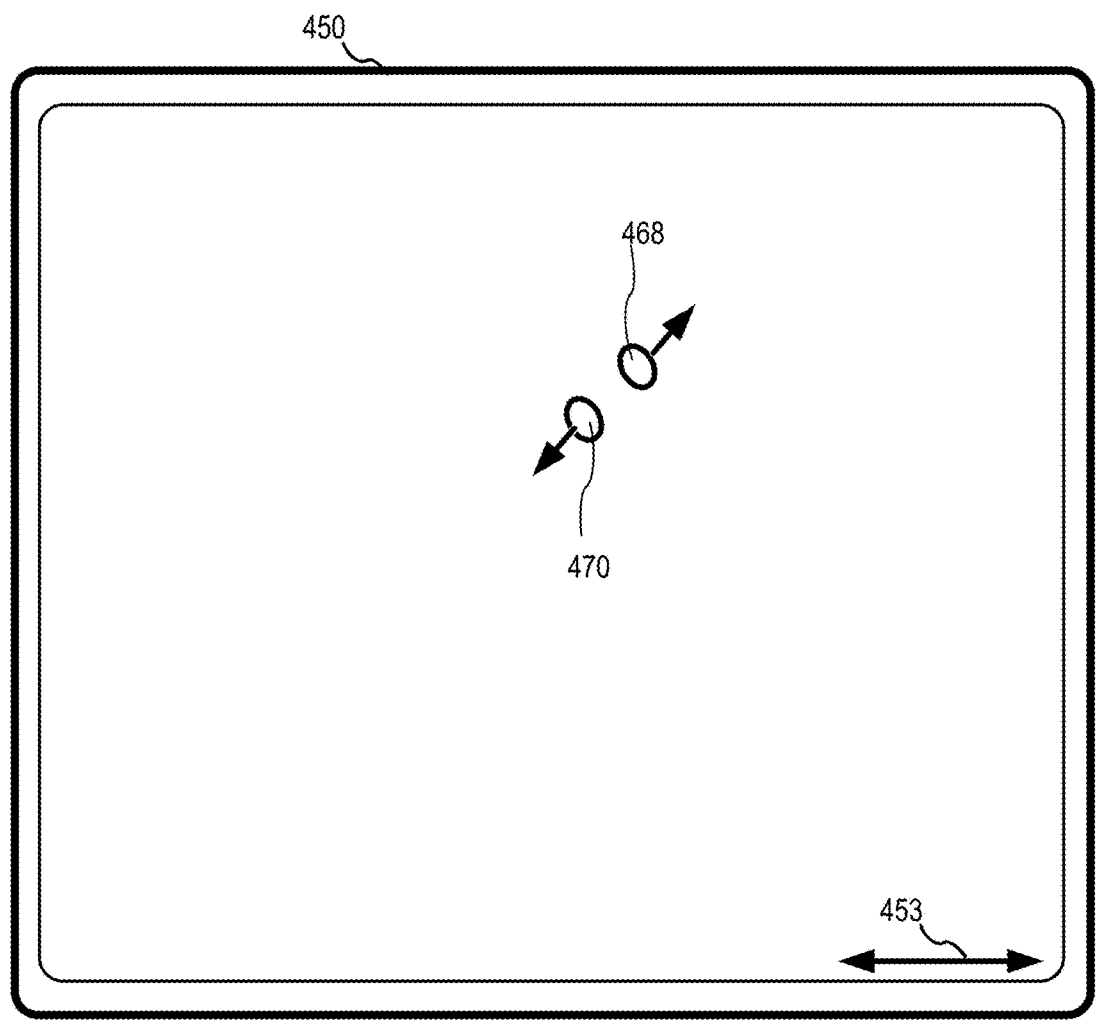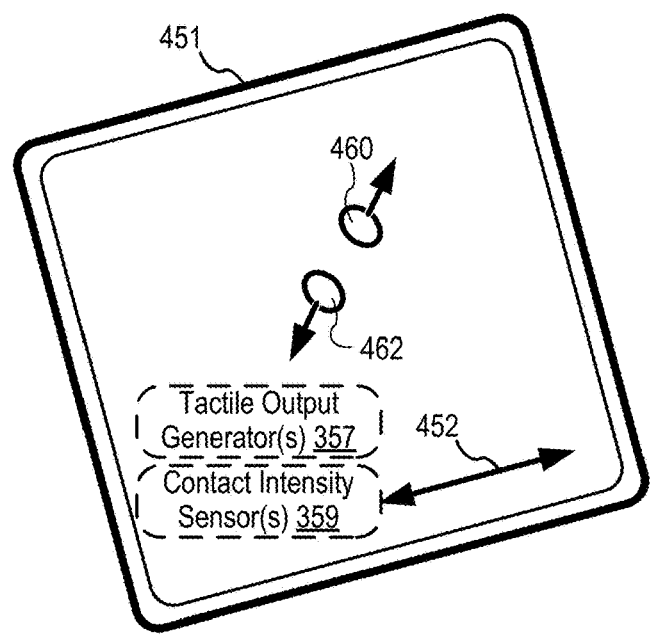
FIG. 4B

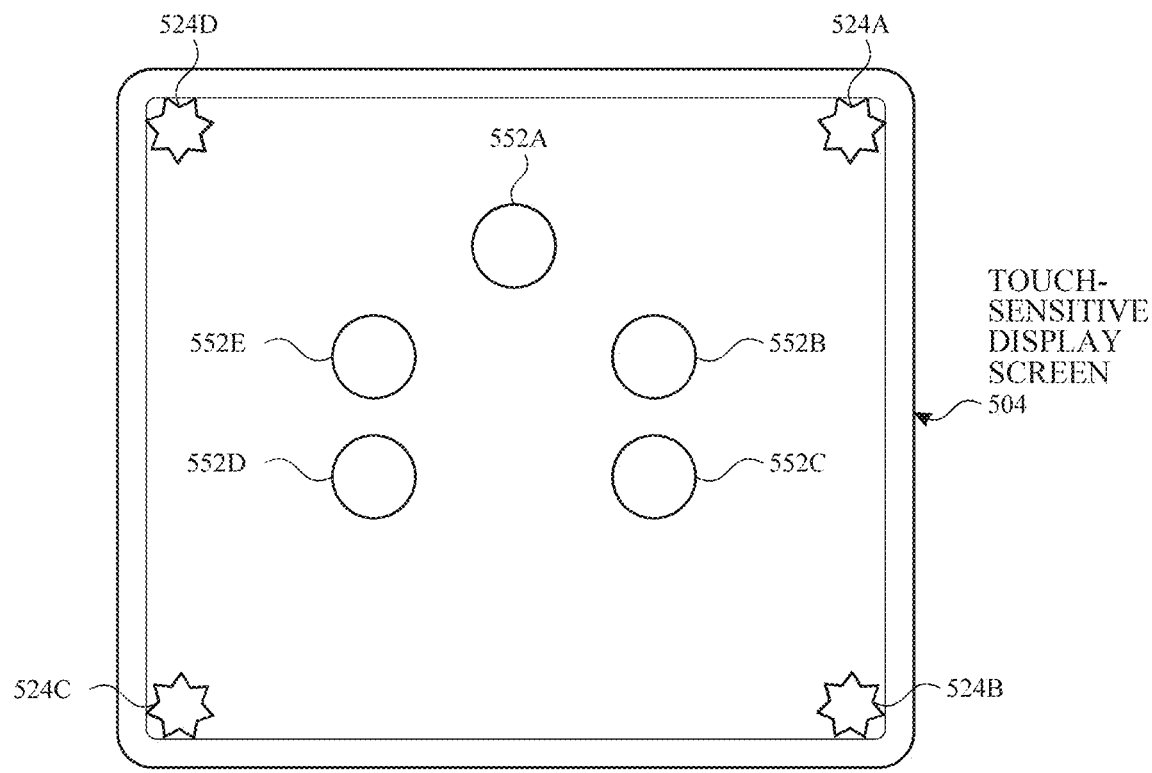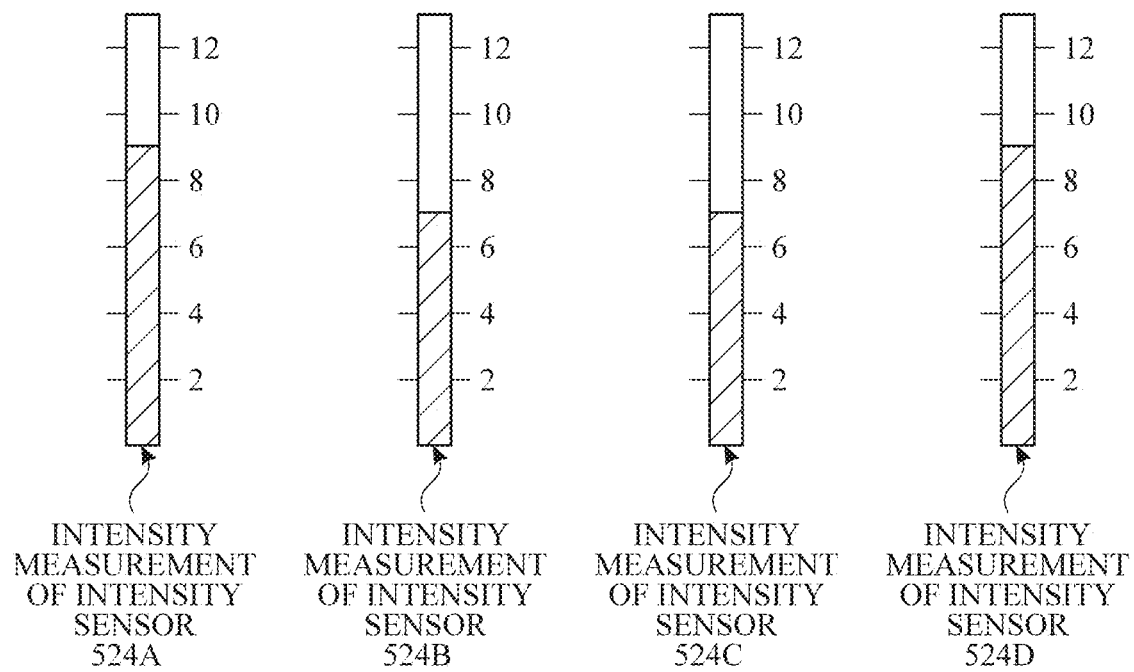
FIG. 5C

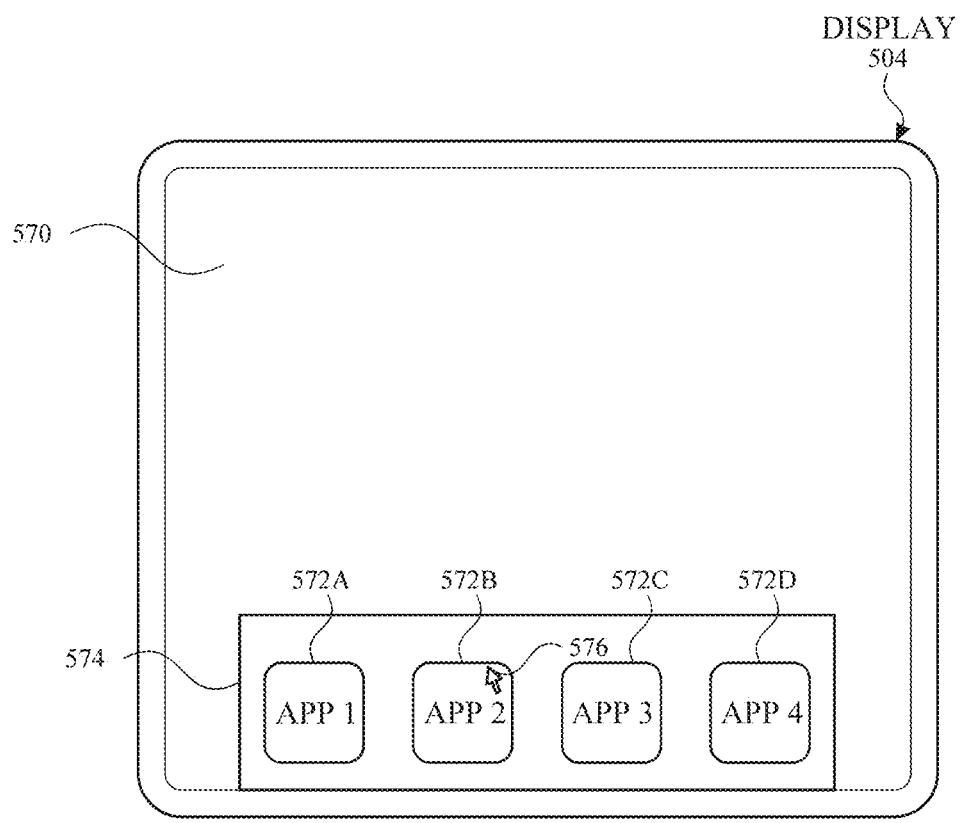
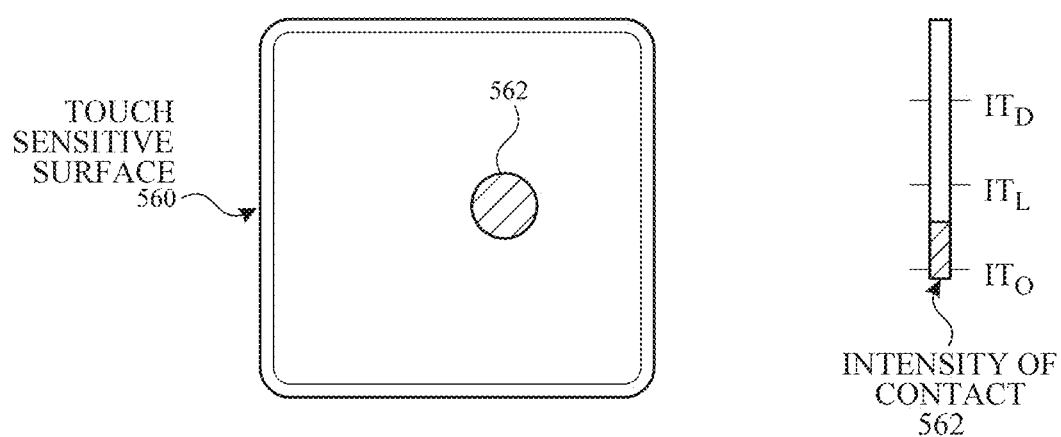
FIG. 5E

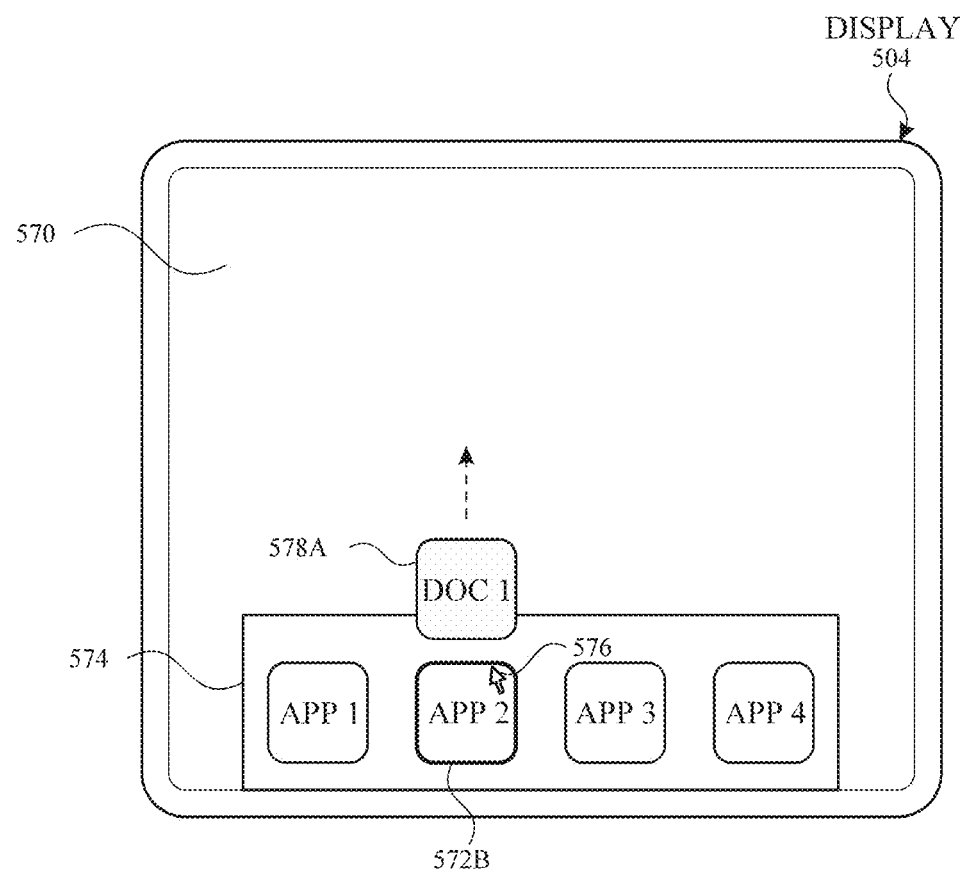
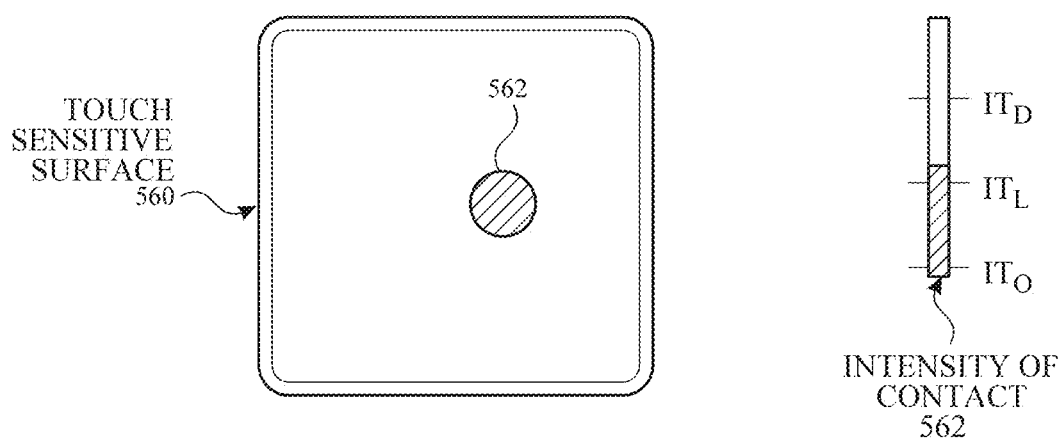
FIG. 5F

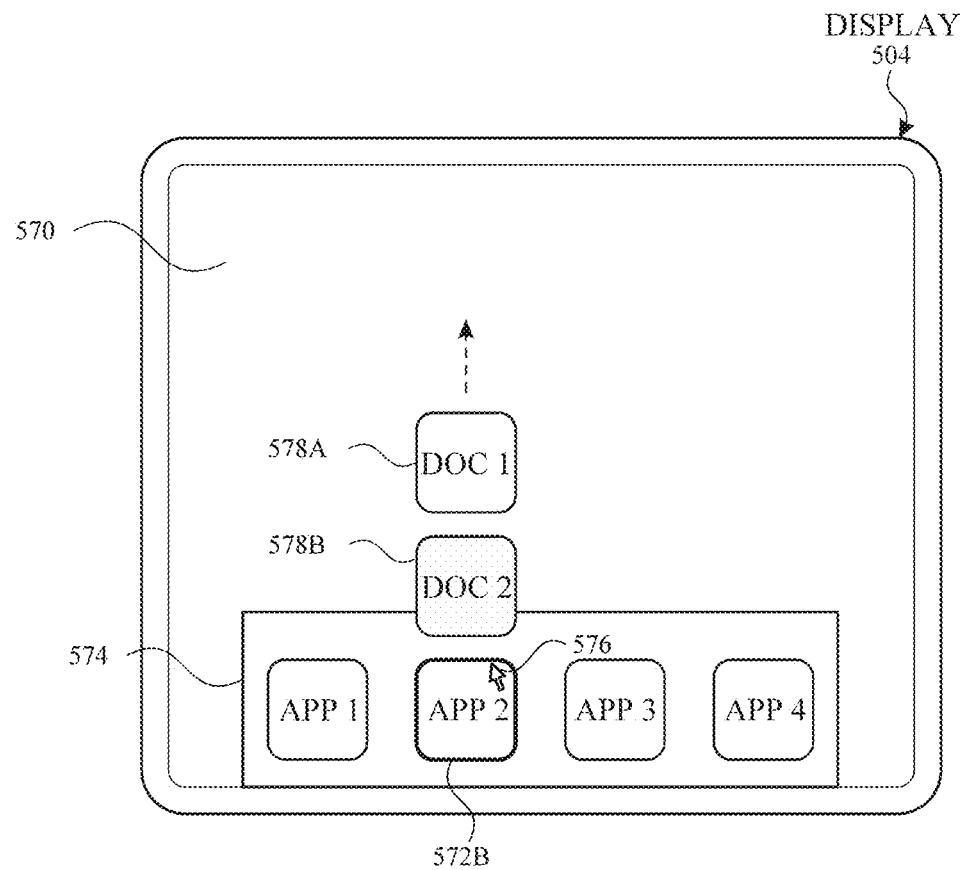
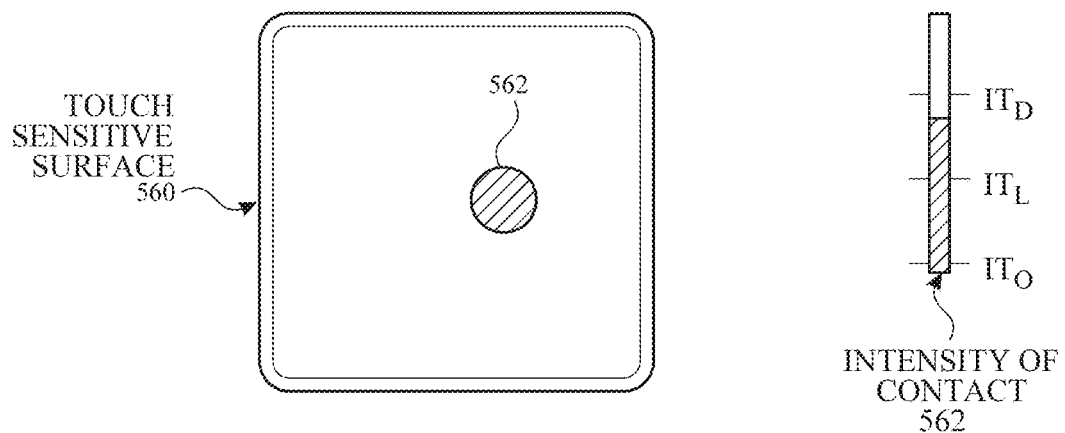
*FIG. 5G*

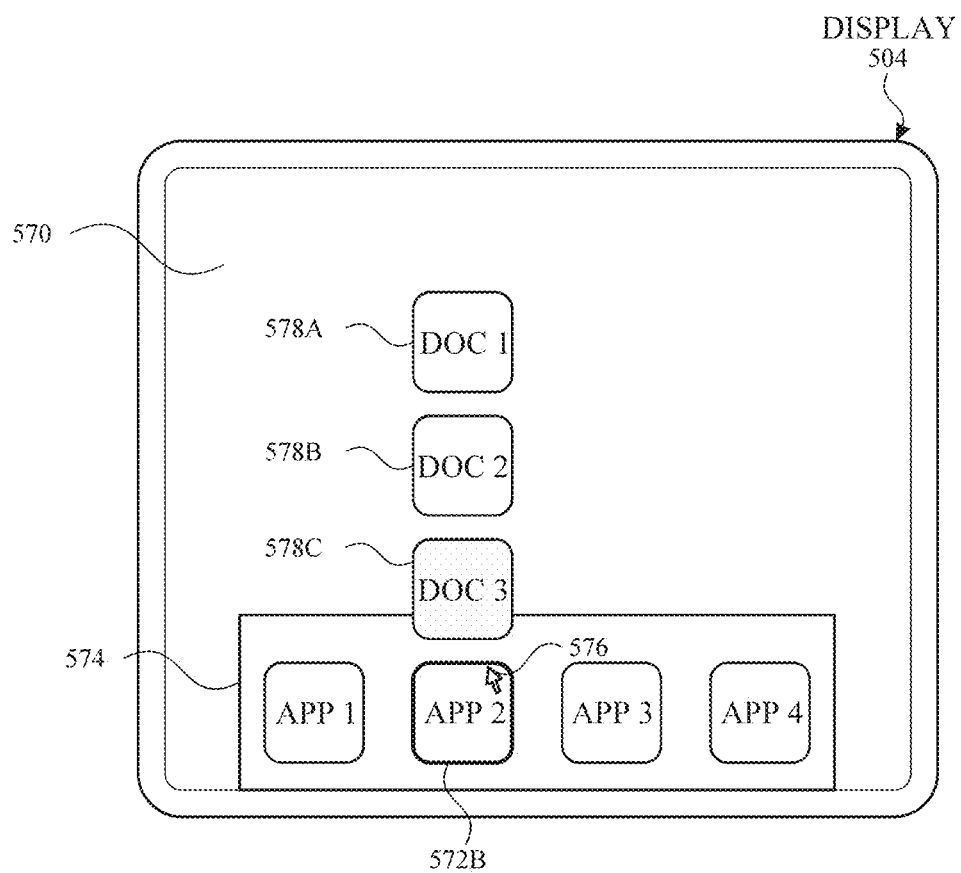
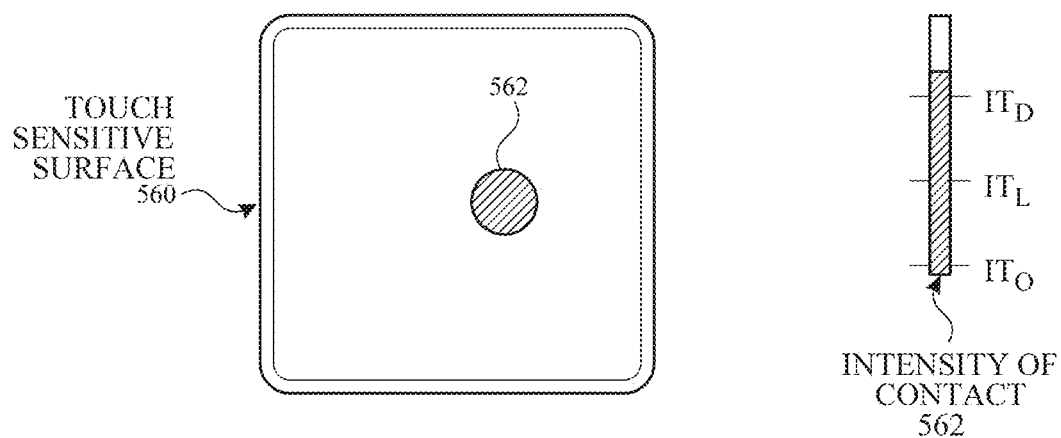
*FIG. 5H*

800 ↘

802
In response to a determination that a distance between the computer system and a first external device is less than a first threshold distance:

804
In accordance with a determination that a first set of criteria is met, wherein the first set of criteria includes a criterion that is met when the computer system is currently playing first media and the first external device is playing second media, display a media control user interface that includes: a first selectable graphical user interface object for starting playback of the first media on the first external device; and one or more selectable user interface objects for controlling the playback of the second media on the first external device, including a first media control selectable graphical user interface object

806
While displaying the media control user interface, receive an input.

808
In response to receiving the input:

810
In accordance with a determination that the input corresponds to the first selectable graphical user interface object, initiate a process to cause the first external device to playback the first media.

812
In accordance with a determination that the input corresponds to the first media control selectable graphical user interface object, initiate a process for controlling playback of the second media by the first external device.

1202
While the first portion of the touch-sensitive display is configured to cause the computer system to perform a first operation in response to detecting an input on the first portion, output a visual indicator on the touch-sensitive display, wherein the visual indicator occupies at least a subset of the first portion of the touch-sensitive display, wherein a first visual property of the visual indicator indicates an operational state of the second portion for performing a second operation different from the first operation, including:

1204
In accordance with a determination that the second portion of the touch-sensitive display is operable to initiate a process for performing the second operation, output the visual indicator having a first variation of the first visual property.

1206
In accordance with a determination that the second portion of the touch-sensitive display is not operable to initiate the process for performing the second operation, output the visual indicator having a second variation of the first visual property different from the first variation.

1208
Detect an input directed to the touch-sensitive display.

METHODS AND INTERFACES FOR MEDIA CONTROL WITH DYNAMIC FEEDBACK

CROSS-REFERENCE TO RELATED APPLICATION

This application is a continuation of U.S. Nonprovisional patent application Ser. No. 17/168,069, entitled "METHODS AND INTERFACES FOR MEDIA CONTROL WITH DYNAMIC FEEDBACK," filed on Feb. 4, 2021, which claims priority to U.S. Provisional Patent Application Ser. No. 63/083,820, entitled "METHODS AND INTERFACES FOR MEDIA CONTROL WITH DYNAMIC FEEDBACK," filed on Sep. 25, 2020, the contents of which are hereby incorporated by reference in their entirety.

FIELD

The present disclosure relates generally to computer user interfaces, and more specifically to techniques for managing media playback devices.

BACKGROUND

The number of electronic devices, and particularly smart devices, in users' homes continues to increase. These devices are becoming increasingly complex, capable of being interconnected with each other, and capable of performing more complicated tasks. As such, these devices can benefit from additional methods and interfaces for managing media playback.

BRIEF SUMMARY

Some techniques for managing media playback devices using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing media playback devices. Such methods and interfaces optionally complement or replace other methods for controlling media playback. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a first external device is described. The method comprises: detecting a change in distance between the computer system and the first external device; and in response to detecting the change in distance: in accordance with a determination that a current distance of the computer system from the first external device is less than a first threshold distance but greater than a second threshold distance, generating feedback that indicates that a first operation will be performed when the second threshold distance is reached, wherein the feedback varies based at least in part on a distance of the computer system to the first external device, including: in accordance with a determination that the change in distance includes movement of the computer system toward the first external device, changing a current value for a feedback parameter of the feedback in a first direction; and in accordance with a determination that the change in distance includes movement of the computer system away from the first external device, changing the current value for the feedback parameter of the feedback in a second direction that is different from the first direction; and in accordance with a determination that the current distance of the computer system from the first external device is less than the second threshold distance, performing the first operation.

In accordance with some embodiments, a non-transitory computer-readable storage medium storing one or more programs configured to be executed by one or more processors of a computer system in communication with a first external device is described. The one or more programs include instructions for: detecting a change in distance between the computer system and the first external device; and in response to detecting the change in distance: in accordance with a determination that a current distance of the computer system from the first external device is less than a first threshold distance but greater than a second threshold distance, generating feedback that indicates that a first operation will be performed when the second threshold distance is reached, wherein the feedback varies based at least in part on a distance of the computer system to the first external device, including: in accordance with a determination that the change in distance includes movement of the computer system toward the first external device, changing a current value for a feedback parameter of the feedback in a first direction; and in accordance with a determination that the change in distance includes movement of the computer system away from the first external device, changing the current value for the feedback parameter of the feedback in a second direction that is different from the first direction; and in accordance with a determination that the current distance of the computer system from the first external device is less than the second threshold distance, performing the first operation.

In accordance with some embodiments, a transitory computer-readable storage medium storing one or more programs configured to be executed by one or more processors of a computer system in communication with a first external device is described. The one or more programs include instructions for: detecting a change in distance between the computer system and the first external device; and in response to detecting the change in distance: in accordance with a determination that a current distance of the computer system from the first external device is less than a first threshold distance but greater than a second threshold distance, generating feedback that indicates that a first operation will be performed when the second threshold distance is reached, wherein the feedback varies based at least in part on a distance of the computer system to the first external device, including: in accordance with a determination that the change in distance includes movement of the computer system toward the first external device, changing a current value for a feedback parameter of the feedback in a first direction; and in accordance with a determination that the change in distance includes movement of the computer system away from the first external device, changing the current value for the feedback parameter of the feedback in a second direction that is different from the first direction; and in accordance with a determination that the current distance of the computer system from the first external device is less than the second threshold distance, performing the first operation.

In accordance with some embodiments, a computer system in communication with a first external device is described. The computer system comprises one or more processors, and memory storing one or more programs configured to be executed by the one or more processors. The one or more programs include instructions for: detecting a change in distance between the computer system and the first external device; and in response to detecting the change in distance: in accordance with a determination that a current distance of the computer system from the first external device is less than a first threshold distance but greater than a second threshold distance, generating feedback that indicates that a first operation will be performed when the second threshold distance is reached, wherein the feedback varies based at least in part on a distance of the computer system to the first external device, including: in accordance with a determination that the change in distance includes movement of the computer system toward the first external device, changing a current value for a feedback parameter of the feedback in a first direction; and in accordance with a determination that the change in distance includes movement of the computer system away from the first external device, changing the current value for the feedback parameter of the feedback in a second direction that is different from the first direction; and in accordance with a determination that the current distance of the computer system from the first external device is less than the second threshold distance, performing the first operation.

In accordance with some embodiments, a computer system in communication with a first external device is described. The computer system comprises means for detecting a change in distance between the computer system and the first external device; and means for, in response to detecting the change in distance: in accordance with a determination that a current distance of the computer system from the first external device is less than a first threshold distance but greater than a second threshold distance, generating feedback that indicates that a first operation will be performed when the second threshold distance is reached, wherein the feedback varies based at least in part on a distance of the computer system to the first external device, including: in accordance with a determination that the change in distance includes movement of the computer system toward the first external device, changing a current value for a feedback parameter of the feedback in a first direction; and in accordance with a determination that the change in distance includes movement of the computer system away from the first external device, changing the current value for the feedback parameter of the feedback in a second direction that is different from the first direction; and in accordance with a determination that the current distance of the computer system from the first external device is less than the second threshold distance, performing the first operation.

In accordance with some embodiments, a method performed at a computer system that is in communication with a display generation component and one or more input devices is described. The method comprises: in response to a determination that a distance between the computer system and a first external device is less than a first threshold distance: in accordance with a determination that a first set of criteria is met, wherein the first set of criteria includes a criterion that is met when the computer system is currently playing first media and the first external device is playing second media, displaying a media control user interface that includes: a first selectable graphical user interface object for starting playback of the first media on the first external device; and one or more selectable user interface objects for controlling the playback of the second media on the first external device, including a first media control selectable graphical user interface object; while displaying the media control user interface, receiving, via the one or more input devices, an input; and in response to receiving the input: in accordance with a determination that the input corresponds to the first selectable graphical user interface object, initiating a process to cause the first external device to playback the first media; and in accordance with a determination that the input corresponds to the first media control selectable graphical user interface object, initiating a process for controlling playback of the second media by the first external device.

In accordance with some embodiments, a non-transitory computer-readable storage medium storing one or more programs configured to be executed by one or more processors of a computer system in communication with a display generation component and one or more input devices is described. The one or more programs include instructions for: in response to a determination that a distance between the computer system and a first external device is less than a first threshold distance: in accordance with a determination that a first set of criteria is met, wherein the first set of criteria includes a criterion that is met when the computer system is currently playing first media and the first external device is playing second media, displaying a media control user interface that includes: a first selectable graphical user interface object for starting playback of the first media on the first external device; and one or more selectable user interface objects for controlling the playback of the second media on the first external device, including a first media control selectable graphical user interface object; while displaying the media control user interface, receiving, via the one or more input devices, an input; and in response to receiving the input: in accordance with a determination that the input corresponds to the first selectable graphical user interface object, initiating a process to cause the first external device to playback the first media; and in accordance with a determination that the input corresponds to the first media control selectable graphical user interface object, initiating a process for controlling playback of the second media by the first external device.

In accordance with some embodiments, a transitory computer-readable storage medium storing one or more programs configured to be executed by one or more processors of a computer system in communication with a display generation component and one or more input devices is described. The one or more programs include instructions for: in response to a determination that a distance between the computer system and a first external device is less than a first threshold distance: in accordance with a determination that a first set of criteria is met, wherein the first set of criteria includes a criterion that is met when the computer system is currently playing first media and the first external device is playing second media, displaying a media control user interface that includes: a first selectable graphical user interface object for starting playback of the first media on the first external device; and one or more selectable user interface objects for controlling the playback of the second media on the first external device, including a first media control selectable graphical user interface object; while displaying the media control user interface, receiving, via the one or more input devices, an input; and in response to receiving the input: in accordance with a determination that the input corresponds to the first selectable graphical user interface object, initiating a process to cause the first external device to playback the first media; and in accordance with a determination that the input corresponds to the first media control selectable graphical user interface object, initiating a process for controlling playback of the second media by the first external device.

In accordance with some embodiments, a computer system in communication with a display generation component and one or more input devices is described. The computer system comprises a display generation component, one or more input devices, one or more processors, and memory storing one or more programs configured to be executed by the one or more processors. The one or more programs include instructions for: in response to a determination that a distance between the computer system and a first external device is less than a first threshold distance: in accordance with a determination that a first set of criteria is met, wherein the first set of criteria includes a criterion that is met when the computer system is currently playing first media and the first external device is playing second media, displaying a media control user interface that includes: a first selectable graphical user interface object for starting playback of the first media on the first external device; and one or more selectable user interface objects for controlling the playback of the second media on the first external device, including a first media control selectable graphical user interface object; while displaying the media control user interface, receiving, via the one or more input devices, an input; and in response to receiving the input: in accordance with a determination that the input corresponds to the first selectable graphical user interface object, initiating a process to cause the first external device to playback the first media; and in accordance with a determination that the input corresponds to the first media control selectable graphical user interface object, initiating a process for controlling playback of the second media by the first external device.

In accordance with some embodiments, a computer system in communication with a display generation component and one or more input devices is described. The computer system comprises a display generation component, one or more input devices, and means for in response to a determination that a distance between the computer system and a first external device is less than a first threshold distance: in accordance with a determination that a first set of criteria is met, wherein the first set of criteria includes a criterion that is met when the computer system is currently playing first media and the first external device is playing second media, displaying a media control user interface that includes: a first selectable graphical user interface object for starting playback of the first media on the first external device; and one or more selectable user interface objects for controlling the playback of the second media on the first external device, including a first media control selectable graphical user interface object; while displaying the media control user interface, receiving, via the one or more input devices, an input; and in response to receiving the input: in accordance with a determination that the input corresponds to the first selectable graphical user interface object, initiating a process to cause the first external device to playback the first media; and in accordance with a determination that the input corresponds to the first media control selectable graphical user interface object, initiating a process for controlling playback of the second media by the first external device.

In accordance with some embodiments, a method performed at a computer system that is in communication with a touch-sensitive surface is described. The touch-sensitive surface includes a first portion that is associated with a first operation and a second portion that is associated with a second operation, different from the first operation. The method comprises: detecting, via the touch-sensitive surface, a first input, wherein detecting the first input includes detecting first contact having a respective size; and in response to detecting the first input: in accordance with a determination that the respective size of the first contact is less than a first threshold size and that the first input is directed to the first portion of the touch-sensitive surface, initiating a process for performing the first operation; and in accordance with a determination that the respective size of the first contact is less than the first threshold size and that the first input is directed to the second portion of the touch-sensitive surface, initiating a process for performing the second operation; and in accordance with a determination that the respective size of the first contact is greater than the first threshold size, initiating a process for performing the first operation without regard for whether the first input is directed to the first portion or the second portion of the touch-sensitive surface.

In accordance with some embodiments, a non-transitory computer-readable storage medium storing one or more programs configured to be executed by one or more processors of a computer system in communication with a touch-sensitive surface is described. The touch-sensitive surface includes a first portion that is associated with a first operation and a second portion that is associated with a second operation, different from the first operation. The one or more programs include instructions for: detecting, via the touch-sensitive surface, a first input, wherein detecting the first input includes detecting first contact having a respective size; and in response to detecting the first input: in accordance with a determination that the respective size of the first contact is less than a first threshold size and that the first input is directed to the first portion of the touch-sensitive surface, initiating a process for performing the first operation; and in accordance with a determination that the respective size of the first contact is less than the first threshold size and that the first input is directed to the second portion of the touch-sensitive surface, initiating a process for performing the second operation; and in accordance with a determination that the respective size of the first contact is greater than the first threshold size, initiating a process for performing the first operation without regard for whether the first input is directed to the first portion or the second portion of the touch-sensitive surface.

In accordance with some embodiments, a transitory computer-readable storage medium storing one or more programs configured to be executed by one or more processors of a computer system in communication with a touch-sensitive surface is described. The touch-sensitive surface includes a first portion that is associated with a first operation and a second portion that is associated with a second operation, different from the first operation. The one or more programs include instructions for: detecting, via the touch-sensitive surface, a first input, wherein detecting the first input includes detecting first contact having a respective size; and in response to detecting the first input: in accordance with a determination that the respective size of the first contact is less than a first threshold size and that the first input is directed to the first portion of the touch-sensitive surface, initiating a process for performing the first operation; and in accordance with a determination that the respective size of the first contact is less than the first threshold size and that the first input is directed to the second portion of the touch-sensitive surface, initiating a process for performing the second operation; and in accordance with a determination that the respective size of the first contact is greater than the first threshold size, initiating a process for performing the first operation without regard for whether the first input is directed to the first portion or the second portion of the touch-sensitive surface.

In accordance with some embodiments, a computer system in communication with a touch-sensitive surface is described. The computer system comprises a touch-sensitive surface that includes a first portion that is associated with a first operation and a second portion that is associated with a second operation, different from the first operation; one or more processors; and memory storing one or more programs configured to be executed by the one or more processors. The one or more programs include instructions for: detecting, via the touch-sensitive surface, a first input, wherein detecting the first input includes detecting first contact having a respective size; and in response to detecting the first input: in accordance with a determination that the respective size of the first contact is less than a first threshold size and that the first input is directed to the first portion of the touch-sensitive surface, initiating a process for performing the first operation; and in accordance with a determination that the respective size of the first contact is less than the first threshold size and that the first input is directed to the second portion of the touch-sensitive surface, initiating a process for performing the second operation; and in accordance with a determination that the respective size of the first contact is greater than the first threshold size, initiating a process for performing the first operation without regard for whether the first input is directed to the first portion or the second portion of the touch-sensitive surface.

In accordance with some embodiments, a computer system in communication with a touch-sensitive surface is described. The computer system comprises a touch-sensitive surface that includes a first portion that is associated with a first operation and a second portion that is associated with a second operation, different from the first operation; and means for detecting, via the touch-sensitive surface, a first input, wherein detecting the first input includes detecting first contact having a respective size; and means for in response to detecting the first input: in accordance with a determination that the respective size of the first contact is less than a first threshold size and that the first input is directed to the first portion of the touch-sensitive surface, initiating a process for performing the first operation; and in accordance with a determination that the respective size of the first contact is less than the first threshold size and that the first input is directed to the second portion of the touch-sensitive surface, initiating a process for performing the second operation; and in accordance with a determination that the respective size of the first contact is greater than the first threshold size, initiating a process for performing the first operation without regard for whether the first input is directed to the first portion or the second portion of the touch-sensitive surface.

In accordance with some embodiments, a method performed at a computer system that includes a touch-sensitive display is described. The touch-sensitive display has a first portion and a second portion, and includes one or more physical features that distinguishes the second portion from the first portion. The method comprises: while the first portion of the touch-sensitive display is configured to cause the computer system to perform a first operation in response to detecting an input on the first portion, outputting a visual indicator on the touch-sensitive display, wherein the visual indicator occupies at least a subset of the first portion of the touch-sensitive display, wherein a first visual property of the visual indicator indicates an operational state of the second portion for performing a second operation different from the first operation, including: in accordance with a determination that the second portion of the touch-sensitive display is operable to initiate a process for performing the second operation, outputting the visual indicator having a first variation of the first visual property; and in accordance with a determination that the second portion of the touch-sensitive display is not operable to initiate the process for performing the second operation, outputting the visual indicator having a second variation of the first visual property different from the first variation; detecting an input directed to the touch-sensitive display; and in response to detecting the input directed to the touch-sensitive display: in accordance with a determination that the input is directed to the second portion of the touch-sensitive display while the visual indicator has the first variation of the first visual property, initiating a process for performing the second operation; and in accordance with a determination that the input is directed to the second portion of the touch-sensitive display while the visual indicator has the second variation of the first visual property, forgoing initiating a process for performing the second operation.

In accordance with some embodiments, a non-transitory computer-readable storage medium storing one or more programs configured to be executed by one or more processors of a computer system that includes a touch-sensitive display is described. The touch-sensitive display has a first portion and a second portion, and includes one or more physical features that distinguishes the second portion from the first portion. The one or more programs include instructions for: while the first portion of the touch-sensitive display is configured to cause the computer system to perform a first operation in response to detecting an input on the first portion, outputting a visual indicator on the touch-sensitive display, wherein the visual indicator occupies at least a subset of the first portion of the touch-sensitive display, wherein a first visual property of the visual indicator indicates an operational state of the second portion for performing a second operation different from the first operation, including: in accordance with a determination that the second portion of the touch-sensitive display is operable to initiate a process for performing the second operation, outputting the visual indicator having a first variation of the first visual property; and in accordance with a determination that the second portion of the touch-sensitive display is not operable to initiate the process for performing the second operation, outputting the visual indicator having a second variation of the first visual property different from the first variation; detecting an input directed to the touch-sensitive display; and in response to detecting the input directed to the touch-sensitive display: in accordance with a determination that the input is directed to the second portion of the touch-sensitive display while the visual indicator has the first variation of the first visual property, initiating a process for performing the second operation; and in accordance with a determination that the input is directed to the second portion of the touch-sensitive display while the visual indicator has the second variation of the first visual property, forgoing initiating a process for performing the second operation.

In accordance with some embodiments, a transitory computer-readable storage medium storing one or more programs configured to be executed by one or more processors of a computer system that includes a touch-sensitive display is described. The touch-sensitive display has a first portion and a second portion, and includes one or more physical features that distinguishes the second portion from the first portion. The one or more programs include instructions for:

while the first portion of the touch-sensitive display is configured to cause the computer system to perform a first operation in response to detecting an input on the first portion, outputting a visual indicator on the touch-sensitive display, wherein the visual indicator occupies at least a subset of the first portion of the touch-sensitive display, wherein a first visual property of the visual indicator indicates an operational state of the second portion for performing a second operation different from the first operation, including: in accordance with a determination that the second portion of the touch-sensitive display is operable to initiate a process for performing the second operation, outputting the visual indicator having a first variation of the first visual property; and in accordance with a determination that the second portion of the touch-sensitive display is not operable to initiate the process for performing the second operation, outputting the visual indicator having a second variation of the first visual property different from the first variation; detecting an input directed to the touch-sensitive display; and in response to detecting the input directed to the touch-sensitive display: in accordance with a determination that the input is directed to the second portion of the touch-sensitive display while the visual indicator has the first variation of the first visual property, initiating a process for performing the second operation; and in accordance with a determination that the input is directed to the second portion of the touch-sensitive display while the visual indicator has the second variation of the first visual property, forgoing initiating a process for performing the second operation.

In accordance with some embodiments, a computer system is described. The computer system comprises a touch-sensitive display. The touch-sensitive display has a first portion and a second portion, and includes one or more physical features that distinguishes the second portion from the first portion. The computer system also comprises one or more processors, and memory storing one or more programs configured to be executed by the one or more processors. The one or more programs include instructions for: while the first portion of the touch-sensitive display is configured to cause the computer system to perform a first operation in response to detecting an input on the first portion, outputting a visual indicator on the touch-sensitive display, wherein the visual indicator occupies at least a subset of the first portion of the touch-sensitive display, wherein a first visual property of the visual indicator indicates an operational state of the second portion for performing a second operation different from the first operation, including: in accordance with a determination that the second portion of the touch-sensitive display is operable to initiate a process for performing the second operation, outputting the visual indicator having a first variation of the first visual property; and in accordance with a determination that the second portion of the touch-sensitive display is not operable to initiate the process for performing the second operation, outputting the visual indicator having a second variation of the first visual property different from the first variation; detecting an input directed to the touch-sensitive display; and in response to detecting the input directed to the touch-sensitive display: in accordance with a determination that the input is directed to the second portion of the touch-sensitive display while the visual indicator has the first variation of the first visual property, initiating a process for performing the second operation; and in accordance with a determination that the input is directed to the second portion of the touch-sensitive display while the visual indicator has the second variation of the first visual property, forgoing initiating a process for performing the second operation.

In accordance with some embodiments, a computer system is described. The computer system comprises a touch-sensitive display. The touch-sensitive display has a first portion and a second portion, and includes one or more physical features that distinguishes the second portion from the first portion. The computer system also comprises means for while the first portion of the touch-sensitive display is configured to cause the computer system to perform a first operation in response to detecting an input on the first portion, outputting a visual indicator on the touch-sensitive display, wherein the visual indicator occupies at least a subset of the first portion of the touch-sensitive display, wherein a first visual property of the visual indicator indicates an operational state of the second portion for performing a second operation different from the first operation, including: in accordance with a determination that the second portion of the touch-sensitive display is operable to initiate a process for performing the second operation, outputting the visual indicator having a first variation of the first visual property; and in accordance with a determination that the second portion of the touch-sensitive display is not operable to initiate the process for performing the second operation, outputting the visual indicator having a second variation of the first visual property different from the first variation; means for detecting an input directed to the touch-sensitive display; and means for in response to detecting the input directed to the touch-sensitive display: in accordance with a determination that the input is directed to the second portion of the touch-sensitive display while the visual indicator has the first variation of the first visual property, initiating a process for performing the second operation; and in accordance with a determination that the input is directed to the second portion of the touch-sensitive display while the visual indicator has the second variation of the first visual property, forgoing initiating a process for performing the second operation.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing media playback devices, thereby increasing the effectiveness, efficiency, and user satisfaction with such devices. Such methods and interfaces may complement or replace other methods for managing media playback devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 5I illustrates an electronic device in accordance with some embodiments.

FIG. 8 is a flow diagram illustrating a method for managing media playback devices, in accordance with some embodiments.

FIGS. 12A and 12B depict a flow diagram illustrating a method for managing media playback devices, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing media playback devices. For example, methods and techniques for transferring or controlling media playback at electronic devices is described below. Such techniques can reduce the cognitive burden on a user who manage media playback across various devices, thereby enhancing productivity. Further, such techniques can reduce processor and battery power otherwise wasted on redundant user inputs.

Figure 6A:
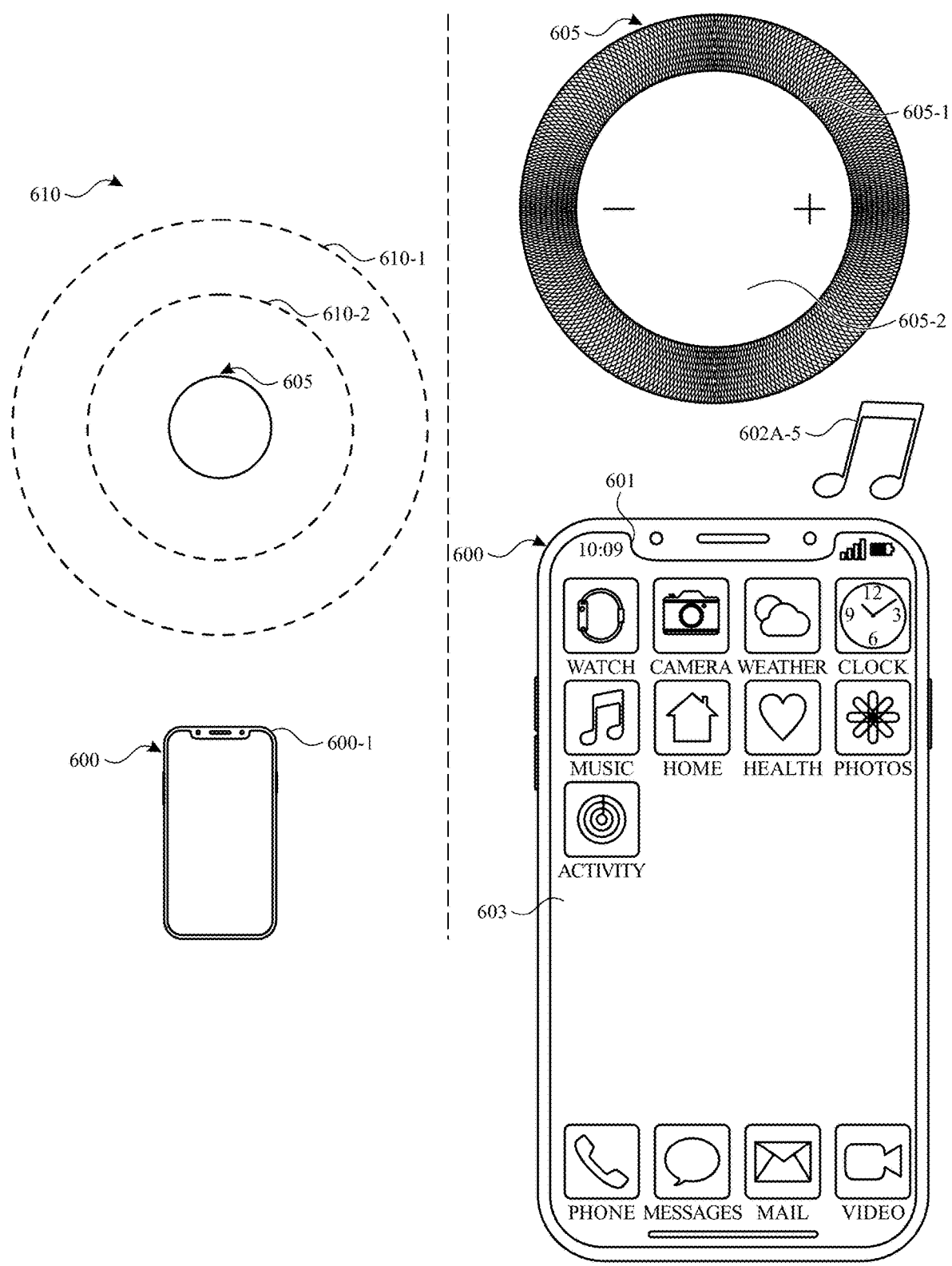
FIGS. 6A-6X illustrate exemplary user interfaces for managing media playback devices, in accordance with some embodiments.
Figure 6X:
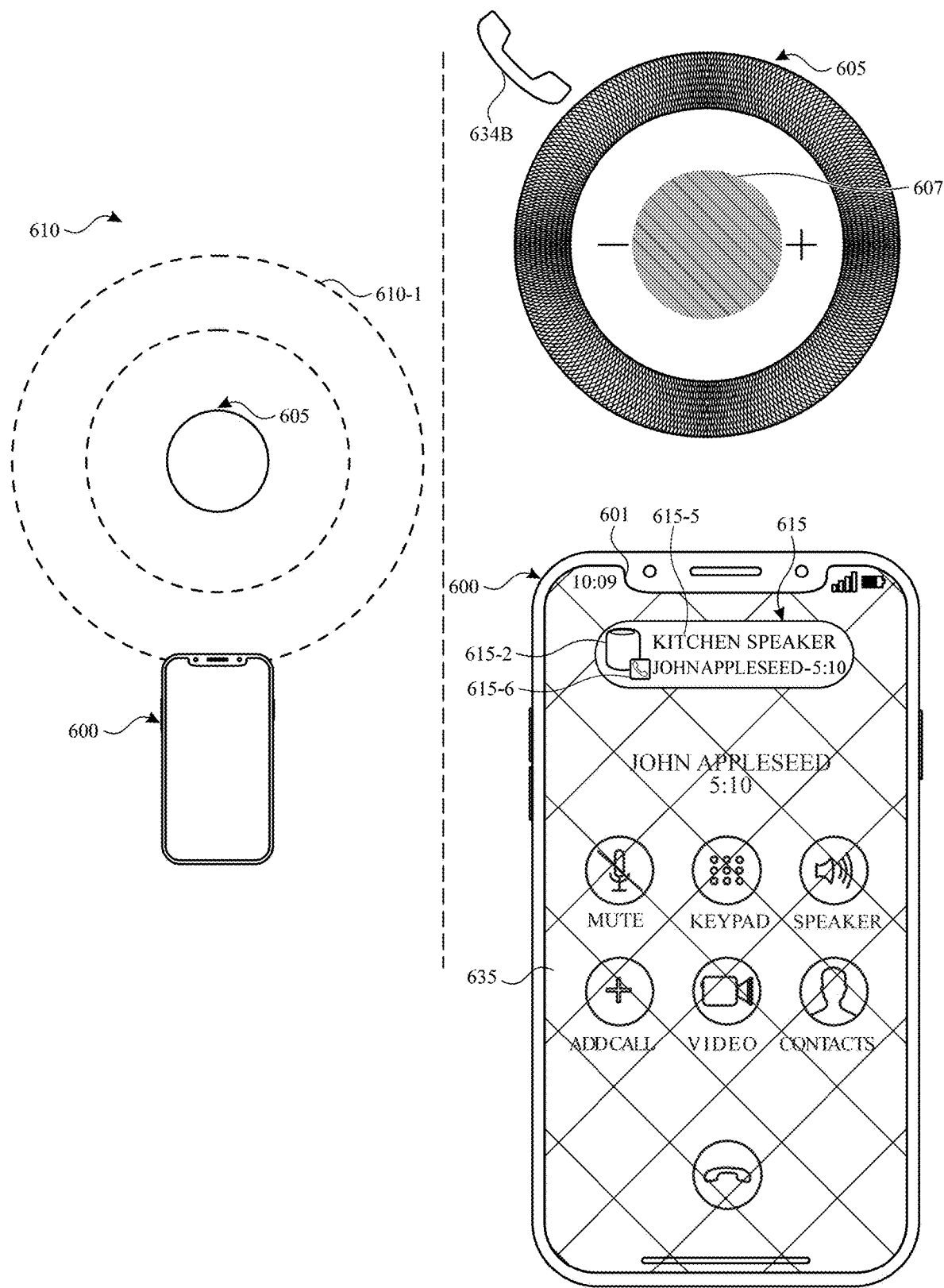
Figure 7:
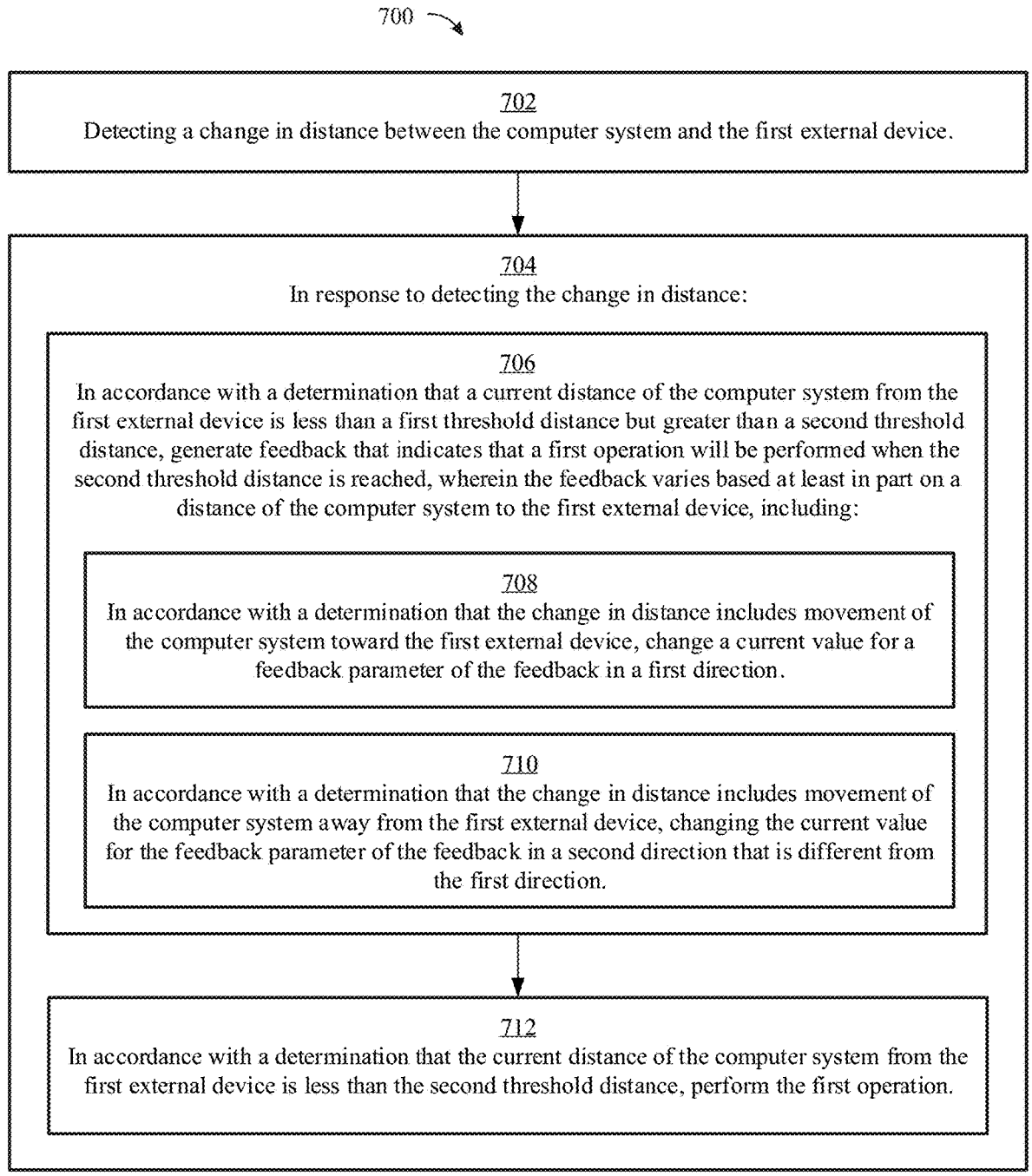
FIG. 7 is a flow diagram illustrating a method for managing media playback devices, in accordance with some embodiments.
Figure 9A:
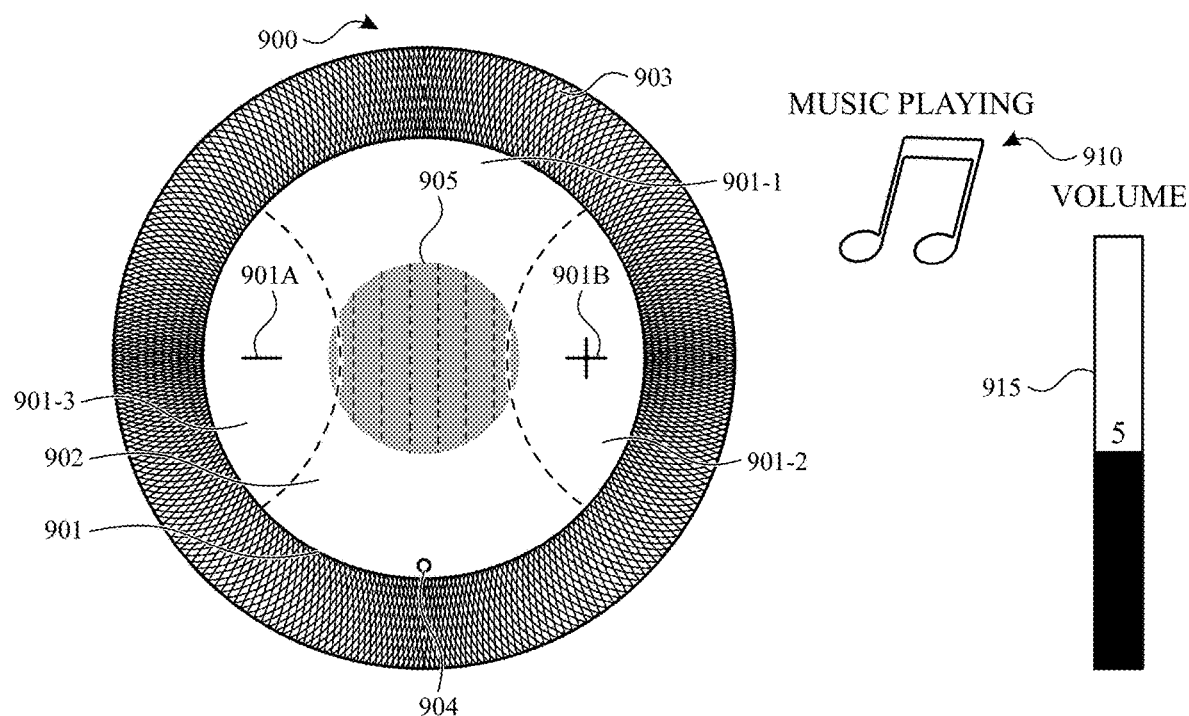
FIGS. 9A-9R illustrate exemplary embodiments for managing media playback devices, in accordance with some embodiments.
Figure 9B:
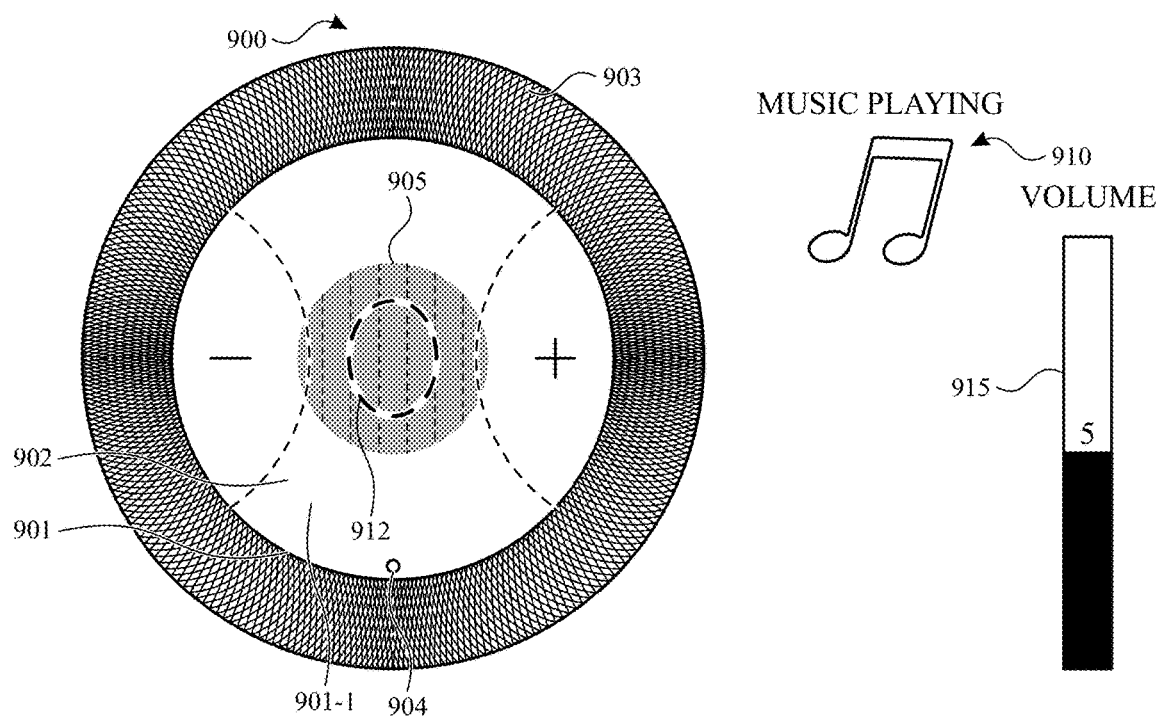
Figure 9C:
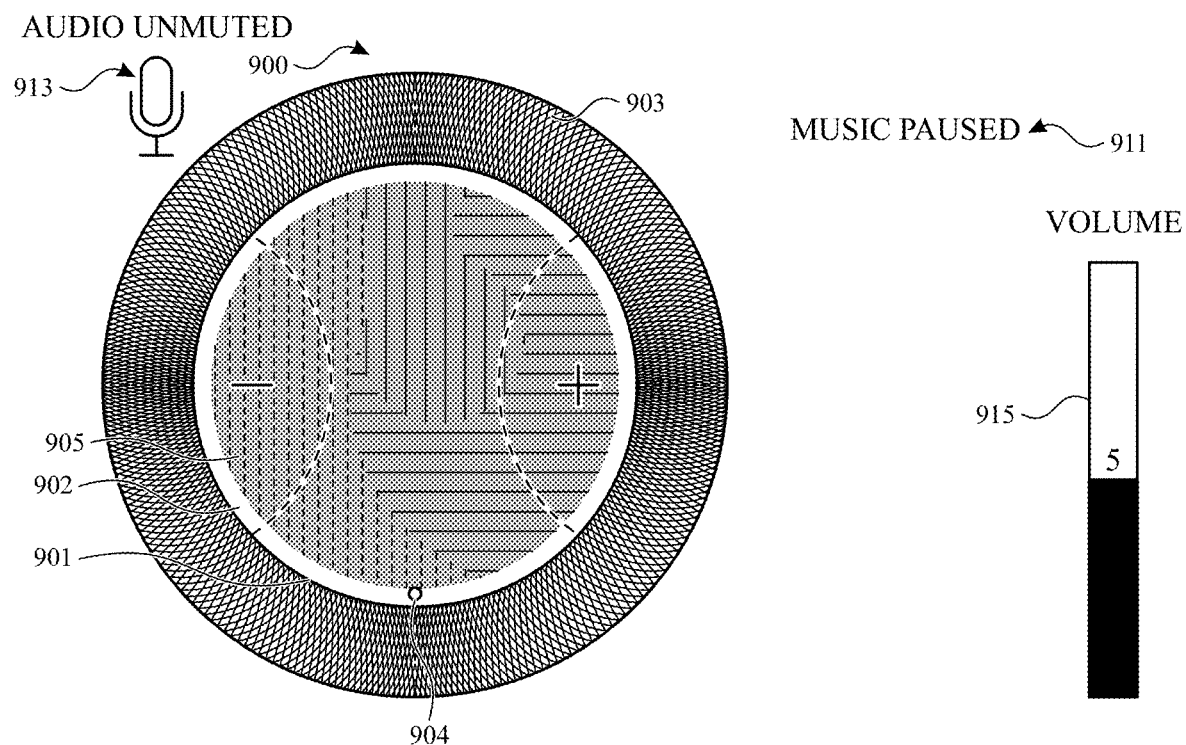
Figure 9D:
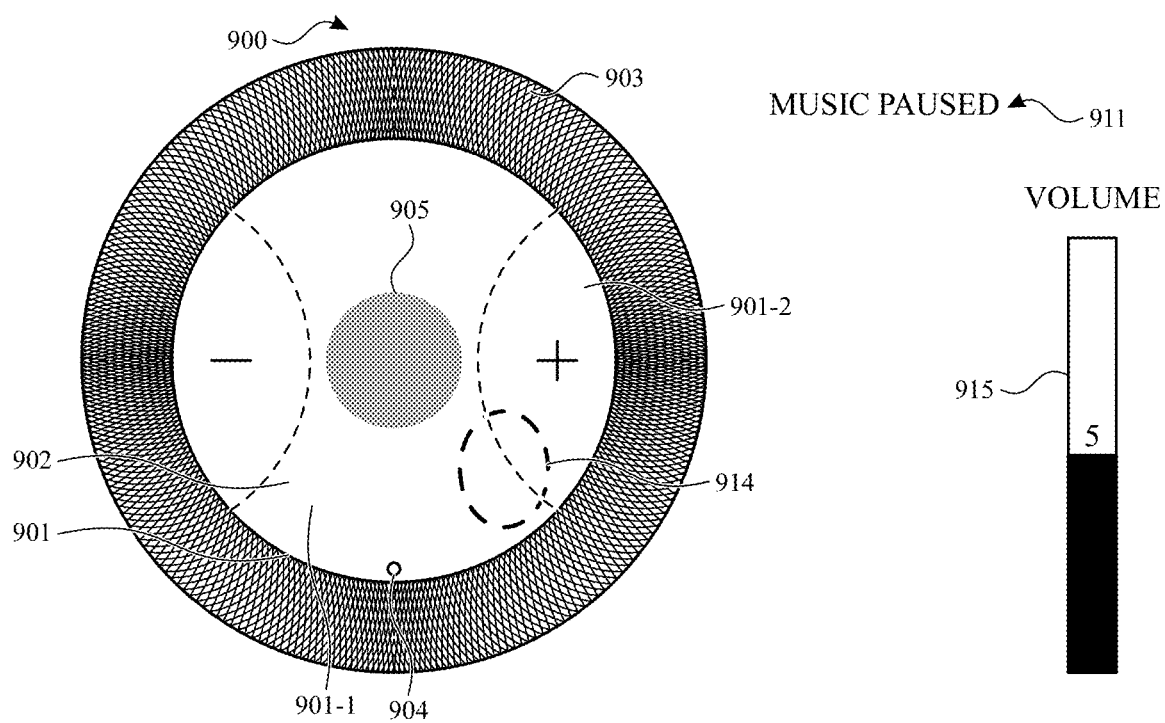
Figure 9E:
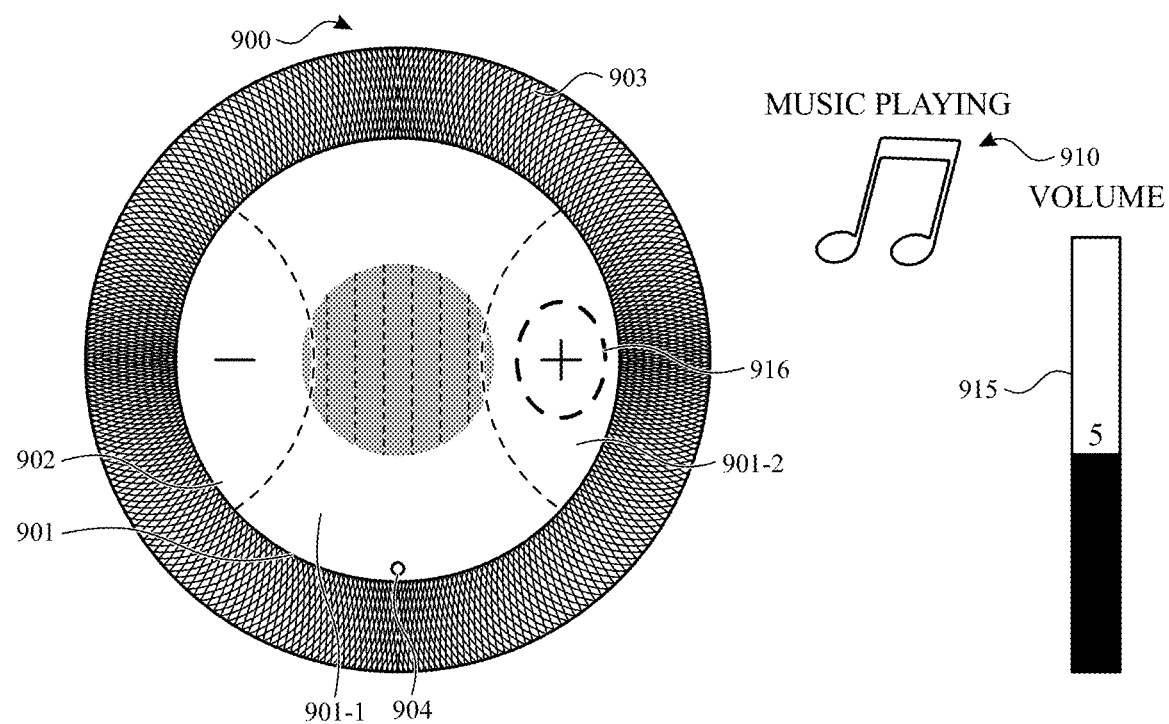
Figure 9F:
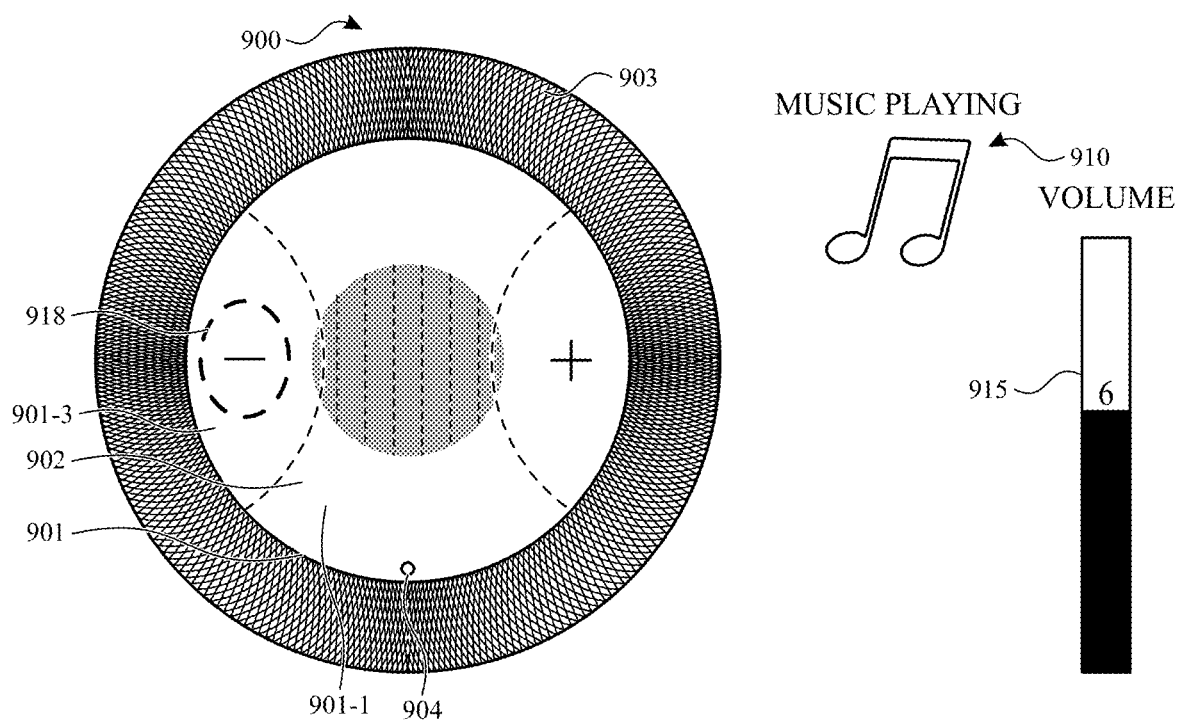
Figure 9G:
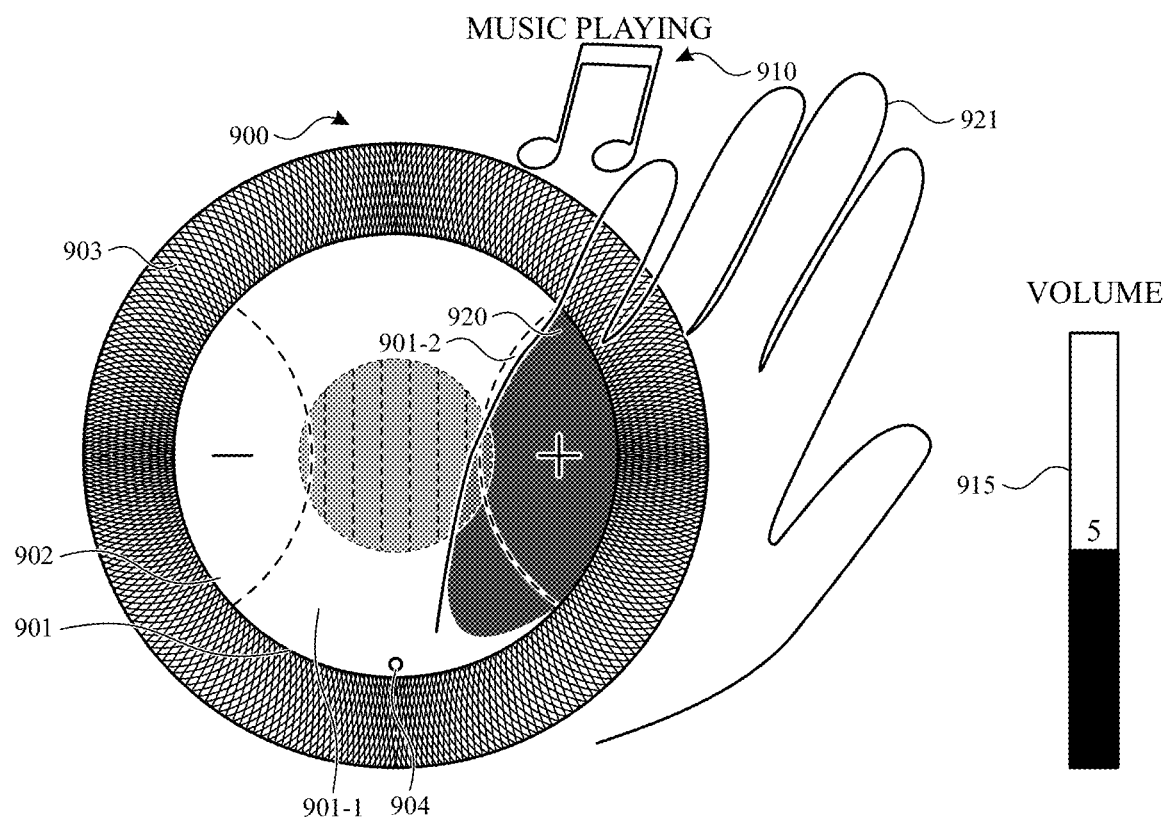
Figure 9H:
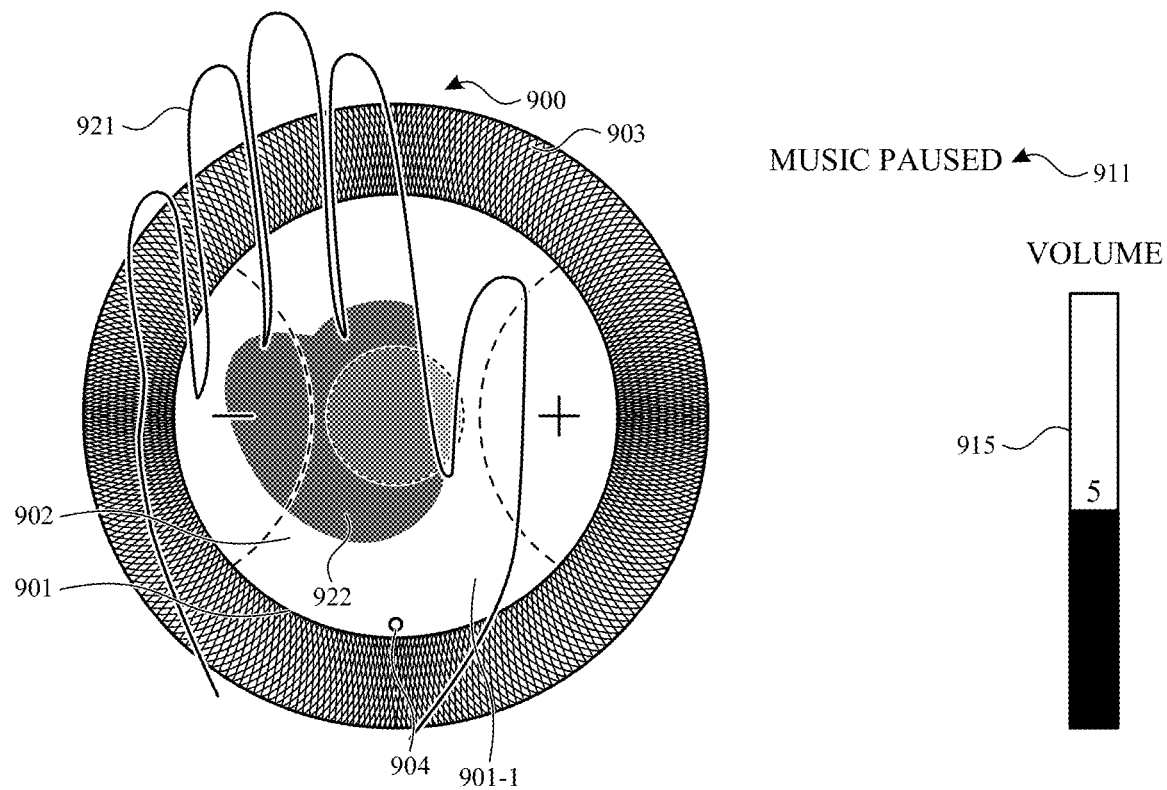
Figure 9I:
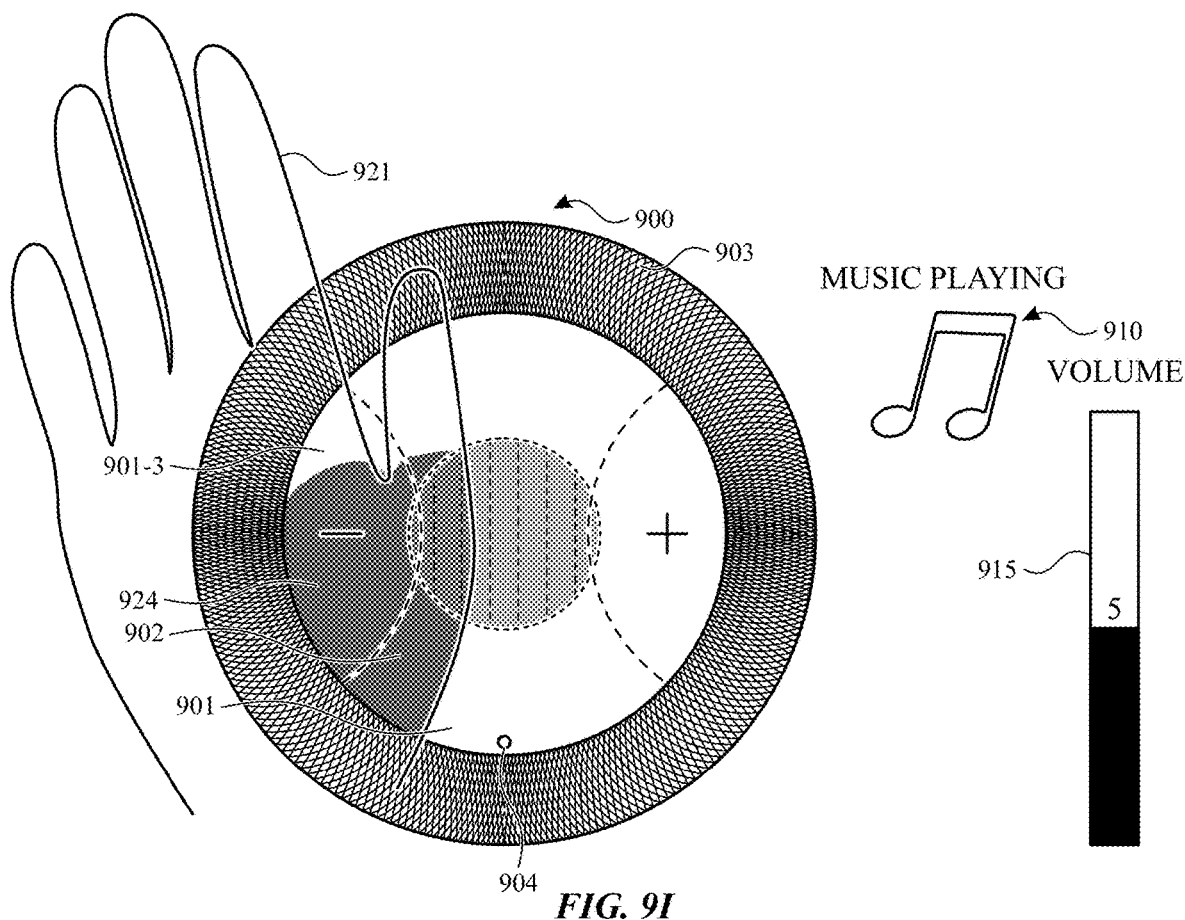
Figure 9J:
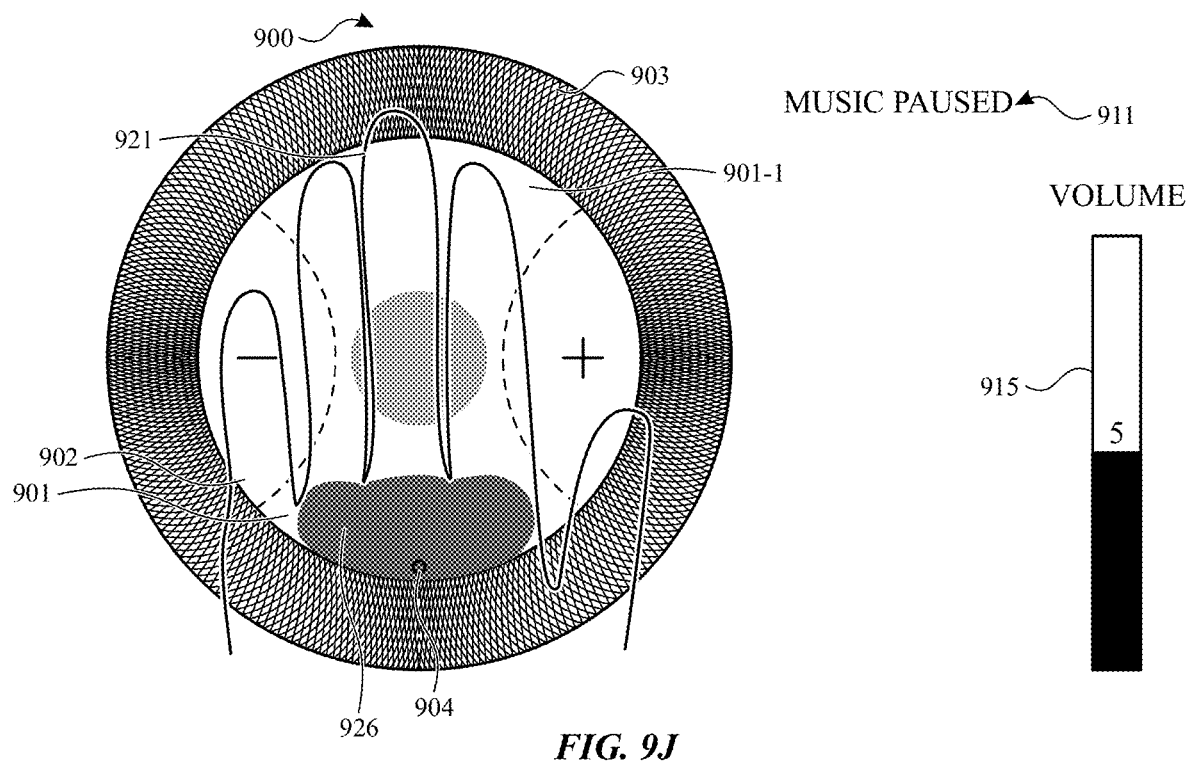
Figure 9K:
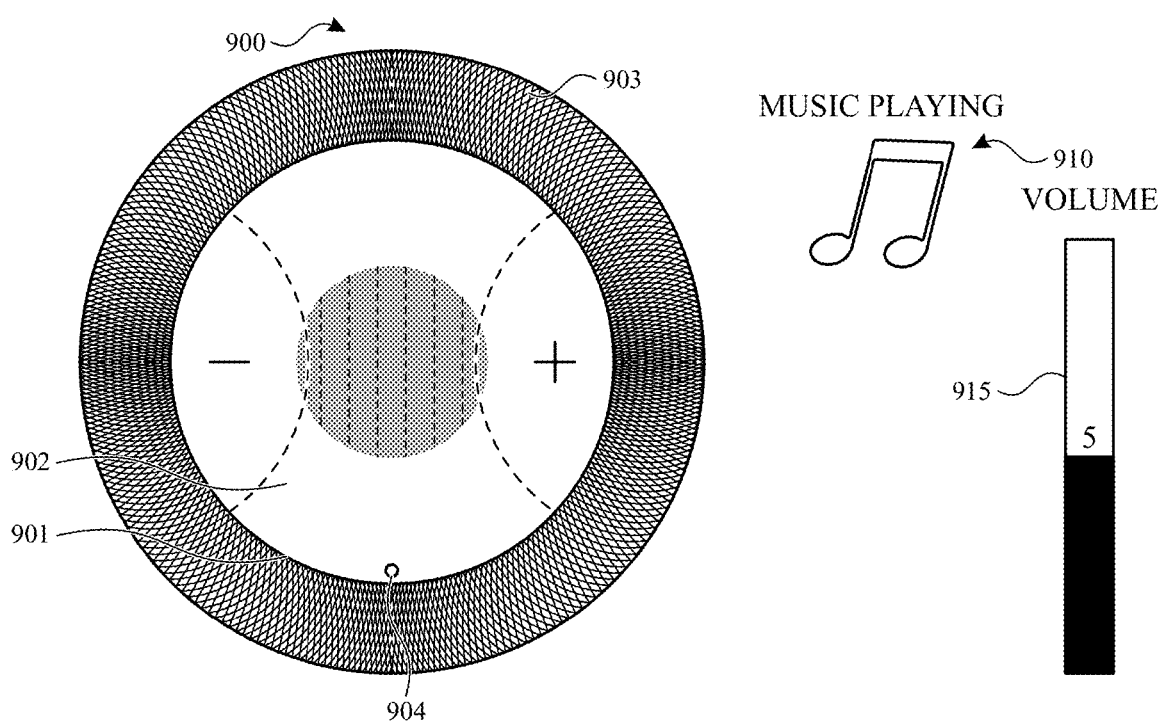
Figure 9L:
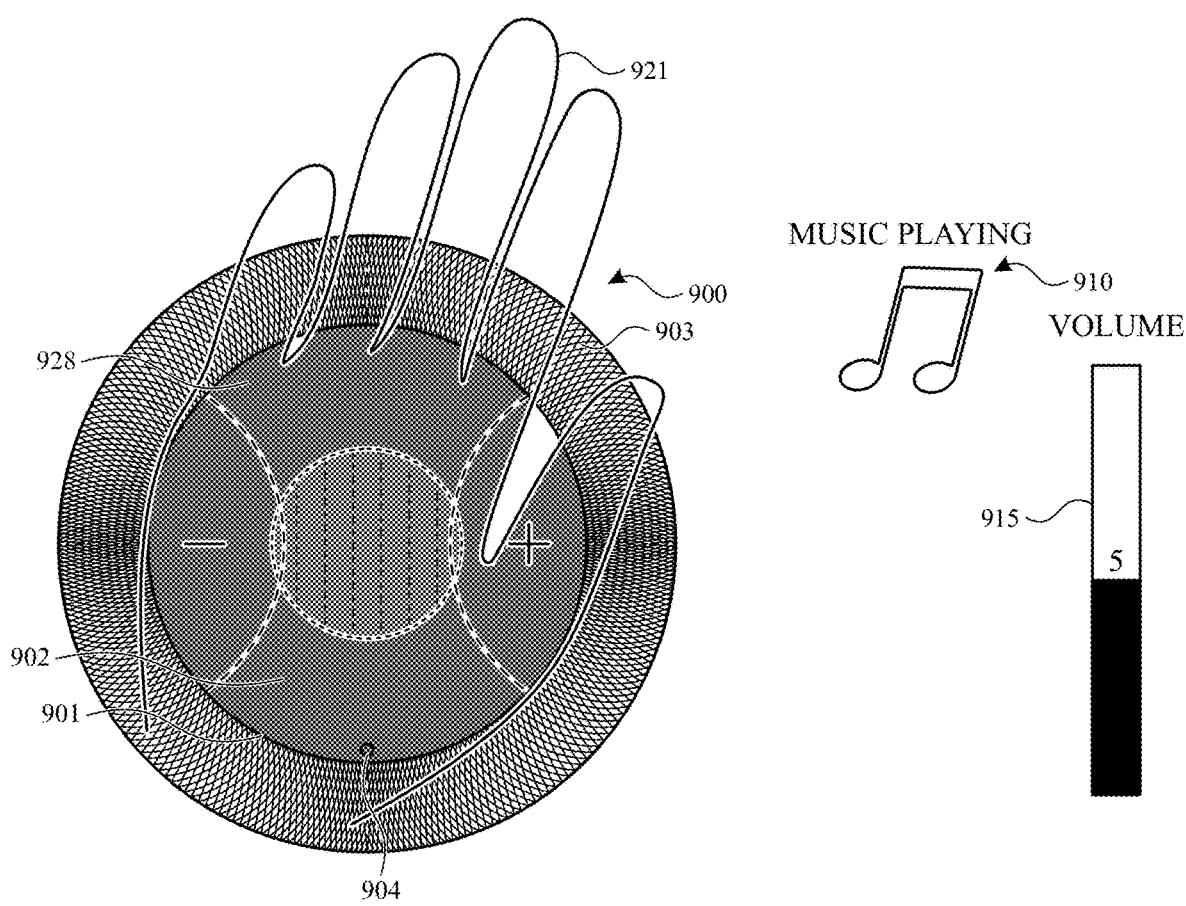
Figure 9M:
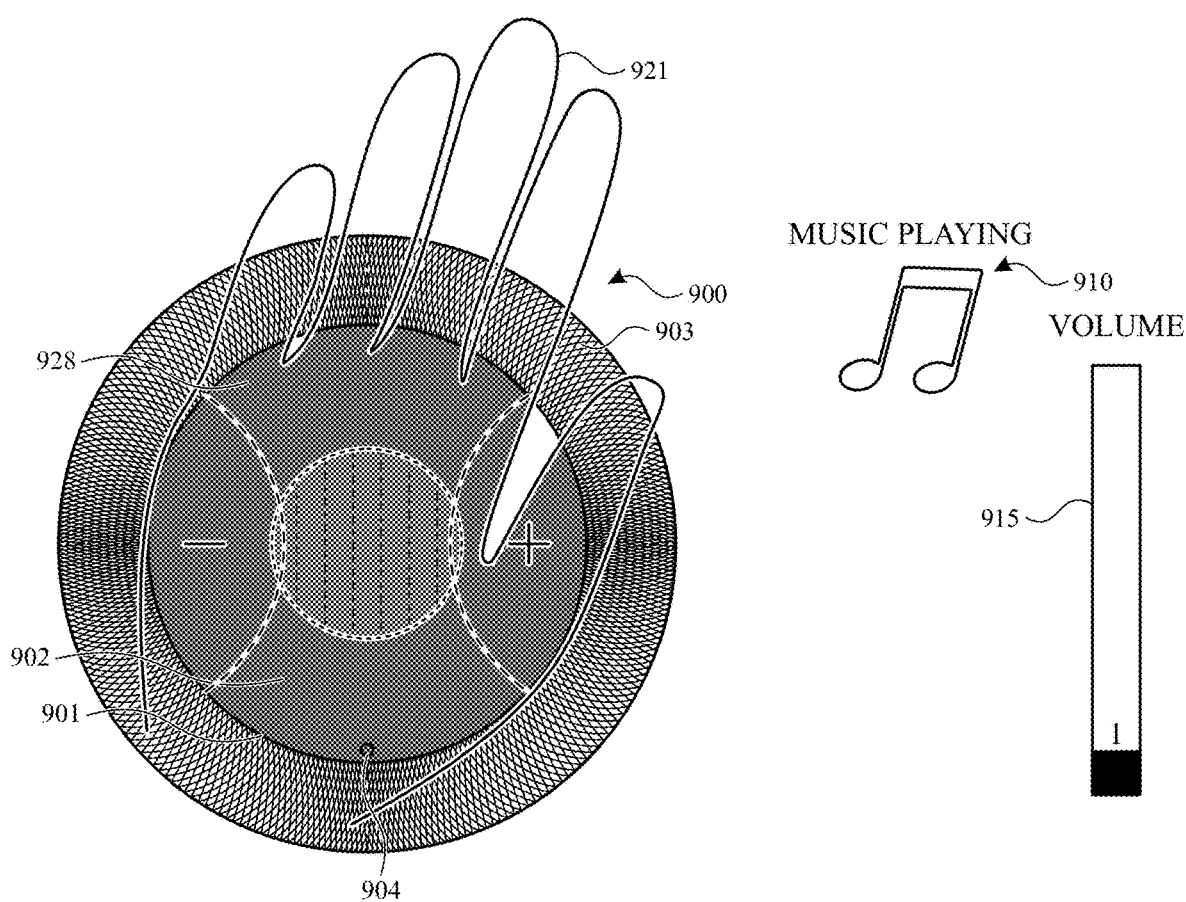
Figure 9R:
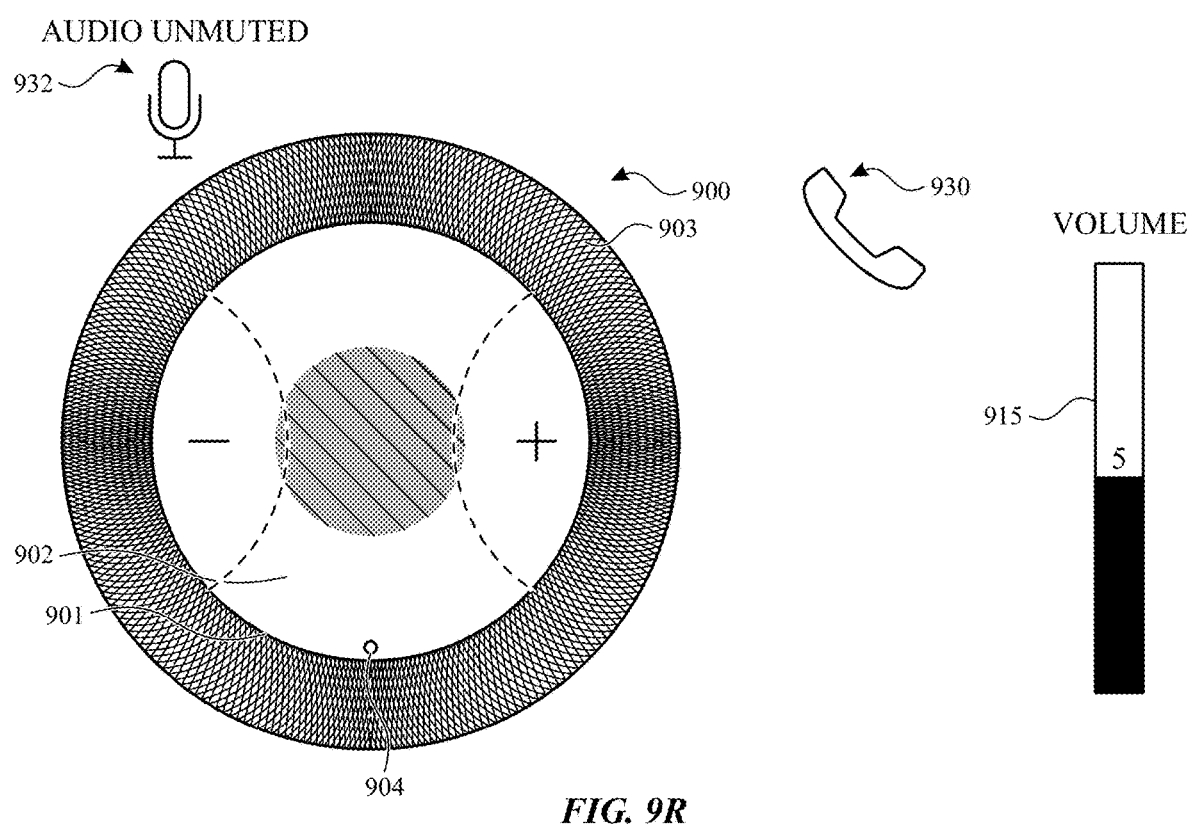
Figure 10:
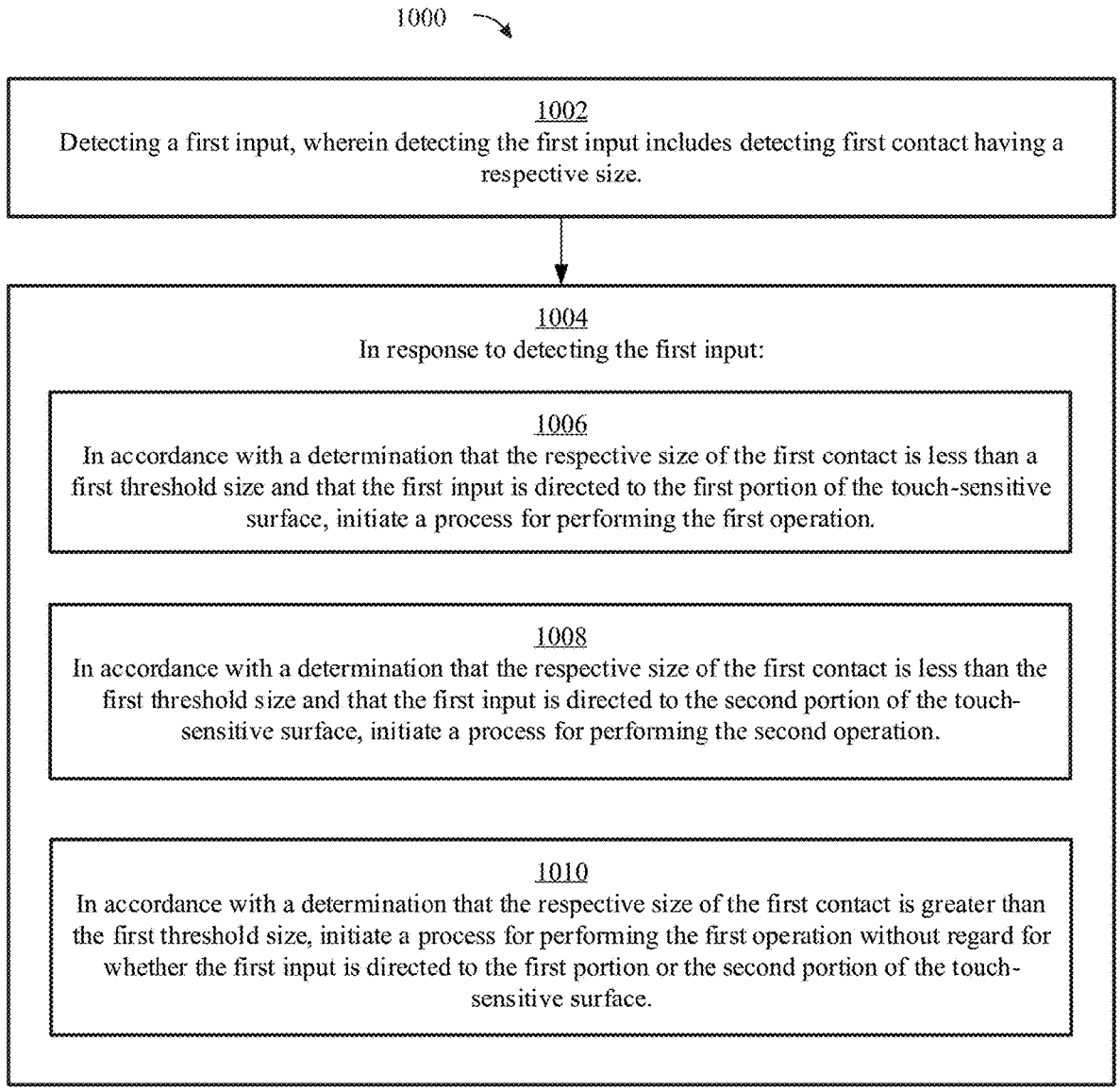
FIG. 10 is a flow diagram illustrating a method for managing media playback devices, in accordance with some embodiments.
Figure 11A:
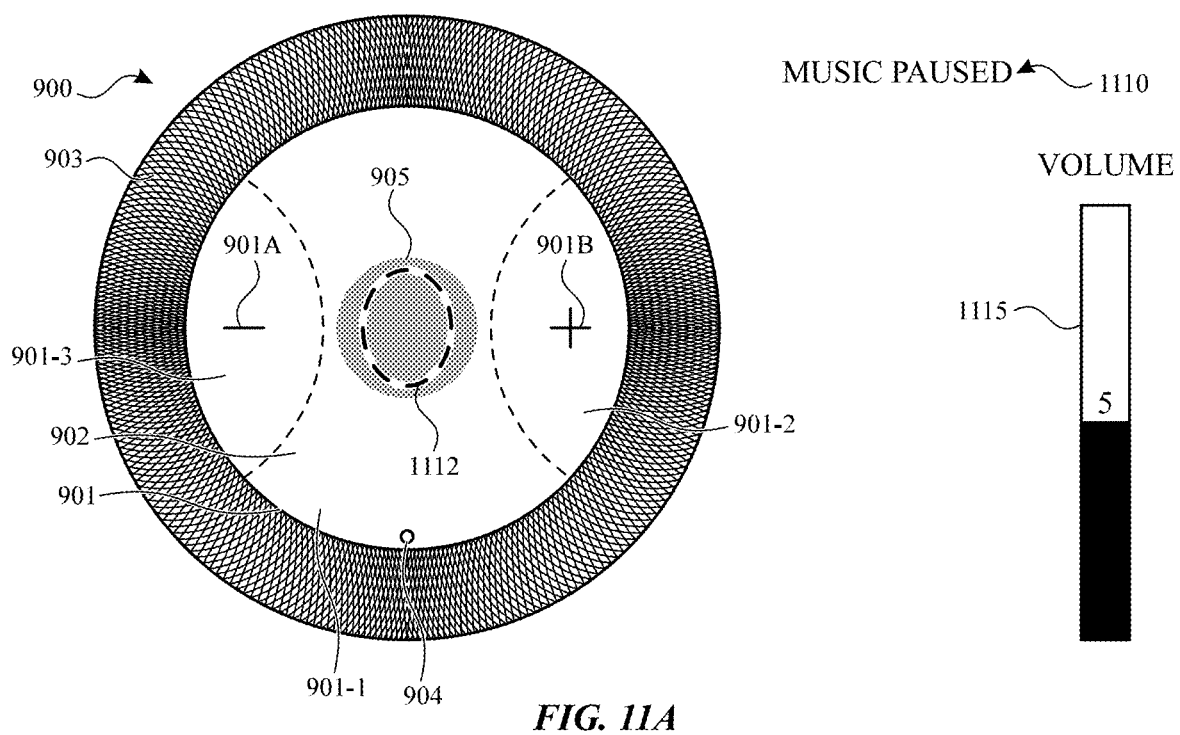
FIGS. 11A-11R illustrate exemplary embodiments for managing media playback devices, in accordance with some embodiments.
Figure 11B:
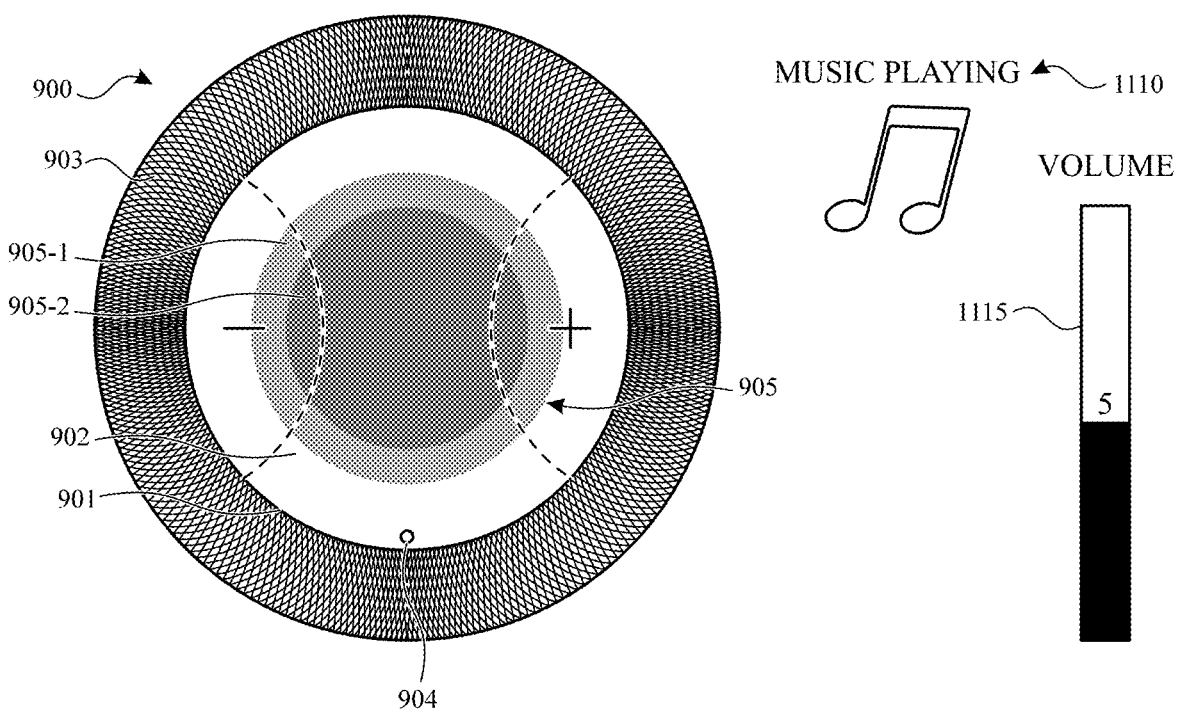

Below, FIGS. 1A-1B, 2, 3, 4A-4B, and 5A-5J provide a description of exemplary devices for performing the techniques for managing media playback devices. FIGS. 6A-6X illustrate exemplary user interfaces for managing media playback devices. FIGS. 7 and 8 are flow diagrams illustrating methods of managing media playback devices in accordance with some embodiments. The user interfaces in FIGS. 6A-6X are used to illustrate the processes described below, including the processes in FIGS. 7 and 8. FIGS. 9A-9R illustrate exemplary embodiments for managing media playback devices. FIG. 10 is a flow diagram illustrating methods of managing media playback devices in accordance with some embodiments. The embodiments in FIGS. 9A-9R are used to illustrate the processes described below, including the processes in FIG. 10. FIGS. 11A-11R illustrate exemplary embodiments for managing media playback devices. FIGS. 12A and 12B depict a flow diagram illustrating methods of managing media playback devices in accordance with some embodiments. The embodiments in FIGS. 11A-11R are used to illustrate the processes described below, including the processes in FIGS. 12A and 12B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
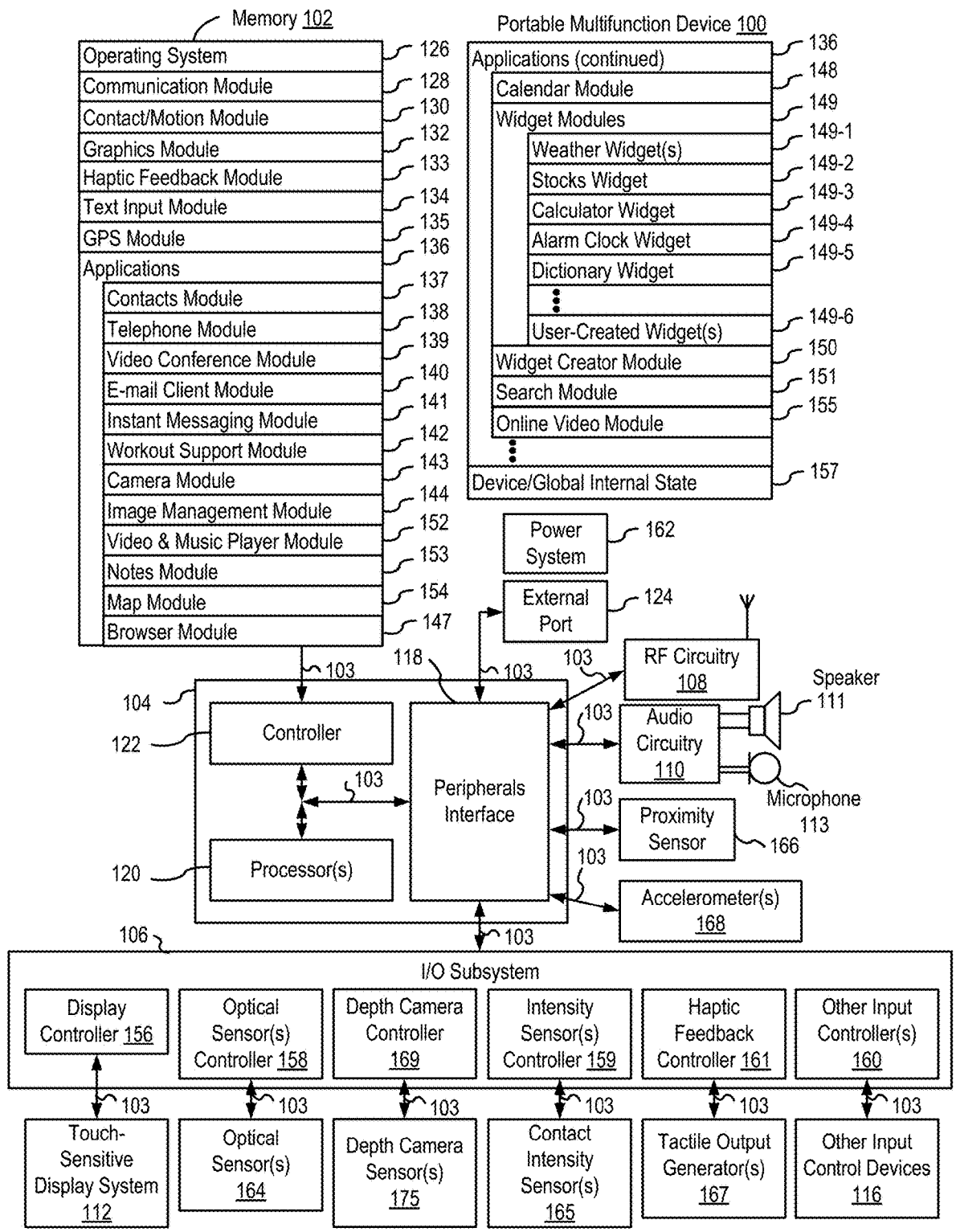
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
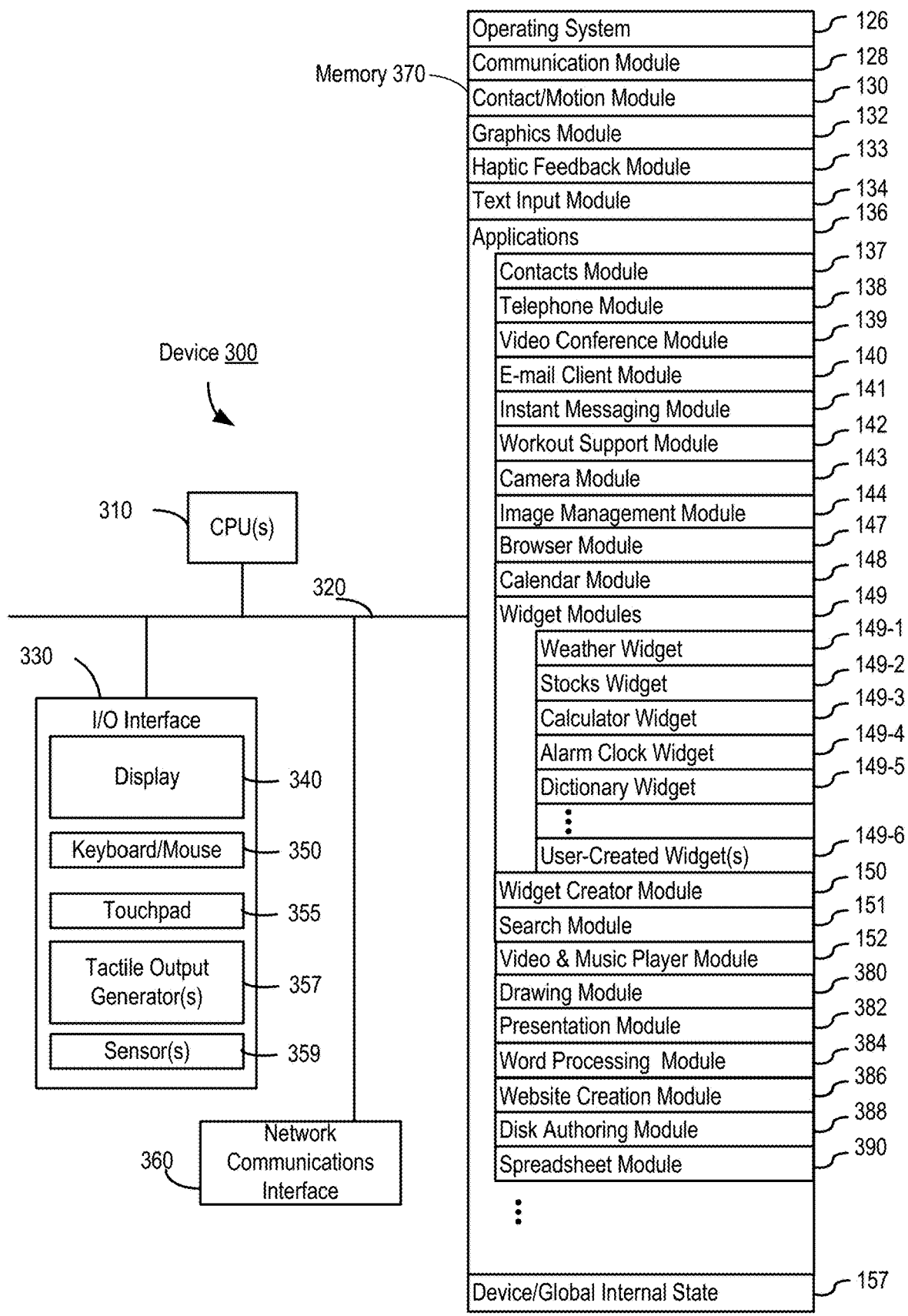
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
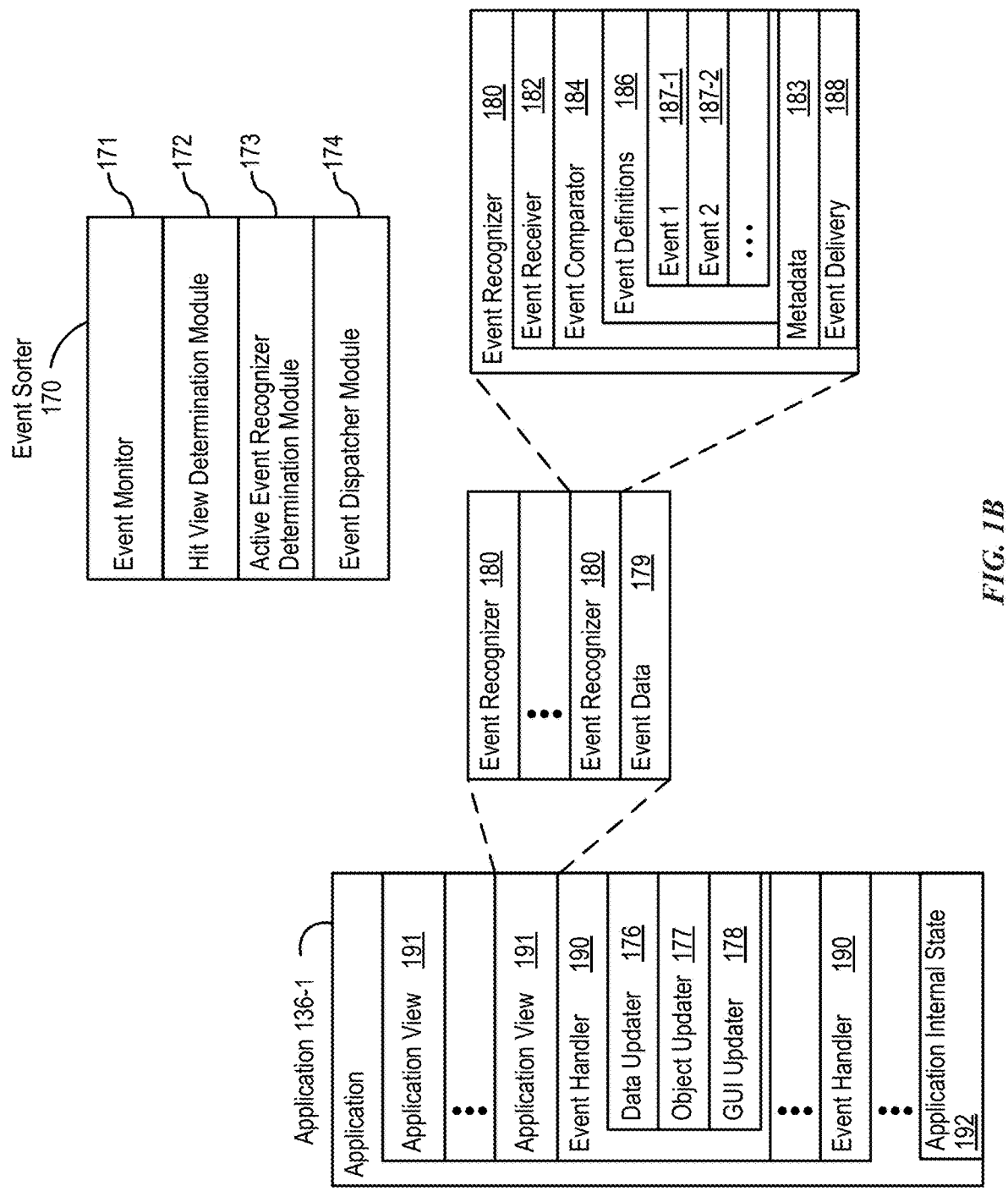
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
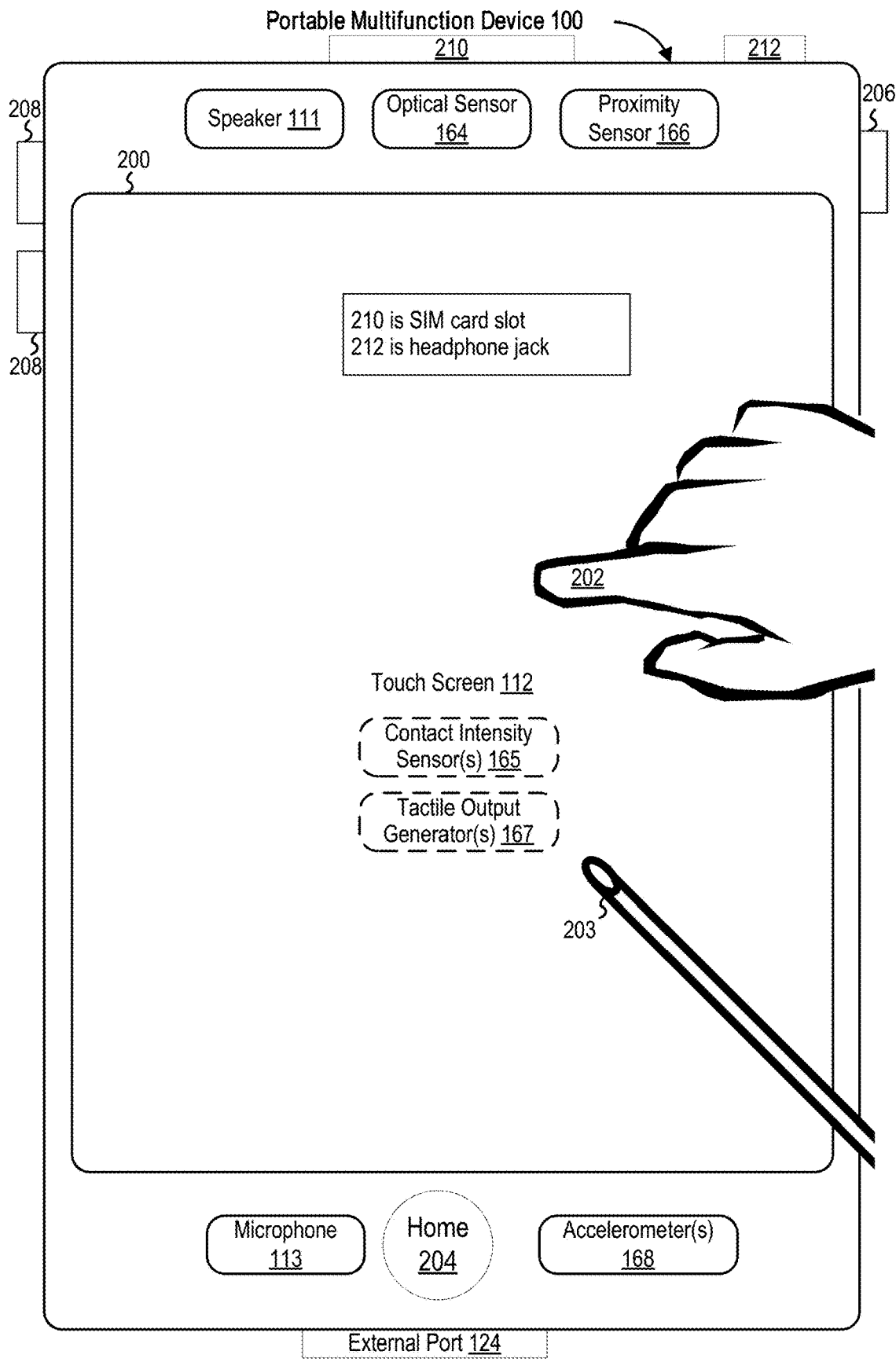
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
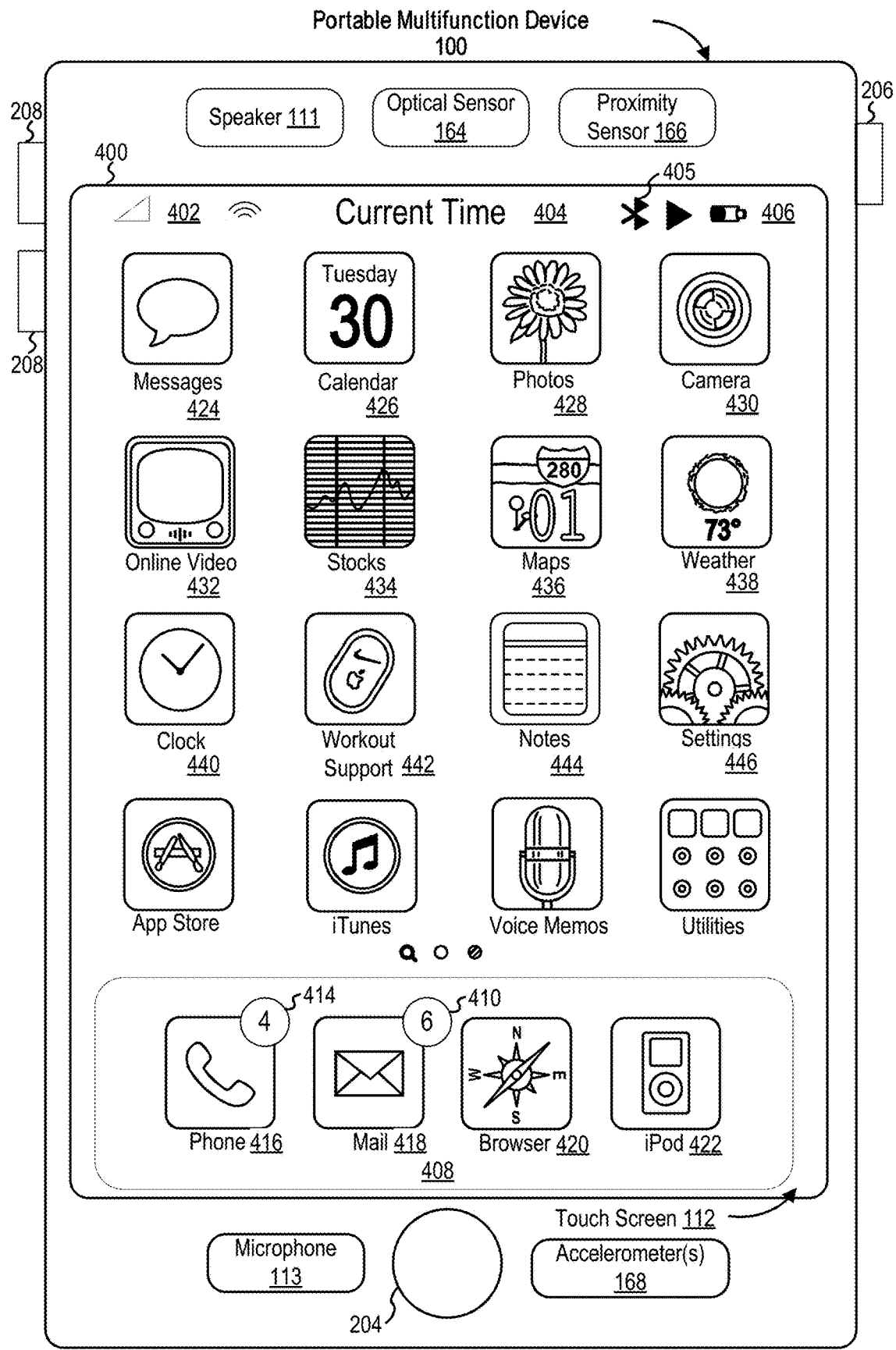
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
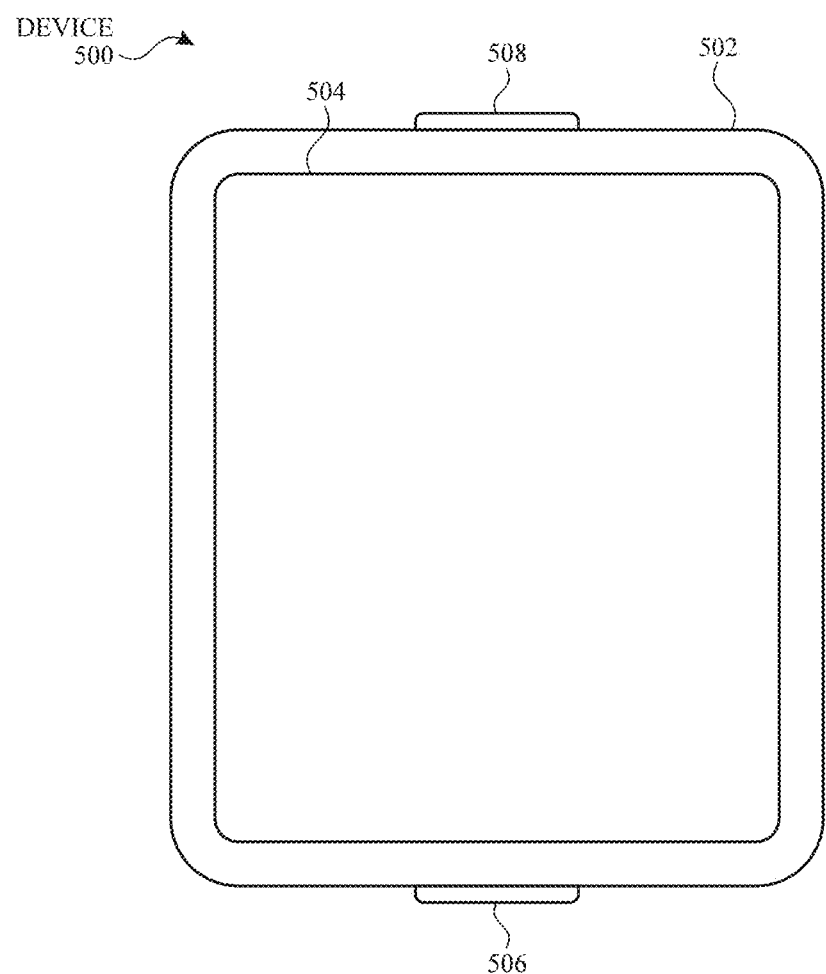
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
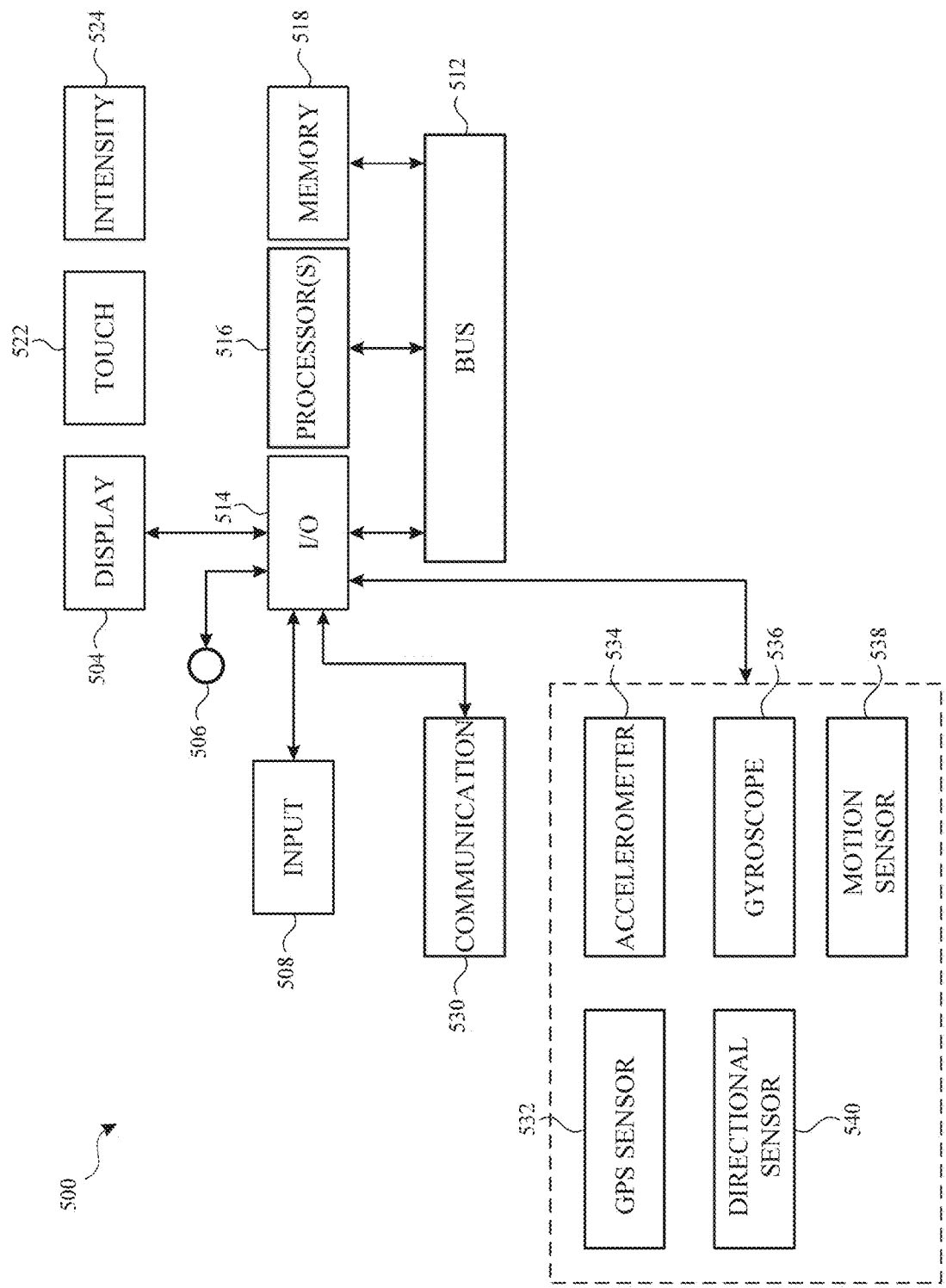
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, and 1200 (FIGS. 7, 8, 10, 12A, and 12B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
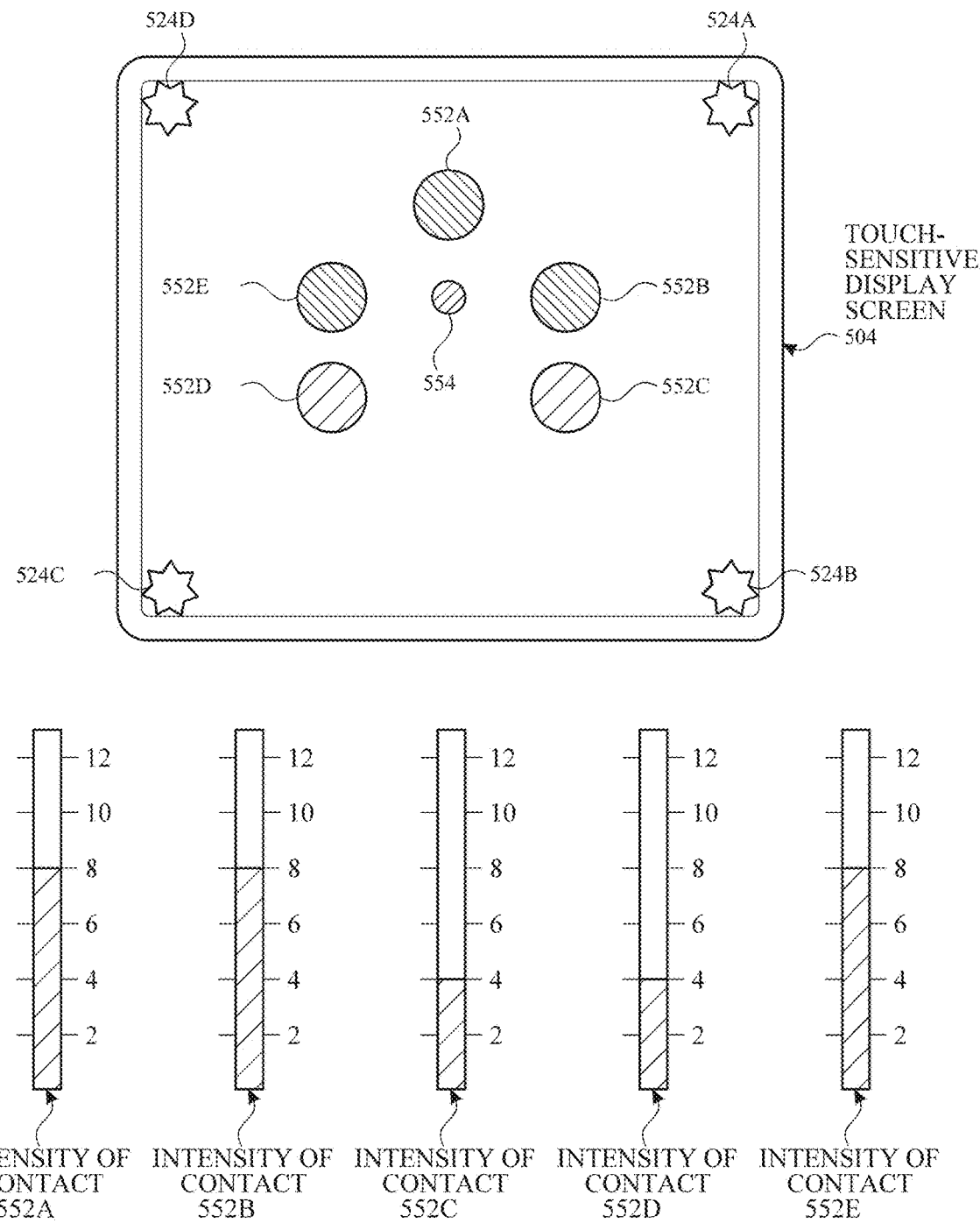
Figure 51:
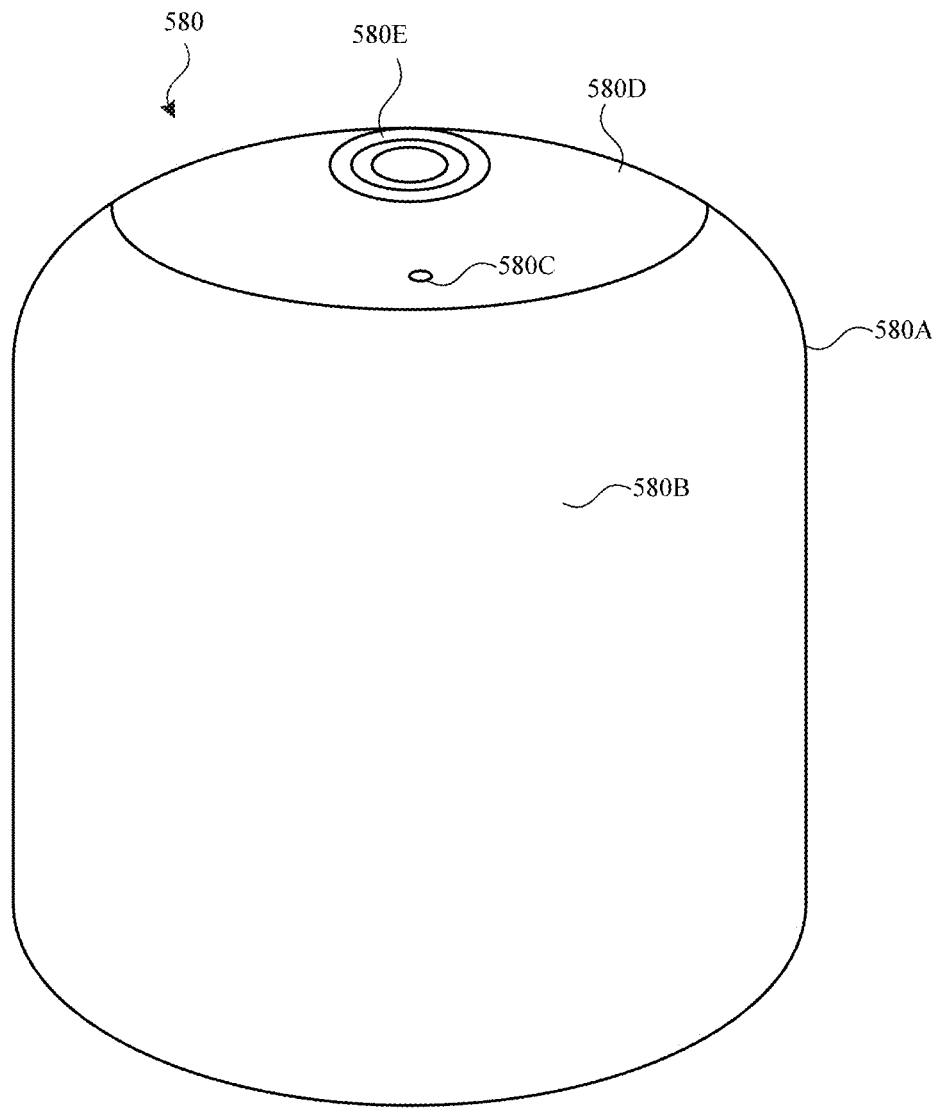

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 5I illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5J:
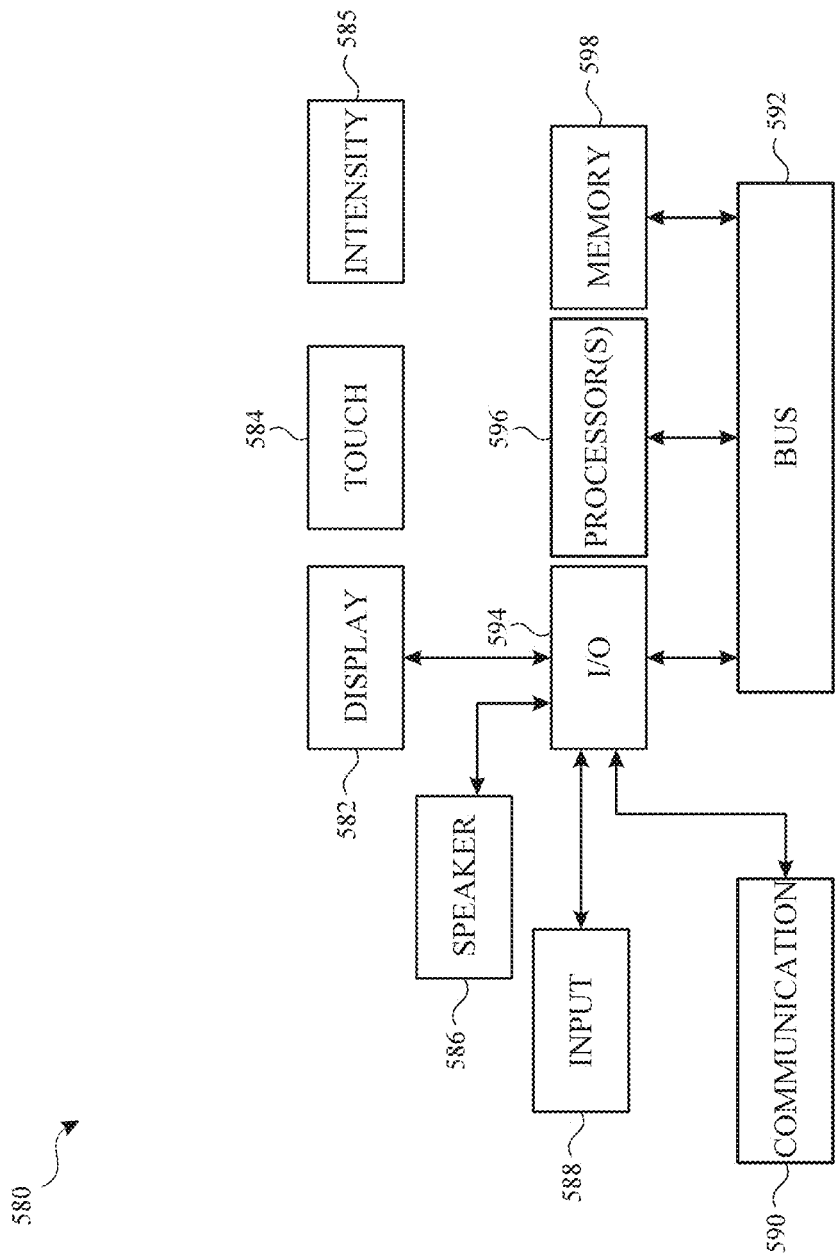
FIG. 5J is a block diagram illustrating an electronic device in accordance with some embodiments.

FIG. 5J depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including processes 700, 800, 1000, and 1200 (FIGS. 7, 8, 10, and 12). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5J, but can include other or additional components in multiple configurations.

Attention is now directed towards embodiments of user interfaces ("UI") and associated processes that are implemented on an electronic device, such as portable multifunction device 100, device 300, device 500, or device 580.

FIGS. 6A-6X illustrate exemplary user interfaces for managing media playback devices, in accordance with some embodiments. The user interfaces in these figures are used to illustrate the processes described below, including the processes in FIGS. 7 and 8.

FIGS. 6A-6X illustrate various embodiments depicting a position, location, and/or movement of device 600 relative to device 605, and responses at devices 600 and 605 based on the relative position/location/movement and various states of devices 600 and 605. The relative position/location/movement of the devices is depicted in diagram 610, which shows outer threshold distance 610-1 (also referred to herein as outer threshold 610-1) from device 605 and inner threshold distance 610-2 (also referred to herein as inner threshold 610-2) from device 605. In order to depict the location of device 600 relative to outer threshold 610-1 and inner threshold 610-2, the location of device 600 is represented by edge portion 600-1, which generally corresponds to the top corner(s) of device 600. In some embodiments, device 600 includes one or more features of device 100, device 300, and/or device 500, and device 605 includes one or more features of device 580. For example, device 600 includes display 601, and device 605 includes touch-sensitive surface 605-1 (similar to touch-sensitive surface 580D), one or more displays 605-2 (similar to display 580E), and one or more speakers 605-3 (similar to speakers 580B concealed in body 580A). In the embodiments illustrated in FIGS. 6A-6X, display 605-2 is generally distinguished from touch-sensitive surface 605-1 by the depiction of light (e.g., light 607). However, because the display may not be activated in all figures or, when activated, the light can vary in displayed size (as well as other characteristics such as brightness, intensity, color, pattern, movement, etc.), reference number 605-2 should be understood to refer generally to the display component of device 605. In some embodiments, the different colors of light 607 are represented by different hatch patterns, and the brightness of light 607 is represented by the shade of light 607 depicted in the figures. For example, darker shades of light 607 can represent brighter display of light, and lighter shades of light 607 can represent dimmer display of light.

In some embodiments, the figures depict indicators 602A, 602B, 604A, 604B, and 634B to indicate different audio outputs at each of the devices. For example, indicator 602A indicates a first song is being played (output) at device 600, and indicator 602B indicates the first song is being played at device 605. Similarly, indicator 604A indicates a second song, different from the first song, is being played at device 600, and indicator 604B indicates the second song is being played at device 605. Indicator 634B indicates communication audio is being output at device 605. The indicators are displayed having different sizes to represent the volume at which the respective audio is being output. In the embodiments depicted in FIGS. 6A-6X, the volume ranges from 1 to 5, with 1 being the lowest output volume, and 5 being the highest output volume. In some embodiments, a volume of 5 represents the current volume setting of the respective device, and volumes 1-4 represent volumes less than the current volume setting. The volumes are also indicated by a numeric value appended to the reference numbers in the figures. For example, reference number 602A-5 indicates the first song is being played at device 600 at volume 5 (e.g., full volume), whereas reference number 602A-1 indicates the first song is being played at device 600 at volume 1. Similar nomenclature is used in other instances where appropriate. When no indicator (e.g., 602A, 602B, 604A, 604B) is shown next to device 600 or device 605 in FIGS. 6A-6X, no audio is being output at the respective device.

Figure 6B:
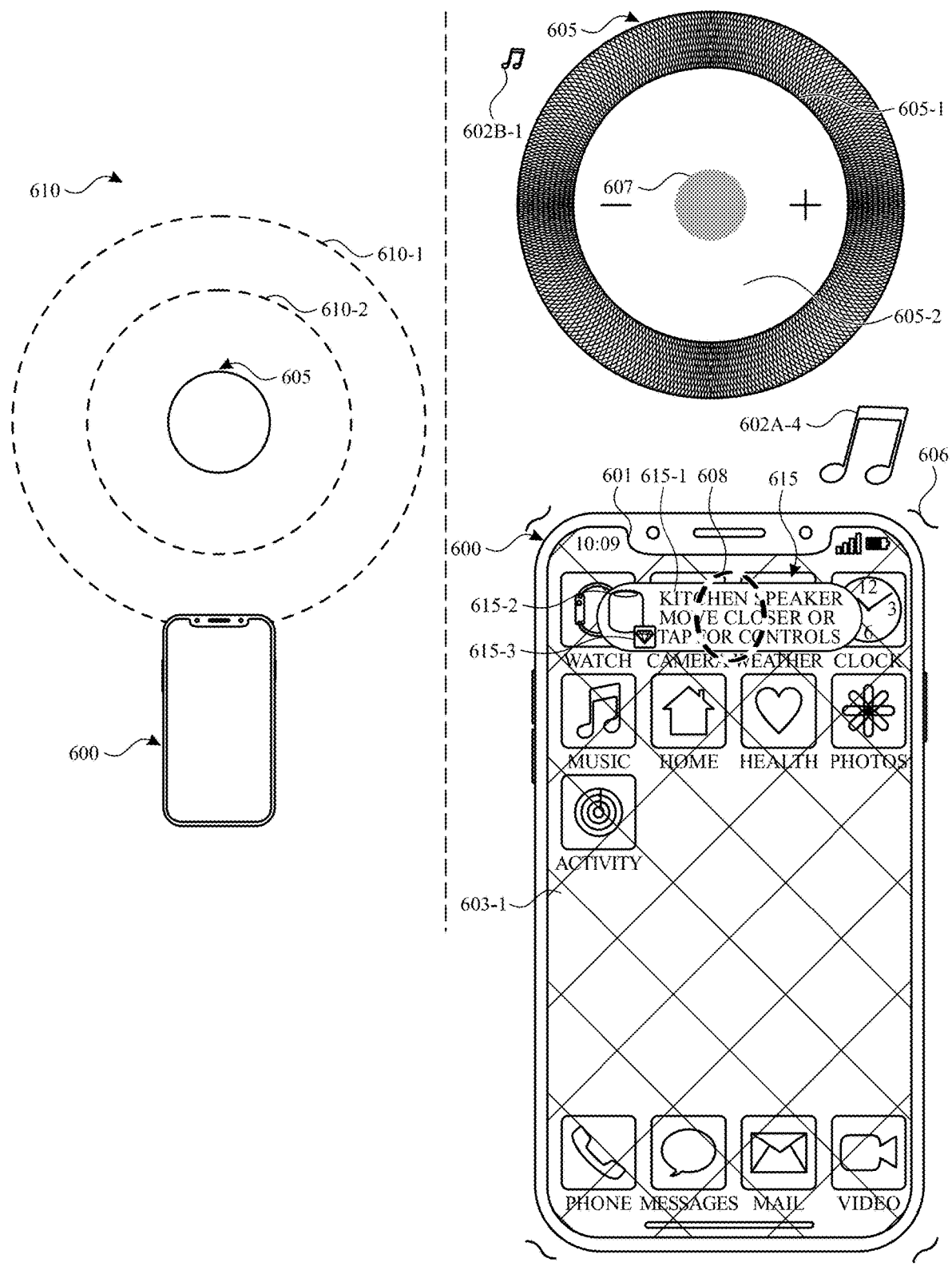
Figure 6C:
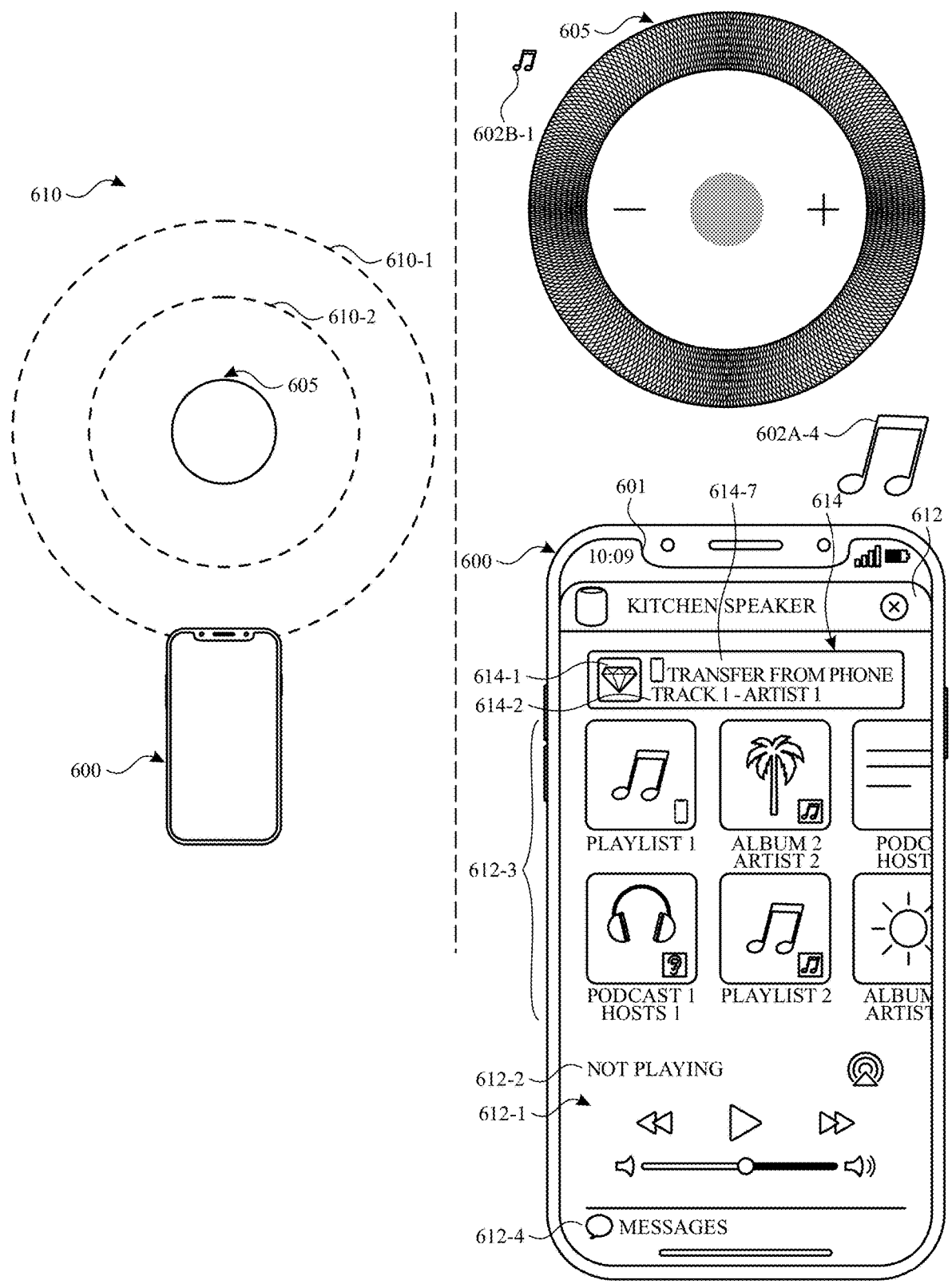

FIGS. 6A-6C depict an embodiment in which device 600 is playing audio while device 605 is not, and device 600 displays an interface for manually transferring audio playback from device 600 to device 605 (e.g., without automatically transferring the audio for playback at device 605) in response to entering outer threshold 610-1 and detecting touch inputs on display 601. In the embodiments discussed below, the audio at devices 600 and 605 is music. However, the audio can be other types of audio such as, for example, communication audio (e.g., audio from a phone call, a video communication session, a recording, etc.) or audio from other types of media playback (e.g., audio from a video game, movie).

In FIG. 6A, diagram 610 indicates that device 600 is positioned facing device 605 (device 600 is pointed toward device 605) and located outside outer threshold 610-1. Device 600 is currently playing the first song (e.g., via one or more speakers of device 600) at full volume, as indicated by indicator 602A-5, and is displaying home interface 603 on display 601. Device 605 is currently not outputting any audio or displaying any lights.

In FIG. 6B, diagram 610 indicates that device 600 has moved toward device 605, and is now positioned at outer threshold 610-1. In response to detecting device 600 at outer threshold 610-1, device 600 and device 605 begin to generate feedback to indicate that the song playing at device 600 can be transferred (e.g., handed off) for playback at device 605.

Device 600 provides tactile feedback by generating a slight tactile output 606, and generates visual feedback by displaying pill interface object 615 and beginning to blur 603-1 home interface 603 (the slight blurring is represented by large diamond hatching noted with reference 603-1). Device 600 also generates an audio feedback by reducing the volume of the first song, as depicted by indicator 602A-4. Pill interface object 615 (also referred to herein as pill 615) includes text 615-1 that identifies device 605 (identified in this example as "Kitchen Speaker") and provides instructions to a user of device 600 to move device 600 closer to device 605 or to tap pill 615 to display controls for device 605. Pill 615 also includes representation 615-2 of device 605 and representation 615-3 of the first song (e.g., album art) that is being played at device 600, which is the song that, in this example, is capable of being transferred to device 605.

Device 605 generates visual feedback by displaying light 607 (e.g., via display 605-2) and generates audio feedback by beginning to play the first song as depicted by indicator 602B-1. The output of the first song at device 605 is at a low volume and is in sync with playback of the first song at device 600, so that both device 600 and device 605 are playing the first song simultaneously, but at different volumes. In some embodiments, the audio feedback at device 605 is generated such that the first song, as outputted by device 605, has one or more audio characteristics (e.g., pitch, tone, frequency range) that approximate audio output by the audio hardware output of device 600. For example, the first song can be played at device 605 with audio characteristics that sound tinnier (e.g., having less bass, having a higher pitched frequency range) than the normal audio characteristics with which device 605 would playback the first song after transfer is complete (e.g., as described with respect to FIG. 6H) that mimics the quality of the audio generated at device 600. As discussed in greater detail below, the audio at device 605 blossoms to a fuller, richer sound (e.g., having more base, having a wider range of frequencies) when the first song is transferred for playback at device 605.

The feedback at devices 600 and 605 provides a cue to the user of device 600 that the first song can be transferred for playback at device 605, and provides instruction to the user to initiate the transfer of the song to device 605 by moving device 600 toward device 605 or by providing further input (e.g., touch input) at device 600. Although the first song is being output at device 605 as part of the audio feedback, playback of the first song has not transferred to device 605. In some embodiments, this is because device 600 still maintains control (e.g., primary control) of playback of the song. For example, device 600 controls whether the first song is playing, paused, stopped, or whether a different song is selected for playback. Additionally, if device 600 moves outside of outer threshold 610-1, the first song stops being played at device 605 and continues playing at full volume at device 600. In some embodiments, transfer is not complete until device 605 is playing back audio (e.g., the first song) without reference to the relative distance between device 600 and device 605. In some embodiments, transfer is not complete until device 600 is no longer outputting the audio that was transferred (e.g., no longer outputting audio feedback that includes playing back the audio (e.g., the first song)).

In some embodiments, device 605 initially pulses light 607 to a bright state with a large size when device 600 reaches outer threshold 610-1, and then slightly dims and shrinks the size of the light to the state depicted in FIG. 6B. In some embodiments, device 605 displays light 607 having a particular color, depending on the type of audio that is being prepared for transfer to device 605. For example, if the audio is communication audio, the light is green, or if the audio is music, the light is white. In some embodiments, when the audio begins to play at device 605, light 607 changes to a color that corresponds to the first song. For example, if the album art (e.g., representation 615-3) includes purple coloring, light 607 turns purple to correspond to the album art of the first song. In some embodiments, this transition to the colored light occurs as device 600 moves towards device 605, as discussed in greater detail below. In some embodiments, the different colors of light 607 are represented by different hatch patterns, and the brightness of light 607 is represented by the shade of light 607 depicted in the figures. For example, darker shades of light 607 can represent brighter display of light, and lighter shades of light 607 can represent dimmer display of light.

In FIG. 6B, device 600 detects input 608 (e.g., a tap input) on pill 615 and, in response, expands pill 615 to display controls interface 612, as shown in FIG. 6C.

In FIG. 6C, device 600 is still located at outer threshold 610-1. Device 600 continues to play the first song at a volume of 4, as depicted by indicator 602A-4, and device 605 continues to generate the audio feedback by playing the first song at a volume of 1, as depicted by indicator 602B-1, while continuing to display light 607. The first song is not yet transferred for playback at device 605, as discussed in greater detail below. Instead, playback of the first song continues to be performed at device 600, and controls interface 612 is displayed to provide the user of device 600 with the option to manually transfer playback of the first song from device 600 to device 605, or to perform a number of other options at device 605.

Controls interface 612 is a user interface that provides controls that can be used to control various operations using device 605. For example, controls interface 612 includes media playback controls 612-1, which can be selected to control the playback of audio at device 605. As shown in FIG. 6C, device 605 is currently not playing audio (other than the audio feedback represented by indicator 602B-1), and media playback controls 612-1 include controls to play or pause audio, controls to seek tracks for playback at device 605, and controls for adjusting a volume setting of device 605. Controls interface 612 also includes status 612-2 indicating that device 605 is not playing audio, and representations 612-3 of recommended songs that can be selected for playback at device 605. Controls interface 612 also includes message controls 612-4, for controlling messaging functions (e.g., composing, sending, and/or reading messages) using device 605.

Controls interface 612 also includes transfer affordance 614, which can be selected to immediately transfer playback of the first song from device 600 to device 605. As shown in FIG. 6C, transfer affordance 614 includes a representation 614-1 of the song to be transferred to device 605, text 614-2 identifying the song to be transferred, and text 614-3 indicating that the song is to be transferred from device 600. In some embodiments, device 600 displays controls interface 612 without transfer affordance 614 when neither device 600 nor device 605 are playing audio.

FIGS. 6D-6I depict an embodiment similar to that shown in FIGS. 6A-6C. However, instead of tapping pill 615 to display controls interface 612, FIGS. 6D-6I illustrate controls interface 612 automatically being displayed, and the first song automatically being transferred for playback at device 605, when device 600 reaches inner threshold 610-2. FIGS. 6D-6I also further demonstrate the dynamic feedback at devices 600 and 605 in response to moving device 600 toward and away from device 605.

Figure 6D:
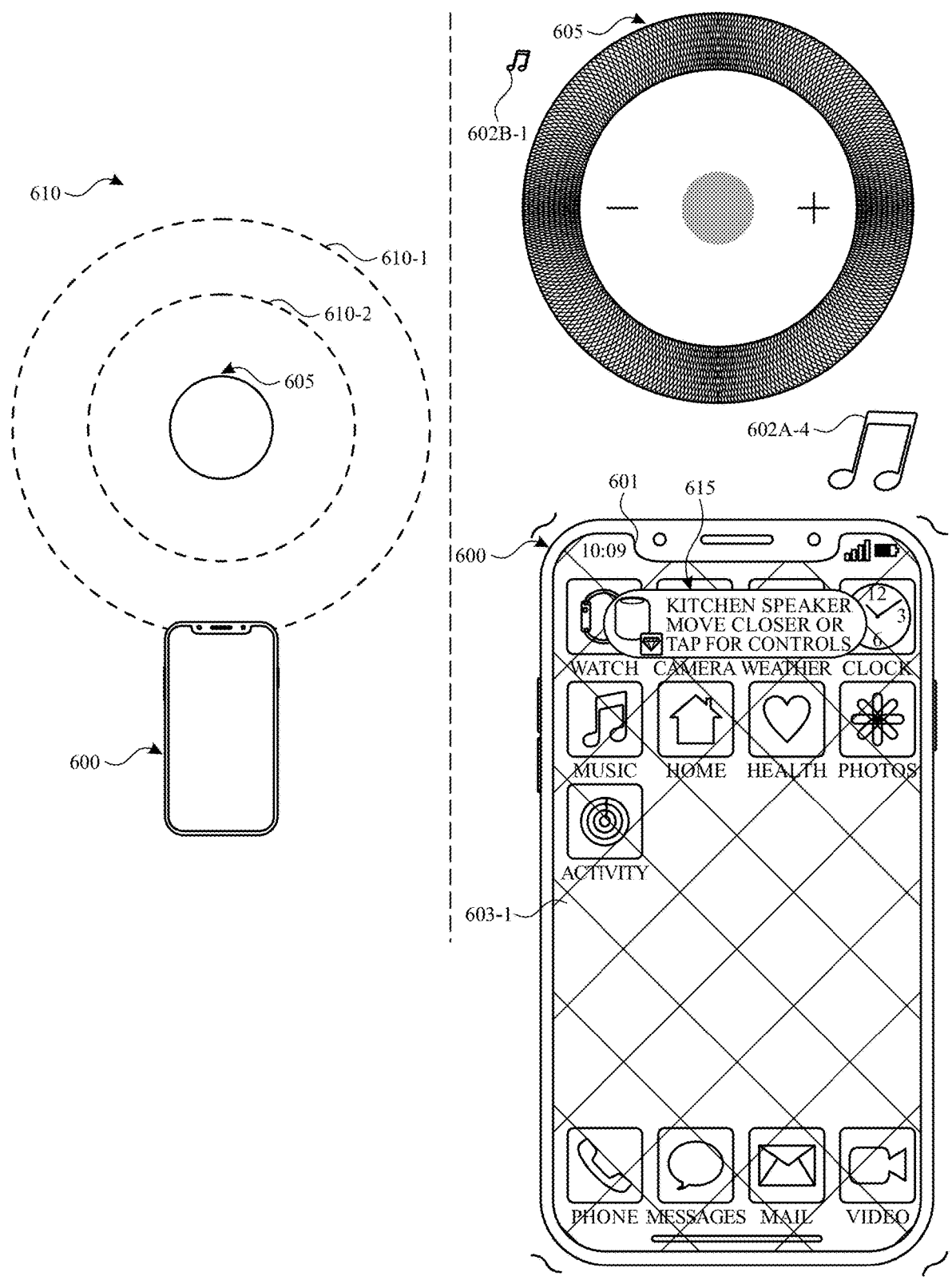

FIG. 6D is similar to FIG. 6B, where device 600 is shown at outer threshold 610-1, the visual, tactile, and audio feedback discussed above is generated at device 600 (including the display of pill 615), and the visual and audio feedback discussed above is generated at device 605.

Figure 6E:
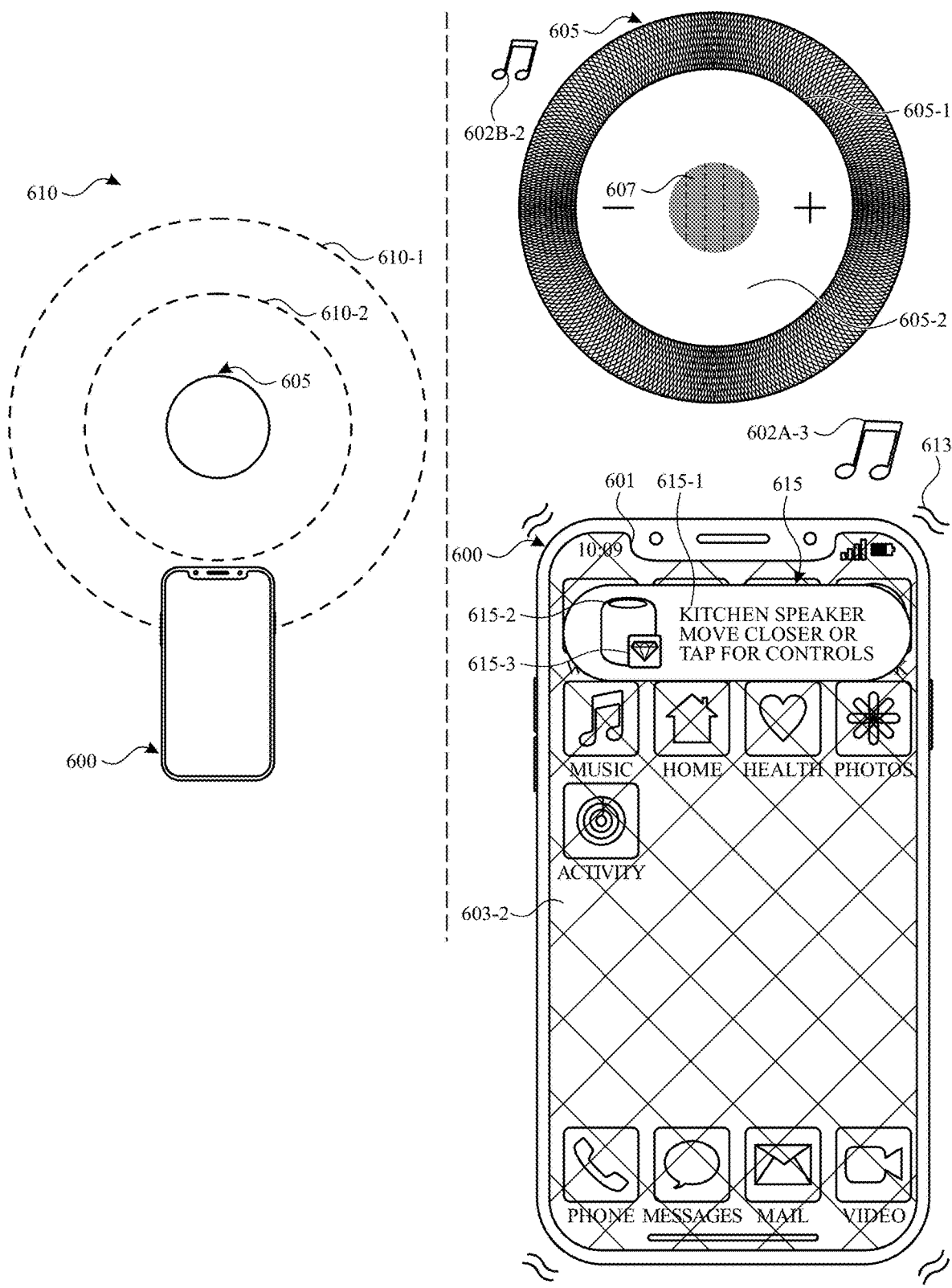

In FIG. 6E, device 600 moves closer to device 605, as depicted in diagram 610, without reaching inner threshold 610-2. In response to the movement of device 600 toward device 605, device 600 and device 605 vary their respective feedback to encourage continued movement of device 600 toward device 605 to complete the transfer of the first song from playback at device 600 to playback at device 605.

Specifically, device 600 varies the tactile feedback by generating stronger tactile output 613. In some embodiments, the tactile feedback varies based on the distance between device 600 and device 605. For example, as device 600 gets closer to device 605, the tactile outputs get stronger, and as device 600 moves away from device 605, the tactile outputs get weaker. In some embodiments, the tactile feedback varies based on the velocity and/or direction of movement of device 600 toward device 605. For example, if device 600 moves toward or away from device 605 slowly, the tactile feedback can include a series of disbursed, and optionally slight, tactile outputs as device 600 moves toward or away from device 605. Conversely, if device 600 moves toward or away from device 605 quickly, the tactile feedback can include a series of rapid, and optionally stronger, tactile outputs as device 600 moves toward or away from device 605. In some embodiments, as device 600 accelerates toward device 605, the tactile feedback can include a series of tactile outputs that increase in frequency and, optionally, strength as device 600 moves toward device 605. In some embodiments, the tactile output has characteristics that mimic the first song. For example, the tactile output has a pattern and, optionally, different magnitudes that imitate the beat of the first song.

Device 600 varies the audio feedback by decreasing the volume of the first song as depicted by indicator 602A-3. Device 600 varies the visual feedback by increasing the blur 603-2 of home interface 603 (the increased blur is represented by medium diamond hatching noted with reference 603-2) and increasing the size of pill 615, including increasing the sizes of text 615-1, representation 615-2, and representation 615-3. Additionally, device 600 displays representation 615-3 positioned closer to representation 615-2. Thus, as device 600 moves towards 605, the tactile output increases, the audio of the first song decreases, home interface 603 gets blurrier, pill 615 increases in size, and the album art for the first song moves toward the representation of device 605. The foregoing tactile, audio, and visual feedback actions individually, and collectively, provide feedback to the user indicating that playback of the first song will transfer from device 600, thereby encouraging the user to continue moving device 600 toward device 605 in order to transfer playback of the first song from device 600 to device 605.

Device 605 varies the audio feedback by increasing the volume of the first song as depicted by indicator 602B-2, and varies the visual feedback by increasing the size and brightness of light 607, and changing the color of light 607 to purple, as indicated by the hatch pattern of light 607. In some embodiments, as part of the feedback, device 605 animates light 607 while outputting the first song. For example, device 605 causes light 607 to change colors, flicker with the beat of the first song, and/or have an appearance of moving on display 605-2. The foregoing visual and audio feedback actions individually, and collectively, provide feedback to the user that the first audio will be played at device 605, thereby encouraging the user to continue moving device 600 toward device 605 in order to transfer playback of the first song to device 605.

Figure 6F:
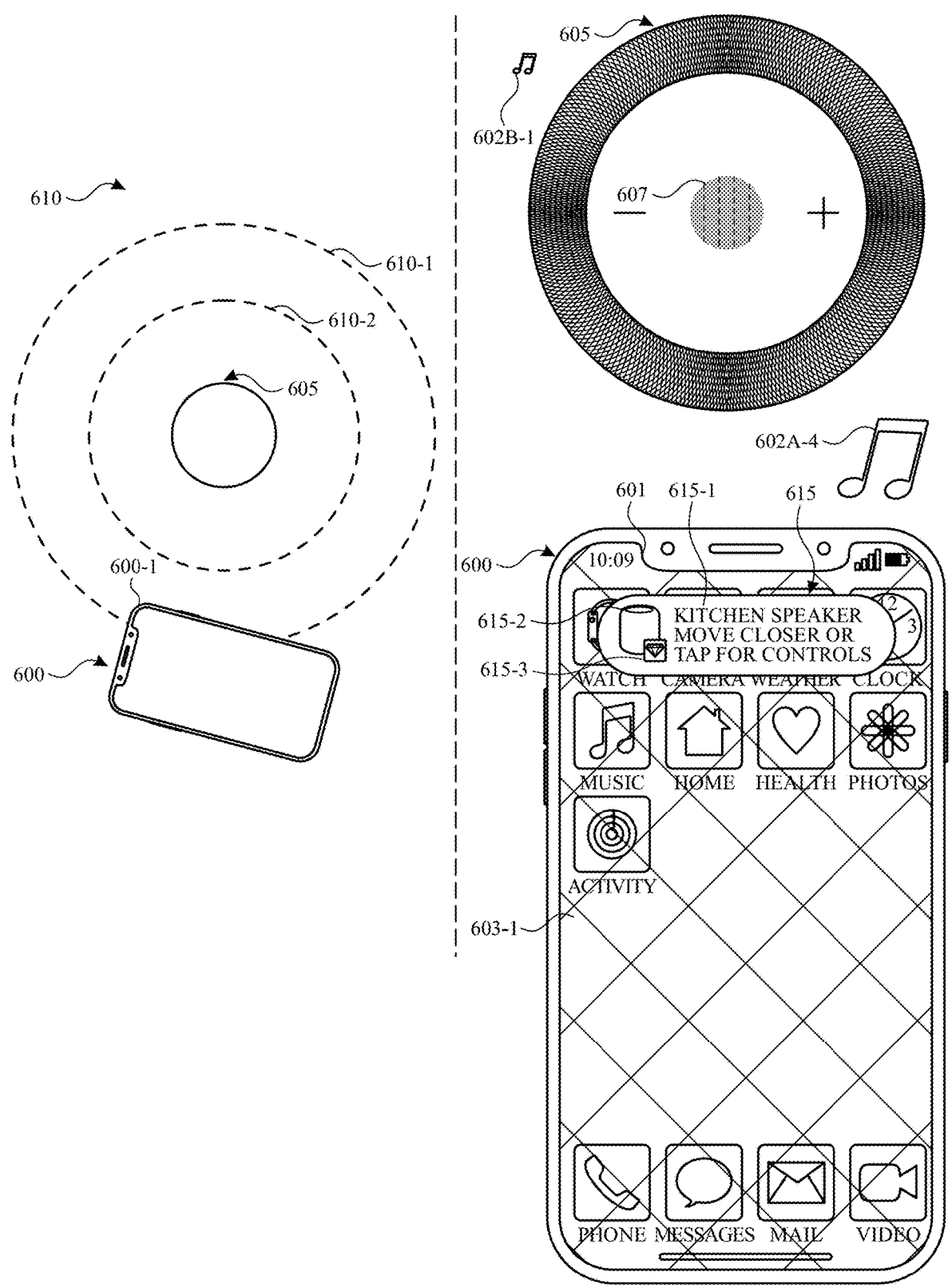

In FIG. 6F, device 600 has moved back away from, and is no longer facing, device 605, while remaining between outer threshold 610-1 and inner threshold 610-2. In response, device 600 and device 605 vary their respective feedback to indicate that device 600 is no longer moving in the direction to effect the transfer of the first song from playing at device 600 to playing at device 605. For example, device 600 partially reverses the prior feedback changes by increasing the volume of the first song, as depicted by indicator 602A-4, and decreasing the blur of home interface 603, reducing the size of pill 615, including text 615-1 and representations 615-2 and 615-3, and moving representation 615-3 away from representation 615-2. Because device 600 is slightly past outer threshold 610-1, pill 615 is smaller than depicted in FIG. 6E, but larger than depicted in FIG. 6D (when device 600 is at outer threshold 610-1). Accordingly, text 615-1 and representations 615-2 and 615-3 are slightly larger than depicted in FIG. 6D, and representation 615-3 is slightly closer to representation 615-2 than depicted in FIG. 6D.

In FIG. 6F, device 605 reverses the prior feedback changes by decreasing the volume of the first song, as depicted by indicator 602B-1, and decreasing the size, brightness, and purple hue of light 607.

In some embodiments, device 600 does not generate a tactile feedback depending on the context of device 600. For example, as shown in FIG. 6F, device 600 does not generate a tactile output because device 600 is not facing device 605. Device 600 may not generate a tactile output in other instances such as when device 600 is charging or stationary.

Referring now to FIGS. 6G-6I, device 600 is again facing device 605 and is now located at inner threshold 610-2, as depicted in diagram 610. As discussed in greater detail below, the feedback at device 600 and device 605 continues to vary (e.g., while device 600 is between outer threshold 610-1 and inner threshold 610-2) until device 600 reaches inner threshold 610-2, at which point, device 600 transfers playback of the first song to device 605 and devices 600 and 605 stop varying their respective feedback.

Figure 6G:
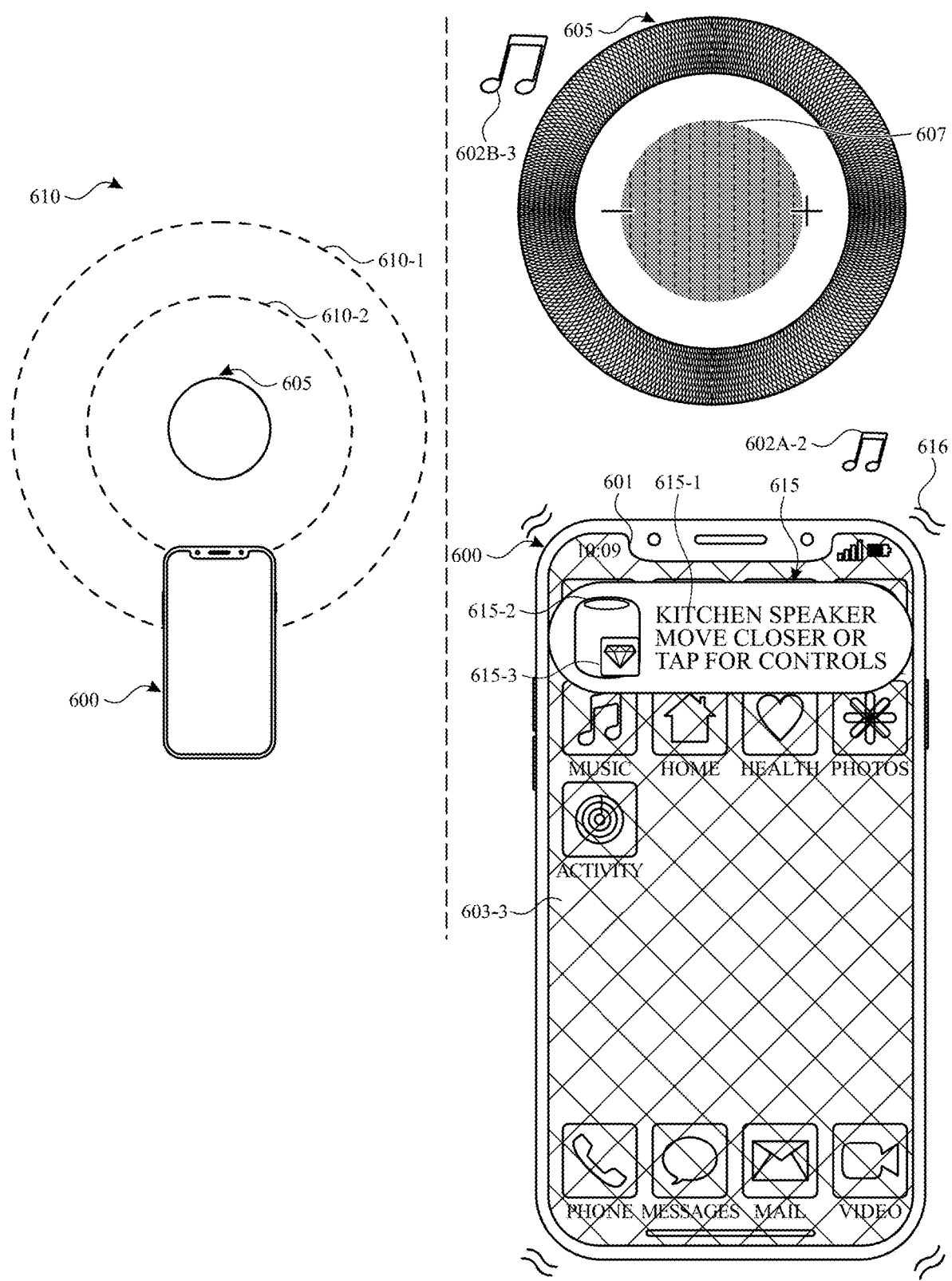

As device 600 moves toward device 605, device 600 generates visual feedback that includes increasing the blur 603-3 of home interface 603 (the increased blur is represented by small diamond hatching noted with reference 603-3), increasing the size of pill 615 (including text 615-1 and representations 615-2 and 615-3), and moving representation 615-3 toward representation 615-2, as shown in FIG. 6G. When device 600 reaches inner threshold 610-2, device 600 transfers playback of the first song to device 605 and displays pill 615 transitioning to controls interface 612, as shown in FIGS. 6H and 6I.

Figure 6H:
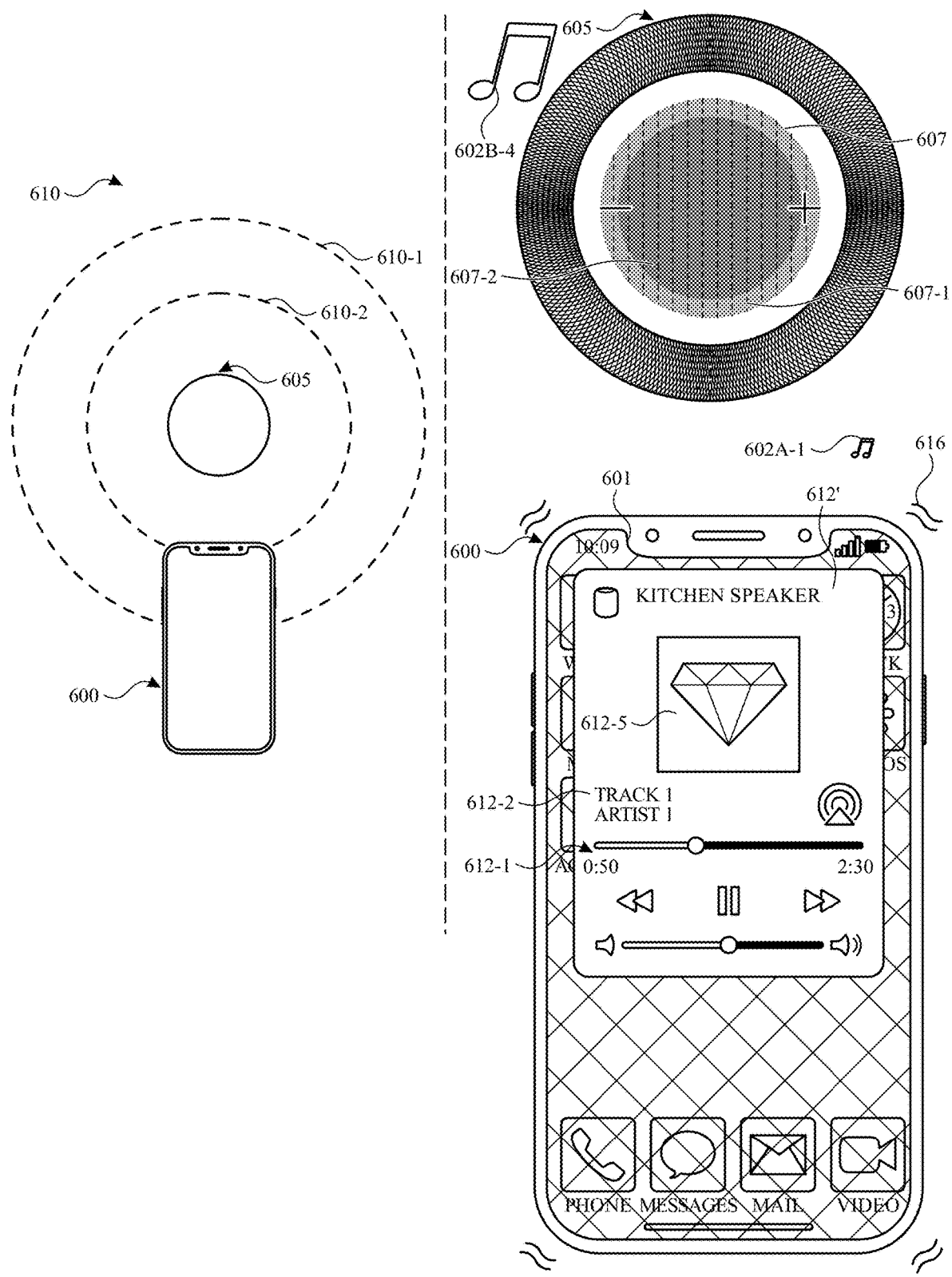
Figure 6I:
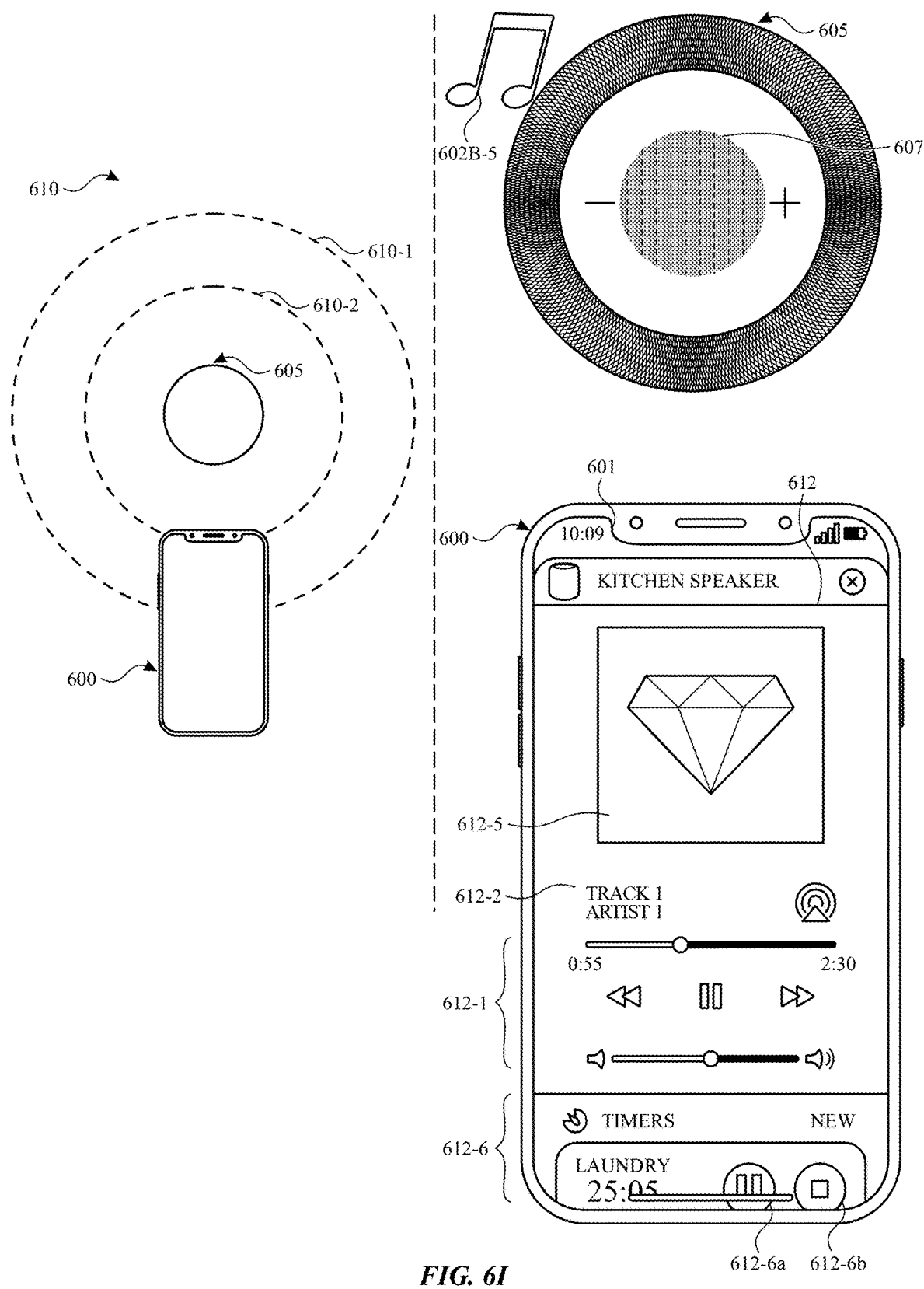

In FIG. 6H, device 600 displays controls interface in a transitory state (represented by reference number 612') as it fully expands from pill 615 in FIG. 6G to controls interface 612 in FIG. 6I. Controls interface 612' includes playback controls 612-1, status 612-2, and album art 612-5 for the song playing at device 605. In FIGS. 6H and 6I, status 612-2 and album art 612-5 indicate that the first song "Track 1, Artist 1" is now being played at device 605, and controls 612-1 include playback controls for controlling playback of the first song at device 605. In some embodiments, device 600 also generates tactile output 616 as pill 615 expands, as shown in FIGS. 6G and 6H.

In FIG. 6I, controls interface 612 is further expanded to include timer controls 612-6, which can be selected to control the function of timers at device 605. For example pause control 612-6a can be selected to pause a timer (e.g., "Laundry" timer) that is operating at device 605, and stop control 612-6b can be selected to stop the timer.

Referring again to FIG. 6G, device 605 generates visual feedback by increasing the size, brightness, and purple hue of lights 607, and generates audio feedback by increasing the volume of the first song, as depicted by indicator 602B-3. In the embodiment depicted in FIGS. 6G-6H, device 605 pulses light 607 when the audio is transferred to device 605 for playback. In FIG. 6H, light 607 is shown pulsing to have increased brightness, size, and purple hue during the media transfer. The pulse of light 607 is depicted in FIG. 6H (and similar figures) by outer portion 607-1 of light 607 and inner portion 607-2 of light 607, which represent a temporary increase in the size and, optionally, brightness of light 607. The increased size is depicted by the larger displayed region of light 607. The increased brightness is depicted by the darker shading of inner portion 607-2. Outer portion 607-1 has the same shade as light 607 in FIG. 6G, and inner portion 607-2 is depicted with a darker shade than outer portion 607-1, indicating that the inner portion of light 607 is brighter than outer portion 607-1 (and light 607 in FIG. 6G). In some embodiments, device 605 blinks light 607 in addition to, or in lieu of, the pulsing light 607. In FIG. 6I, light 607 is shown after the pulse and having a normal play state while device 605 plays the first song.

As previously discussed, as device 600 moves toward device 605, device 600 decreases the volume of the first song, and device 605 increases the volume of the first song. Upon reaching inner threshold 610-2, device 600 transfers playback of the first song to device 605. As part of this transfer, device 600 continues to decrease the volume of the first song, while device 605 continues to increase the volume of the first song, as depicted by indicator 602A-2 and indicator 602B-3, respectively. Additionally, during this transfer, the audio at device 605 changes from the tinny sound to a full, rich audio sound. These changes in volume continue as device 600 transfers playback of the first song to device 605, as shown in FIGS. 6G-6I. When playback of the first song is transferred to device 605, as shown in FIG. 6I, device 600 is no longer playing the first song, and device 605 is playing the first song at full volume, as depicted by indicator 602B-5.

Figure 6J:
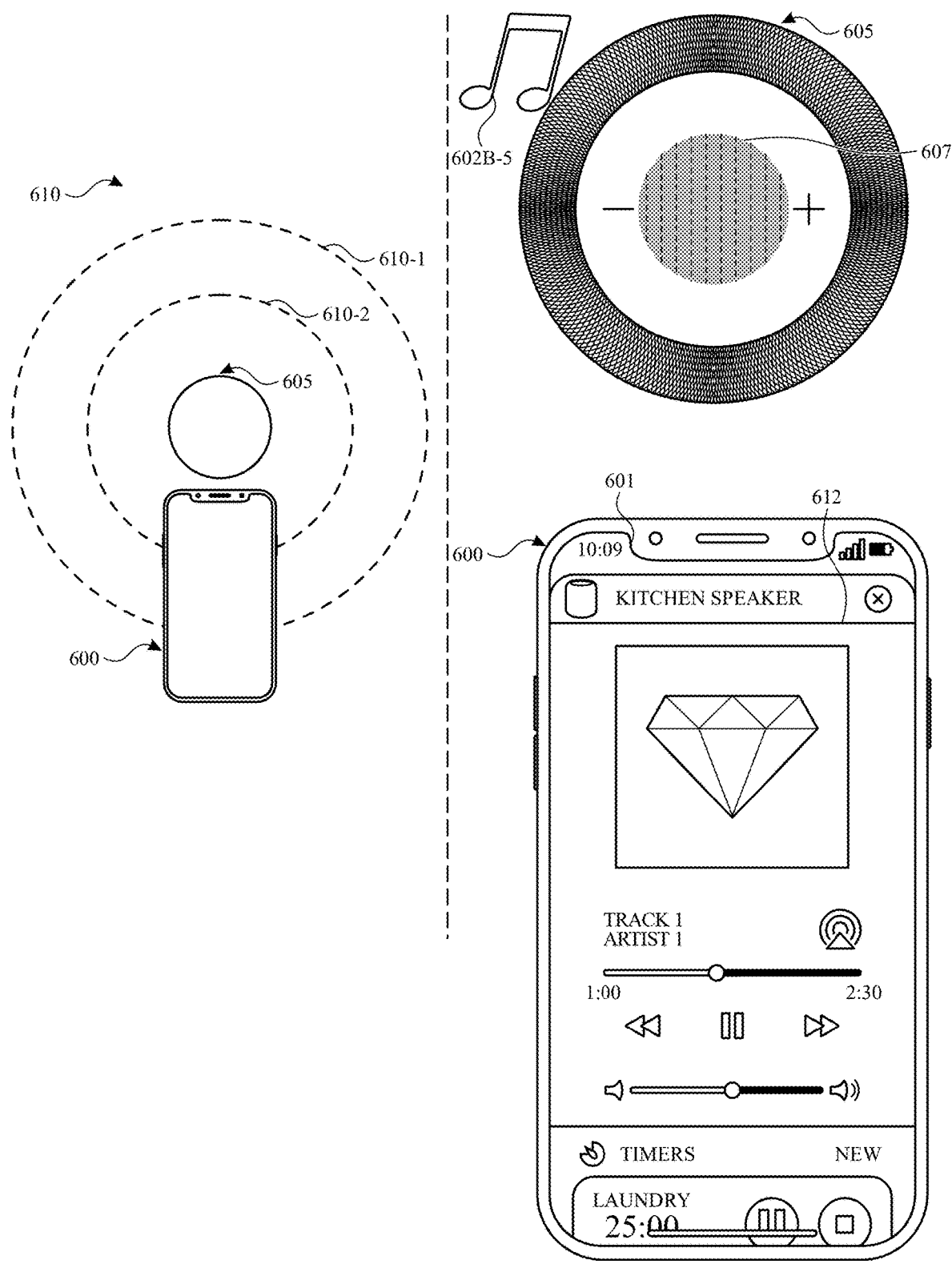
Figure 6K:
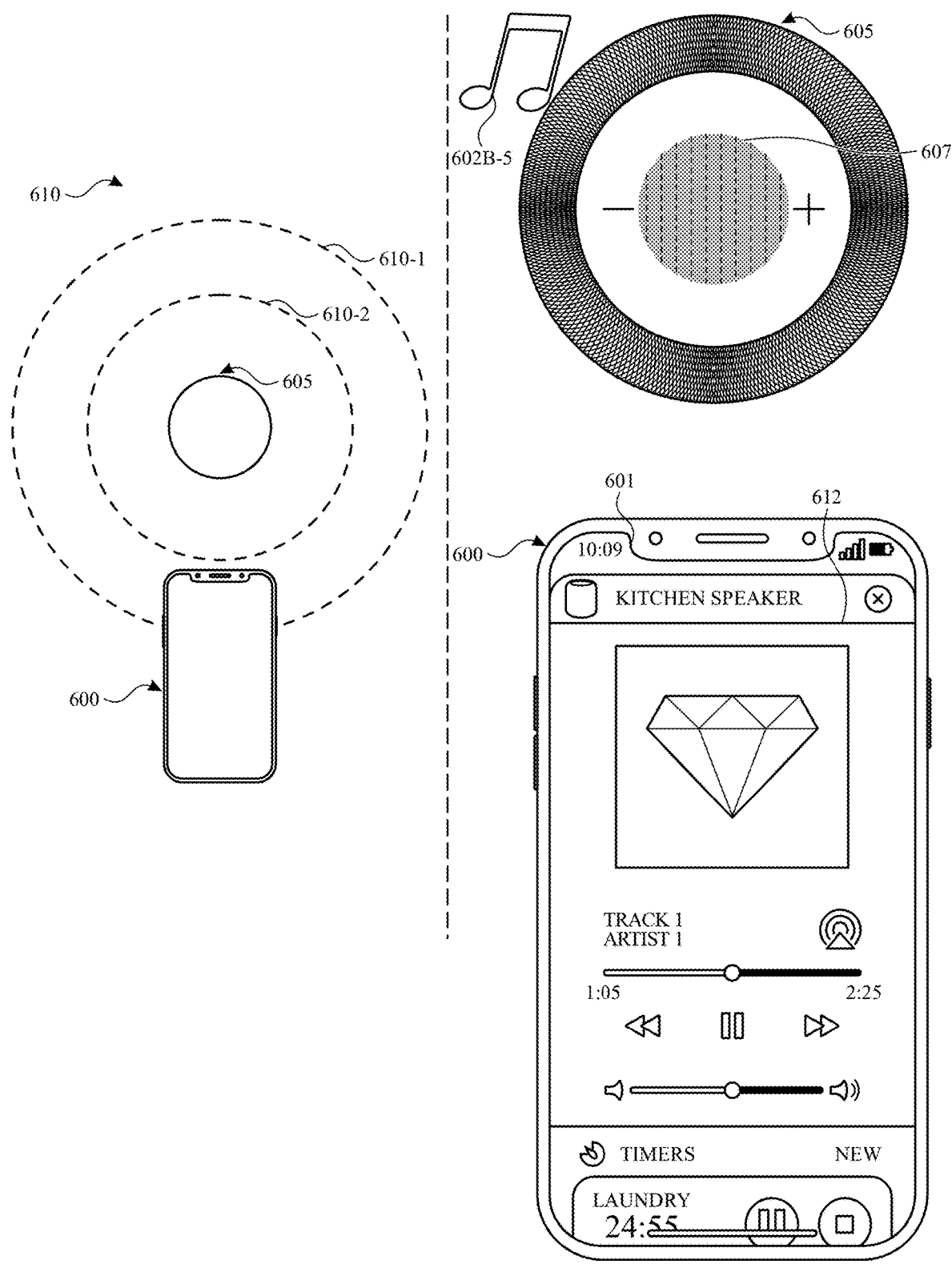
Figure 6L:
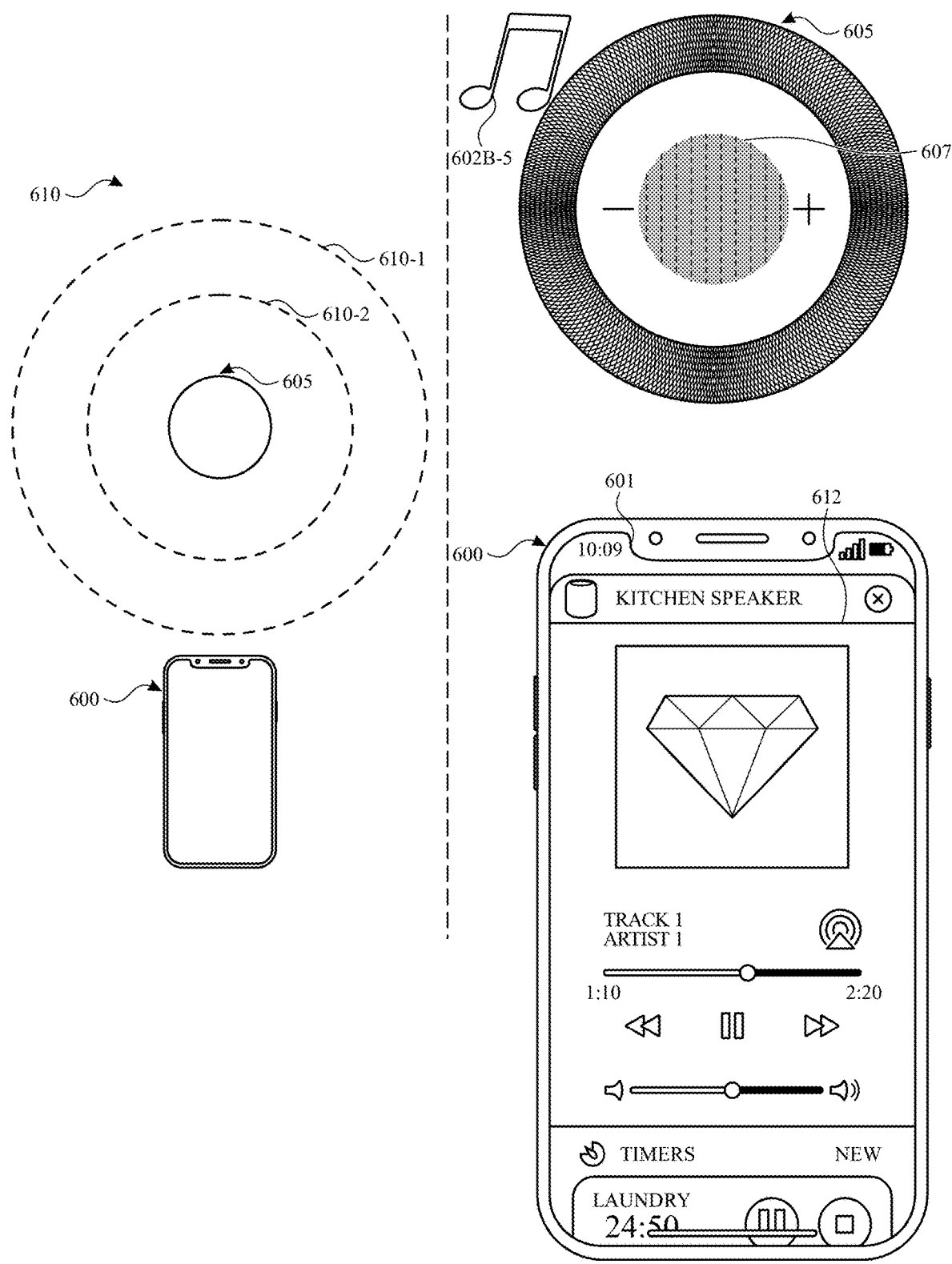
Figure 6M:
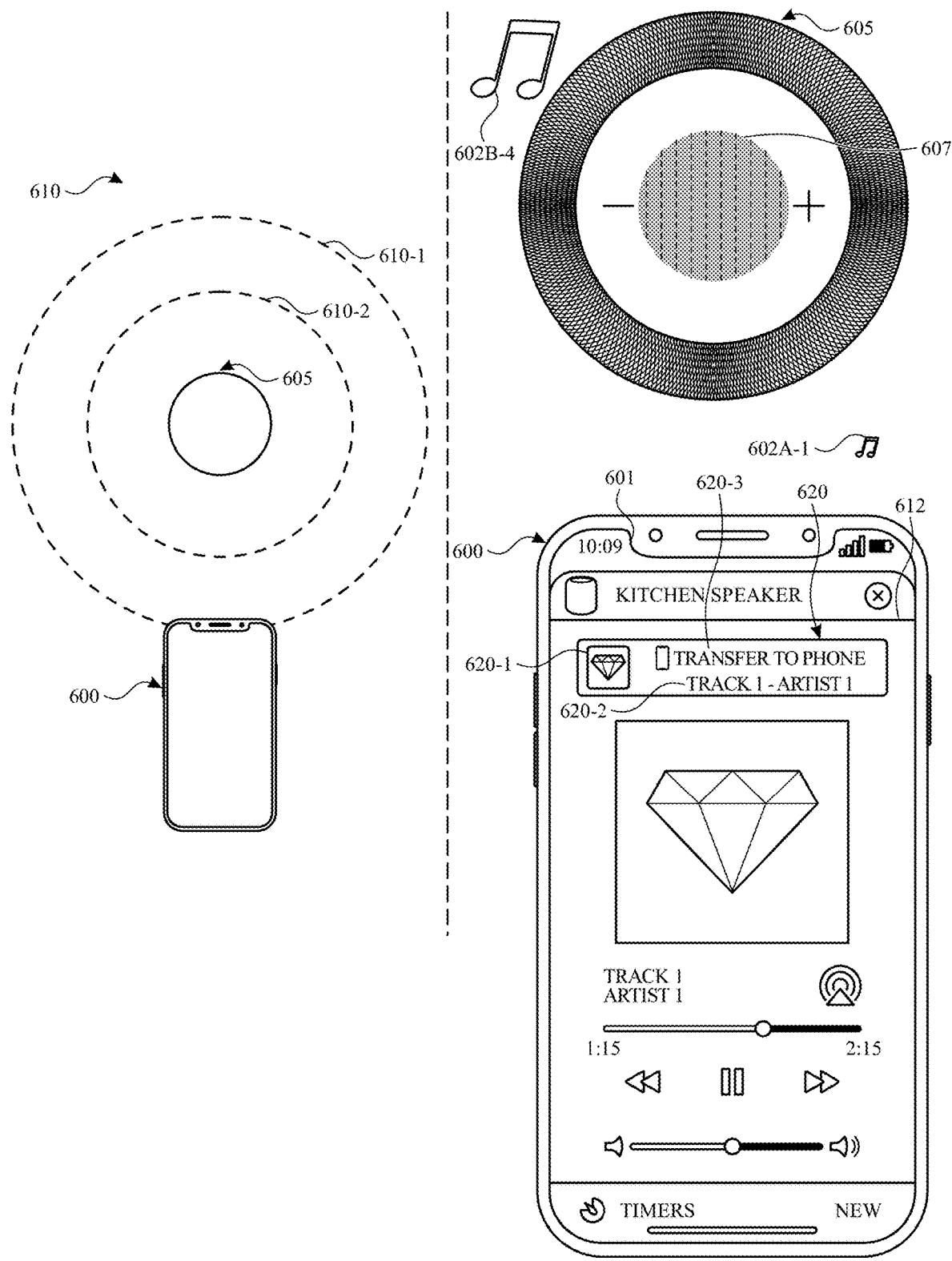

As depicted in FIGS. 6J-6M, device 600 and device 605 no longer vary feedback based on movement of device 600 relative to device 605 after the audio has been transferred to device 605. To re-enable the feedback, device 600 is moved beyond outer threshold 610-1, as depicted in FIG. 6M.

In FIG. 6J, device 600 is moved closer to device 605, as depicted in diagram 610. Device 600 continues to display controls interface 612 without generating any feedback based on the movement of device 600. Similarly, device 605 continues to play the first song without generating any feedback based on the movement of device 600. In some embodiments, device 605 animates light 607 with the playback of the first song, but this animation of light 607 is not based on the movement of device 600.

In FIG. 6K, device 600 is moved away from device 605, as depicted in diagram 610. Device is positioned between outer threshold 610-1 and inner threshold 610-2. Device continues to display controls interface 612 without generating any feedback based on the movement of device 600. Device 605 continues to play the first song without generating any feedback based on the movement of device 600.

In FIG. 6L, device 600 is moved away from device 605, as depicted in diagram 610. Device 600 is positioned outside of outer threshold 610-1. Device 600 continues to display controls interface 612 without generating any feedback based on the movement of device 600. Device 605 continues to play the first song without generating any feedback based on the movement of device 600. In some embodiments, when device 600 is moved outside a threshold distance of device 605 (e.g., inner threshold 610-2 or outer threshold 610-1), the audio stops playing at device 605, and resumes playing at device 600, depending on the type of audio. For example, in some embodiments, music continues to play at device 605, but communication audio stops playing at device 605 and continues playing at device 600.

In FIG. 6M, device 600 is moved toward device 605 and is now located at outer threshold 610-1, as depicted in diagram 610. In response to detecting device 600 re-entering outer threshold 610-1, device 600 and device 605 begin to vary feedback based on the movement of device 600 relative to device 605 and based on the respective states of devices 600 and 605.

For example, as illustrated in FIG. 6M, device 605 is currently playing the first song, and device 600 is not. When device 600 reaches outer threshold 610-1, device 600 and device 605 begin to generate feedback to indicate to the user of device 600 that continued movement of device 600 toward device 605, will cause the audio to transfer from device 605 to device 600. Accordingly, device 600 generates audio feedback by playing the first song at a low volume, as depicted by indicator 602A-1, and device 605 generates audio feedback by decreasing the volume of the first song, as depicted by indicator 602B-4. Additionally, device 600 generates visual feedback by displaying transfer affordance 620. Transfer affordance 620 is similar to transfer affordance 614, and can be selected to immediately transfer playback of the first song from device 605 to device 600.

As shown in FIG. 6M, transfer affordance includes a representation 620-1 of the song to be transferred to device 600, text 620-2 identifying the song to be transferred, and text 620-3 indicating that the song is to be transferred to device 600. In some embodiments, device 605 generates visual feedback by dimming, shrinking, and, optionally, reducing a purple hue of light 607. In some embodiments, in response to an input on transfer affordance 620, device 605 pulses light 607 and, after the audio is transferred to device 600, fades light 607 to an "off" setting.

FIGS. 6N-6W depict an embodiment in which both device 600 and device 605 are simultaneously playing different songs.

Figure 6N:
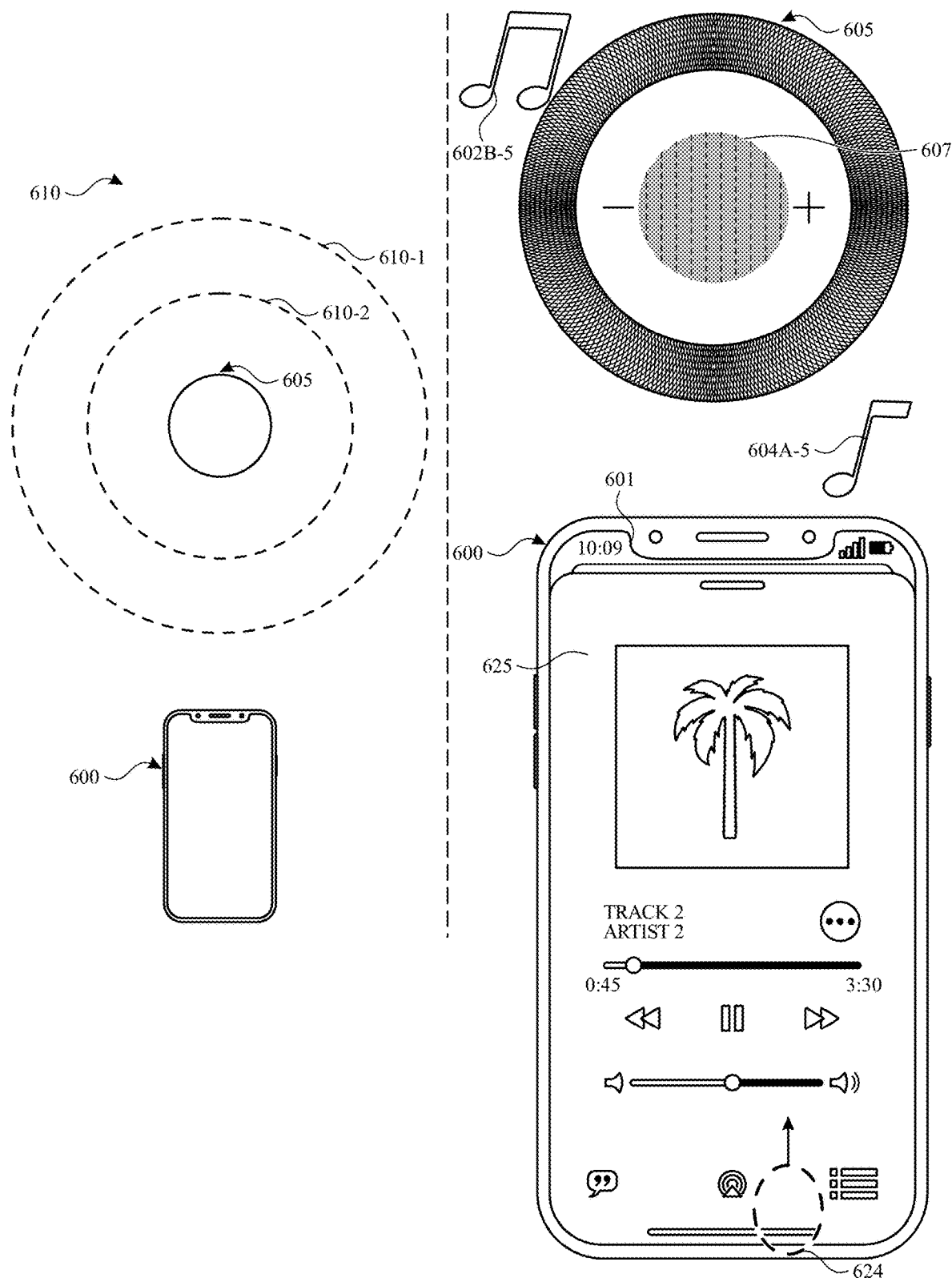

In FIG. 6N, device 605 is playing the first song, as depicted by indicator 602B-5 and light 607, and device 600 is beyond outer threshold 610 and playing a second song, as depicted by indicator 604A-5 and music interface 625, which is an interface for controlling playback of music at device 600. Device 600 detects input 624 (e.g., a swipe gesture) and, in response, dismisses music interface 625 to display home interface 603.

Figure 6O:
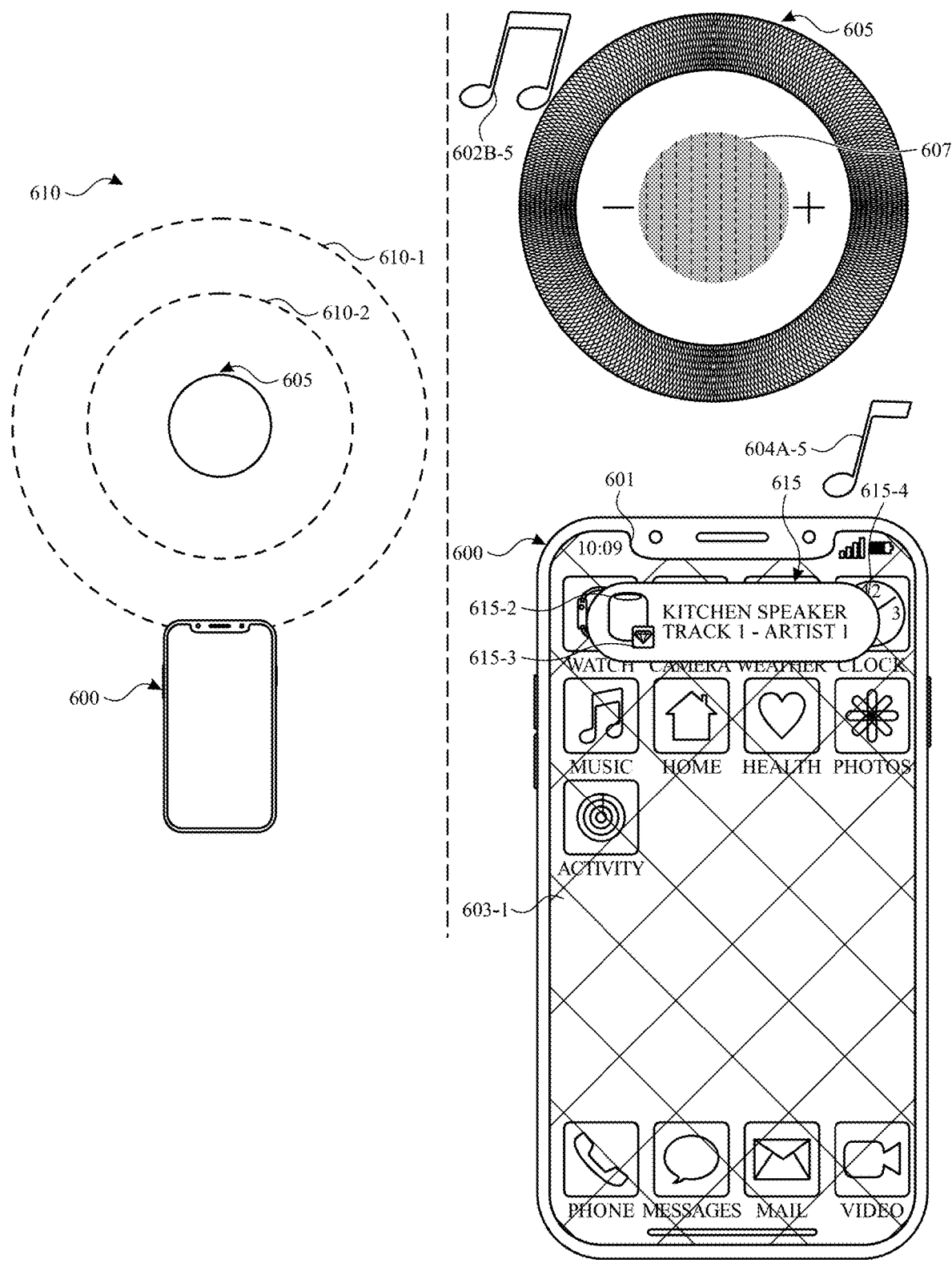

In FIG. 6O, device moves to outer threshold 610-1, as depicted by diagram 610. In response, device 600 begins to blur 603-1 home interface 603 and displays pill 615 having a small size. Because device 605 is currently playing the first song, pill 615 includes text 615-4 indicating that the device 605 ("Kitchen Speaker") is currently playing the first song. Pill 615 also includes representation 615-2 and representation 615-3. Device 605 continues to play the first song, with no variation in feedback based on movement of device 600.

Figure 6P:
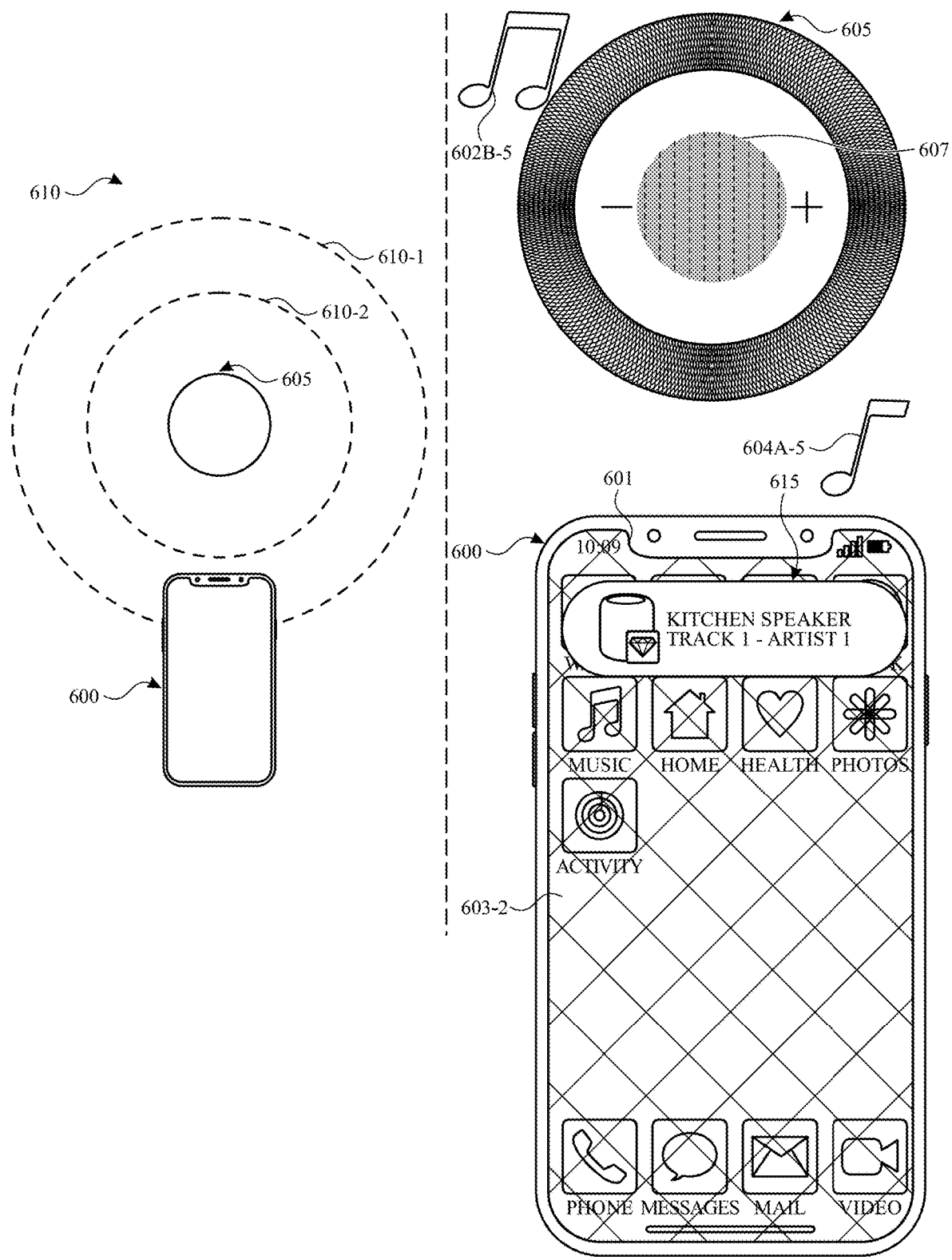

In FIG. 6P, device 600 moves closer to device 605 (without crossing inner threshold 610-2) and, in response, increases the blur 603-2 of home interface 603, increases the size of pill 615 (including representations 615-2 and 615-3), and moves representation 615-3 toward representation 615-2. Device 600 continues to play the second song, as depicted by indicator 604A-5. Device 605 continues to play the first song, as depicted by indicator 602B-5 and light 607.

Figure 6Q:
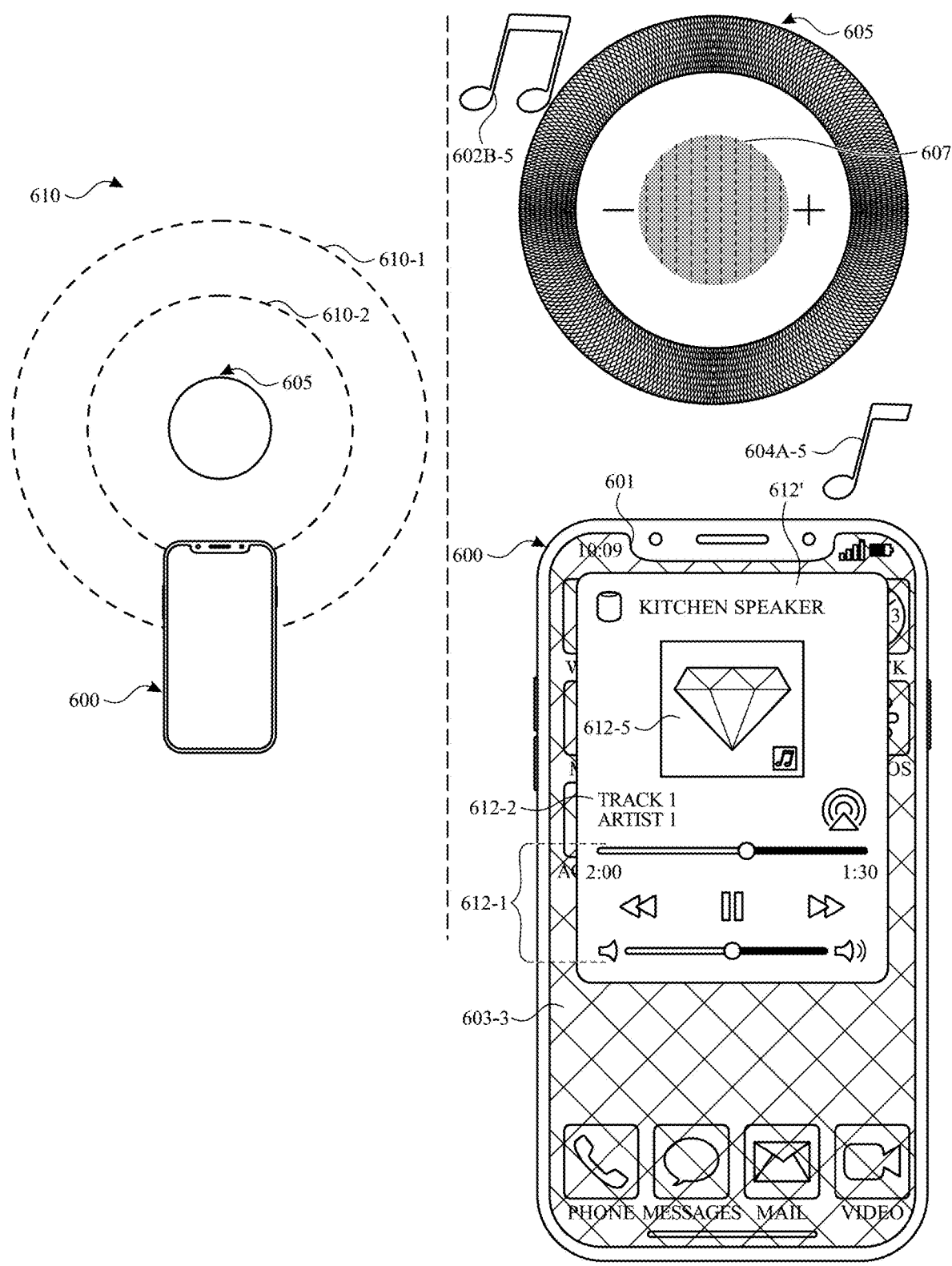
Figure 6R:
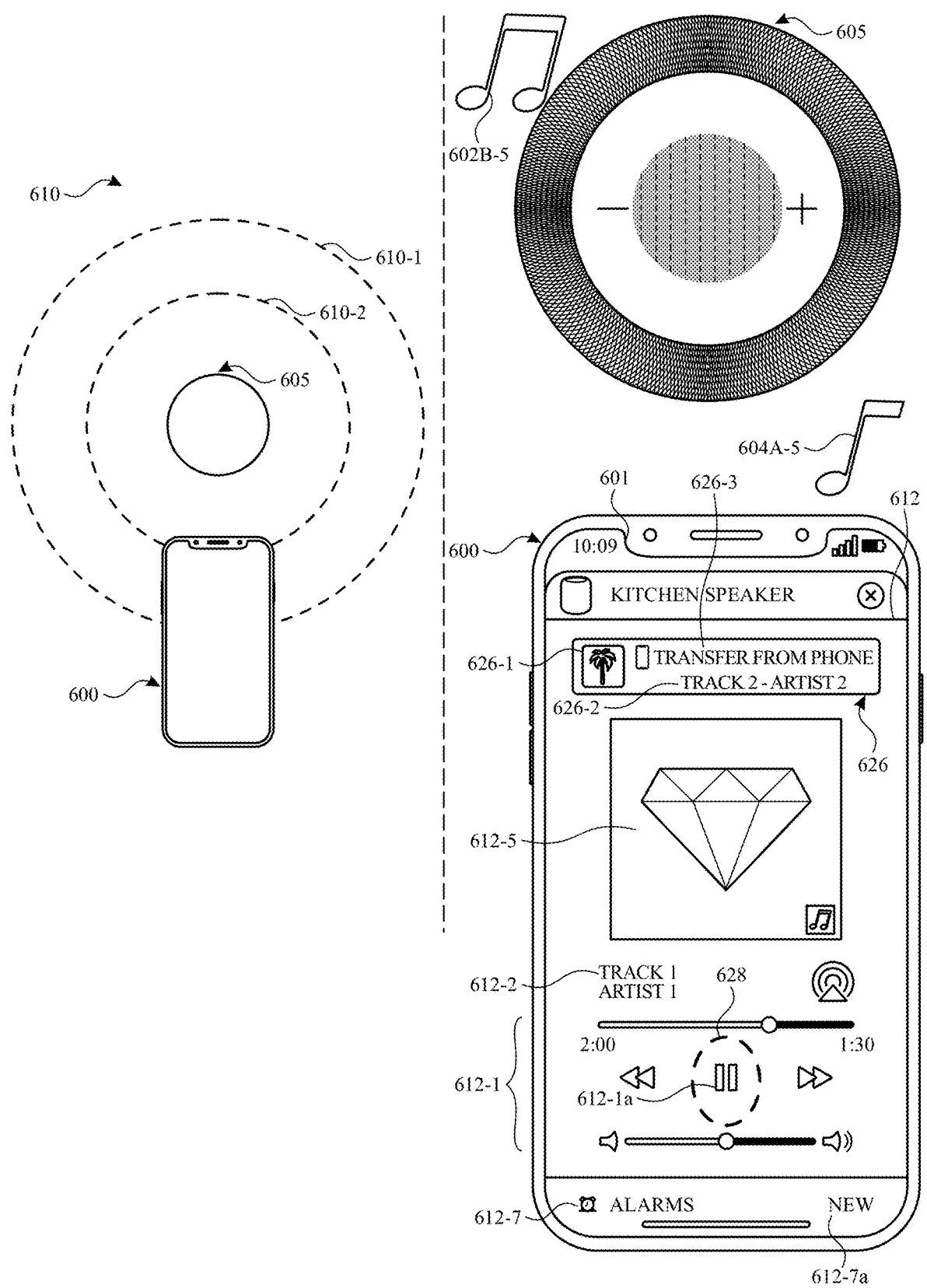

In FIG. 6Q, device 600 reaches inner threshold 610-2 and, in response, increases the blur 603-3 of home interface 603 and expands pill 615 to controls interface 612, with the transitory state of controls interface 612' shown in FIG. 6Q and the fully expanded state shown in FIG. 6R. Controls interface 612' includes playback controls 612-1 for device 605, status 612-2 indicating that device 605 is playing the first song, and album art 612-5 representing the first song. Device 605 continues to play the first song, as depicted by indicator 602B-5 and light 607. In some embodiments, device 600 or device 605 adds the first song being played at device 605 to a queue for playback at device 600, in response to detecting device 600 at inner threshold 610-2.

In FIG. 6R, device 600 displays controls interface 612 in its fully expanded state. Controls interface 612 includes playback controls 612-1, status 612-2, and alarm controls 612-7. Alarm controls 612-7 are selectable controls for controlling the function of one or more alarms at device 605. For example, new control 612-7a can be selected to start a new alarm at device 605. Because device 600 and device 605 are playing different songs, controls interface 612 also includes transfer affordance 626. Transfer affordance 626 is similar to transfer affordance 614 and can be selected to immediately transfer playback of the second song from device 600 to device 605. As shown in FIG. 6R, transfer affordance 626 includes a representation 626-1 of the song to be transferred to device 605, text 626-2 identifying the song to be transferred, and text 626-3 indicating that the song is to be transferred from device 600. In response to an input on transfer affordance 626, device 605 stops playing the first song, and begins playing the second song.

Figure 6S:
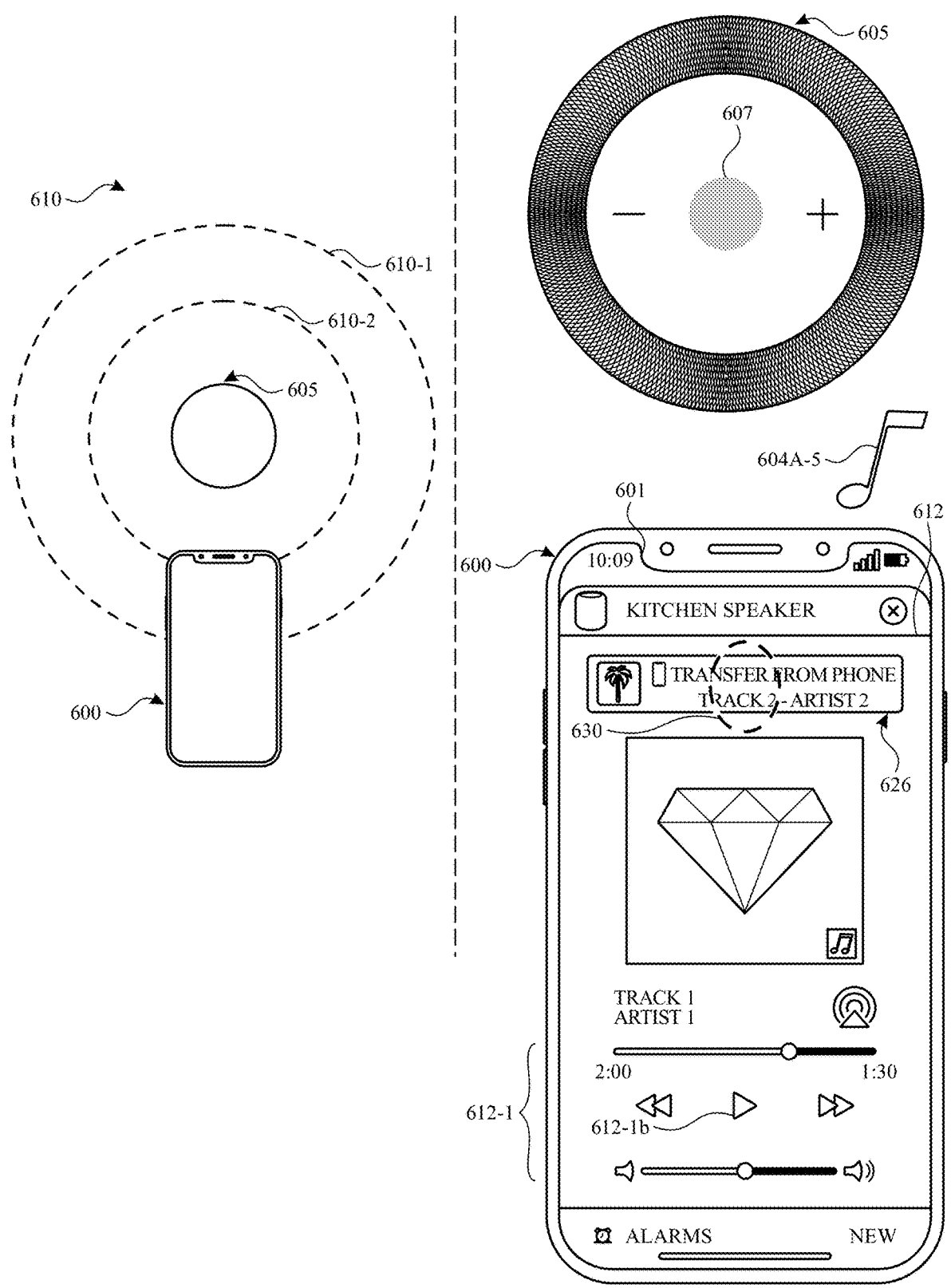

In FIG. 6R, device 600 detects input 628 on pause control option 612-1a and, in response, pauses the first song being played at device 605, as shown in FIG. 6S.

In FIG. 6S, the first song is paused at device 605. Accordingly, device 600 displays controls interface 612 with playback controls 612-1 having a play affordance 612-1b, and device 605 changes light 607 to a dim, small, and white light to indicate the paused state. Device 600 detects input 630 on transfer affordance 626 and, in response, transfers playback of the second song from device 600 to device 605, as depicted in FIG. 6T.

Figure 6T:
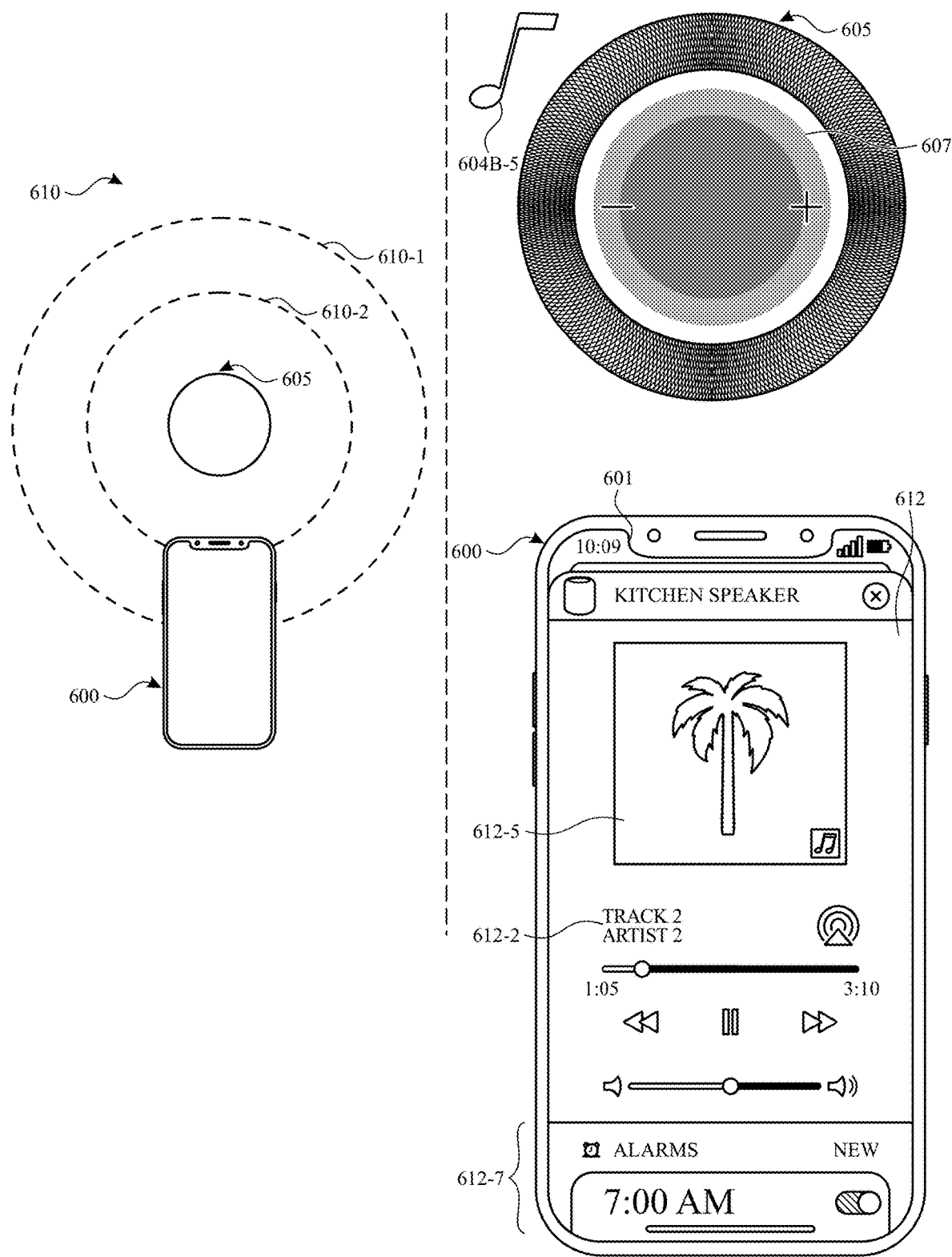

In FIG. 6T, device 600 depicts controls interface 612 updated to indicate that device 605 is now playing the second song. Accordingly, controls interface 612 no longer includes transfer affordance 626, and status 612-2 and album art 612-5 have been updated to represent the second song, which is now playing at device 605. Device 605 is now playing the second song, as depicted by indicator 604B-5, and light 607 which, as shown in FIG. 6T, is pulsing to a bright, large, white state during the transfer, before shrinking and changing to a blue color that corresponds to the album art of the second song, as shown in FIG. 6U.

Figure 6U:
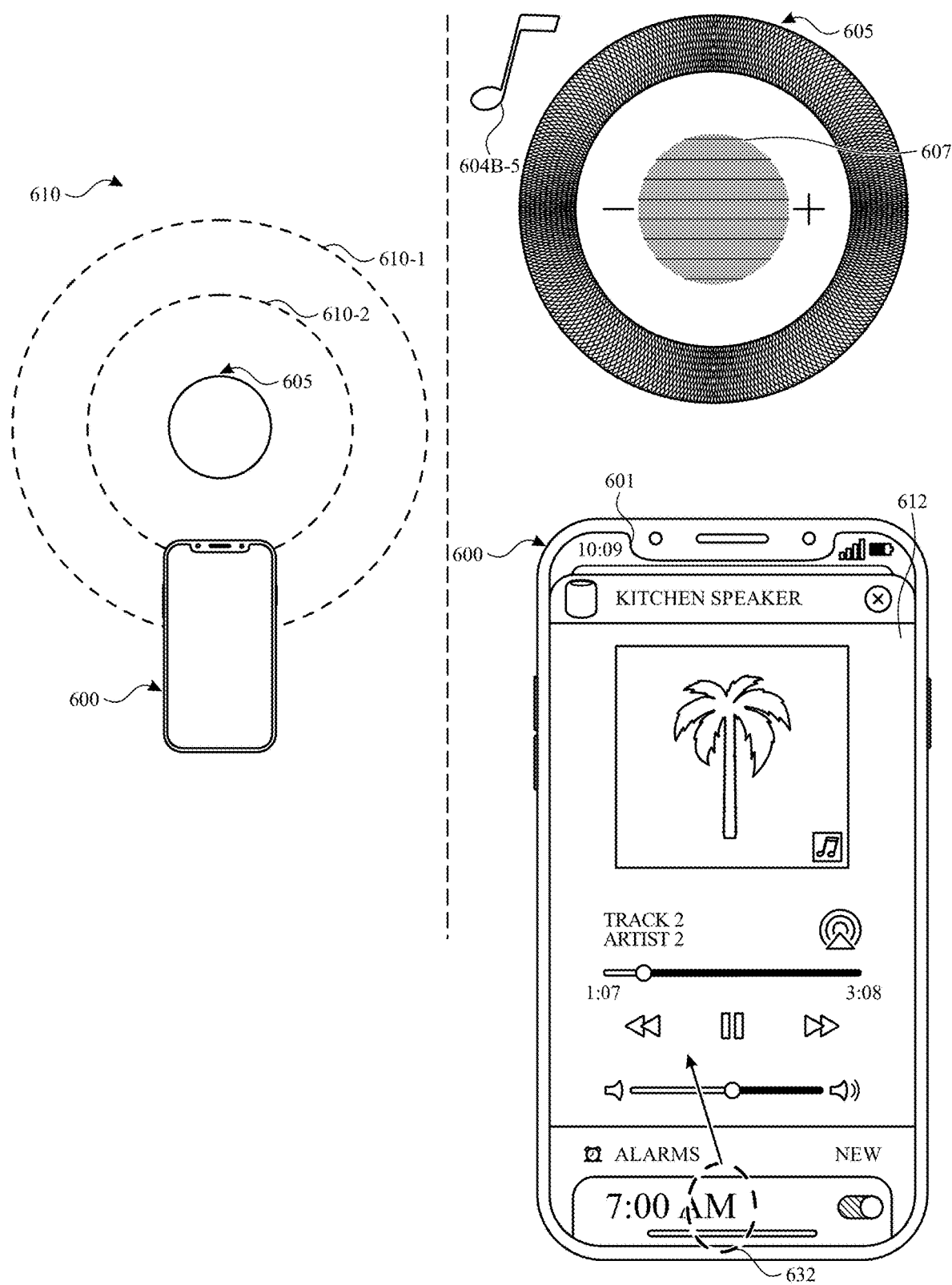
Figure 6V:
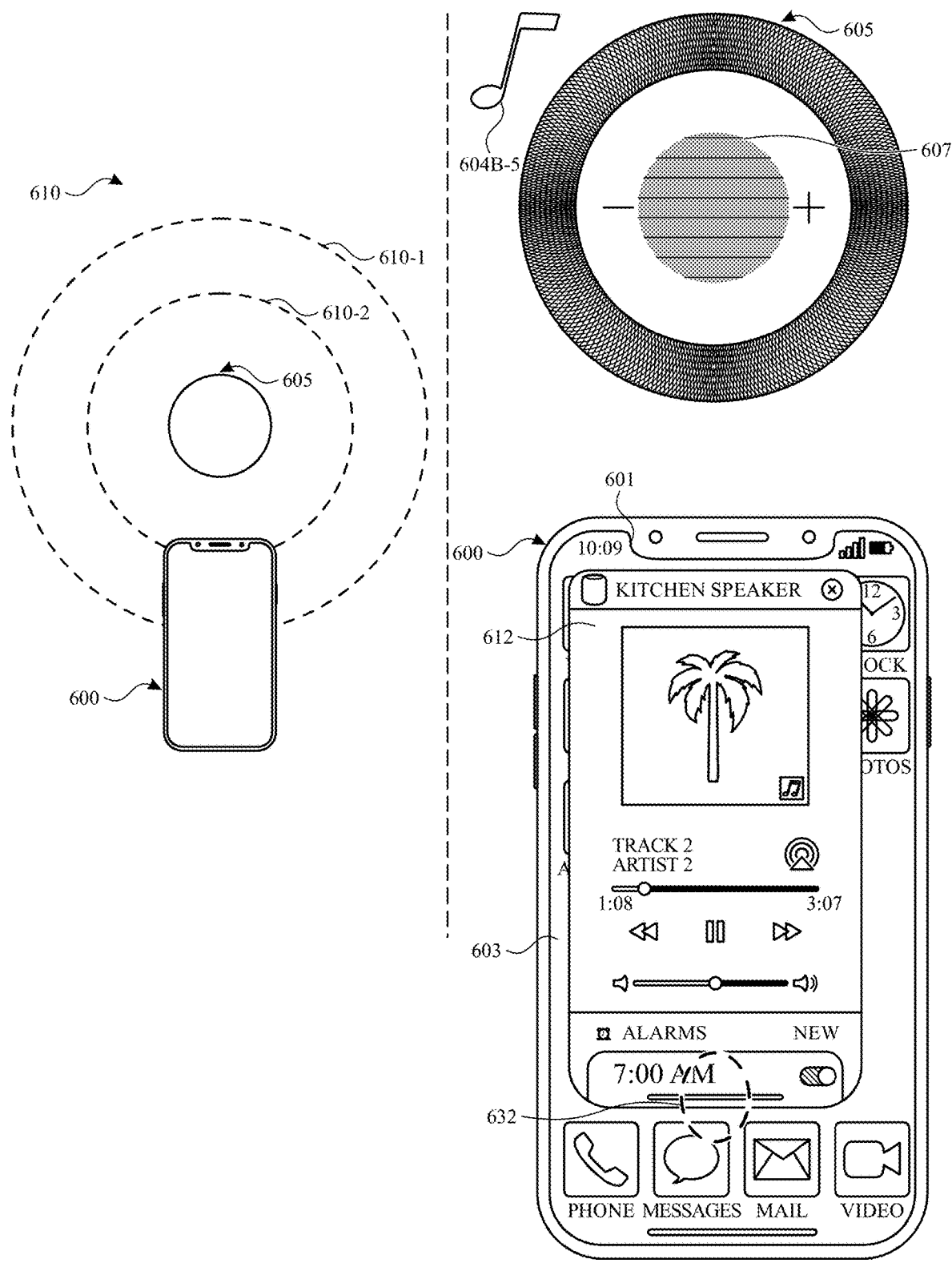
Figure 6W:
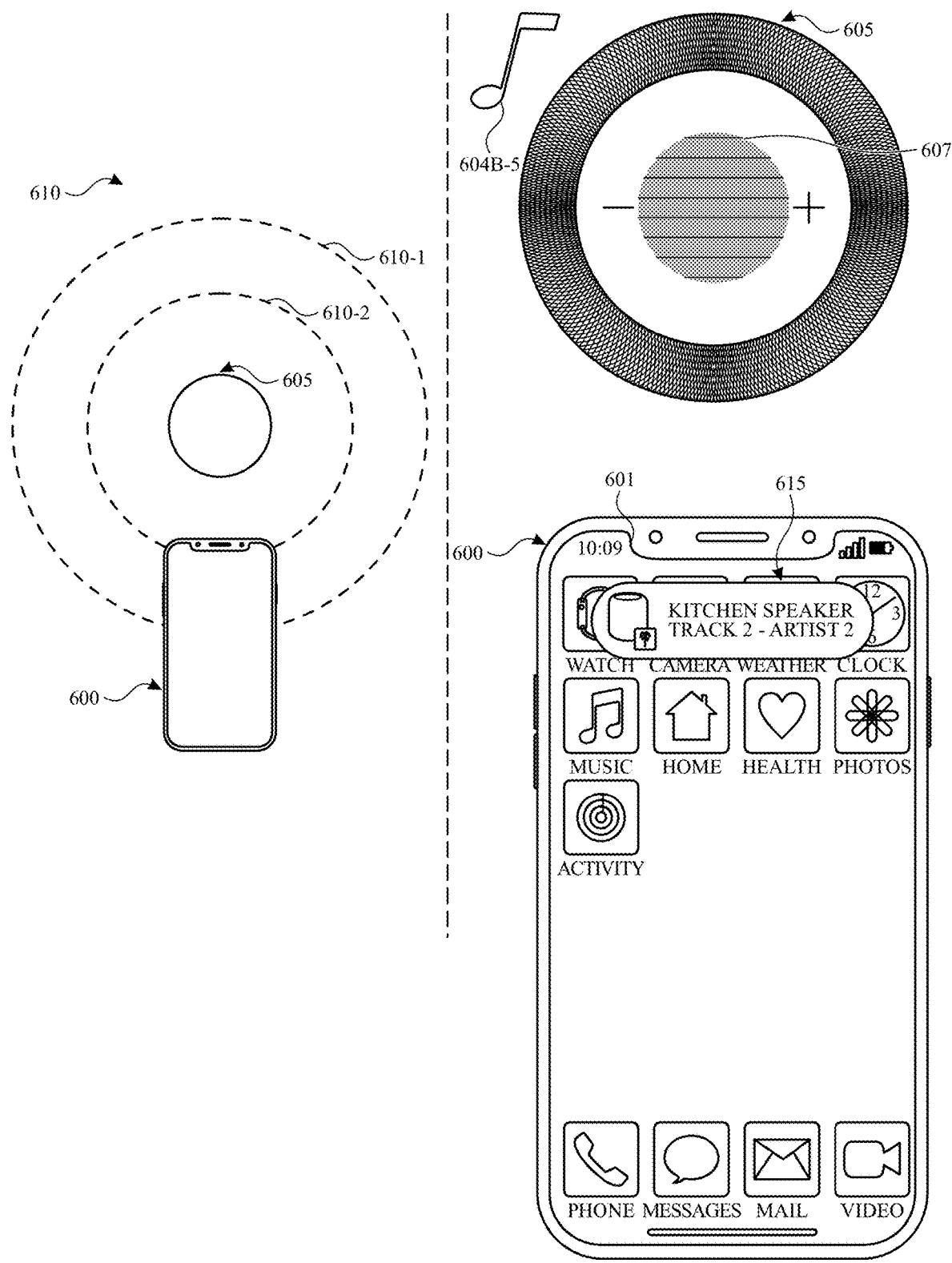

In FIGS. 6U and 6V, device 600 detects input 632 (e.g., a touch-and-drag gesture) and, in response, dismisses controls interface 612, shrinking it back to the pill state, as shown in FIG. 6W. Device 605 continues to play the second song, as depicted by indicator 604B-5 and light 607.

In FIG. 6W, pill 615 is shown with information that corresponds to the second song, including a representation of the second music and text indicating device 605 is playing the second song (Track 2—Artist 2).

As mentioned above, device 605 can play different types of audio and display light 607 having different colors based on the audio. FIG. 6X depicts an embodiment in which device 605 is outputting communication audio for a phone call, as depicted by indicator 634B, and displaying light 607 having a green color to indicate that the type of audio playing at device 605 is communication audio. In the embodiment in FIG. 6X, the audio for the phone call was transferred from device 600 to device 605 in a manner similar to that discussed above with respect to the transfer of music. Device 600 and device 605 also vary feedback based on the distance of device 600 from device 605, as discussed above. For example, in FIG. 6X device 600 is at outer threshold 610-1 and displays pill 615 having information for the phone call, while phone interface 635 is slightly blurred. Pill 615 includes text 615-5 indicating that a phone call is being played at device 605 ("Kitchen Speaker"). Pill 615 also includes representation 615-2 of device 605, and representation 615-6 of phone call audio.

FIG. 7 is a flow diagram illustrating a method for managing media playback devices using an electronic device in accordance with some embodiments. Method 700 is performed at a device (e.g., 100, 300, 500, 600) that is in communication with a first external device (e.g., 605). Some operations in method 700 are, optionally, combined, the orders of some operations are, optionally, changed, and some operations are, optionally, omitted.

In some embodiments, the electronic device (e.g., 600) is a computer system (e.g., a smartphone, a smartwatch; a smart speaker; a media playback device (e.g., a digital media player)) that is in communication with a first external device (e.g., 605) (e.g., a smart speaker; a media playback device (e.g., a digital media player); a smartphone; a smartwatch). The computer system is optionally in communication (e.g., wired communication, wireless communication) with a display generation component (e.g., 601). The display generation component is configured to provide visual output, such as display via a CRT display, display via an LED display, or display via image projection. In some embodiments, the display generation component is integrated with the computer system. In some embodiments, the display generation component is separate from the computer system. Thus, the computer system can transmit, via a wired or wireless connection, data (e.g., image data or video data) to an integrated or external display generation component to visually produce the content (e.g., using a display device).

As described below, method 700 provides an intuitive way for managing media playback devices. The method reduces the cognitive burden on a user for managing media playback devices, thereby creating a more efficient human-machine interface. For battery-operated computing devices, enabling a user to manage media playback devices faster and more efficiently conserves power and increases the time between battery charges.

In method 700, the computer system (e.g., 600) detects (702) a change in distance between the computer system and the first external device (e.g., 605). In some embodiments, the change in distance is detected based on a change in signal strength (e.g., wireless signal strength) exchanged between the system and the first external device. In some embodiments, the change in distance is detected via one or more sensors (e.g., infrared sensors; optical sensors). In some embodiments, the change in distance is detected via data transmitted to the system from a Wi-Fi positioning system, from GPS, and/or from the first external device.

In response (704) to detecting the change in distance, the computer system (e.g., 600) performs steps 706-712 of method 700.

In response to detecting the change in distance, in accordance with a determination that a current distance of the computer system (e.g., 600) from the first external device (e.g., 605) is less than a first threshold distance (e.g., 610-1) (e.g., a predetermined threshold distance (e.g., 6 inches, 12 inches, 18 inches); an outer threshold distance from the first external device) but greater than a second threshold distance (e.g., 610-2) (e.g., a predetermined threshold distance that is less than the first threshold distance (e.g., 4 inches, 8 inches, 12 inches); an inner threshold distance from the first external device), the computer system generates (706) (e.g., outputs; initiates; initiates a process to generate) feedback (e.g., at the computer system and/or at the first external device) (in some embodiments, without performing the first operation) that indicates that a first operation (e.g., transmitting data to the first external device (e.g., data handing off media from the computer system to the first external device); retrieving media or information about media currently playing on the first external device (e.g., to play back on the computer system) will be performed when the second threshold distance is reached. The feedback varies (e.g., generating the feedback includes varying the feedback) based at least in part on a distance of the computer system to the first external device (e.g., based on distance of the computer system to the first external device, and a direction of movement of the computer system relative to the first external device). Generating feedback that varies based at least in part on a distance of the computer system to the first external device and indicates that a first operation will be performed when the second threshold distance is reached provides instruction to a user of the computer system for action needed to cause the computer system to perform the first operation without requiring additional inputs from the user (e.g., input at a touchscreen) and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

Generating the feedback includes, in accordance with a determination that the change in distance includes movement of the computer system (e.g., 600) toward the first external device (e.g., 605) (e.g., the change in distance includes a decrease in the distance between the computer system and the first external device (in some embodiments, while remaining between the first threshold distance and the second threshold distance (e.g., the computer system is located at a first distance from the first external device, between the first threshold distance and the second threshold distance))), the computer system changes (708) a current value for a feedback parameter of the feedback in a first direction (e.g., in a first manner (e.g., increasing; decreasing)) (e.g., increasing an audio volume (e.g., at the first external device); decreasing an audio volume (e.g., at the computer system), increasing a tactile output frequency, increasing a tactile output amplitude, increasing a size of a user interface element, and/or increasing a brightness of a user interface element).

Generating the feedback includes, in accordance with a determination that the change in distance includes movement of the computer system (e.g., 600) away from the first external device (e.g., 605) (e.g., the change in distance includes an increase in the distance between the computer system and the first external device (in some embodiments, while remaining between the first threshold distance and the second threshold distance (e.g., the computer system is located at a second distance from the first external device, between the first threshold distance and the second threshold distance and greater than the first distance from the first external device))), the computer system changes (710) the current value for the feedback parameter of the feedback in a second direction that is different from the first direction (e.g., in a second manner (e.g., decreasing; increasing)) (e.g., decreasing an audio volume (e.g., at the first external device); increasing an audio volume (e.g., at the computer system), decreasing a tactile output frequency, decreasing a tactile output amplitude, decreasing a size of a user interface element, and/or decreasing a brightness of a user interface element).

In response to detecting the change in distance, in accordance with a determination that the current distance of the computer system (e.g., 600) from the first external device (e.g., 605) is less than the second threshold distance (e.g., 610-2), the computer system performs (712) the first operation (e.g., transmitting data to the first external device (e.g., data handing off media from the computer system to the first external device); retrieving media or information about media currently playing on the first external device (e.g., to play back on the computer system) (in some embodiments, performing the first operation and ceasing to vary the current value for the feedback parameter based on movement of the computer system relative to the first external device (e.g., ceasing to generate the feedback; disabling varying the current value for the feedback parameter based on movement of the computer system relative to the first external device)). In some embodiments, in accordance with a determination that the current distance of the computer system from the first external device is greater than the first threshold distance (e.g., 610-1) and the second threshold distance (e.g., 610-2), the computer system forgoes generating feedback (e.g., at the computer system; at the first external device) and forgoes performing the first operation.

In some embodiments, the computer system (e.g., 600) is in communication with a display generation component (e.g., 601) (e.g., a display controller, a touch-sensitive display system). In some embodiments, generating feedback includes displaying, via the display generation component, a first visual feedback (e.g., 603-1; 603-2; 603-3; 615; 615-1; 615-2; 615-3) (e.g., at the computer system). In some embodiments, the first visual feedback includes blurring a user interface (e.g., 603) and/or user interface object. In some embodiments, the first visual feedback includes displaying an indication of content (e.g., 615-3) (e.g., media content). In some embodiments, the first visual feedback includes displaying a user interface object (e.g., 615) (e.g., an affordance) that includes an indication (e.g., 615-2) of the first external device (e.g., 605) and, optionally, status information (e.g., 615-1) for the first external device. In some embodiments, the visual feedback is optionally gradually modified or generated and is based, for example, on movement of the computer system toward or away from the first external device. For example, as the computer system moves toward the first external device, the visual feedback gradually increases (e.g., a degree of blur gradually increases, the size of a user interface object gradually increases, a user interface object gradually moves toward another user interface object), and as the computer system moves away from the first external device, the visual feedback gradually decreases (e.g., a degree of blur gradually decreases, the size of a user interface object gradually decreases, a user interface object gradually moves away from another user interface object). Displaying a first visual feedback provides instruction to a user of the computer system for action needed to cause the computer system to perform the first operation without requiring additional inputs from the user (e.g., input at a touchscreen) and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) changes the current value for the feedback parameter of the feedback in the first direction, including increasing an amount (e.g., degree) of blur (e.g., 603-1; 603-2; 603-3) (e.g., decreasing resolution) of at least a portion of a user interface (e.g., 603) (e.g., increasing blurriness of a user interface and/or one or more objects displayed on the user interface). In some embodiments, the feedback parameter is blurriness (e.g., resolution). In some embodiments, changing the current value for the feedback parameter in the second direction includes decreasing the amount of blur (e.g., increasing resolution) of at least a portion of the user interface. In some embodiments, increasing the amount of blur of at least a portion of a user interface includes increasing blurriness of a background user interface without changing a blurriness of a user interface object (e.g., the background increases in blurriness while the pill affordance remains unchanged (with respect to blurriness)).

In some embodiments, the computer system (e.g., 600) changes the current value for the feedback parameter of the feedback in the first direction, including increasing a size (e.g., expanding; enlarging) of a first user interface object (e.g., 615) (e.g., an affordance; representing a "pill" view of a media control user interface). In some embodiments, the feedback parameter is size. In some embodiments, changing the current value for the feedback parameter in the second direction includes decreasing the size of the first user interface object.

In some embodiments, while the computer system (e.g., 600) is a first distance from the first external device (e.g., a distance depicted in diagram 610 of FIG. 6D), and while displaying the first user interface object (e.g., 615) having a first state (e.g., a state in which the first user interface object has the "pill" view appearance; a state in which first information is displayed in the first user interface object, but second information is not; a state in which controls for the first external device are not displayed in the first user interface object) and a first size (e.g., a size shown in FIG. 6D), the computer system detects a second change in distance. In accordance with a determination that the current distance (e.g., the current distance after the second change in distance) of the computer system from the first external device (e.g., 605) is less than the first threshold distance (e.g., 610-1) but greater than the second threshold distance (e.g., 610-2): in accordance with a determination that the current distance is a second distance from the first external device (e.g., a distance depicted in diagram 610 of FIG. 6F), wherein the second distance is less than the first distance, the computer system displays the first user interface object having the first state and a second size greater than the first size (e.g., see pill 615 in FIG. 6F) (e.g., increasing the user interface object from the first size to the second size, while maintaining the first state of the user interface object); and in accordance with a determination that the current distance is a third distance from the first external device (e.g., a distance depicted in diagram 610 of FIG. 6E), wherein the third distance is less than the second distance, displaying the first user interface object having the first state and a third size greater than the second size (e.g., see pill 615 in FIG.

6E) (e.g., increasing the user interface object from the first or second size to the third size, while maintaining the first state of the user interface object). Displaying the first user interface object having the first state with the first, second, or third sizes based on the current distance from the first external device provides instruction to a user of the computer system for action needed to cause the computer system to perform the first operation without requiring additional inputs from the user (e.g., input at a touchscreen) and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In accordance with a determination that the current distance (e.g., after the second change in distance) of the computer system (e.g., 600) from the first external device (e.g., 605) is less than the second threshold distance (e.g., 610-2), the computer system displays the first user interface object (e.g., 615) transitioning (e.g., see controls interface 612' in FIG. 6H) from the first state (e.g., pill 615) to a second state (e.g., controls interface 612 and 612') different from the first state (e.g., a state in which the first user interface object no longer has the "pill" view appearance; a state in which the first user interface object has a full-screen or card appearance; a state in which both first information and second information is displayed in the first user interface object; a state in which controls (e.g., 612-1) for the first external device are displayed in the first user interface object) (e.g., the first user interface object increases in size when transitioning to the second state). Displaying the first user interface object transitioning from the first state to the second state when the current distance is less than the second threshold distance provides feedback to a user of the computer system indicating that the movement toward the first external device has caused the computer system to perform the first operation. Providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first user interface object (e.g., 615) progressively expands as the computer system (e.g., 600) is between the first (e.g., 610-1) and second (e.g., 610-2) threshold distances and moving towards the first external device (e.g., 605) (and, in some embodiments, progressively contracts as the computer system moves away from the first external device). In some embodiments, when the computer system reaches the second threshold distance, the first user interface object transitions (e.g., "pops") to a card appearance (e.g., 612').

In some embodiments, the computer system (e.g., 600) changes the current value for the feedback parameter of the feedback in the first direction, including increasing a size (e.g., expanding; enlarging) of a representation (e.g., 615-2) (e.g., an image; an indication) of the first external device (e.g., 605). Increasing a size of a representation of the first external device provides feedback to a user of the computer system that the first operation is associated with the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the representation of the first external device is included in the first user interface object (e.g., 615) (e.g., the pill affordance). In some embodiments, changing the current value for the feedback parameter in the second direction includes decreasing the size of the representation of the first external device.

In some embodiments, the computer system (e.g., 600) changes the current value for the feedback parameter of the feedback in the first direction, including displaying a representation (e.g., 615-3) (e.g., an image; an indication; text; album artwork; text identifying the media content) of media content moving toward a representation (e.g., 615-2) (e.g., an image; an indication) of the first external device (e.g., 605). Displaying a representation of media content moving toward a representation of the first external device provides feedback to a user of the computer system that the first operation is associated playing media at the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the feedback parameter is a displayed position of the representation of the media content with respect to a representation of the first external device. In some embodiments, changing the current value for the feedback parameter in the second direction includes displaying the representation of the media moving away from the representation of the first external device.

In some embodiments, the computer system (e.g., 600) generates feedback, including causing display of a second visual feedback (e.g., 607) at the first external device (e.g., 605). Causing display of a second visual feedback at the first external device provides feedback to a user of the computer system that the first operation is associated with the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the second visual feedback includes displaying or modifying a graphical element (e.g., 605-2) at the first external device.

In some embodiments, the computer system (e.g., 600) changes the current value for the feedback parameter of the feedback in the first direction, including causing an increase in one or more of: a) a size of the first set of one or more graphical elements (e.g., a size of light 607) displayed at the first external device (e.g., 605) (e.g., causing an increasing number of light elements (e.g., 605-2) to activate (e.g., glow) at the first external device); and b) a brightness (e.g., increasing size and/or brightness) of the first set of one or more graphical elements displayed at the first external device (e.g., the glow of one or more light elements at the first external device gets brighter and/or larger as the computer system moves toward the first external device). Causing an increase in at least one of a size or brightness of a first set of one or more graphical elements displayed at the first external device provides feedback to a user of the computer system that the first operation is associated with the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the feedback parameter is a size and/or brightness of an active region of one or more light elements (e.g., LEDs) at the first external device. In some embodiments, changing the current value for the feedback parameter in the second direction includes decreasing the size and/or brightness of the first set of one or more graphical elements at the first external device.

In some embodiments, the computer system (e.g., 600) changes the current value for the feedback parameter in the first direction, including causing a change in a set of one or more colors of a second set (e.g., the first set) of one or more graphical elements (e.g., light 607) displayed at the first external device (e.g., 605) (e.g., the glow of one or more light elements at the first external device changes colors as the computer system moves toward the first external device). In some embodiments, the feedback parameter is a color of an active region of one or more light elements (e.g., LEDs) at the first external device. In some embodiments, changing the current value for the feedback parameter in the first direction includes changing the set of one or more colors to a first set of one or more colors (e.g., colors that correspond to a media item (e.g., colors that match album art associated with a song)). In some embodiments, changing the current value for the feedback parameter in the second direction includes changing the set of one or more colors to a second set of one or more colors different from the first set of one or more colors.

In some embodiments, the first operation is associated with a type of media (e.g., playback of music; playback of a communication media (e.g., a phone call)). In some embodiments, the computer system (e.g., 600) causes a change in the set of one or more colors of the second set of one or more graphical elements (e.g., light 607) displayed at the first external device (e.g., 605), including: in accordance with a determination that the media is a first type (e.g., music), causing the set of one or more colors to have a first set of one or more colors (e.g., white) (e.g., see light 607 in FIG. 6B); and in accordance with a determination that the media is a second type (e.g., a phone call) different from the first type, causing the set of one or more colors to have a second set of one or more colors (e.g., green) different from the first set of one or more colors (e.g., see light 607 in FIG. 6X). Causing the set of one or more colors to have a first or second set of one or more colors depending on whether the media is a first or second type provides feedback to a user of the computer system that the first operation is associated with playback of a specific type of media at the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first operation is associated with playback of audio content (e.g., 602A; 602B; 604A; 604B). In some embodiments, the computer system (e.g., 600) causes display of the second visual feedback (e.g., light 607) at the first external device (e.g., 605), including causing a change in (e.g., modulating) a visual characteristic (e.g., pulse frequency, brightness, color) of the visual feedback (e.g., 607) based on an audio characteristic (e.g., volume, frequency, beat) of the audio content. Causing a change in a visual characteristic of the visual feedback based on an audio characteristic of the audio content provides feedback to a user of the computer system that the first operation is associated with playback of the audio content at the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) is in communication with a tactile output generator (e.g., 167) (e.g., a linear actuator; eccentric rotating mass actuator). In some embodiments, generating feedback includes generating, via the tactile output generator, a tactile output (e.g., 606; 613; 616) (audio output is optionally generated in coordination with the tactile output) at the computer system. Generating a tactile output at the computer system provides feedback to a user of the computer system that the first operation is associated with the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) changes the current value for the feedback parameter of the feedback in the first direction, including increasing at least one of a magnitude, frequency, and/or rate of repetition (e.g., increasing the magnitude and/or frequency of vibration) of the tactile output (e.g., 606; 613; 616). In some embodiments, the computer system changes the current value for the feedback parameter of the feedback in the second direction, including decreasing at least one of the magnitude, frequency, and/or rate of repetition (e.g., decreasing the magnitude and/or frequency of vibration) of the tactile output. In some embodiments, the feedback parameter is a magnitude, frequency, and/or rate of repetition of the tactile output. Increasing or decreasing at least one of a magnitude, frequency, and/or rate of repetition of the tactile output depending on whether the change in direction includes movement of the computer system toward or away from the first external device provides feedback to a user of the computer system that the first operation is associated with the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation and the continued movement away from the first external device will cause the computer system not to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) changes a current value for the feedback parameter of the feedback in the first direction, including: in accordance with a determination that the movement of the computer system toward the first external device (e.g., 605) includes a first velocity of movement, the computer system changes the current value for the feedback parameter of the feedback in the first direction by a first amount (e.g., see tactile output 606 in FIG. 6B/6D) (e.g., increasing the frequency, magnitude, and/or rate of repetition of the tactile output by a first amount); and in accordance with a determination that the movement of the computer system toward the first external device includes a second velocity of movement different from the first velocity, changing the current value for the feedback parameter of the feedback in the first direction by a second amount different than the first amount (e.g., see tactile output 613 in FIG. 6E) (e.g., increasing the frequency, magnitude, and/or rate of repetition of the tactile output by a second amount). Changing the current value for the feedback parameter of the feedback in the first direction by a first amount or a second amount depending on whether the movement of the computer system toward the first external device includes a first or second velocity of movement provides feedback to a user of the computer system that the first operation is associated with the first external device, provides instruction to the user for action needed to cause the computer system to perform the first operation without requiring additional inputs from the user (e.g., input at a touchscreen), encourages continued movement of the computer system toward the first external device by correlating the tactile output with the velocity of movement toward the first external device, and provides varying levels of feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the first velocity of movement is greater than the second velocity of movement, and the first amount is greater than the second amount. Thus, when the velocity of movement is greater, the feedback parameter (e.g., frequency, rate of repetition, and/or magnitude) of the tactile output is increased at a greater rate, and when the velocity of movement is less, the feedback parameter of the tactile output is increased at a lesser rate.

In some embodiments, the computer system (e.g., 600) changes a current value for the feedback parameter of the feedback in the first direction (e.g., or the second direction), including: in accordance with a determination that the movement of the computer system toward the first external device (e.g., 605) includes at least a first threshold amount of movement toward the first external device (e.g., or away from the first external device) (e.g., see diagram 610 in FIG. 6E or FIG. 6F), the computer system changes the current value for the feedback parameter of the feedback in the first direction (e.g., or second direction) based on the current distance of the computer system from the first external device (e.g., if the computer system is a first distance from the first external device, changing the current value for the feedback parameter of the feedback in the first direction by a first amount, and if the computer system is a second (different) distance from the first external device, changing the current value for the feedback parameter of the feedback in the first direction by a second amount different than the first amount). In some embodiments, the computer system changes a current value for the feedback parameter of the feedback in the first direction (e.g., or the second direction), including: in accordance with a determination that the movement of the computer system toward the first external device (e.g., or away from the first external device) does not include at least the first threshold amount of movement toward the first external device (in some embodiments, movement towards the first external device is detected, but the movement is below the first threshold amount), forgoing changing the current value for the feedback parameter of the feedback in the first direction (e.g., or second direction) based on the current distance of the computer system from the first external device. Changing the current value for the feedback parameter of the feedback in the first direction based on the current distance of the computer system from the first external device, depending on whether or not the movement of the computer system toward the first external device includes at least a first threshold amount of movement toward the first external device, reduces the number of operations performed at the computer system, by reducing or eliminating feedback operations when movement of the computer system does not include at least the threshold amount of movement. Reducing the number of operations performed at the computer system reduces power usage, improves battery life, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first operation is associated with playback of an audio signal (e.g., 602A; 602B; 604A; 604B). In some embodiments, the computer system (e.g., 600) generates the tactile output (e.g., 606; 613; 616), including changing (e.g., modulating) a characteristic (e.g., a tactile characteristic; frequency, rate of repetition, and/or magnitude of the tactile output) of the tactile output based on an audio characteristic (e.g., volume, frequency, beat) of the audio signal. Changing a characteristic of the tactile output based on an audio characteristic of the audio signal provides feedback to a user of the computer system that the first operation is associated with playback of the audio signal at the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) is in communication with an audio output device (e.g., 111) (e.g., an internal or external speaker). In some embodiments, generating feedback includes generating, via the audio output device, a first audio feedback (e.g., 602A; 604A) (e.g., adjusting an audio output) at the computer system. Generating a first audio feedback at the computer system provides instruction to a user of the computer system for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) changes the current value for the feedback parameter of the feedback in the first direction, including decreasing an output volume of audio output (e.g., 602A; 604A) (e.g., currently output) at the computer system. Decreasing an output volume of audio output at the computer system provides feedback to a user of the computer system that the first operation is associated with playback of the audio, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the feedback parameter is the output volume of audio being output at the computer system. In some embodiments, changing the current value for the feedback parameter in the second direction includes increasing output volume of audio output at the computer system. In some embodiments, when the computer system is currently outputting audio while the current distance of the computer system from the first external device is less than the first threshold distance but greater than the second threshold distance, the computer system decreases the output volume of the audio when the computer system moves toward the first external device and increases the output volume of the audio when the computer system moves away from the first external device.

In some embodiments, while the first audio feedback (e.g., 602A; 604A) is generated at the computer system (e.g., 600), second audio feedback (e.g., 602B; 604B) (e.g., adjusting an audio output) is generated at the first external device (e.g., 605) (e.g., in response to instruction(s) from the first external device; in response to instruction(s) from the computer system). Generating a second audio feedback at the first external device while the first audio feedback is generated at the computer system provides feedback to a user of the computer system that the first operation is associated with the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the computer system (e.g., 600) changes the current value for the feedback parameter of the feedback in the first direction, an output volume of audio output (e.g., see 602B-3 in FIG. 6G) (e.g., currently output) increases at the first external device (e.g., 605) (e.g., in response to instruction(s) from the first external device; in response to instruction(s) from the computer system). Increasing an output volume of audio output at the first external device while changing the current value for the feedback parameter of the feedback in the first direction provides feedback to a user of the computer system that the first operation is associated with playback of audio at the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the feedback parameter is the output volume of audio (e.g., 602B; 604B) being output at the first external device (e.g., 605). In some embodiments, the computer system (e.g., 600) changing the current value for the feedback parameter in the second direction includes decreasing output volume of audio output at the first external device. In some embodiments, when the computer system is currently outputting audio and the first external device is not outputting audio, and when the current distance of the computer system from the first external device transitions from a distance greater than the first threshold distance and the second threshold distance to a distance that is less than the first threshold distance but greater than the second threshold distance, audio begins to play at the first external device (e.g., while continuing to play at the computer system). While the current distance of the computer system from the first external device is less than the first threshold distance but greater than the second threshold distance, the output volume of the audio at the first external device is increased (e.g., while the output volume of the audio at the computer system decreases) when the computer system moves toward the first external device and is decreased (e.g., while the output volume of the audio at the computer system increases) when the computer system moves away from the first external device.

In some embodiments, when the first external device (e.g., 605) is currently outputting audio (e.g., 602B; 604B) while the current distance of the computer system (e.g., 600) from the first external device is less than the first threshold distance (e.g., 610-1) but greater than the second threshold distance (e.g., 610-2), the output volume of the audio at the first external device is decreased when the computer system moves toward the first external device and is increased when the computer system moves away from the first external device. In some embodiments, when the first external device is currently outputting audio and the computer system is not outputting audio, and when the current distance of the computer system from the first external device transitions from a distance greater than the first threshold distance and the second threshold distance to a distance that is less than the first threshold distance but greater than the second threshold distance, audio begins to play at the computer system (e.g., while continuing to play at the first external device). While the current distance of the computer system from the first external device is less than the first threshold distance but greater than the second threshold distance, the output volume of the audio (e.g., 602A; 604A) at the computer system is increased (e.g., while the output volume of the audio at the first external device decreases) when the computer system moves toward the first external device and is decreased (e.g., while the output volume of the audio at the first external device increases) when the computer system moves away from the first external device.

In some embodiments, while the computer system (e.g., 600) changes the current value for the feedback parameter of the feedback in the first direction, an equalization setting of audio output (e.g., 602B; 604B) (e.g., currently output) is adjusted at the first external device (e.g., 605) (e.g., in response to instruction(s) from the first external device; in response to instruction(s) from the computer system). Adjusting an equalization setting of audio output at the first external device while changing the current value for the feedback parameter of the feedback in the first direction provides feedback to a user of the computer system that the first operation is associated with playback of audio output at the first external device, provides instruction to the user for action needed to cause the computer system to perform the first operation without requiring additional inputs from the user (e.g., input at a touchscreen), and provides feedback to the user indicating that continued movement toward the first external device will cause the computer system to perform the first operation. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the feedback parameter is an equalization setting that affects audio properties that determine the fullness of the audio output at the first external device. In some embodiments, changing the current value for the feedback parameter in the first direction includes adjusting the equalization setting in a first manner such that the audio output at the first external device increases in fullness. In some embodiments, changing the current value for the feedback parameter in the second direction includes adjusting the equalization setting in a second manner such that the audio output at the first external device decreases in fullness. In some embodiments, when the first external device is currently outputting audio while the current distance of the computer system from the first external device is less than the first threshold distance but greater than the second threshold distance, the equalization setting of the audio output at the first external device changes such that the audio properties smoothly transition from having a tinny sound (e.g., having audio properties similar to audio produced from a low-power speaker (e.g., a speaker of a smartphone)) to having a full, rich sound as the computer system moves toward the first external device. Conversely, the equalization setting of the audio output at the first external device changes such that the audio properties smoothly transition from the full, rich sound to the tinny sound as the computer system moves away from the first external device.

In some embodiments, the computer system (e.g., 600) is in communication with a tactile output generator (e.g., 167) (e.g., a linear actuator; eccentric rotating mass actuator). In some embodiments, generating the feedback includes: in accordance with a determination that a first set of criteria is met, generating, via the tactile output generator, a first tactile output (e.g., 606; 613) (audio output is optionally generated in coordination with the tactile output) at the computer system; and in accordance with a determination that the first set of criteria is not met, forgoing generating the first tactile output (in some embodiments, generating a non-tactile output such as an audio output and/or a visual output) at the computer system (e.g., see FIG. 6F). In some embodiments, tactile output is generated (or not) depending on an operational state of the computer system. For example, in some embodiments, the feedback does not include tactile output when the computer system (e.g., a battery of the computer system) is being charged. As another example, in some embodiments, the feedback does not include tactile output when the computer system is stationary (e.g., the computer system is not being moved) (e.g., the computer system has been placed on a surface such as a table). As yet another example, in some embodiments, the feedback does not include tactile output when the computer system is positioned in a particular manner such as, for example, when the computer system is positioned away from the first external device (e.g., as illustrated in FIG. 6F).

In some embodiments, the first set of criteria is not met when the computer system (e.g., 600) is in a charging state (e.g., a battery of the computer system is being charged). In some embodiments, the first set of criteria is not met when the computer system is stationary for a predetermined amount of time (e.g., the computer system is not being moved). In some embodiments, the first set of criteria is not met when a predetermined portion of the computer system (e.g., 600-1) (e.g., a display screen, a top surface, a user-facing surface) is positioned (e.g., oriented) away (e.g., facing away) from the external device (e.g., see FIG. 6F).

In some embodiments, in response to detecting the change in distance: in accordance with a determination that the current distance of the computer system (e.g., 600) from the first external device (e.g., 605) is less than the second threshold distance (e.g., 610-2), the computer system ceases to vary the current value for the feedback parameter based on movement of the computer system relative to the first external device (e.g., ceasing to generate the feedback; disabling varying the current value for the feedback parameter based on movement of the computer system relative to the first external device) (e.g., see FIGS. 6J-6L). Ceasing to vary the current value for the feedback parameter based on movement of the computer system relative to the first external device when the current distance of the computer system from the first external device is less than the second threshold distance provides feedback to a user of the computer system that the first operation has been performed as a result of the prior movement of the computer system with respect to the first external device. Providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, after ceasing to vary the current value for the feedback parameter based on movement of the computer system (e.g., 600) relative to the first external device (e.g., 605) (e.g., after performing the first operation; after disabling varying the current value for the feedback parameter based on movement of the computer system relative to the first external device), the computer system detects a third change in distance between the computer system and the first external device. In response to detecting the third change in distance: in accordance with a determination that the current distance (e.g., the current distance after detecting the third change in distance) of the computer system from the first external device is greater than a third threshold distance (e.g., 610-1) (e.g., a predetermined threshold distance; the outer threshold distance; the first threshold distance; the first threshold distance plus a variance (e.g., 45%/50%/60% of the first threshold distance)), varying (e.g., re-enabling varying) the current value for the feedback parameter based on movement of the computer system relative to the first external device (e.g., see FIGS. 6L and 6M). In response to detecting the third change in distance: in accordance with a determination that the current distance (e.g., the current distance after detecting the third change in distance) of the computer system from the first external device is less than the third threshold distance, forgoing varying the current value for the feedback parameter based on movement of the computer system relative to the first external device (e.g., continuing to cease varying the current value for the feedback parameter based on movement of the computer system relative to the first external device) (e.g., see FIGS. 6J and 6K). Selectively enabling varying the current value for the feedback parameter based on movement of the computer system relative to the first external device depending on whether the computer system has moved beyond the third threshold distance prevents the computer system from generating unwanted or unnecessary feedback by ensuring that a user of the computer system intentionally desires to re-enable the feedback, as indicated by moving the computer system beyond the third threshold distance. Preventing the computer system from generating unwanted or unnecessary feedback conserves computational resources, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) performs the first operation, including: in accordance with a determination that a second set of criteria is met, wherein the second set of criteria includes a criterion that is met when the computer system is currently playing (e.g., outputting audio and/or displaying video (e.g., at the computer system)) first media (e.g., 602A) (e.g., audio and/or video media), the computer system initiates playback of the first media at the first external device (e.g., 605), including: decreasing a first audio characteristic (e.g., a volume, an equalization setting) of the first media at the computer system (e.g., see 602A-4, 602A-3, 602A-2, and/or 602A-1 in FIGS. 6D-6H); and while decreasing the first audio characteristic of the first media at the computer system, causing an increase of a second audio characteristic (e.g., the first audio characteristic, a volume, an equalization setting) of the first media at the first external device (e.g., see 602B-1, 602B-2, 602B-3, 602B-4, and/or 602B-5 in FIGS. 6D-6I) (e.g., crossfading handoff of the first media from the computer system to the first external device, which, in some embodiments, includes gradually decreasing the output volume of the first media at the computer system, while simultaneously gradually increasing the output volume of the first media at the first external device). Causing an increase of a second audio characteristic of the first media at the first external device while decreasing the first audio characteristic of the first media at the computer system provides feedback to a user of the computer system that the first operation is associated with playback of the first media at the first external device, and provides feedback to the user that the first operation has been performed so that the user no longer attempts to execute the first operation (e.g., by providing inputs on a touchscreen or continuing to move the computer system), thereby reducing the number of inputs at the computer system. Providing improved feedback and reducing the number of inputs at the computer system enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, after the computer system (e.g., 600) performs the first operation (e.g., transmitting data to the first external device (e.g., data handing off media from the computer system to the first external device); retrieving media or information about media currently playing on the first external device (e.g., to play back on the computer system), one or more of a size or brightness (e.g., reducing the size and/or brightness) of a third set of one or more graphical elements (e.g., light 607; 605-2) displayed at the first external device (e.g., 605) is reduced (e.g., see FIG. 6I) (e.g., in response to instruction(s) from the first external device; in response to instruction(s) from the computer system) (e.g., the glow of one or more light elements at the first external device gets dimmer and/or smaller in size after the first operation is performed). Reducing one or more of a size or brightness of a third set of one or more graphical elements displayed at the first external device after performing the first operation provides feedback to a user of the computer system that the first operation is associated with the first external device, and provides feedback to the user that the first operation has been performed so that the user no longer attempts to execute the first operation (e.g., by providing inputs on a touchscreen or continuing to move the computer system), thereby reducing the number of inputs at the computer system. Providing improved feedback and reducing the number of inputs at the computer system enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the glow of the set of one or more light elements at the first external device increase in brightness and/or size as the computer system approaches the first external device, until reaching the second threshold distance. In some embodiments, when the first operation is performed (e.g., media is handed off from the computer system to the first external device, or from the first external device to the computer system), the set of one or more graphical elements have a high brightness and/or large size and, after the first operation is performed, the set of one or more graphical elements fade in brightness and/or size (e.g., to an "off" setting).

In some embodiments, after the computer system (e.g., 600) performs the first operation (e.g., transmitting data to the first external device (e.g., data handing off media from the computer system to the first external device); retrieving media or information about media currently playing on the first external device (e.g., to play back on the computer system), an equalization setting of audio output (e.g., 602B; 604B) (e.g., currently output) at the first external device (e.g., 605) is adjusted (e.g., in response to instruction(s) from the first external device; in response to instruction(s) from the computer system) (e.g., causing the equalization setting of the audio output at the first external device to change such that the audio properties smoothly transition from having a tinny sound to having a full, rich sound). Adjusting an equalization setting of an audio output at the first external device after performing the first operation provides feedback to a user of the computer system that the first operation is associated with playback of the audio at the first external device, and provides feedback to the user that the first operation has been performed so that the user no longer attempts to execute the first operation (e.g., by providing inputs on a touchscreen or continuing to move the computer system), thereby reducing the number of inputs at the computer system. Providing improved feedback and reducing the number of inputs at the computer system enhances the operability of the computer system, and makes the user-system interface more efficient (e.g., by helping the user to provide proper inputs and reducing user mistakes when operating/interacting with the computer system)

which, additionally, reduces power usage and improves battery life of the computer system by enabling the user to use the system more quickly and efficiently.

In some embodiments, while the first external device (e.g., 605) is currently playing (e.g., outputting audio and/or displaying video) second media (e.g., 602B) (e.g., audio and/or video media), the computer system (e.g., 600) detects a fourth change in distance between the computer system and the first external device (e.g., see diagram 610 in FIG. 6L). In response to detecting the fourth change in distance, and in accordance with a determination that the current distance (e.g., the current distance after detecting the fourth change in distance) of the computer system from the first external device is greater than a fourth threshold distance (e.g., 610-1) (e.g., a predetermined threshold distance; the outer threshold distance; the first threshold distance; the first threshold distance plus a variance (e.g., 45%/50%/60% of the first threshold distance)): in accordance with a determination that the second media is a first type of media (e.g., communication audio (e.g., a phone call, audio from a video communication)), playback of the second media at the first external device ceases (e.g., in response to instruction(s) from the first external device; in response to instruction(s) from the computer system) (e.g., initiating a process to cause the computer system to playback the second media (e.g., handing off the playback of the second media from the first external device to the computer system)); and in accordance with a determination that the second media is a second type of media different from the first type (e.g., music; a podcast; non-communication session audio), playback of the second media at the first external device continues (e.g., see FIG. 6L). Continuing or ceasing playback of the second media at the first external device when the computer system moves beyond a fourth threshold distance from the first external device automatically performs an operation without requiring a user of the computer system to provide additional input (e.g., input to continue or cease playing the second media at the first external device). Performing an operation without requiring additional inputs enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. Additionally, ceasing playback of the second media at the first external device when the second media is the first type of media (e.g., a phone call) preserves privacy of the user of the computer system by ensuring that the first type of media is not being played back at the first external device without the user's knowledge.

Note that details of the processes described above with respect to method 700 (e.g., FIG. 7) are also applicable in an analogous manner to the methods described below. For example, methods 800, 1000, and 1200 optionally include one or more of the characteristics of the various methods described above with reference to method 700. For example, these methods can include providing dynamic feedback based on movement of the computer system relative to the first external device, as discussed in method 700. For brevity, these details are not repeated below.

FIG. 8 is a flow diagram illustrating a method for managing media playback devices using an electronic device in accordance with some embodiments. Method 800 is performed at a device (e.g., 100, 300, 500, 600) a display (e.g., 601) and one or more input devices (e.g., 601; 112). Some operations in method 800 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component (e.g., 601) (e.g., a display controller, a touch-sensitive display system) and with one or more input devices (e.g., 601; 112) (e.g., a touch-sensitive surface). The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 800 provides an intuitive way for managing media playback devices. The method reduces the cognitive burden on a user for managing media playback devices, thereby creating a more efficient human-machine interface. For battery-operated computing devices, enabling a user to manage media playback devices faster and more efficiently conserves power and increases the time between battery charges.

In method 800, in response to a determination (802) that a distance between the computer system (e.g., 600) and a first external device (e.g., 605) (e.g., a smart speaker; a media playback device (e.g., a digital media player); a smartphone; a smartwatch) is less than (e.g., is now less than; has transitioned and/or changed to be less than) a first threshold distance (e.g., 610-1; 610-2) (e.g., a predetermined threshold distance (e.g., 6 inches, 12 inches, 18 inches); an outer threshold distance from the first external device; an inner threshold distance from the first external device (e.g., 4 inches, 8 inches, 12 inches)), the computer system performs steps 804-812 of method 800.

In accordance with a determination that a first set of criteria is met, wherein the first set of criteria includes a criterion that is met when the computer system (e.g., 600) is currently playing (e.g., outputting audio and/or displaying video (e.g., at the computer system) or causing a connected device to output audio and/or display video) first media (e.g., 604A) (e.g., audio and/or video media) and the first external device (e.g., 605) is playing second media (e.g., 602B) (e.g., audio and/or video media) (e.g., the computer system and the first external device are simultaneously outputting different audio), the computer system displays (804) a media control user interface (e.g., 612; 612). The media control interface includes (e.g., concurrently includes) a first selectable graphical user interface object (e.g., 626) for starting playback of the first media (e.g., 604A) on the first external device (e.g., a "transfer from phone" affordance); and one or more selectable user interface objects (e.g., 612-1) for controlling the playback of the second media on the first external device (e.g., the objects, when selected, control playback). The one or more selectable user interface objects include a first media control selectable graphical user interface object (e.g., 612-1a; 612-1b) (e.g., a play affordance, a pause affordance, a next track affordance, a previous track affordance, a volume affordance, and/or an audio scrubber). Displaying a media control user interface that, when the computer system is currently playing first media and the first external device is playing second media, includes a first selectable graphical user interface object for starting playback of the first media on the first external device and one or more selectable user interface objects for controlling the playback of the second media on the first external device, including a first media control selectable graphical user interface object, provides feedback to a user of the computer system of a first function that can be performed that starts playback of the first media on the first external device, and a second function that can be performed that controls playback of the second media on the first external device, without requiring further input from the user to navigate between different user interfaces to access each of these separate functions. Moreover, the computer system automatically displays the media control user interface having the first selectable graphical user interface object and the one or more selectable user interface objects when a set of conditions are met, without requiring further input from the user to access and navigate between different user interfaces to access the first selectable graphical user interface object and the one or more selectable user interface objects. Providing improved feedback and performing an operation automatically when a set of conditions is met reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) displays the media control user interface (e.g., 612; 612) in response to determining that the distance between the computer system and the first external device (e.g., 605) is less than the first threshold distance (e.g., 610-2) (e.g., when the first threshold distance is an inner threshold distance from the first external device). In some embodiments, the computer system displays the media control user interface in response to an input (e.g., 608) on a user interface object (e.g., 615) that is displayed when the distance between the computer system and the first external device is less than the first threshold distance (e.g., 610-1) and greater than a second threshold distance (e.g., 610-2) (e.g., when the first threshold distance is an outer threshold distance from the first external device and the second threshold distance is an inner threshold distance from the first external device).

While displaying the media control user interface (e.g., 612), the computer system (e.g., 600) receives (806), via the one or more input devices (e.g., 601), an input (e.g., 628; 630) (e.g., a touch input).

In response (808) to receiving the input (e.g., 628; 630), and in accordance with a determination that the input (e.g., 630) corresponds to the first selectable graphical user interface object (e.g., 626) (e.g., the input is a selection of the "transfer from phone" affordance), the computer system (e.g., 600) initiates (810) a process to cause the first external device (e.g., 605) to playback the first media (e.g., device 605 begins playing music 604B in FIG. 6T) (e.g., initiating a process for outputting the first media at the first external device (e.g., handing off the playback of the first media from the computer system to the first external device)) (in some embodiments, ceasing playback of the second media at the first external device) (e.g., adding the first media to a queue for playback at the first external device). In some embodiments, playing back the first media at the first external device includes ceasing playback of the first media at the computer system.

In response (808) to receiving the input (e.g., 628; 630), and in accordance with a determination that the input (e.g., 628) corresponds to (e.g., is a selection of) the first media control selectable graphical user interface object (e.g., 612-1a) (e.g., a pause affordance), initiating a process for controlling (e.g., modifying) playback of the second media (e.g., 602B) (e.g., the object, when selected, controls playback) by the first external device (e.g., 605) (e.g., pausing playback of the second media at the first external device (e.g., see FIG. 6S)) (in some embodiments, while continuing to playback the first media at the computer system).

In some embodiments, in response to a determination that a distance between the computer system (e.g., 600) and the first external device (e.g., 605) is less than the first threshold distance (e.g., 610-1), and in accordance with a determination that a second set of criteria is met, wherein the second set of criteria includes a criterion that is met when the computer system is not playing the first media (e.g., 604A) (e.g., the computer system is not causing playback of any media) and the first external device is not playing the second media (e.g., 602B) (e.g., the first external device is not causing playback of any media), the computer system displays, via the display generation component (e.g., 601), a set of one or more representations of predetermined media content items (e.g., 612-3) (e.g., the media control user interface includes the set of one or more representations of predetermined media content items) (e.g., a set of icons or images representing recommended or recently played songs or albums that can be selected to initiate playback of the corresponding song or album). Displaying a set of one or more representations of predetermined media content items when the computer system is not playing the first media and the first external device is not playing the second media provides feedback to a user of the computer system of a function that can be performed that starts playback of predetermined media, without requiring further input from the user to navigate to a user interface to select media for playback. Moreover, the computer system automatically displays the set of one or more representations of predetermined media content items when a set of conditions are met, without requiring further input from the user to access and navigate between different user interfaces to access representations of media content items. Providing improved feedback and performing an operation automatically when a set of conditions is met reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the method further comprises: while displaying the set of one or more representations of predetermined media content items (e.g., 612-3), the computer system (e.g., 600) receives, via the one or more input devices (e.g., 601), an input directed to a first representation of a predetermined media content item; and in response to receiving the input directed to the first representation, initiates a process to cause the computer system and/or the first external device (e.g., 605) to play media corresponding to the first representation.

In some embodiments, in response to a determination that a distance between the computer system (e.g., 600) and the first external device (e.g., 605) is less than the first threshold distance (e.g., 610-1), and in accordance with a determination that a third set of criteria is met, wherein the third set of criteria includes a criterion that is met when the computer system is not playing the first media (e.g., 604A) (e.g., the computer system is not causing playback of any media) and the first external device is currently playing the second media (e.g., 602B) (e.g., see FIG. 6M), the computer system displays, via the display generation component (e.g., 601), a second selectable graphical user interface object (e.g., 620) (e.g., the media control user interface includes the second selectable graphical user interface object) that, when selected, initiates playback of the second media at the computer system (e.g., a "transfer to phone" affordance; an affordance for handing off media from the first external device to the computer system). Displaying, when the computer system is not playing the first media and the first external device is playing the second media, a second selectable graphical user interface object that, when selected, initiates playback of the second media at the computer system provides feedback to a user of the computer system of a function that can be performed that starts playback of the second media at the computer system without requiring further input from the user to navigate between different user interfaces to access controls to initiate playback of the second media at the computer system. Moreover, the computer system automatically displays the second selectable graphical user interface object when a set of conditions are met, without requiring further input from the user to access and navigate between different user interfaces to access the second selectable graphical user interface object. Providing improved feedback and performing an operation automatically when a set of conditions is met reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the method further comprises: while displaying the second selectable graphical user interface object (e.g., 620), the computer system (e.g., 600) receives, via the one or more input devices (e.g., 601), an input directed to the second selectable graphical user interface object; and in response to receiving the input directed to the second selectable graphical user interface object, initiates a process to cause the computer system to playback the second media (e.g., 602B). In some embodiments, the first external device continues playback of the second media when the second media is transferred to the computer system. In some embodiments, the first external device ceases playback of the second media when the second media is transferred to the computer system. In some embodiments, when the first external device hands off playback of the second media to the computer system, the first external device generates feedback to indicate the handoff process is initiated. For example, in some embodiments, the first external device includes lights, and the lights pulse and increase in brightness (and, optionally, in pulse frequency) when the handoff is initiated, and then the lights fade to an "off" setting when the handoff is complete.

In some embodiments, in response to a determination that a distance between the computer system (e.g., 600) and the first external device (e.g., 605) is less than the first threshold distance (e.g., 610-2), and in accordance with a determination that a fourth set of criteria is met, wherein the fourth set of criteria includes a criterion that is met when the computer system is currently playing the first media (e.g., 604A) and the first external device is not playing the second media (e.g., 602B) (e.g., the first external device is not causing playback of any media), the computer system initiates a process to cause the first external device to playback the first media (e.g., see FIGS. 6G-6I) (e.g., initiating a process for outputting the first media at the first external device (e.g., handing off the playback of the first media from the computer system to the first external device) without requiring further input (e.g., touch input) from a user of the computer system). Initiating a process to cause the first external device to playback the first media, when the computer system is currently playing the first media and the first external device is not playing the second media, allows the computer system to automatically initiate playback of the first media at the first external device without requiring further input from the user to initiate playback of the first media at the first external device. Performing an operation automatically when a set of conditions is met enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, playing back the first media at the first external device includes ceasing playback of the first media at the computer system.

In some embodiments, in response to a determination that a distance between the computer system (e.g., 600) and the first external device (e.g., 605) is less than the first threshold distance (e.g., 610-1; 610-2), and in accordance with a determination that a fifth set of criteria is met, wherein the fifth set of criteria includes a first criterion that is met when the computer system is currently playing the first media (e.g., 604A) and the first external device is playing third media (e.g., 602B) (e.g., the second media) (e.g., the computer system and the first external device are simultaneously outputting different audio) and a second criterion that is met when the first media is different from the third media (e.g., the first and third media are different songs), the computer system adds the third media to a queue for playback at the computer system (e.g., the computer system continues to cause playback of the first media while the third media is added to the queue for future playback at the computer system). Adding the third media to a queue for playback at the computer system when the computer system is currently playing the first media and the first external device is playing third media that is different from the first media, allows the computer system to automatically add the third media to a playback queue of the computer system without requiring further input from the user to navigate various user interfaces to locate the third media (e.g., in a library of media items) and add it to the queue. Performing an operation automatically when a set of conditions is met enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the media control user interface (e.g., 612) further includes a set of one or more selectable user interface objects (e.g., 612-4; 612-6; 612-7) (e.g., timer controls; alarm controls; message controls) that includes a first selectable user interface object (612-6*a*; 612-6*b*; 612-7*a*) that, when selected, controls an operation at the first external device (e.g., 605) (e.g., an operation associated with a timer at the first external device; an operation associated with an alarm at the first external device; an operation associated with a message at the first external device). Displaying a media control user interface that includes a first selectable user interface object that, when selected, controls an operation at the first external device provides feedback to a user of the computer system of a function that can be performed that controls an operation at the first external device, without requiring further input from the user to navigate between different user interfaces to access the function. Moreover, the computer system automatically displays the media control user interface having the first selectable user interface object when a set of conditions are met, without requiring further input from the user to access and navigate between different user interfaces to access the first selectable user interface object. Providing improved feedback and performing an operation automatically when a set of conditions is met reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the set of one or more selectable user interface objects includes a set of controls selected from a group consisting of timer controls (e.g., 612-6) (e.g., controls for setting or adjusting a timer using the first external device), alarm controls (e.g., 612-7) (e.g., controls for setting or adjusting an alarm using the first external device), and message controls (e.g., 612-4) (e.g., controls for composing, sending, or reading a message using the first external device).

In some embodiments, in response to a determination that a distance between the computer system (e.g., 600) and the first external device (e.g., 605) is less than (e.g., is now less than; has transitioned and/or changed to be less than) a second threshold distance (e.g., 610-1) (e.g., a predetermined threshold distance (e.g., 6 inches, 12 inches, 18 inches); an outer threshold distance from the first external device) (in some embodiments, in response to a determination that the distance between the computer system and the first external device is less than the second threshold distance and greater than the first threshold distance), the computer system displays, via the display generation component (e.g., 601), a representation (e.g., 615) (e.g., an affordance (selectable graphical user interface object) representing a "pill" view) of the media control user interface (e.g., 612), wherein the representation of the media control user interface includes an indication (e.g., 615-1; 615-2) of the first external device (e.g., text and/or images that represent the first external device). Displaying, when a distance between the computer system and the first external device is less than a second threshold distance, a representation of the media control user interface that includes an indication of the first external device provides feedback to a user of the computer system of a function that can be performed with respect to the first external device, without requiring further input from the user to navigate between different user interfaces to access functionality for the first external device. Moreover, the computer system automatically displays the representation of the media control user interface having the indication of the first external device, without requiring further input from the user. Providing improved feedback and performing an operation automatically when a set of conditions is met reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the indication of the first external device (e.g., 605) includes first status information (e.g., 615-1) associated with the first external device (e.g., text and/or images that indicate a current state or status of the first external device). In some embodiments, the status information includes an indication of whether media is being played back at the first external device, an indication of what media is being played back at the first external device, an indication of a type of media (e.g., call, music, podcast, voice command, virtual assistant) being played back at the first external device, and/or an indication of whether the first external device is turned on/off, connected/disconnected, and/or has sufficient power.

In some embodiments, the computer system (e.g., 600) detects a first change in distance between the computer system and the first external device (e.g., 605). In some embodiments, the change in distance is detected based on a change in signal strength (e.g., wireless signal strength) exchanged between the system and the first external device. In some embodiments, the change in distance is detected via one or more sensors (e.g., infrared sensors; optical sensors). In some embodiments, the change in distance is detected via data transmitted to the system from a Wi-Fi positioning system, from GPS, and/or from the first external device. In response to detecting the first change in distance, and in accordance with a determination that the first change in distance includes movement of the computer system toward the first external device (e.g., see FIG. 6E) (e.g., the change in distance includes a decrease in the distance between the computer system and the first external device (in some embodiments, while remaining between the first threshold distance and the second threshold distance (e.g., the computer system is located at a first distance from the first external device, between the first threshold distance and the second threshold distance))), the computer system adjusts (e.g., increases) a displayed size of the representation (e.g., 615) of the media control user interface (e.g., see FIG. 6E). Adjusting a displayed size of the representation of the media control user interface when the first change in distance includes movement of the computer system toward the first external device provides instruction to a user of the computer system for action needed to cause the computer system display the media control user interface and provides feedback to the user indicating that continued movement toward the first external device will cause the computer system to display the media control user interface. Providing instruction for causing the computer system to perform an operation without requiring additional inputs and providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 600) detects a second change in distance between the computer system and the first external device (e.g., 605). In some embodiments, the change in distance is detected based on a change in signal strength (e.g., wireless signal strength) exchanged between the system and the first external device. In some embodiments, the change in distance is detected via one or more sensors (e.g., infrared sensors; optical sensors). In some embodiments, the change in distance is detected via data transmitted to the system from a Wi-Fi positioning system, from GPS, and/or from the first external device. In response to detecting the second change in distance, and in accordance with a determination that the second change in distance includes movement of the computer system away from the first external device (e.g., see FIG. 6F) (e.g., the second change in distance includes an increase in the distance between the computer system and the first external device (in some embodiments, while remaining between the first threshold distance and the second threshold distance (e.g., the computer system is located at a second distance from the first external device, between the first threshold distance and the second threshold distance and greater than the first distance from the first external device))), the computer system adjusts (e.g., decreases) a displayed size of the representation (e.g., 615) of the media control user interface (e.g., see FIG. 6F). Adjusting a displayed size of the representation of the media control user interface when the second change in distance includes movement of the computer system away from the first external device provides feedback to a user of the computer system indicating that continued movement away from the first external device will not cause the computer system to display the media control user interface. Providing improved feedback enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the representation of the media control user interface (e.g., 615) includes a first subset of status information (e.g., 615-1) associated with the first external device (e.g., 605) (e.g., text and/or images that indicate a current state or status of the first external device). In some embodiments, while displaying the representation of the media control user interface, the computer system (e.g., 600) receives a second input (e.g., 608) (e.g., a touch input directed to the representation of the media control user interface; a change in the distance between the computer system and the first external device (e.g., the computer system moves closer to the first external device)). In response to receiving the second input, the computer system displays the representation of the media control user interface having an expanded state (e.g., 612; 612) that includes a second subset of status information (e.g., 612-2; 612-1) associated with the first external device that is different than the first subset of status information associated with the first external device (e.g., text and/or images that indicate a current state or status of the first external device) (e.g., status information that is not included in the first subset of status information). In some embodiments, the second subset of status information includes the first subset of status information plus additional status information. In some embodiments, displaying the representation of the media control user interface having an expanded state includes displaying an animation of the representation of the media control user interface expanding to display additional status information (e.g., the second subset of status information). In some embodiments, displaying the representation of the media control user interface having an expanded state includes displaying the representation of the media control user interface expanding to the media control user interface, wherein the second subset of status information is displayed in the media control user interface. In some embodiments, the expanded state of the representation of the media control user interface is the media control user interface.

In some embodiments, the computer system (e.g., 600) displays the representation of the media control user interface having an expanded state (e.g., 612'), including in accordance with a determination that a sixth set of criteria is met, wherein the sixth set of criteria includes a criterion that is met when the computer system is currently playing the first media (e.g., 604A) and the first external device (e.g., 605) is not playing the second media (e.g., 602B) (e.g., the first external device is not causing playback of any media), the computer system displays a third selectable graphical user interface object (e.g., 626) (e.g., the first selectable graphical user interface object) (e.g., a "transfer from phone" affordance) that, when selected, initiates playback of the first media on the first external device (e.g., the third selectable graphical user interface object is displayed without immediately handing off playback of the first media to the first external device). In some embodiments, the method further comprises: while displaying the third selectable graphical user interface object, receiving an input directed to the third selectable graphical user interface object; and in response to receiving the input directed to the third selectable graphical user interface object, initiating a process to cause the first external device to playback the first media (e.g., initiating a process for outputting the first media at the first external device (e.g., handing off the playback of the first media from the computer system to the first external device)).

In some embodiments, in response to a determination that a distance between the computer system (e.g., 600) and the first external device (e.g., 605) is less than the first threshold distance (e.g., 610-2) (e.g., an inner threshold distance from the first external device (e.g., 4 inches, 8 inches, 12 inches)), the computer system displays second status information (e.g., 612-2; 612-1) associated with the first external device (e.g., text and/or images that indicate a current state or status of the first external device). Displaying second status information associated with the first external device when the distance between the computer system and the first external device is less than the first threshold distance provides feedback to a user of the computer system indicating that the distance between the computer system and the first external device is less than the first threshold distance. Providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the status information includes an indication of whether media is being played back at the first external device, an indication of what media is being played back at the first external device, an indication of a type of media (e.g., call, music, podcast, voice command, virtual assistant) being played back at the first external device, and/or an indication of whether the first external device is turned on/off, connected/disconnected, and/or has sufficient power.

In some embodiments, the computer system (e.g., 600) displays the second status information (e.g., 612-2; 612-1) associated with the first external device (e.g., 605), including displaying a second representation (e.g., 615) (e.g., an affordance (selectable graphical user interface object) representing a "pill" view) of the media control user interface transitioning (e.g., see FIGS. 6G-6I) from a first state (e.g., 615 in FIG. 6G) that does not include the second status information (e.g., the "pill" view) to a second state (e.g., 612' in FIG. 6H; 612 in FIG. 6I) that includes the second status information (e.g., the second state of the second representation of the media control user interface is the media control user interface). Displaying a second representation of the media control user interface transitioning from a first state that does not include the second status information to a second state that includes the second status information provides feedback to a user of the computer system indicating that the distance between the computer system and the first external device is less than the first threshold distance. Providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the second representation of the media control user interface includes little or no status information in the first state, and includes the second status information in the second state.

In some embodiments, in response to receiving the input (e.g., 632), and in accordance with a determination that the input corresponds to a predefined gesture (e.g., an upward swipe that originates at a location on the media control user interface), the computer system (e.g., 600) ceases display of the one or more selectable user interface objects (e.g., 612-1) for controlling the playback of the second media on the first external device (e.g., 605) (e.g., see FIGS. 6U-6W). In some embodiments, ceasing display of the one or more selectable user interface objects for controlling the playback of the second media on the first external device includes displaying an animation of the media control user interface shrinking to a representation (e.g., an affordance showing a "pill" view) of the media control user interface (e.g., see FIG. 6V).

Note that details of the processes described above with respect to method 800 (e.g., FIG. 8) are also applicable in an analogous manner to the methods described above and below. For example, methods 700, 1000, and 1200 optionally include one or more of the characteristics of the various methods described above with reference to method 800. For example, these methods can include displaying a controls interface, as discussed in method 800. For brevity, these details are not repeated below.

FIGS. 9A-9R illustrate exemplary embodiments for managing media playback devices, in accordance with some embodiments. The embodiments in these figures are used to illustrate the processes described below, including the processes in FIG. 10.

FIGS. 9A-9R depict various examples in which device 900 performs one or more operations in response to inputs that are received at device 900 when device 900 is in various operational states. Device 900 is similar to device 580 and device 605 (e.g., includes one or more features of devices 580 and 605), and includes touch-sensitive surface 901 (similar to touch-sensitive surface 580D), one or more displays 902 (similar to display 580E), one or more speakers 903 (similar to speakers 580B concealed in body 580A), and one or more microphones 904 (similar to microphone(s) 580C). In the embodiments illustrated in FIGS. 9A-9R, display 902 is generally distinguished from touch-sensitive surface 901 by the depiction of light (e.g., light 905). However, because the display may not be activated in all figures or, when activated, the light can vary in displayed size (as well as other characteristics such as brightness, intensity, color, pattern, movement, etc.), reference number 902 should be understood to refer generally to the display component of device 900.

In FIGS. 9A-9R, touch-sensitive surface 901 includes first portion 901-1, second portion 901-2, and third portion 901-3. The dashed lines separating the first, second, and third portions are for illustrative purposes only and are not part of device 900. Second portion 901-2 includes feature 901A, and third portion 901-3 includes feature 901B. In some embodiments, features 901A and 901B are physical markings such as ridges or etchings that distinguish the second and third portions from the first portion. Each respective portion corresponds to one or more operations that can be performed at device 900 in response to an input at the respective portion. In some embodiments, the operation(s) that is associated with a respective portion depends on the state of device 900, as discussed in greater detail below. Thus, as the state of device 900 changes, the operation(s) associated with the respective portion can also change.

In some embodiments, the state of device 900 is indicated by one or more characteristics of light 905 such as, for example, the color, size, and/or brightness of light 905, as discussed in greater detail below. FIGS. 9A-9R, and the corresponding description of those figures, demonstrate various non-limiting examples of the states of device 900, operations device 900 performs during these states, and various combinations of the characteristics of light 905 displayed by device 900 during these states and operations. The examples in FIGS. 9A-9R are for illustrative purposes, and are not intended to limit the states, operations, and light characteristics that can be performed by device 900. Thus, additional combinations of states, operations, and light characteristics can be performed by device 900, as understood from the examples provided herein.

In some embodiments, the state of device 900 is indicated by the displayed size of light 905. Examples of such embodiments are discussed in greater detail with respect to FIGS. 11A-11R.

In some embodiments, the state of device 900 is indicated by the color of light 905. For example, device 900 displays light having a green color when device 900 is in a communication state, having a multi-color pattern when device 900 is in a virtual assistant state, having a white color (or a color that corresponds to a particular song or album) when device 900 is in a music playback state, having an amber color when device 900 is in a low power state (e.g., device 900 has a low power supply), or having a red color when device 900 needs to be reset. In the embodiments depicted in FIGS. 9A-9R, different colors of light 905 are represented by different hatch patterns.

In some embodiments, the state of device 900 is indicated by the brightness of light 905 or a temporary change in brightness. For example, device 900 displays light 905 having a dim state when music is paused, and displays light 905 having a brighter state when music is playing. As another example, device 900 temporarily brightens light 905 to indicate an input is received at device 900, and dims light 905 when an input has not been received at device 900 for a predetermined amount of time. In some embodiments, device 900 brightens or dims light 905 in response to volume adjustments (e.g., increase brightness with a volume increase and decrease brightness with a volume decrease). In some embodiments, the brightness of light 905 is represented by the shade of light 905 depicted in the figures. For example, darker shades of light 905 can represent brighter display of light, and lighter shades of light 905 can represent dimmer display of light.

In some embodiments, the operation(s) that is performed at device 900 in response to an input depends on various characteristics of the input such as, for example, a size, location, and/or duration of the input. For example, in some embodiments, a respective portion of touch-sensitive surface 901 can be associated with two operations that can be performed in response to an input at the respective portion, and device 900 performs a first operation when the input has a first set of characteristics and performs a second operation when the input has a second set of characteristics.

Figure 9N:
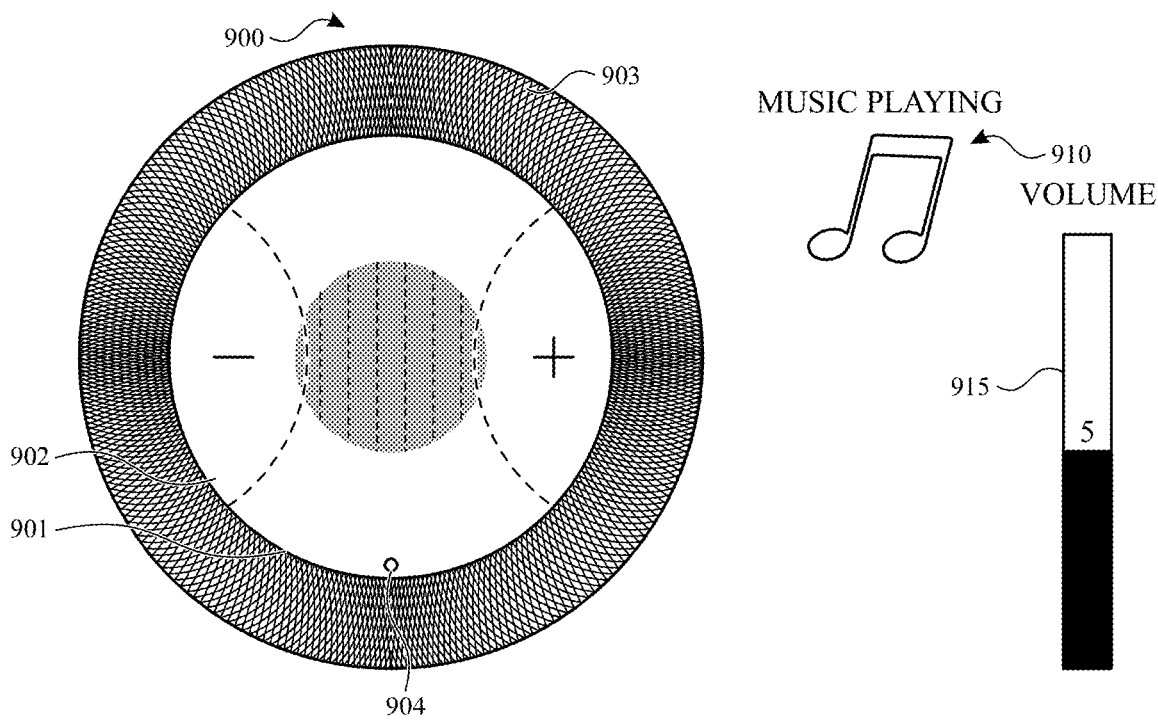
Figure 9O:
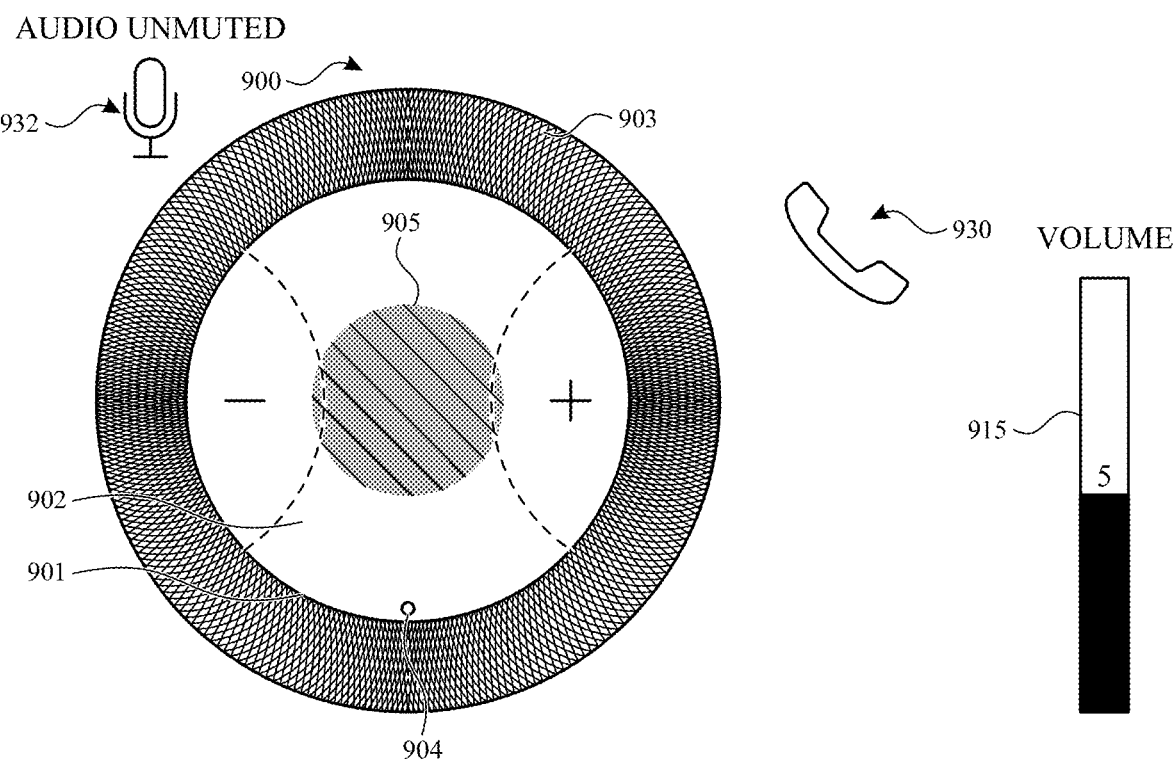

FIGS. 9A-9N depict various embodiments in which device 900 performs different operations based on a size, location, and duration of the input, when the device is generally in a state for playing music. FIGS. 9A-9F depict various operations performed by device 900 when the input is a small touch gesture such as, for example, a tap gesture or a touch-and-hold gesture having contact with touch-sensitive surface 901 that is smaller than a predetermined size threshold. FIGS. 9G-9N depict various operations performed by device 900 when the input is a large touch gesture such as, for example, a tap gesture or a touch-and-hold gesture having a contact with touch-sensitive surface 901 that is larger than a predetermined size threshold.

In FIG. 9A, device 900 is currently playing music at volume of 5, as depicted by light 905, indicator 910, and indicator 915. In the embodiment depicted in FIG. 9A, device 900 displays light 905 (e.g., similar to light 607) when device 900 is in the state for playing music. In some embodiments, the color of light 905 varies depending on the audio being output at device 900. For example, in some embodiments, when the audio is music, the light is a white hue or has a color that corresponds to the music that device 900 is playing. In the embodiment depicted in FIG. 9A, light 905 has a purple hue that corresponds to the music playing at device 900, as discussed above with respect to the embodiments in FIGS. 6A-6X.

In FIG. 9B, device 900 detects input 912 at portion 901-1 while device 900 is playing music. In response, device 900 performs different operations depending on the characteristics of the input. For example, if input 912 is a small, long-touch input (e.g., the input is a touch input that is smaller than a predetermined size threshold and is held for at least a predetermined amount of time), device 900 activates a virtual assistant, as shown in FIG. 9C. In this embodiment, device 900 transitions to a state in which a virtual assistant is activated—that is, device 900 is configured to interact with a user by facilitating interaction with a virtual assistant (e.g., artificial intelligence) using various components of device 900. Accordingly, device 900 pauses the music (as depicted by indicator 911), activates microphone 904 (as depicted by indicator 913), and displays light 905 having a larger size and different color than in FIG. 9B, indicating that the state of device 900 has changed from the music playback state in FIG. 9B to the virtual assistant state in FIG. 9C. As shown in FIG. 9C, light 905 has a multi-color pattern to represent the virtual assistant state.

In some embodiments, the operations associated with portions 901-1, 901-2, and 901-3 change when device 900 transitions from the music playback state to the virtual assistant state. For example, during the music playback state, portions 901-2 and 901-3 correspond to volume adjustment operations (e.g., volume up and volume down, respectively), and portion 901-1 corresponds to an operation for enabling the virtual assistant and an operation for pausing the music (as discussed in greater detail below). However, during the virtual assistant state, portions 901-1, 901-2, and 901-3 each correspond to an operation for terminating the virtual assistant. In other words, if device 900 detects an input on any of portions 901-1, 901-2, and 901-3, while in the virtual assistant state shown in FIG. 9C, device 900 will cancel the virtual assistant and transition back to the music playback state depicted in FIG. 9B.

Referring again to FIG. 9B, if input 912 is a small, tap input (e.g., the input is a touch input that is smaller than the predetermined size threshold and is not held for at least the predetermined amount of time), device 900 remains in the music playback state and pauses playback of the music, as shown in FIG. 9D. In this embodiment, device 900 pauses the music (as depicted by indicator 911) and changes light 905 to a small, white light as shown in FIG. 9D to indicate the music has been paused.

In FIG. 9D, device 900 detects input 914 (e.g., a small, tap input) on portion 901-1 (slightly overlapping portion 901-2) and, in response, resumes playback of the music, as shown in FIG. 9E. In the embodiment depicted in FIG. 9D, although input 914 slightly overlaps portion 901-2, device 900 determines the input to be on portion 901-1 because, for example, the majority of the surface area of input 914 is on portion 901-1.

In FIG. 9E, device 900 is playing music at a volume of 5 and detects input 916 (e.g., a small, tap input) on portion 901-2. In response, device 900 increases the volume of the music from a volume of 5 to a volume of 6, as indicated by volume indicator 915 in FIGS. 9E and 9F.

In FIG. 9F, device 900 is playing music at a volume of 6 and detects input 918 (e.g., a small, tap input) on portion 901-3. In response, device 900 decreases the volume of the music from a volume of 6 to a volume of 5, as indicated by volume indicator 915 in FIGS. 9F and 9G. Again, in the embodiment depicted in FIG. 9F, device 900 determines input 918 is on portion 901-3 because a majority of the contact area from input 918 is on portion 901-3.

FIGS. 9G-9N depict various operations performed by device 900 when the input is a large touch gesture located on touch-sensitive surface 901.

In FIG. 9G, device 900 is playing music at a volume of 5 and detects input 920. Input 920 is a large, tap input, such as a touch input from a palm or other large portion of user's hand 921, that is maintained for less than a predetermined amount of time. Although hand 921 is depicted extending beyond the edges of device 900, input 920 is caused by contact of hand 921 with touch-sensitive surface 901. In FIG. 9G, input 920 is located primarily on portion 901-2 of touch-sensitive surface 901 and, therefore, device 900 determines input 920 is located at portion 901-2. Importantly, because input 920 is a large, tap input (e.g., the tap input is larger than a predetermined size threshold and is maintained for less than a predetermined amount of time), device 900 performs a different operation than when the input is a small touch input. Specifically, rather than performing the volume adjustment operation that is performed when the input is a small, tap input at portion 901-2, device 900 pauses the music, which, in the current embodiment, is the same operation performed by device 900 when the input is a small, tap input at portion 901-1.

As depicted in FIG. 9H, device 900 pauses the music in response to input 920, as depicted by indicator 911 and light 905. While the music is paused, device 900 detects input 922, which is a large, tap input on portion 901-1, and partially overlapping portion 901-3. In response, device 900 resumes playing music, as illustrated in FIG. 9I.

In FIG. 9I, device 900 detects input 924 (large, tap input) on portion 901-3 while music is playing. In response, device 900 pauses the music, as depicted in FIG. 9J.

In FIG. 9J, while the music is paused, device 900 detects input 926 (large, tap input) on portion 901-1 and, in response, resumes playing the music, as shown in FIG. 9K.

FIGS. 9G-9K demonstrate that, when the input on touch-sensitive surface 901 is a large, tap input, device 900 performs the operation that is performed when the input is a small, tap input at portion 901-1, regardless of where the large, tap input is located (detected) on touch-sensitive surface 901. In the embodiments depicted in FIGS. 9A, 9B, and 9D-9K, this operation is a play/pause operation. However, other operations can be performed, depending on the state of device 900. For example, the operation can be a cancel operation when device 900 is performing a timer function, performing an alarm function, engaged in a communication session, playing a recorded message, or (as depicted in FIG. 9C) performing a virtual assistant function.

FIGS. 9L-9R depict various operations that are performed by device 900 when the input is a large touch-and-hold gesture—that is, a touch input (e.g., from a palm or other large portion of user's hand 921) that is larger than a predetermined size threshold and is maintained for more than a predetermined amount of time on touch-sensitive surface 901. In some embodiments, the large touch-and-hold gesture is referred to as a cover gesture, because the user is covering the touch-sensitive surface 901 with their hand 921.

In FIG. 9L, device 900 is playing music at a volume of 5 and detects input 928, which is a large touch-and-hold gesture on touch-sensitive surface 901. When device 900 detects input 928 is maintained on touch-sensitive surface 901 for a predetermined amount of time, device 900 lowers the output volume of the music (e.g., to a volume of 1), as depicted in FIG. 9M. Device 900 continues to play music at the lowered volume for as long as input 928 is maintained. When input 928 is no longer detected, device 900 increases the volume of the music back to the previous volume of 5, as depicted in FIG. 9N.

FIGS. 90-9R depict an embodiment in which device 900 performs an operation in response to a large touch-and-hold gesture when device 900 is in a communication state. In the communication state, device 900 is outputting communication audio for a communication session (e.g., a phone call, video chat), as depicted by indicator 930, and microphone 904 is receiving audio for the communication session, as depicted by indicator 932. Additionally, light 905 has a green hue, indicating device 900 is in a communication state.

Figure 9P:
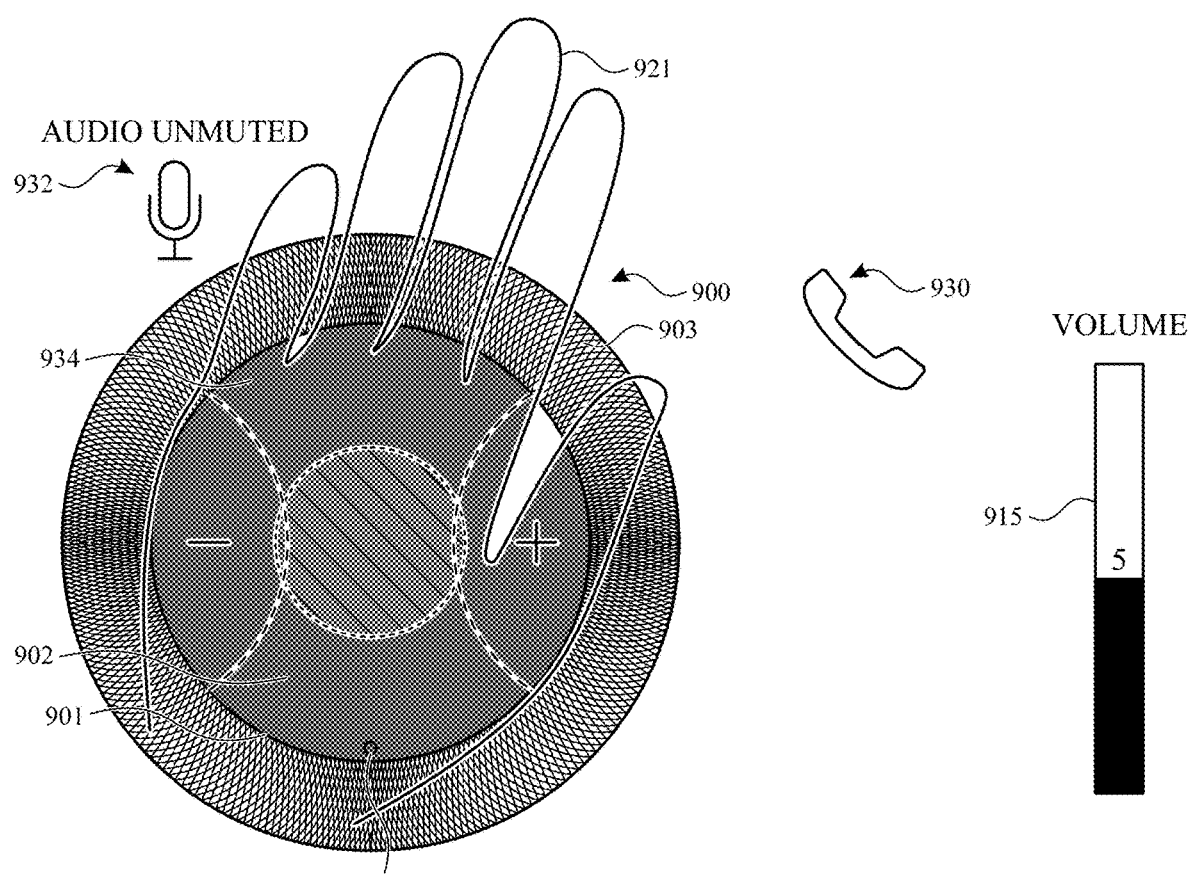
Figure 9Q:
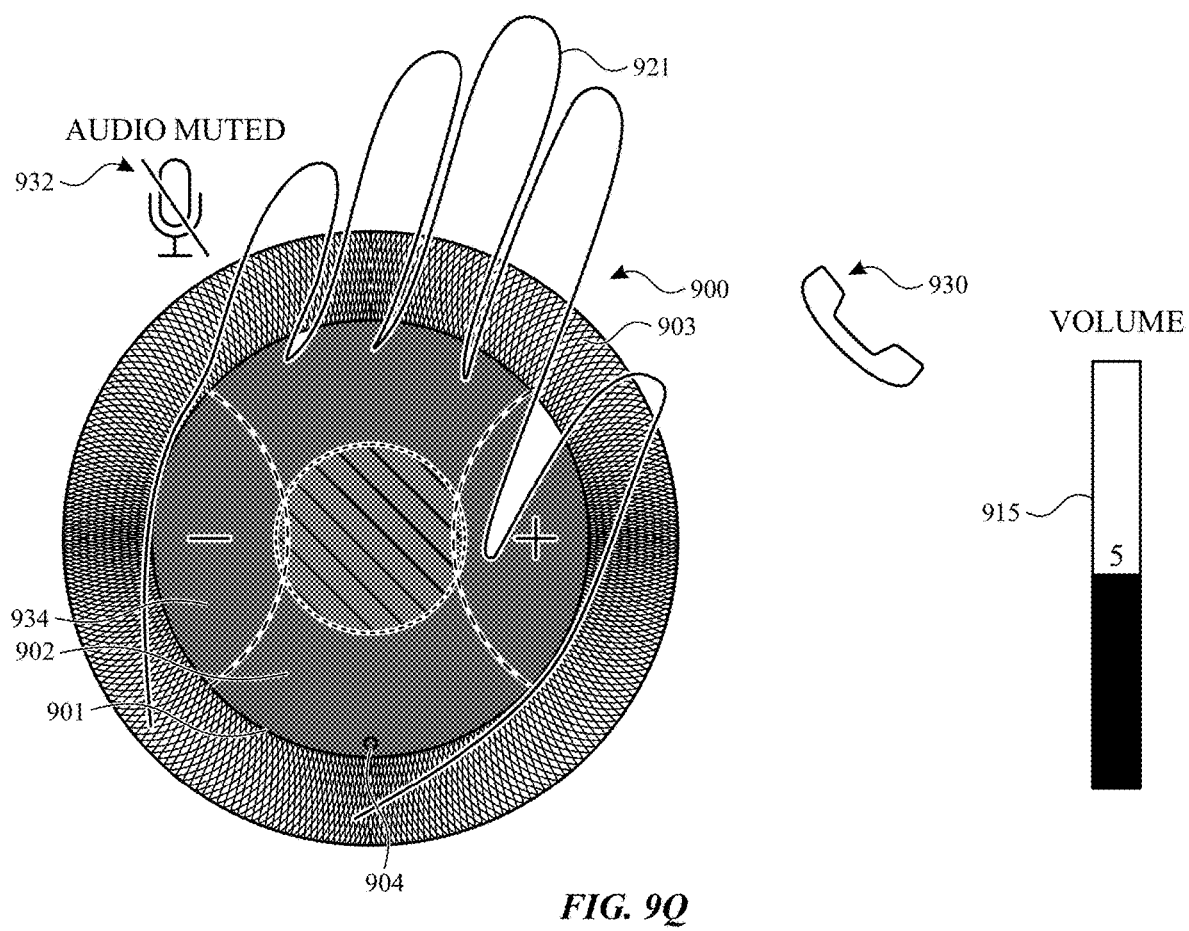

In FIG. 9P, device 900 detects input 934, which is a large touch-and-hold gesture on touch-sensitive surface 901. When device 900 detects input 934 is maintained on touch-sensitive surface 901 for a predetermined amount of time, device 900 mutes the audio received for the communication session, as depicted by indicator 932 in FIG. 9Q, while continuing to output the communication session audio. Device 900 continues to mute the audio received for the communication session for as long as input 934 is maintained. When input 934 is no longer detected, device 900 unmutes the audio received for the communication session, as depicted by indicator 932 in FIG. 9R. In some embodiments, the audio for the communication session can be muted in such a way that microphone 904 remains activated. For example, the audio received at microphone 904 is used for a task other than the communication session. For example, audio received at microphone 904 can be used for interacting with a virtual assistant instead of the communication session.

FIG. 10 is a flow diagram illustrating a method for managing media playback devices using an electronic device in accordance with some embodiments. Method 1000 is performed at a device (e.g., 100, 300, 500, 900) with a touch-sensitive surface (e.g., 901). Some operations in method 1000 are, optionally, combined, the orders of some operations are, optionally, changed, and some operations are, optionally, omitted.

In some embodiments, the electronic device (e.g., 900) is a computer system (e.g., a speaker; a digital media player). The computer system is optionally in communication (e.g., wired communication, wireless communication) with a touch-sensitive surface (e.g., 901) (e.g., a touch-sensitive display). The touch-sensitive surface includes a first portion (e.g., 901-1) that is associated with a first operation (e.g., a playback control operation; pause; play; mute; unmute) and a second portion (e.g., 901-2) that is associated with (e.g., primarily associated with; by default) a second operation (e.g., a volume increase operation; a volume decrease operation), different from the first operation (e.g., the second portion is separate (e.g., physically distanced) from the first portion). In some embodiments the computer system includes a display generation component (e.g., 902) (e.g., a display controller, a touch-sensitive display system). The display generation component is configured to provide visual output, such as display via a CRT display, display via an LED display, or display via image projection. In some embodiments, the display generation component is integrated with the computer system. In some embodiments, the display generation component is separate from the computer system.

As described below, method 1000 provides an intuitive way for managing media playback devices. The method reduces the cognitive burden on a user for managing media playback devices, thereby creating a more efficient human-machine interface. For battery-operated computing devices, enabling a user to manage media playback devices faster and more efficiently conserves power and increases the time between battery charges.

In method 1000, the computer system (e.g., 900) detects (1002), via the touch-sensitive surface (e.g., 901), a first input (e.g., a touch input) (e.g., 912; 914; 916; 918; 920; 922; 924; 926; 928; 934). Detecting the first input includes detecting first contact having a respective size (e.g., surface area; contiguous surface area; total contacted surface area).

In response (1004) to detecting the first input (e.g., 912; 914; 916; 918; 920; 922; 924; 926; 928; 934), the computer system (e.g., 900) performs steps 1006, 1008, and 1010 of method 1000.

In accordance with a determination that the respective size of the first contact is less than a first threshold size (e.g., a size of contact shown in FIGS. 9A-9F) (e.g., the amount of area of the touch-sensitive surface occupied by the first contact is less than a first threshold amount of area (e.g., a non-zero amount of surface area; an amount of surface area less than the area of the first portion) of the touch-sensitive surface (e.g., the touch input includes contact with less than a predefined amount of the touch surface) (e.g., the first input is a touch that is smaller than a predefined size)) and that the first input (e.g., 912; 914) is directed to the first portion (e.g., 901-1) of the touch-sensitive surface (e.g., at least a predefined amount (e.g., 51%, 55%, 60%) of the touch contact is located within the first portion; the entirety of the first input is within the first portion), the computer system (e.g., 900) initiates (1006) a process for performing the first operation.

In accordance with a determination that the respective size of the first contact is less than the first threshold size (e.g., a size of contact shown in FIGS. 9A-9F) and that the first input (e.g., 916; 918) is directed to the second portion (e.g., 901-2; 901-3) of the touch-sensitive surface (e.g., at least a predefined amount (e.g., 51%, 55%, 60%) of the touch contact is located on the second portion; the entirety of the first input is within the second portion), the computer system (e.g., 900) initiates (1008) a process for performing the second operation.

In accordance with a determination that the respective size of the first contact is greater than the first threshold size (e.g., a size of contact shown in FIGS. 9G-9Q), the computer system (e.g., 900) initiates (1010) a process for performing the first operation (e.g., without performing the second operation) without regard for whether the first input is directed to the first portion or the second portion of the touch-sensitive surface. Initiating a process for performing the first operation or the second operation based on whether the first input is directed to the first or second portion of the touch-sensitive surface when the respective size of the first contact is less than the first threshold size, and initiating a process for performing the first operation without regard for whether the input is directed to the first or second portion when the respective size of the first contact is greater than the first threshold size, provides a technique for disambiguating inputs in a manner that reduces the risk of performing unintended actions, thereby reducing the number of inputs at the computer system and conserving computational resources. Reducing the number of inputs at the computer system enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, initiating the process for performing the first operation without regard for whether the first input is directed to the first portion (e.g., 901-1) or the second portion (e.g., 901-2; 901-3) includes: in accordance with a determination that the first input (e.g., 922; 926) is directed to the first portion (e.g., 901-1), the computer system (e.g., 900) performs the first operation; and in accordance with a determination that the first input (e.g., 920; 924) is directed to the second portion (e.g., 901-2; 901-3), the computer system performs the first operation. In some embodiments, initiating the process for performing the first operation without regard for whether the first input is directed to the first portion or the second portion includes: the computer system detects a second input (e.g., 922; 926) directed to the first portion of the touch-sensitive surface and, in response to the second input, initiates a process for performing the first operation; and the computer system detects a third input (e.g., 920; 924) directed to the second portion of the touch-sensitive surface and, in response to the third input, the computer system initiates a process for performing the first operation (e.g., without initiating a process for performing the second operation).

In some embodiments, in response to detecting the first input (e.g., 912; 914; 916; 918; 920; 922; 924; 926; 928; 934), in accordance with a determination that the respective size of the first contact is greater than the first threshold size (e.g., a size of contact shown in FIGS. 9G-9Q) and that the first input (e.g., the first contact of the first input) (e.g., 920; 922; 924) is detected on at least a subset (e.g., a portion) of the first portion (e.g., 901-1) of the touch-sensitive surface and at least a subset of the second portion (e.g., 901-2; 901-3) of the touch-sensitive surface, the computer system (e.g., 900) initiates a process for performing the first operation (e.g., without performing the second operation). Initiating a process for performing the first operation when the respective size of the first contact is greater than the first threshold size and the first input is detected on at least a subset of the first portion of the touch-sensitive surface and at least a subset of the second portion of the touch-sensitive surface, provides a technique for disambiguating inputs in a manner that reduces the risk of performing unintended actions, thereby reducing the number of inputs at the computer system and conserving computational resources. Reducing the number of inputs at the computer system enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to detecting the first input (e.g., 914; 918), in accordance with a determination that the respective size of the first contact is less than the first threshold size (e.g., a size of contact shown in FIGS. 9A-9F) and that the first contact is detected on at least a subset of the second portion (e.g., 901-2; 901-3) of the touch-sensitive surface, the computer system (e.g., 900) initiates a process for performing the first operation or the second operation based on a position of the first contact on the touch-sensitive surface (e.g., based on where a representative portion such as a center portion or edge portion of the first contact is located; based on where a majority of the first contact is located). In accordance with a determination that the position of the first contact meets a first set of position criteria (e.g., a representative portion (e.g., a center portion, an edge portion) of the first contact is located on the first portion of the touch-sensitive surface; at least a predefined amount (e.g., 25%, 35%, 45%, 51%, 55%, 60%, 75%, 85%, 95%, 99%, 100%, more than 50%) of the first contact is located on the first portion), the computer system initiates a process for performing the first operation (e.g., see input 914 in FIG. 9D). In accordance with a determination that the position of the first contact meets a second set of position criteria (e.g., a representative portion (e.g., a center portion, an edge portion) of the first contact is located on the second portion of the touch-sensitive surface; at least a predefined amount (e.g., 25%, 35%, 45%, 51%, 55%, 60%, 75%, 85%, 95%, 99%, 100%, more than 50%) of the first contact is located on the second portion), different from the first set of position criteria, the computer system initiates a process for performing the second operation (e.g., see input 918 in FIG. 9F). Initiating a process for performing the first operation or the second operation based on a position of the first contact when the respective size of the first contact is less than the first threshold size and the first contact is detected on at least a subset of the second portion of the touch-sensitive surface provides a technique for disambiguating inputs in a manner that reduces the risk of performing unintended actions, thereby reducing the number of inputs at the computer system and conserving computational resources. Reducing the number of inputs at the computer system enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first portion (e.g., 901-1) of the touch-sensitive surface includes a central portion (e.g., a center region; a region located at a midpoint of a diameter of the touch-sensitive surface) of the touch-sensitive surface (e.g., 901).

In some embodiments, the second portion (e.g., 901-2; 901-3) of the touch-sensitive surface includes an edge portion (e.g., one or more outer portions; one or more regions positioned at an edge of the touch-sensitive surface) of the touch-sensitive surface (e.g., 901). In some embodiments, the first portion is an hourglass-shaped region and the second portion includes one or more parabolic-shaped regions located adjacent a midpoint of the first portion.

In some embodiments, the computer system (e.g., 900) initiates a process for performing the first operation, including: in accordance with a determination that the computer system is currently causing output of first audio (e.g., playing music) (e.g., see FIG. 9B), the computer system ceases output of the first audio (e.g., pausing the first audio) (e.g., see FIG. 9D); and in accordance with a determination that the computer system is not currently causing output of first audio (e.g., see FIG. 9D), the computer system initiates output of the first audio (e.g., playing/initiating playback of/resuming the first audio) (e.g., see FIG. 9E).

In some embodiments, the computer system (e.g., 900) is currently causing output of second audio (e.g., at a first volume) (e.g., see FIG. 9E), and the second operation includes adjusting a volume of the second audio (e.g., increasing or decreasing the second audio to a second volume different than the first volume) (e.g., see FIGS. 9F and 9G).

In some embodiments, the touch-sensitive surface (e.g., 901) includes a third portion (e.g., 901-3) (e.g., separate from the first and second portion, physically and/or visually distinguished from the first and second portion) that is associated with a third operation (e.g., a volume increase; a volume decrease) that is different from the first operation and the second operation. In some embodiments, the second operation is a first type of volume adjustment (e.g., a volume increase operation), and the third operation is a second type of volume adjustment (e.g., a volume decrease operation).

In some embodiments, the computer system (e.g., 900) detects, via the touch-sensitive surface (e.g., 901), a second input (e.g., the first input) (e.g., 928; 934), wherein detecting the second input includes detecting second contact (e.g., the first contact of the first input) having a second respective size (e.g., a size of contact shown in FIGS. 9L, 9M, 9P, and/or 9Q) (e.g., the second input is a hand-cover gesture (e.g., a placement of a hand over a predetermined amount (e.g., 15%, 25%, 35%, 45%, 55%, 65% 75%, 80%, 85%, 90% 95%, 100%) of the touch-sensitive surface)). In response to detecting the second input, in accordance with a determination that the second respective size of the second contact is greater than a second threshold size (e.g., a size of contact shown in FIGS. 9L, 9M, 9P, and/or 9Q) (e.g., the first threshold size; a threshold size greater than the first threshold size), the computer system initiates a process for performing a fourth operation (e.g., the first operation; a different operation; a mute operation; a volume reduction operation). The process for performing the fourth operation includes in accordance with a determination that a first set of criteria is met, wherein the first set of criteria includes a first criterion that is met while the second contact is detected having the second respective size greater than the second threshold size (e.g., see FIG. 9M and/or FIG. 9Q) (e.g., while the user's hand is detected covering the touch-sensitive surface), performing the fourth operation (e.g., the fourth operation is maintained for as long as the second contact is detected having the second respective size greater than the second threshold size). The process for performing the fourth operation includes in accordance with a determination that the first set of criteria is no longer met (e.g., the second contact is no longer detected, or is no longer detected having the second respective size greater than the second threshold), ceasing to perform the fourth operation (e.g., see FIG. 9N and/or FIG. 9R). Performing the fourth operation while the second contact is detected having the second respective size greater than the second threshold size, and ceasing to perform the fourth operation when the second contact is no longer detected having the second respective size greater than the second threshold size, provides a technique for disambiguating inputs in a manner that reduces the number of inputs required for selectively performing the fourth operation for a desired amount of time, which also reduces the risk of performing unintended actions, thereby further reducing the number of inputs at the computer system and conserving computational resources. Reducing the number of inputs at the computer system enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 900) is in communication with an audio input device (e.g., 904) (e.g., a microphone). In some embodiments, the first set of criteria further includes a second criterion that is met when the computer system is engaged in (e.g., participating in, hosting) a communication session (e.g., a video communication session; a phone call) (e.g., see FIGS. 9O-9R). In some embodiments, performing the fourth operation includes muting audio input captured by (e.g., temporarily disabling; muting) the audio input device for the communication session (e.g., see FIG. 9Q) (e.g., the computer system mutes audio input detected at the microphone for the communication session for as long as the second contact is detected having the second respective size greater than the second threshold size). In some embodiments, the microphone is not disabled or muted, but rather, is using the audio input for purposes other than the communication session. For example, the audio detected at the microphone is used for providing instruction to a virtual assistant, rather than being used as audio input for the communication session.

In some embodiments, the first set of criteria further includes a third criterion that is met when the computer system (e.g., 900) is causing output of third audio (e.g., playing music) (e.g., see FIG. 9L). In some embodiments, performing the fourth operation includes reducing an output volume of the third audio from a first volume to a second volume (e.g., a non-zero volume setting; a reduced volume) different from the first volume (e.g., see FIG. 9M) (e.g., reducing the output volume for as long as the second contact is detected having the second respective size greater than the second threshold size). In some embodiments, ceasing performance of the fourth operation includes increasing the output volume of the second audio from the second volume to a third volume (e.g., see FIG. 9N) (e.g., the first volume) (e.g., when the hand-cover gesture is no longer detected, the volume is no longer reduced).

In some embodiments, the first operation is determined based on a state of the computer system (e.g., 900). In some embodiments, in accordance with a determination that the computer system has a first state in which the computer system is causing output of fourth audio (e.g., see FIG. 9L) (e.g., output of music), the computer system initiates a process for performing the first operation, including temporarily causing output of the fourth audio at a decreased output volume (e.g., see FIG. 9M) (e.g., temporarily generating the fourth audio at a reduced volume (e.g., for as long as the first input is detected)). In some embodiments, in accordance with a determination that the computer system has a second state in which the computer system is engaged in (e.g., participating in, hosting) a communication session (e.g., see FIG. 9P) (e.g., a video communication session; a phone call), the computer system initiates a process for performing the first operation, including temporarily muting audio input captured by an audio input device for the communication session (e.g., see FIG. 9Q) (e.g., a microphone that is in communication with the computer system).

Note that details of the processes described above with respect to method 1000 (e.g., FIG. 10) are also applicable in an analogous manner to the methods described below. For example, methods 700, 800, and 1200 optionally include one or more of the characteristics of the various methods described above with reference to method 1000. For example, these methods can include performing operations based on various characteristics of an input, including a size of contact, as discussed in method 1000. For brevity, these details are not repeated below.

FIGS. 11A-11R illustrate exemplary embodiments for managing media playback devices, in accordance with some embodiments. The embodiments in these figures are used to illustrate the processes described below, including the processes in FIGS. 12A and 12B.

FIGS. 11A-11R depict various examples in which device 900 performs one or more operations in response to inputs that are received at device 900 when device 900 is in various operational states, as indicated by various characteristics of light 905 displayed at device 900. In the embodiments illustrated in FIGS. 11A-11R, display 902 is generally distinguished from touch-sensitive surface 901 by the depiction of light (e.g., light 905). However, because the display may not be activated in all figures or, when activated, the light can vary in displayed size (as well as other characteristics such as brightness, intensity, color, pattern, movement, etc.), reference number 902 should be understood to refer generally to the display component of device 900.

In FIGS. 11A-11R, touch-sensitive surface 901 includes first portion 901-1, second portion 901-2, and third portion 901-3. Second portion 901-2 includes feature 901A, and third portion 901-3 includes feature 901B. In some embodiments, features 901A and 901B are physical markings such as ridges or etchings that distinguish the second and third portions from the first portion (this is because the dashed lines separating the first, second, and third portions are for illustrative purposes only and are not part of device 900). Each respective portion corresponds to one or more operations that can be performed at device 900 in response to an input at the respective portion. In some embodiments, the operation(s) that is associated with a respective portion depends on the state of device 900, as discussed in greater detail below. Thus, as the state of device 900 changes, the operation(s) associated with the respective portion can also change.

In some embodiments, the state of device 900 is indicated by one or more characteristics of light 905 such as, for example, the color, size, and/or brightness of light 905, as discussed in greater detail below. FIGS. 11A-11R, and the corresponding description of those figures, demonstrate various non-limiting examples of the states of device 900, operations device 900 performs during these states, and various combinations of the characteristics of light 905 displayed by device 900 during these states and operations. The examples in FIGS. 11A-11R are for illustrative purposes, and are not intended to limit the states, operations, and light characteristics that can be performed by device 900. Thus, additional combinations of states, operations, and light characteristics can be performed by device 900, as understood from the examples provided herein.

In some embodiments, the state of device 900 is indicated by the displayed size of light 905. For example, light 905 is a small size (e.g., less than a predetermined size threshold) when device 900 is in a first state, and light 905 is a large size (e.g., greater than the predetermined size threshold) when device 900 is in a second (different) state. Accordingly, portions 901-1, 901-2, and 901-3 have a first set of operations associated with the portions during the first state and a second set of operations associated with the portions during the second state. In some embodiments, device 900 is in the first state, and displays light 905 having a small size, when device 900 is playing music or audio for communication sessions such as a phone call, a video call, or an incoming audio message. In some embodiments, device 900 is in the second state, and displays light 905 having a large size, when device 900 is in a virtual assistant state (discussed above), performing a timer or alarm operation, recording an outgoing audio message, or, in some embodiments, when audio playback is transitioning to (or from) device 900, as discussed above with respect to FIGS. 6A-6X.

In some embodiments, the state of device 900 is indicated by the color of light 905. For example, device 900 displays light having a green color when device 900 is in a communication state, having a multi-color pattern when device 900 is in a virtual assistant state, having a white color (or a color that corresponds to a particular song or album) when device 900 is in a music playback state, having an amber color when device 900 is in a low power state (e.g., device 900 has a low power supply), or having a red color when device 900 needs to be reset. In the embodiments depicted in FIGS. 11A-11R, different colors of light 905 are represented by different hatch patterns.

In some embodiments, the state of device 900 is indicated by the brightness of light 905 or a temporary change in brightness. For example, device 900 displays light 905 having a dim state when music is paused, and displays light 905 having a brighter state when music is playing. As another example, device 900 temporarily brightens light 905 to indicate an input is received at device 900, and dims light 905 when an input has not been received at device 900 for a predetermined amount of time. In some embodiments, device 900 brightens or dims light 905 in response to volume adjustments (e.g., increase brightness with a volume increase and decrease brightness with a volume decrease). In some embodiments, the brightness of light 905 is represented by the shade of light 905 depicted in the figures. For example, darker shades of light 905 can represent brighter display of light, and lighter shades of light 905 can represent dimmer display of light.

In some embodiments, the operation(s) that is performed at device 900 in response to an input depends on various characteristics of the input such as, for example, a size, location, and/or duration of the input. For example, in some embodiments, a respective portion of touch-sensitive surface 901 can be associated with two operations that can be performed in response to an input at the respective portion, and device 900 performs a first operation when the input has a first set of characteristics and performs a second operation when the input has a second set of characteristics.

FIGS. 11A-11H illustrate embodiments in which various operations are associated with portions 901-1, 901-2, and 901-3 when device 900 is in a first state. Because device 900 is in the first state, device 900 displays light 905 having a small size, to indicate that distinct operations can be performed at each of portions 901-1, 901-2, and 901-3.

In FIG. 11A, device 900 is currently in a music playback state in which the music is paused (as depicted by indicator 1110), and the volume setting is 5 (as depicted by indicator 1115). In the embodiment depicted in FIG. 11A, device 900 displays light 905 (e.g., similar to light 607 and light 905) when device 900 is in the state for playing music. In some embodiments, the color of light 905 varies depending on the audio being output at device 900. For example, in some embodiments, when the audio is music, the light is a white hue or has a color that corresponds to the music that device 900 is playing. In the embodiment depicted in FIG. 11A, light 905 has a dim white hue. The white color indicates that the audio is music, and the dimmed brightness indicates that the music is paused. In some embodiments, device 900 does not display light 905 when the music is paused.

In FIG. 11A, device 900 detects input 1112 (e.g., a small, tap input) on first portion 901-1. In response, device 900 pulses light 905 (e.g., to indicate receipt of the input) and resumes playback of the music at a volume of 5, as depicted by indicators 1110 and 1115, as shown in FIG. 11B. The pulse of light 905 is depicted in FIG. 11B (and similar figures) by outer portion 905-1 of light 905 and inner portion 905-2 of light 905, which represent a temporary increase in the size and, optionally, brightness of light 905. The increased size is depicted by the larger displayed region of light 905. The increased brightness is depicted by the darker shading of inner portion 905-2. Outer portion 905-1 has the same shade as light 905 in FIG. 11A, and inner portion 905-2 is depicted with a darker shade than outer portion 905-1, indicating that the inner portion of light 905 is brighter than outer portion 905-1 (and light 905 in FIG. 11A). In some embodiments, device 900 blinks light 905 in addition to, or in lieu of, the pulsing light 905.

Figure 11C:
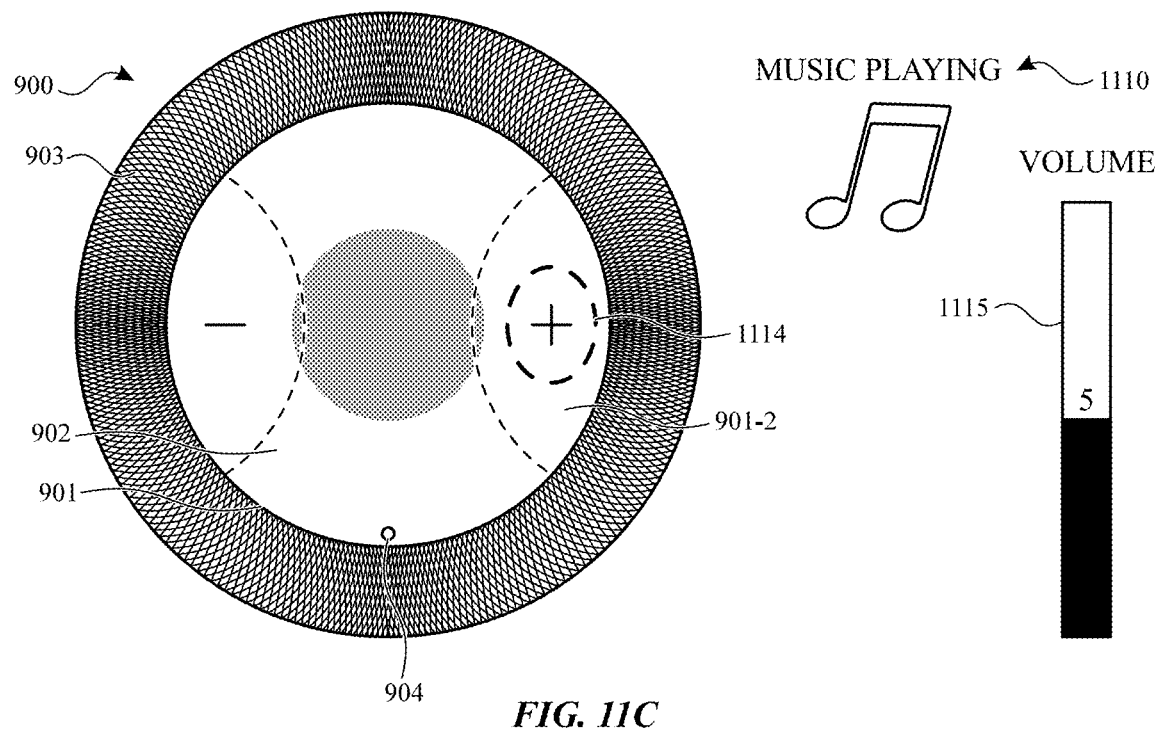
Figure 11D:
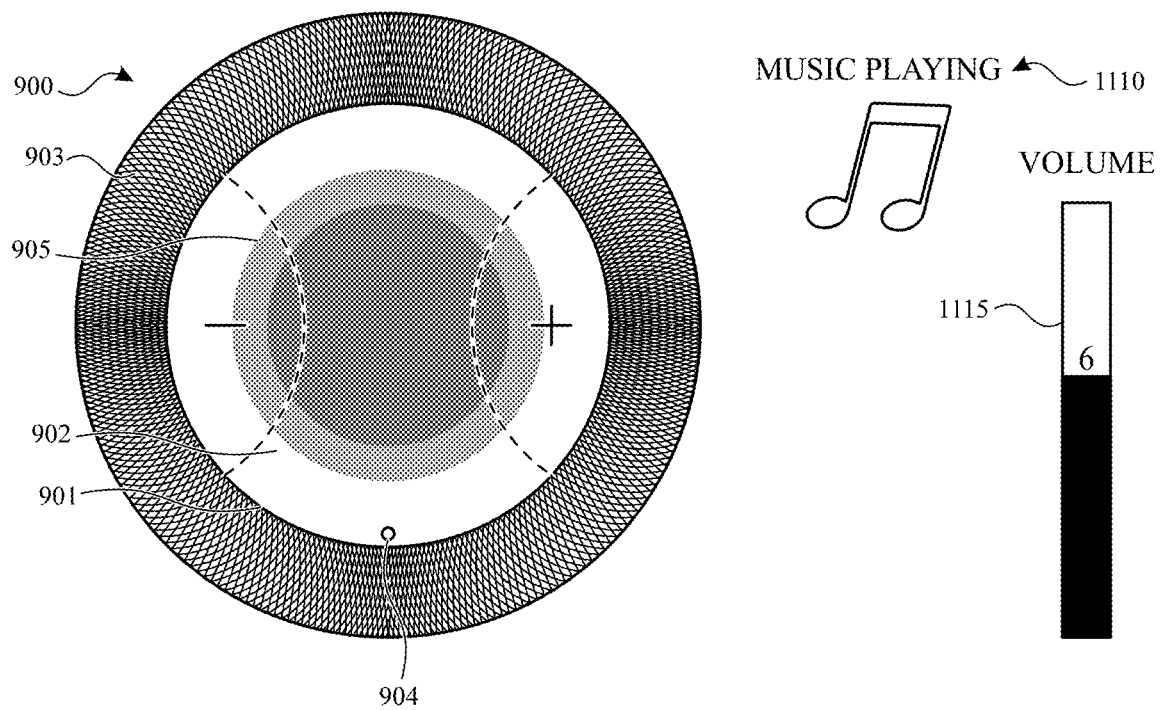

In FIG. 11C, device 900 is playing music at a volume of 5 and displays light 905 having a brighter, larger appearance than in FIG. 11A to indicate music is playing. In some embodiments, device 900 displays light 905 having an animated appearance that moves, flickers, pulses, changes colors, or the like in concert with the beat of the music. In some embodiments, device 900 displays light 905 having a color that represents the music. As shown in FIG. 11C, device 900 detects input 1114 (e.g., a small, tap input) on portion 901-2. In response, device 900 pulses light 905 and increases the volume from level 5 to level 6, as depicted in FIG. 11D.

Figure 11E:
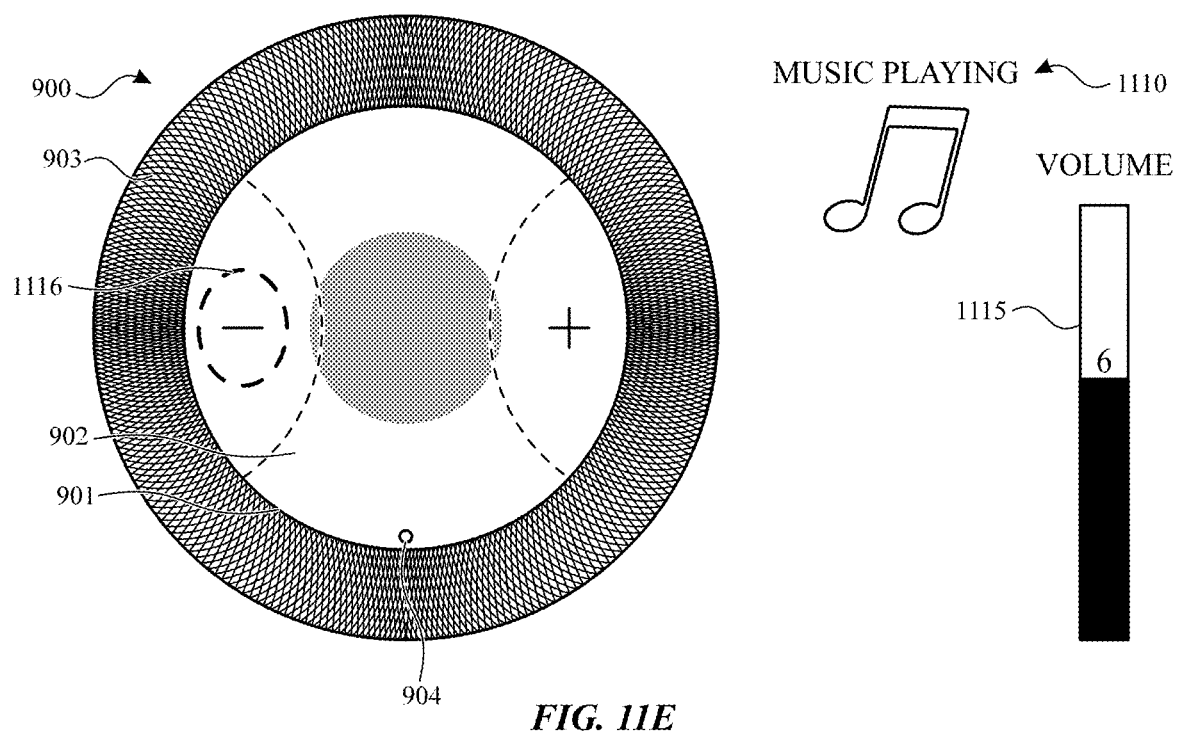
Figure 11F:
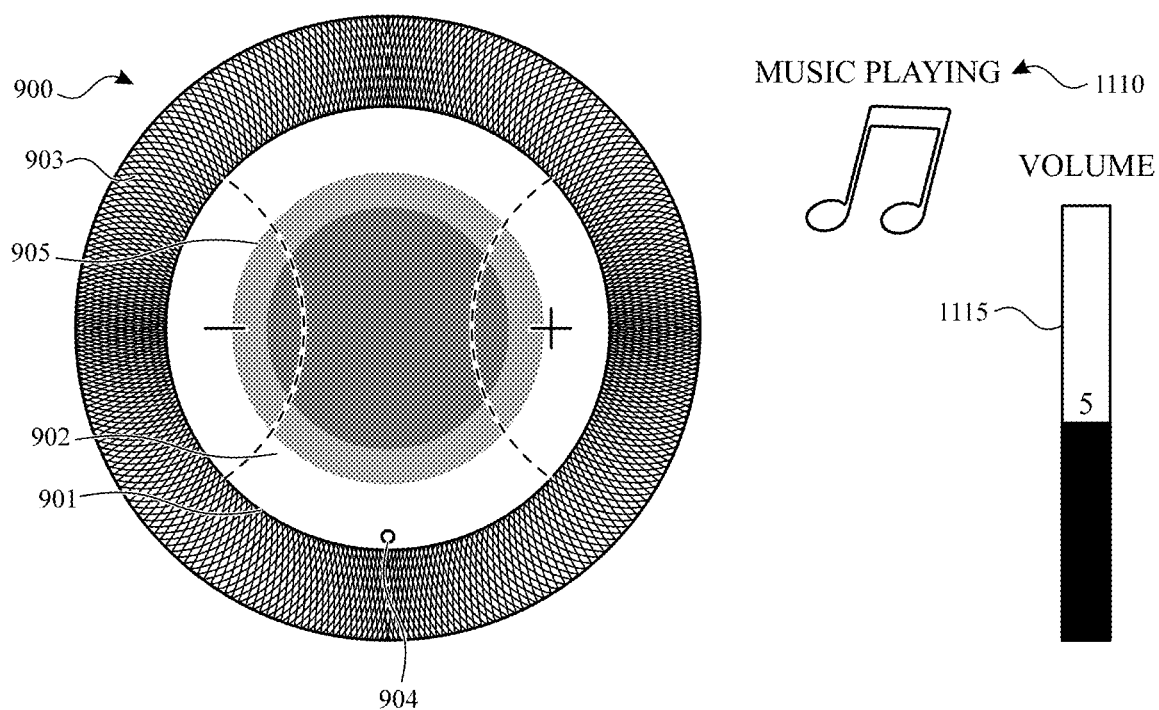

In FIG. 11E, device 900 is playing music at a volume of 6 and detects input 1116 (e.g., a small, tap input) on portion 901-3. In response, device 900 pulses light 905 and decreases the volume from level 6 to level 5, as depicted in FIG. 11F.

Figure 11G:
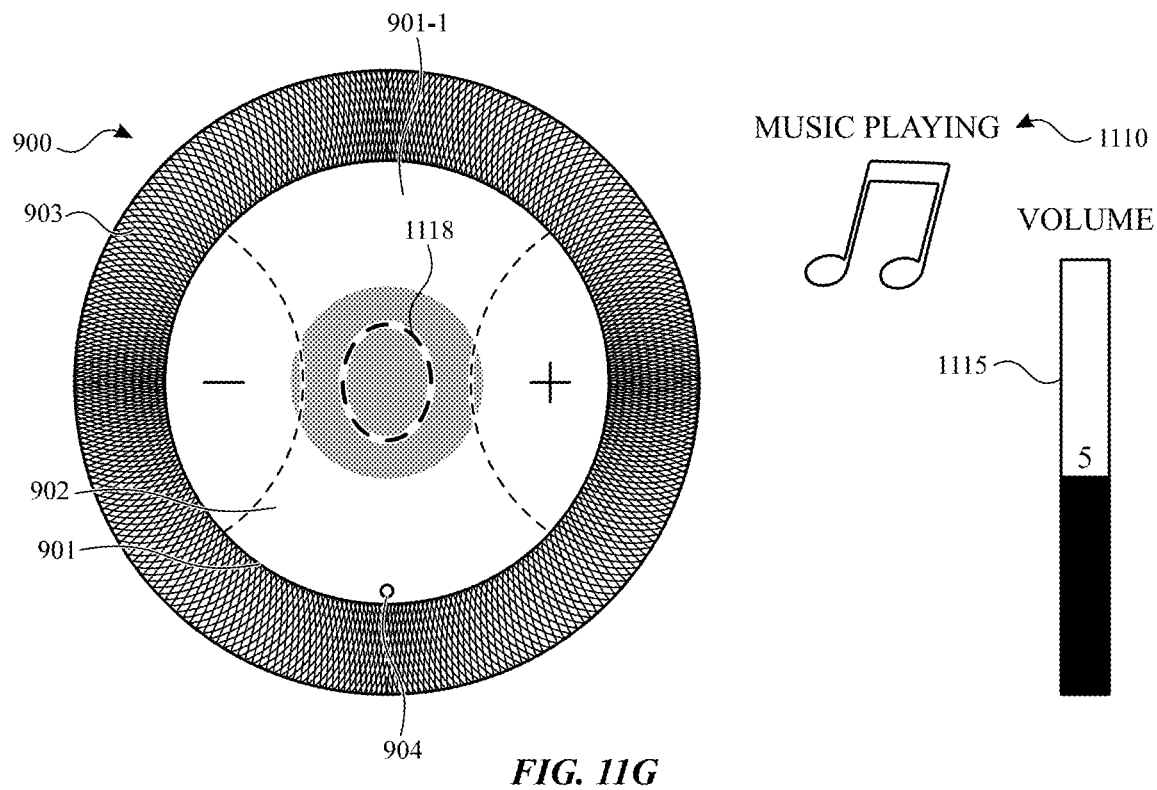
Figure 11H:
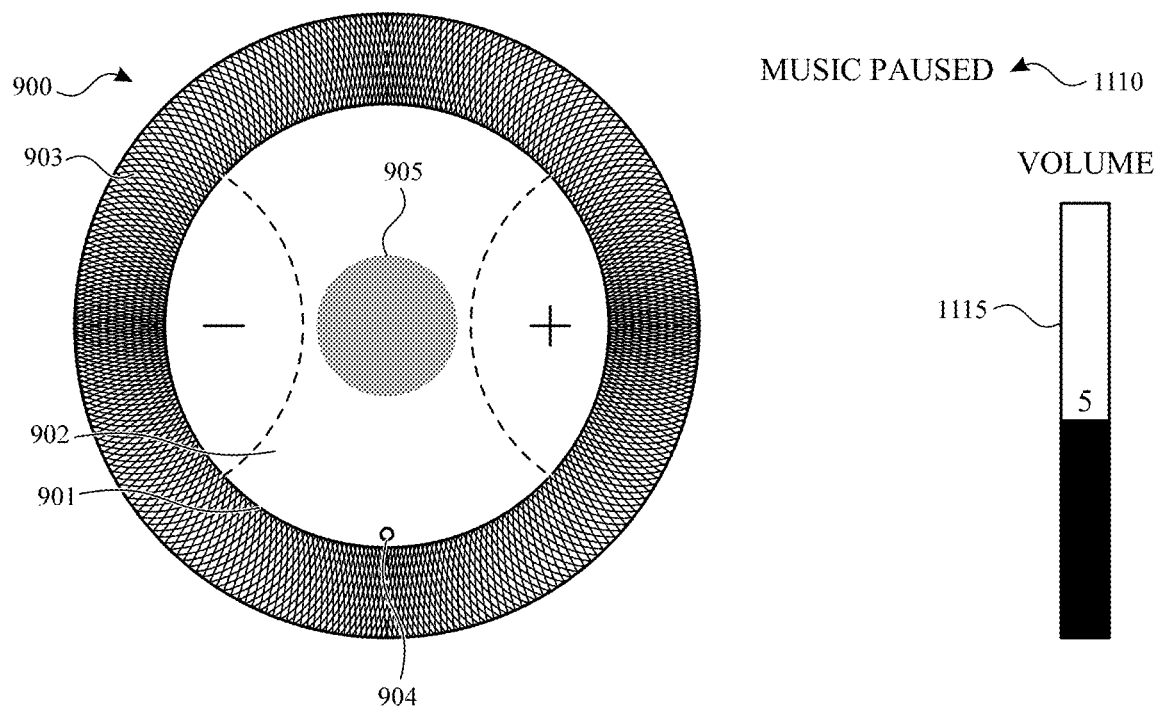

In FIG. 11G, device 900 is playing music at volume 5 and detects input 1118 (e.g., a small, tap input) on portion 901-1. In response, device 900 pauses the music, as depicted by indicator 1110, and shrinks light 905 to a dim, white color to represent the paused state, as depicted in FIG. 11H.

In the embodiments depicted in FIGS. 11A-11H, device 900 increases or decreases the volume in response to an input (e.g., input 1114 or input 1116) at second portion 901-2 or third portion 901-3, and pauses or plays music in response to an input (e.g., input 1112 or input 1118) at portion 901-1, when device 900 is in a music playback state. In some embodiments, however, device 900 can perform different operations in response to inputs detected at portion 901-1. For example, in some embodiments, device 900 can initiate or cancel a task in response to detecting an input at portion 901-1. For example, in response to detecting an input at portion 901-1, device 900 can initiate or cancel a virtual assistant operation, initiate or cancel a timer operation, initiate or cancel an alarm operation, or initiate or cancel a communication session. An embodiment is depicted in FIGS. 11I and 11J, where device 900 is in a communication state, and input at portion 901-1 terminates the communication session.

Figure 11I:
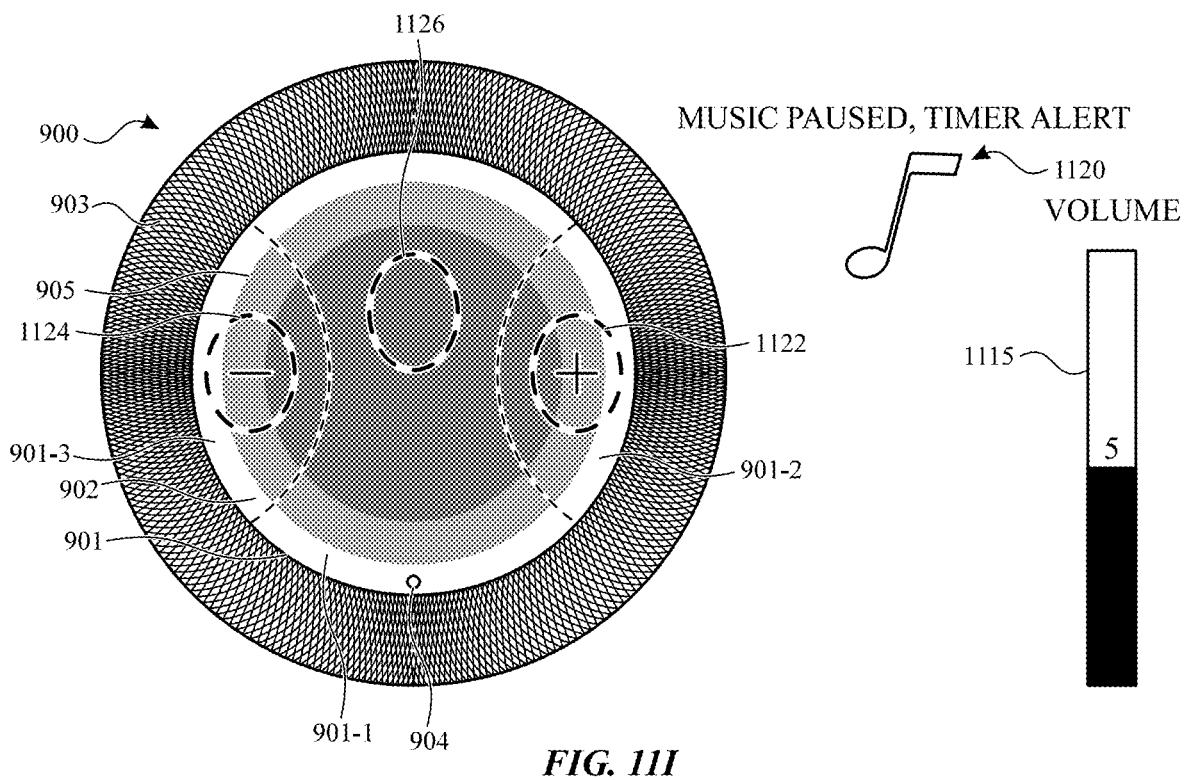
Figure 11J:
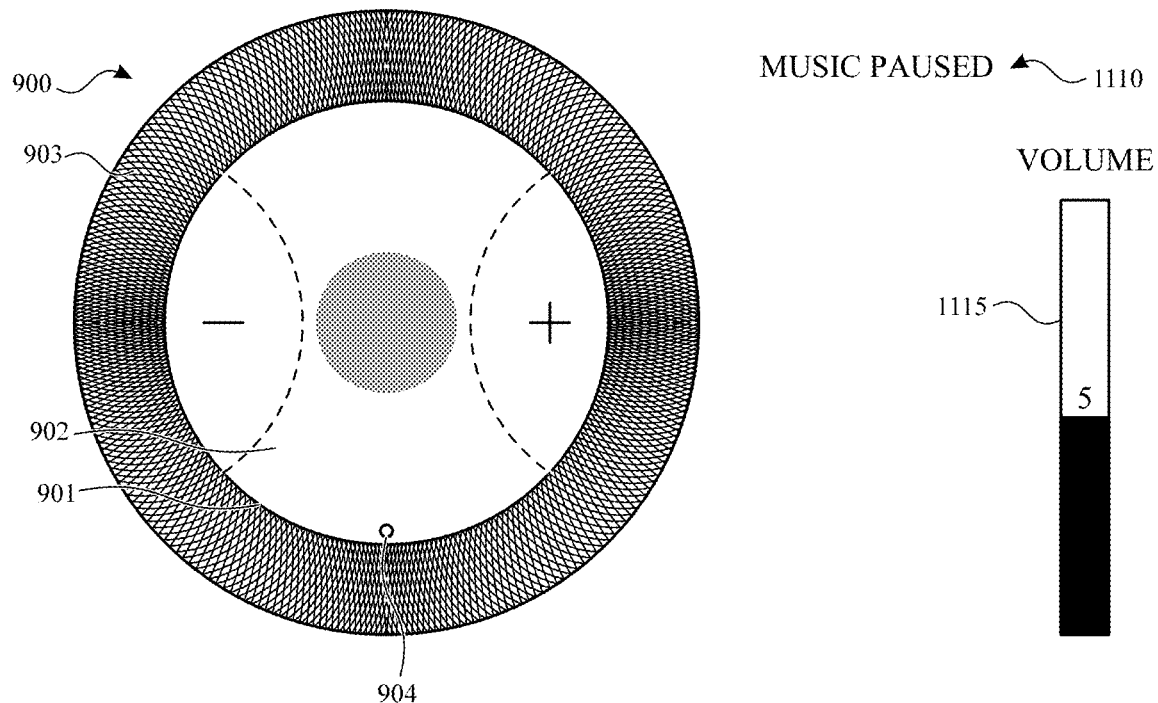

In FIG. 11I, device 900 is in a communication state in which device 900 is outputting audio for a video or audio communication, as depicted by indicator 1120. Device 900 also displays light 905 having a green color (represented by the hatching) to indicate device 900 is in the communication state. While in the communication state, device 900 performs volume adjustment operations in response to inputs (e.g., tap inputs 1122 and 1124) on the second and third portions of touch-sensitive surface 901, and terminates the communication session in response to an input (e.g., tap input 1126) on the first portion of touch-sensitive surface 901. In response to detecting input 1126 on first portion 901-1, device 900 terminates the communication session, and resumes playing music, as depicted in FIG. 11J.

FIGS. 11K-11N depict various embodiments in which device 900 is in a state in which it does not perform a volume adjustment operation in response to inputs at second portion 901-2 or third portion 901-3 and, instead, performs an operation that is associated with first portion 901-1. As mentioned above, this state can be a virtual assistant state, a state in which device 900 is performing a timer or alarm operation, a state in which device 900 is recording an outgoing audio message, or, in some embodiments, when audio playback is transitioning to (or from) device 900, as discussed above with respect to FIGS. 6A-6X. In the embodiments depicted in FIGS. 11K-11N, device 900 displays light 905 having a large size to indicate device 900 is in the state in which the operations (e.g., volume adjustment operations) previously associated with portions 901-2 and 901-3 are disabled, and different operations (the operation(s) associated with first portion 901-1) are reassigned to the respective second and third portions.

Figure 11K:
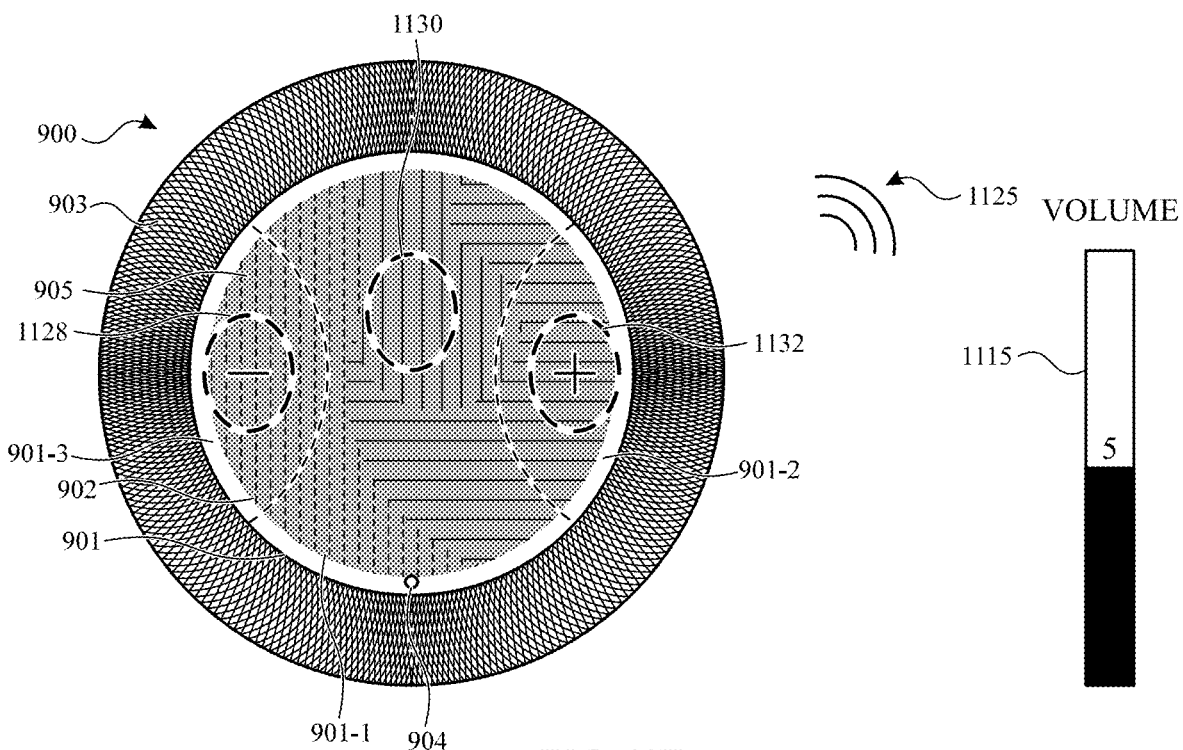
Figure 11L:
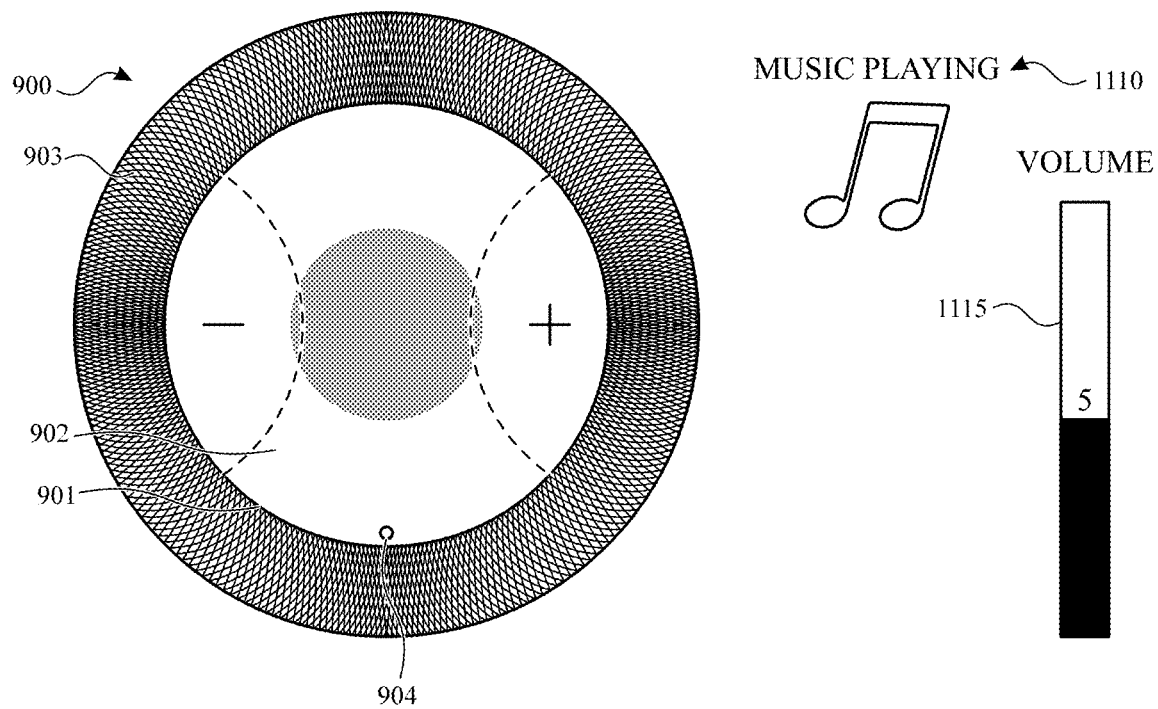

In FIG. 11K, device 900 is performing an alert operation. For example, device 900 was previously playing music and, in response to determining that a timer has expired, device 900 transitioned to the alert state in which device 900 pauses the music and generates an alert, as depicted by indicators 1125, that consists of an audio output and a display of light 905 having a large size and, optionally, a pulsing behavior. While device 900 is performing the alert operation, portions 901-2 and 901-3 are no longer associated with operations for performing a volume adjustment. Instead, portions 901-2 and 901-3 are configured to perform the same operation that is assigned to first portion 901-1, which is an operation to terminate the alert. Thus, in response to any of inputs 1128, 1130, and 1132, device 900 terminates the alert, as depicted in FIG. 11L. In some embodiments, device 900 resumes playing the music after terminating the alert. In some embodiments, device 900 continues to pause the music, as depicted in FIG. 11L.

Figure 11M:
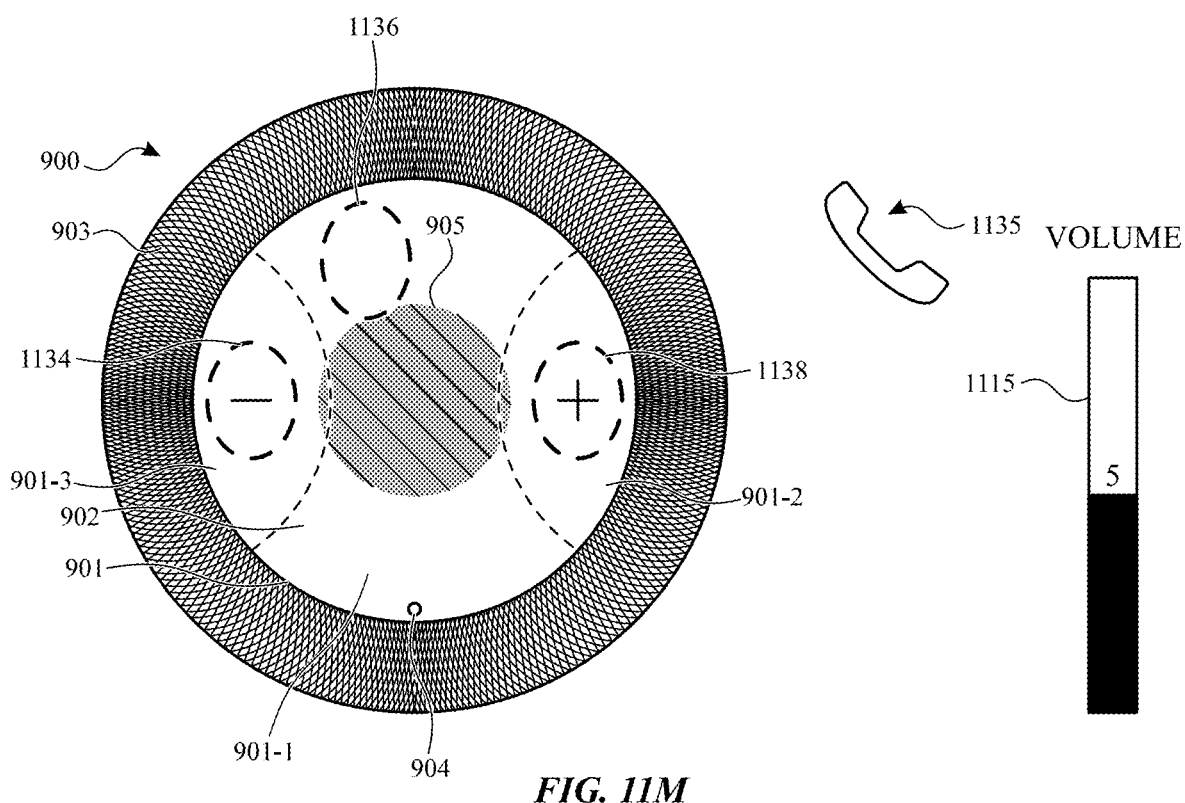
Figure 11N:
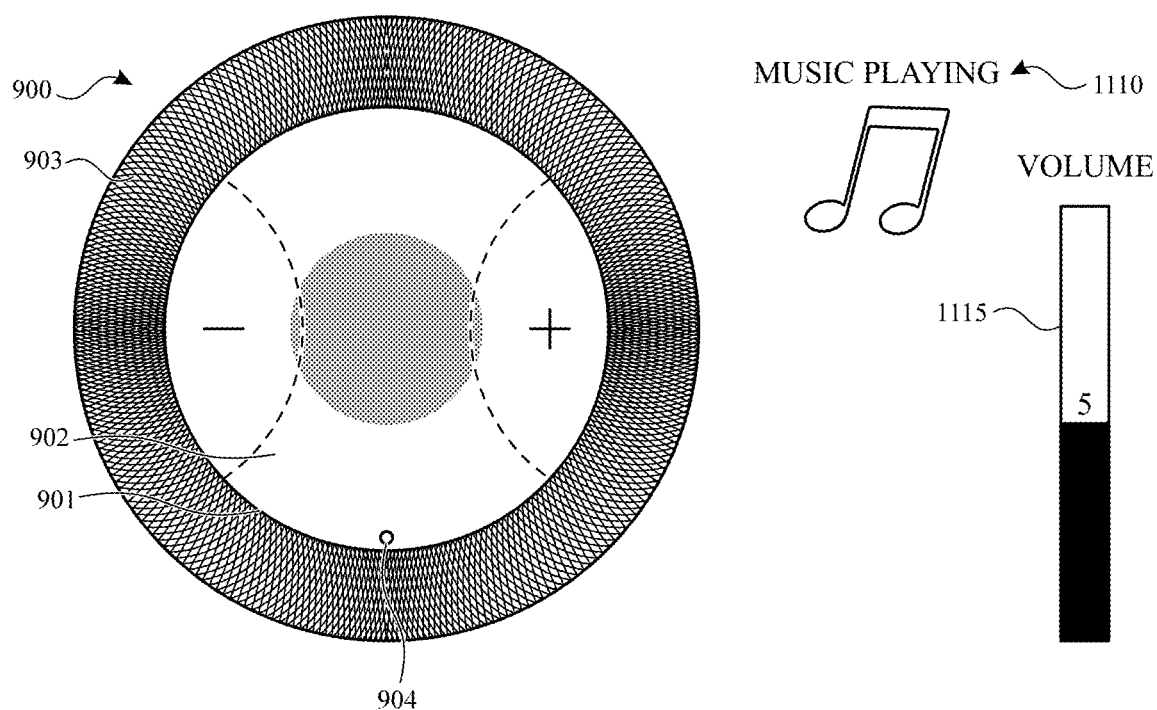
Figure 11O:
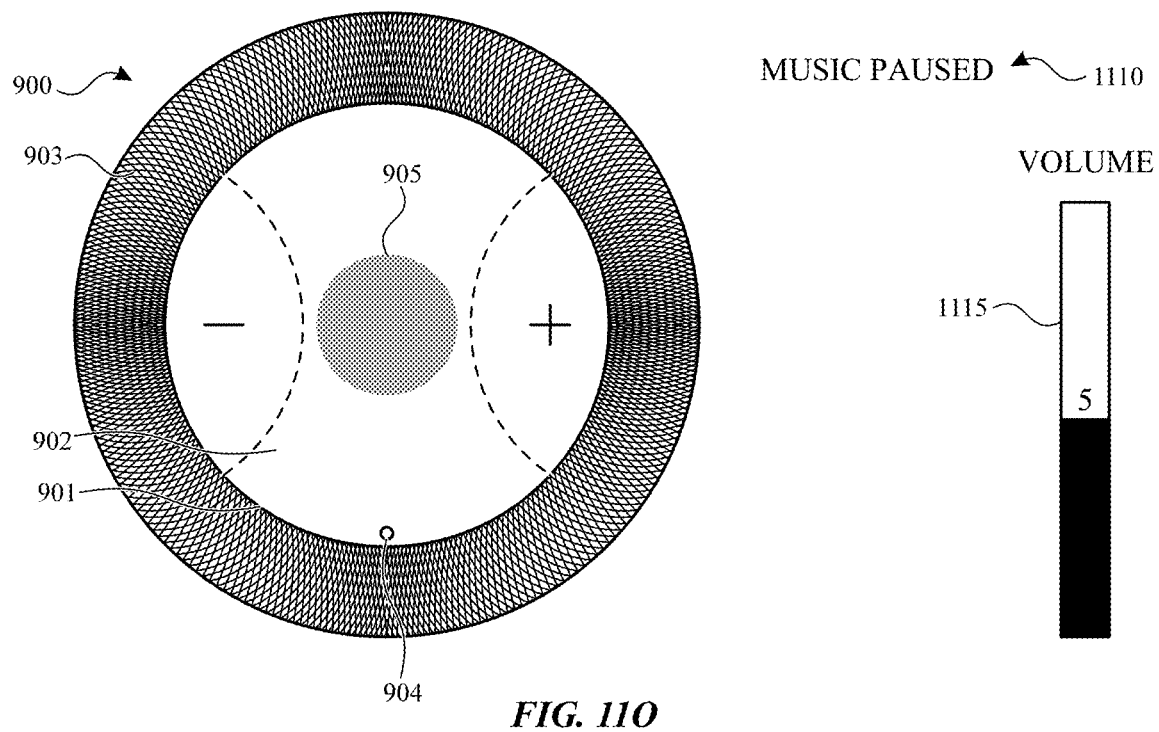

In FIG. 11M, device 900 has transitioned from a music playback state to a virtual assistant state where device 900 is performing a virtual assistant operation. Device 900 is outputting virtual assistant audio, as depicted by indicator 1135, and displays light 905 having a large size and multi-color appearance depicted by different hatch patterns on light 905. While device 900 is in the virtual assistant state, portions 901-2 and 901-3 are no longer associated with operations for performing a volume adjustment. Instead, portions 901-2 and 901-3 are configured to perform the same operation that is assigned to first portion 901-1, which is an operation to terminate the virtual assistant state. Thus, in response to any of inputs 1134, 1136, and 1138, device 900 terminates the virtual assistant state, as depicted in FIG. 11N. In some embodiments, device 900 resumes playing the music after terminating the virtual assistant state, as depicted in FIG. 11N. In some embodiments, device 900 continues to pause the music after terminating the virtual assistant state.

Figure 11P:
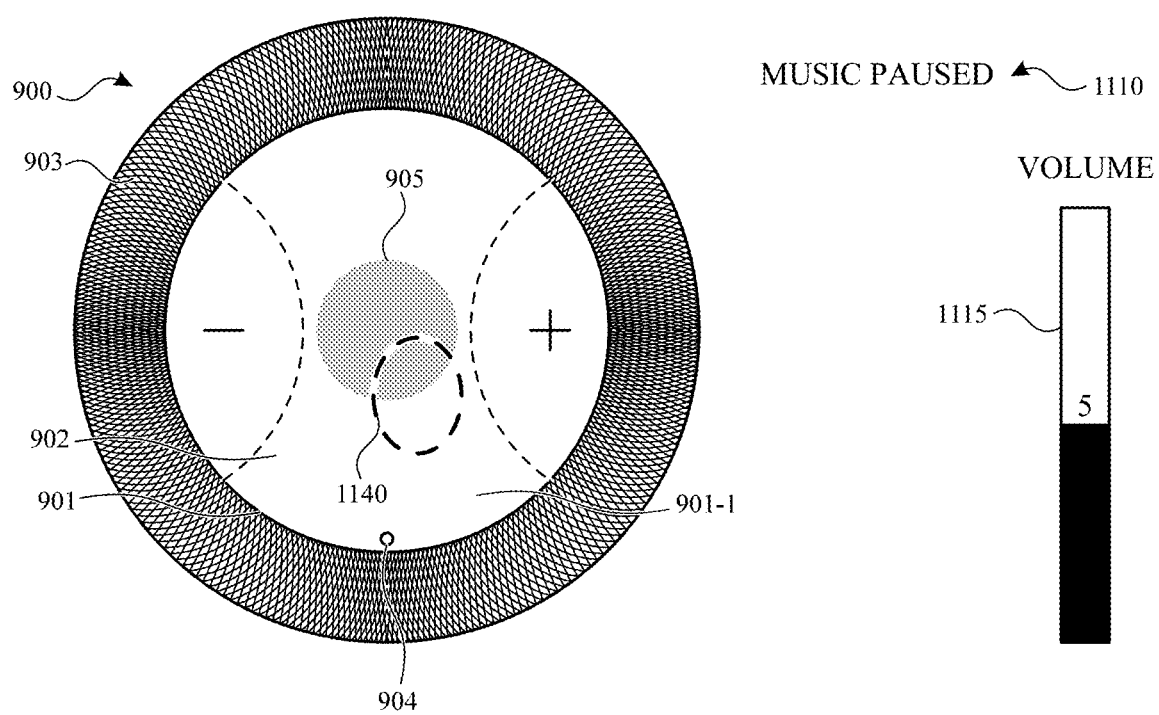
Figure 11Q:
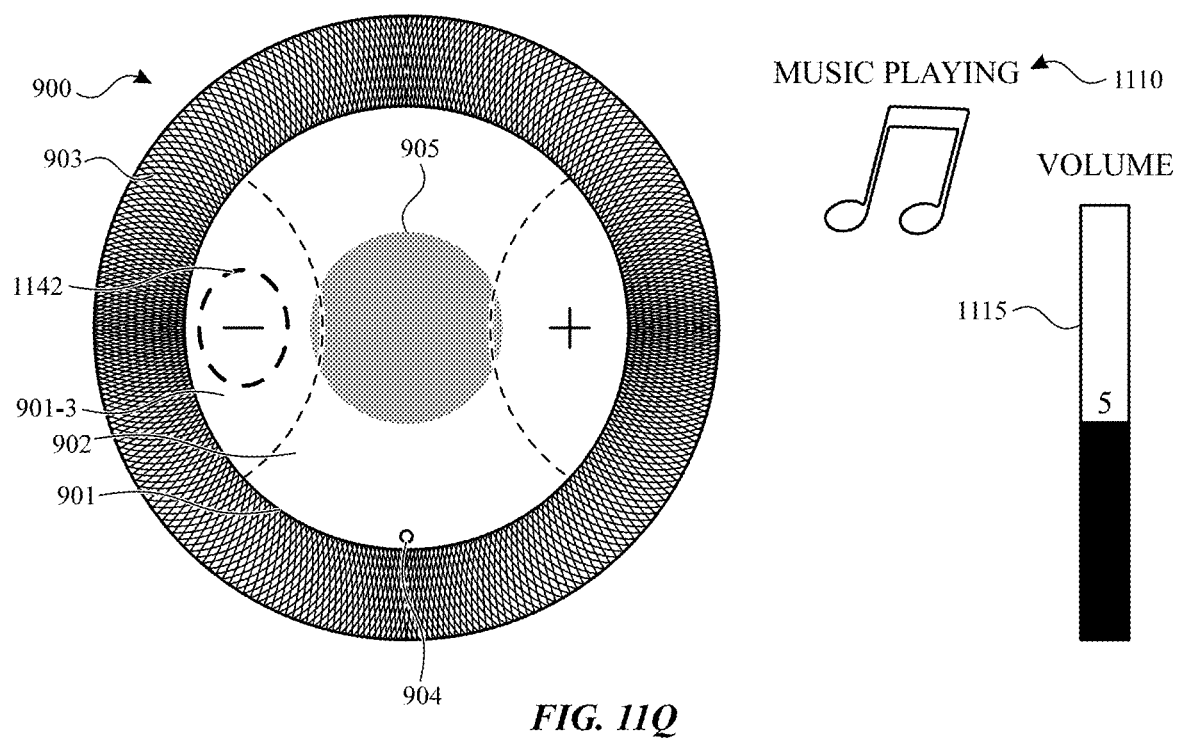
Figure 11R:
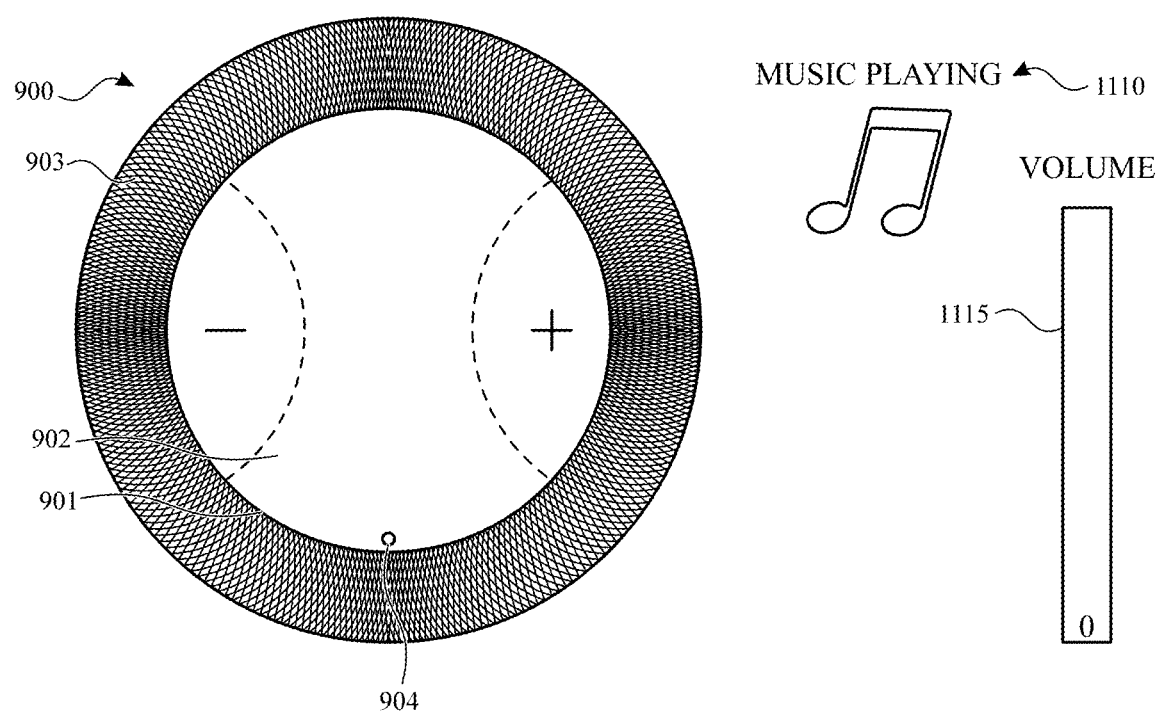
Figure 12B:
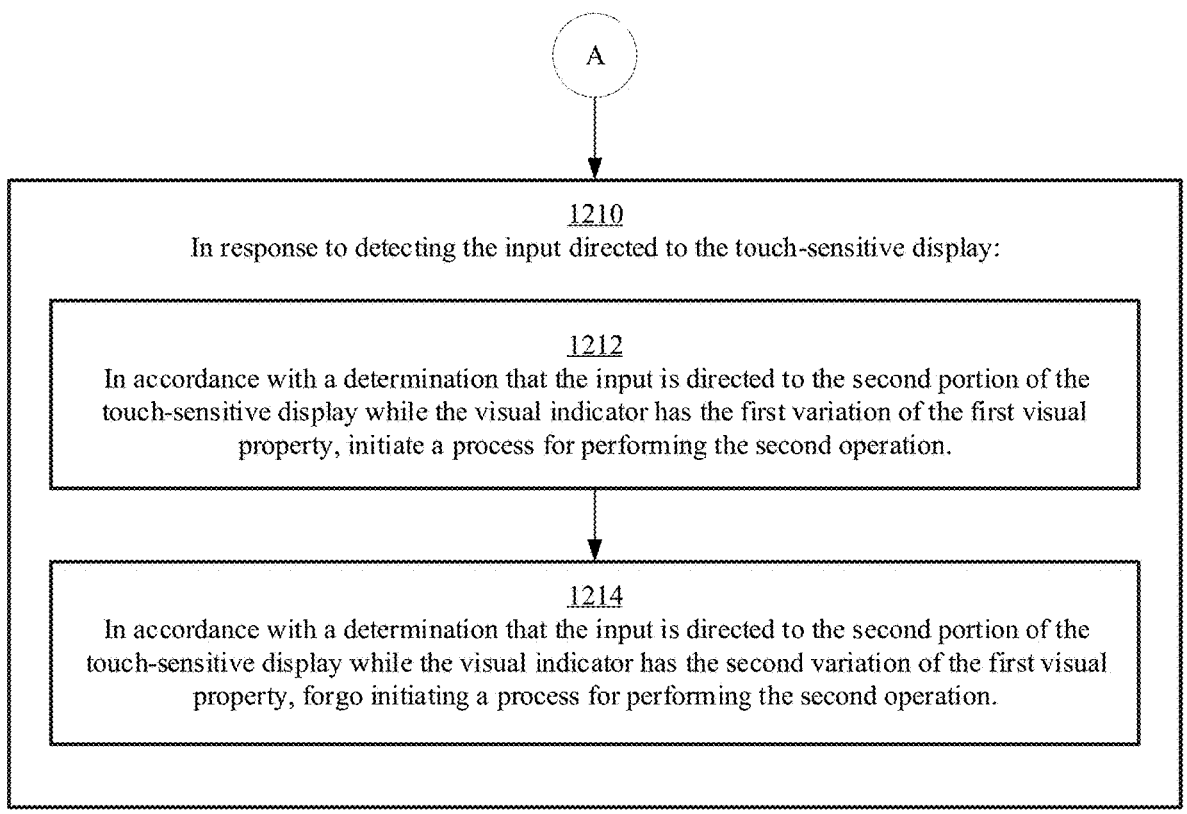

FIGS. 11O-11R depict device 900 changing the state of light 905 in response to detecting various conditions and inputs. For example, in FIG. 11O, device 900 determines the music has been paused for a predetermined period of time and, in response, dims light 905, as depicted in FIG. 11P. While light 905 is dimmed in FIG. 11P, device 900 detects input 1140 on first portion 901-1 and, in response, increases the brightness of light 905 and resumes playing music, as depicted in FIG. 11Q. In some embodiments, in response to input 1140, device 905 increases the brightness of light 905 to the brightness in FIG. 11O without performing the operation associated with the portion of the touch-sensitive surface 901 at which input 1140 was detected (e.g., the music remains paused).

In FIG. 11Q, device 900 is playing music at a volume of 5, as depicted by indicators 1110 and 1115. Device 900 detects one or more inputs 1142 (e.g., a tap-and-hold input or a series of tap inputs) at portion 901-3 and, in response, reduces the volume to 0, and dims light 905 to an "off" state, as depicted in FIG. 11R.

FIGS. 12A and 12B depict a flow diagram illustrating a method for managing media playback devices using an electronic device in accordance with some embodiments. Method 1200 is performed at a device (e.g., 100, 300, 500, 900) with a touch-sensitive display (e.g., 901, 902). Some operations in method 1200 are, optionally, combined, the orders of some operations are, optionally, changed, and some operations are, optionally, omitted.

In some embodiments, the electronic device (e.g., 900) is a computer system (e.g., a speaker; a digital media player) that includes a touch-sensitive display (e.g., 901, 902) having a first portion (e.g., 901-1) and a second portion (e.g., 901-2; 901-3), wherein the touch-sensitive display includes one or more physical features (e.g., 901A; 901B) (e.g., ridges, bumps, markings, textures, etchings, indicia) that distinguishes the second portion from the first portion (e.g., the second portion is different from the first portion). In some embodiments, the second portion is visually and/or texturally different form the first portion. In some embodiments, the one or more physical features are provided (e.g., printed, displayed, etched, engraved, overlaid, molded) on and/or below the touch-sensitive display. In some embodiments, the first portion is associated with a first operation. In some embodiments, the second portion is not associated with the first operation. In some embodiments, the second portion is conditionally associated with the first operation based, for example, on an operation that can be performed in response to an input at the second portion.

As described below, method 1200 provides an intuitive way for managing media playback devices. The method reduces the cognitive burden on a user for managing media playback devices, thereby creating a more efficient human-machine interface. For battery-operated computing devices, enabling a user to manage media playback devices faster and more efficiently conserves power and increases the time between battery charges.

At method 1200, while the first portion (e.g., 901-1) of the touch-sensitive display (e.g., 901) is configured to cause the computer system (e.g., 900) to perform a first operation (e.g., a playback control operation; pause; play; mute; unmute) in response to detecting an input on the first portion, the computer system outputs (1202) (e.g., displays) a visual indicator (e.g., 905) (e.g., a status light) on the touch-sensitive display (e.g., via one or more displays 902). The visual indicator occupies at least a subset of the first portion of the touch-sensitive display. A first visual property (e.g., size, brightness, color, and/or pulse behavior) of the visual indicator indicates an operational state (e.g., active/inactive) of the second portion (e.g., 901-2; 901-3) for (e.g., with respect to) performing a second operation (e.g., volume up; volume down) different from the first operation (e.g., one or more operations that are different from the first operation) (e.g., the status light indicates whether or not the second portion of the touch-sensitive surface is configured or operable to perform the second operation(s)). Outputting a visual indicator on the touch-sensitive display that occupies at least a subset of the first portion of the display, wherein a first visual property of the visual indicator indicates an operational state of the second portion for performing a second operation different from the first operation, provides feedback to a user of the computer system of an operational state of the second portion of the touch-sensitive display. Providing improved feedback reduces the number of inputs at the computer system (e.g., by informing the user of the operational state of the second portion of the touch-sensitive display without requiring the user to provide input to discern the operational state), enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In accordance with a determination that the second portion (e.g., 901-2; 901-3) of the touch-sensitive display (e.g., 901) is operable (e.g., configured) to initiate a process for performing the second operation (e.g., the second portion of the touch-sensitive surface is configured to perform the second operation), the computer system (e.g., 900) outputs (1204) the visual indicator (e.g., 905) having a first variation (e.g., value, shape, pattern, and/or size) of the first visual property (e.g., a first size (e.g., a size that does not include the second portion, or a majority of the second portion, of the touch-sensitive display); light 905 having a size shown in FIGS. 11A, 11C, 11E, 11G, and/or 11I).

In accordance with a determination that the second portion (e.g., 901-2; 901-3) of the touch-sensitive display (e.g., 901) is not operable (e.g., configured) to initiate the process for performing the second operation (e.g., the second portion of the touch-sensitive surface is not configured to perform the second operation), the computer system (e.g., 900) outputs (1206) the visual indicator (e.g., 905) having a second variation (e.g., value, shape, pattern, and/or size) of the first visual property different from the first variation (e.g., a second size different from the first size) (e.g., a larger size than the first size) (e.g., a size that includes at least a subset (portion), or a majority, of the second portion of the touch-sensitive display) (e.g., light 905 having a size shown in FIG. 11K and/or FIG. 11M). In some embodiments, outputting the status light having the larger size includes outputting the status light at the first portion of the touch-sensitive surface and at least a portion of the second portion of the touch-sensitive surface (e.g., covering the first portion and overlapping at least a portion of the second portion).

In method 1200, the computer system (e.g., 900) detects (1208) an input (e.g., 1112; 1114; 1116; 1118; 1122; 1124; 1126; 1128; 1130; 1132; 1134; 1136; 1138; 1140; 1142) (e.g., a touch input) directed to the touch-sensitive display (e.g., 901).

In response (1210) to detecting the input directed to the touch-sensitive display (e.g., 901), the computer system (e.g., 900) performs the following steps. In accordance with a determination that the input (e.g., 1114; 1116; 1122; 1124; 1142) is directed to the second portion (e.g., 901-2) of the touch-sensitive display (e.g., 901) (e.g., at least a predefined amount (e.g., 10%, 25%, 35%, 45%, 51%, 55%, 60%, 75%, 85%, 95%, 99%, 100%, more than 50%) of the touch contact is located within the second portion) while the visual indicator has the first variation of the first visual property (e.g., a small displayed size) (e.g., light 905 has a size shown in FIGS. 11A, 11C, 11E, 11G, and/or 11I), the computer system initiates (1212) a process for performing the second operation (e.g., perform a volume adjustment). In accordance with a determination that the input (e.g., 1128; 1132; 1134; 1138) is directed to the second portion of the touch-sensitive display while the visual indicator has the second variation of the first visual property (e.g., a large displayed size) (e.g., light 905 having a size shown in FIG. 11K and/or FIG. 11M), the computer system forgoes (1214) initiating a process for performing the second operation (e.g., do not perform a volume adjustment). In some embodiments, the computer system performs the first operation when an input is detected at the second portion of the touch-sensitive surface when the status light has the second variation of the visual property.

In some embodiments, in response to detecting the input (e.g., 1112; 1118; 1126; 1140) directed to the touch-sensitive display (e.g., 901) while the visual indicator (e.g., 905) has the first variation of the first visual property (e.g., a small displayed size), and in accordance with a determination that the input is directed to the first portion (e.g., 901-1) of the touch-sensitive display (e.g., at least a predefined amount (e.g., 25%, 35%, 45%, 51%, 55%, 60%, 75%, 85%, 95%, 99%, 100%, more than 50%) of the touch contact is located within the first portion), the computer system (e.g., 900) initiates a process for performing the first operation (e.g., perform a playback control operation; pause; play; mute; unmute). In some embodiments, in response to detecting the input (e.g., 1130; 1136) directed to the touch-sensitive display while the visual indicator has the second variation of the first visual property (e.g., a large displayed size), and in accordance with a determination that the input is directed to the first portion (e.g., 901-1) of the touch-sensitive display (e.g., 901), the computer system (e.g., 900) initiates a process for performing the first operation. In some embodiments, when the input is directed to the first portion of the touch-sensitive display, the first operation is performed without regard for whether the status light has the first or second variation of the first visual property.

In some embodiments, the first visual property is a size of the visual indicator (e.g., 905). In some embodiments, the first variation of the first visual property is a first size (e.g., a size that does not include the second portion of the touch-sensitive display) (e.g., light 905 has the size shown in FIGS. 11A, 11C, 11E, 11G, and/or 11I). In some embodiments, the second variation of the first visual property is a second size that is greater (e.g., larger) than the first size (e.g., a size that includes at least a subset of the second portion of the touch-sensitive display) (e.g., light 905 has the size shown in FIG. 11K and/or FIG. 11M). In some embodiments, the second portion (e.g., 901-2; 901-3) of the touch-sensitive display is not operable to initiate the process for performing the second operation when the visual indicator has the second size. In some embodiments, when the status light has the larger size that includes (e.g., encompasses) both the first portion of the touch-sensitive display and a subset (portion) of the second portion of the touch-sensitive display, the second portion of the touch-sensitive display is not operable to perform the second operation (e.g., operable to initiate the process for performing the second operation).

In some embodiments, in response to detecting the input (e.g., 1114; 1116; 1122; 1124; 1142) directed to the touch-sensitive display (e.g., 901), and in accordance with a determination that the input is directed to the second portion (e.g., 901-2; 901-3) of the touch-sensitive display while the visual indicator (e.g., 905) has the first size (e.g., a size shown in FIGS. 11A, 11C, 11E, 11G, and/or 11I), the computer system (e.g., 900) initiates the process for performing the second operation (e.g., performing a volume adjustment). In response to detecting the input (e.g., 1128; 1132; 1134; 1138) directed to the touch-sensitive display (e.g., 901), and in accordance with a determination that the input is directed to the second portion (e.g., 901-2; 901-3) of the touch-sensitive display while the visual indicator has the second size (e.g., a size shown in FIG. 11K and/or FIG. 11M), the computer system forgoes initiating the process for performing the second operation (e.g., do not perform a volume adjustment) (and, in some embodiments, initiating a process for performing the first operation). In some embodiments, when the status light has the smaller size (e.g., that does not include the second portion of the touch-sensitive display), the second portion of the touch-sensitive display is operable to perform operations other than the first operation (e.g., the second operation) (e.g., operable to initiate one or more processes for performing operations other than the first operation).

In some embodiments, in response to detecting the input directed to the touch-sensitive display, and in accordance with a determination that the input (e.g., 1128; 1132; 1134; 1138) is directed to the second portion (e.g., 901-2; 901-3) of the touch-sensitive display (e.g., 901) while the visual indicator has the second variation of the first visual property (e.g., a displayed size that includes at least a subset of the second portion of the touch-sensitive display) (e.g., light 905 has the size shown in FIG. 11K and/or FIG. 11M), the computer system (e.g., 900) initiates a process for performing the first operation (e.g., perform a playback control operation; pause; play; mute; unmute). In some embodiments, the second portion of the touch-sensitive display is operable to perform the first operation (e.g., operable to initiate a process for performing the first operation) when the status light has the larger displayed size that encompasses the first portion of the touch-sensitive display and at least a subset of the second portion of the touch-sensitive display.

In some embodiments, performing the first operation includes the computer system (e.g., 900) starting to output (e.g., unmuting, initiating/resuming playback) audio (e.g., as indicated by indicator 1110) if audio is not being output (e.g., audio (e.g., music, podcasts, videoconference audio, phone audio) generated at the computer system) or ceasing to output audio if audio is being output (e.g., muting first audio generated at the computer system, pausing playback of first audio generated at the computer system).

In some embodiments, performing the first operation includes the computer system (e.g., 900) initiating a task (e.g., initiating a request (e.g., for a virtual assistant), setting a timer, setting an alarm) or canceling a task (e.g., canceling a request (e.g., for a virtual assistant), canceling or disabling a timer, canceling or disabling an alarm) (e.g., see FIGS. 11K-11N).

In some embodiments, performing the second operation includes the computer system (e.g., 900) initiating a volume adjustment (e.g., increase volume; decrease volume) (e.g., see FIGS. 11C-11F).

In some embodiments, performing the second operation (e.g., a volume adjustment) includes the computer system (e.g., 900) modifying a second visual property (e.g., size, brightness, color, and/or pulse behavior) of the visual indicator different from the first visual property (e.g., see pulsing of light 905 shown in FIGS. 11D and 11F). Modifying a second visual property of the visual indicator different from the first visual property provides feedback to a user of the computer system that the second operation is being performed. Providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the second visual property is a display state (e.g., brightness, behavior) of the visual indicator (e.g., 905). In some embodiments, modifying the second visual property includes the computer system (e.g., 900) modulating the display state of the visual indicator (e.g., pulsing the visual indicator, blinking the visual indicator) in response to the first input (e.g., to provide feedback that the first input was received) (e.g., see pulsing of light 905 shown in FIGS. 11D and 11F). Modulating the display state of the visual indicator in response to the first input provides feedback to a user of the computer system that the first input is being received at the computer system. Providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first visual property is color of the visual indicator (e.g., 905). In some embodiments, the computer system (e.g., 900) is in a first state (e.g., the virtual assistant state shown in FIG. 11M) in which the first portion (e.g., 901-1) of the touch-sensitive display (e.g., 901) is configured to cause the computer system to perform the first operation (e.g., canceling the virtual assistant). In some embodiments, the computer system detects a transition from the first state to a second state (e.g., the music playback state in FIG. 11N) in which the first portion (e.g., and/or second portion) of the touch-sensitive display is configured to cause the computer system to perform a third operation (e.g., a playback control operation; pause; play; mute; unmute) (e.g., an operation different from the first operation) in response to detecting an input on the first portion (e.g., and/or second portion) of the touch-sensitive display. In some embodiments, in response to detecting the transition to the second state, the computer system modifies a color (e.g., one or more colors) of the visual indicator (e.g., light 905 changes from multi-color in FIG. 11M to a white color in FIG. 11N). Modifying a color of the visual indicator provides feedback to a user of the computer system that the computer system has transitioned from the first state to a second state in which the first portion of the touch-sensitive display is configured to cause the computer system to perform a third operation in response to detecting an input on the first portion of the touch-sensitive display. Providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the status light changes colors based on the operation to be performed by the computer system.

In some embodiments, the modified color of the visual indicator (e.g., 905) is a first set of one or more colors (e.g., white) when the third operation is associated with music or an alarm (e.g., an operation for controlling playback and/or handoff of music; an operation for setting, canceling, or silencing an alarm).

In some embodiments, the modified color of the visual indicator (e.g., 905) is a second set of one or more colors (e.g., multicolor (e.g., a multicolor pattern); different from the first set of one or more colors) when the third operation is associated with a virtual assistant (e.g., an operation for initiating/fulfilling a request or command using a virtual assistant).

In some embodiments, the modified color of the visual indicator (e.g., 905) is a third set of one or more colors (e.g., green; different from the first and/or second set of one or more colors) when the third operation is associated with communication audio (e.g., audio for a call; audio for a video communication (e.g., video chat); audio being transmitted to the computer system (e.g., from an external source such as a different computer system)).

In some embodiments, the modified color of the visual indicator (e.g., 905) is a fourth set of one or more colors (e.g., amber, yellow; different from the first, second, and/or third set of one or more colors) when the second state is a low power mode of the computer system (e.g., the power supply is below a predetermined threshold).

In some embodiments, the modified color of the visual indicator (e.g., 905) is a fifth set of one or more colors (e.g., red; different from the first, second, third, and/or fourth set of one or more colors) when the third operation is associated with a reset command (e.g., an operation for initiating a reset of the computer system).

In some embodiments, modifying the color of the visual indicator (e.g., 905) includes animating a color change of the visual indicator based on an audio signal (e.g., an output audio produced at the computer system; an audio signal of an input command received at the computer system). Animating a color change of the visual indicator based on an audio signal provides feedback to a user of the computer system that an operation to be performed at the computer system is associated with the audio signal. Providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the animated color change includes changing colors and, optionally, a pattern and/or behavior of the status light in response to changes in the audio signal. In some embodiments, the animation of the light includes a changing pattern and/or behavior of the status light (e.g., in response to changes in the audio signal) without changing color.

In some embodiments, in accordance with a determination that the computer system (e.g., 900) has not received an input (e.g., user input) for at least a predetermined amount of time (e.g., 30 seconds, 1 minute, 5 minutes), the computer system decreases a brightness of the visual indicator (e.g., 905) (e.g., decreasing the brightness to a non-zero value; see FIGS. 110 and 11P). In some embodiments, the computer system decreases the brightness of the visual indicator when the computer system does not detect any inputs (e.g., user inputs) for a predetermined period of time in order to conserve power and/or longevity of the touch-sensitive display.

In some embodiments, while the visual indicator (e.g., 905) has the decreased brightness (e.g., as shown in FIG. 11P), the computer system (e.g., 900) detects an input (e.g., 1140) (e.g., a user input). In response to detecting the input, the computer system increases the brightness of the visual indicator (e.g., increasing the brightness of the visual indicator to its original brightness) (e.g., see FIG. 11Q). Increasing the brightness of the visual indicator in response to detecting an input after the visual indicator has a decreased brightness provides feedback to a user of the computer system that the input was received at the computer system and that the computer system is in a state in which the computer system is responsive to input. Providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 900) is configured to generate output audio based on a volume setting (e.g., represented using indicator 1115). In some embodiments, in accordance with a determination that the volume setting is greater than zero, the computer system outputs the visual indicator (e.g., 905) (e.g., see FIG. 11Q). In some embodiments, in accordance with a determination that the volume setting is zero, the computer system ceases output of the visual indicator (e.g., the status light is not displayed when the volume is turned off) (e.g., see FIG. 11R). Ceasing output of the visual indicator when the volume setting is zero provides feedback to a user of the computer system that the computer system is not configured to generate output audio. Providing improved feedback reduces the number of inputs at the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

Note that details of the processes described above with respect to method 1200 (e.g., FIGS. 12A and 12B) are also applicable in an analogous manner to the methods described below. For example, methods 700, 800, and 1000 optionally include one or more of the characteristics of the various methods described above with reference to method 1200. For example, these methods can include using light to indicate an operational state of a computer system having a touch-sensitive display, as discussed in method 1200. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to manage media playback devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to customize media playback. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing media playback devices, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media content can be selected and delivered to users by inferring preferences based on non-personal information data or a bare minimum amount of personal information, such as the content being requested by the device associated with a user, other non-personal information available to the electronic device, media playback history or patterns, or publicly available information.

What is claimed is:

1. A computer system that is configured to communicate with a first external device, the computer system comprising:
   one or more processors; and
   memory storing one or more programs configured to be executed by the one or more processors, the one or more programs including instructions for:
   detecting a change in distance between the computer system and the first external device; and
   in response to detecting the change in distance:
   in accordance with a determination that a current distance of the computer system from the first external device is less than a first threshold distance but greater than a second threshold distance, generating feedback that indicates that a first operation associated with media will be performed when the second threshold distance is reached, wherein the feedback varies based at least in part on a distance of the computer system to the first external device, including:
   in accordance with a determination that the change in distance includes movement of the computer system toward the first external device, changing a current value for a feedback parameter of the feedback in a first direction; and
   in accordance with a determination that the change in distance includes in accordance with a determination that the change in distance includes movement of the computer system away from the first external device, changing the current value for the feedback parameter of the feedback in a second direction that is different from the first direction; and
   in accordance with a determination that the current distance of the computer system from the first external device is less than the second threshold distance, performing the first operation at the first external device.

2. The computer system of claim 1, wherein:
   the computer system is in communication with a display generation component, and generating feedback includes displaying, via the display generation component, a first visual feedback.

3. The computer system of claim 2, wherein changing the current value for the feedback parameter of the feedback in the first direction includes increasing an amount of blur of at least a portion of a user interface.

4. The computer system of claim 2, wherein changing the current value for the feedback parameter of the feedback in the first direction includes increasing a size of a first user interface object.

5. The computer system of claim 4, the one or more programs further including instructions for:
while the computer system is a first distance from the first external device, and while displaying the first user interface object having a first state and a first size, detecting a second change in distance:
in accordance with a determination that the current distance of the computer system from the first external device is less than the first threshold distance but greater than the second threshold distance:
in accordance with a determination that the current distance is a second distance from the first external device, wherein the second distance is less than the first distance, displaying the first user interface object having the first state and a second size greater than the first size; and
in accordance with a determination that the current distance is a third distance from the first external device, wherein the third distance is less than the second distance, displaying the first user interface object having the first state and a third size greater than the second size; and
in accordance with a determination that the current distance of the computer system from the first external device is less than the second threshold distance, displaying the first user interface object transitioning from the first state to a second state different from the first state.

6. The computer system of claim 2, wherein changing the current value for the feedback parameter of the feedback in the first direction includes increasing a size of a representation of the first external device.

7. The computer system of claim 2, wherein changing the current value for the feedback parameter of the feedback in the first direction includes displaying a representation of media content moving toward a representation of the first external device.

8. The computer system of claim 1, wherein generating feedback includes causing display of a second visual feedback at the first external device.

9. The computer system of claim 8, wherein changing the current value for the feedback parameter of the feedback in the first direction includes causing an increase in one or more of:
a size of the first set of one or more graphical elements displayed at the first external device; and
a brightness of the first set of one or more graphical elements displayed at the first external device.

10. The computer system of claim 8, wherein changing the current value for the feedback parameter in the first direction includes causing a change in a set of one or more colors of a second set of one or more graphical elements displayed at the first external device.

11. The computer system of claim 1, wherein:
the computer system is in communication with a tactile output generator; and
generating feedback includes generating, via the tactile output generator, a tactile output at the computer system.

12. The computer system of claim 11, wherein:
changing the current value for the feedback parameter of the feedback in the first direction includes increasing at least one of a magnitude, frequency, and/or rate of repetition of the tactile output, and
changing the current value for the feedback parameter of the feedback in the second direction includes decreasing at least one of the magnitude, frequency, and/or rate of repetition of the tactile output.

13. The computer system of claim 1, wherein:
the computer system is in communication with an audio output device, and
generating feedback includes generating, via the audio output device, a first audio feedback at the computer system.

14. The computer system of claim 13, wherein changing the current value for the feedback parameter of the feedback in the first direction includes decreasing an output volume of audio output at the computer system.

15. The computer system of claim 13, wherein while the first audio feedback is generated at the computer system, second audio feedback is generated at the first external device.

16. The computer system of claim 1, the one or more programs further including instructions for, in response to detecting the change in distance:
in accordance with a determination that the current distance of the computer system from the first external device is less than the second threshold distance, ceasing to vary the current value for the feedback parameter based on movement of the computer system relative to the first external device.

17. The computer system of claim 1, wherein performing the first operation includes:
in accordance with a determination that a second set of criteria is met, wherein the second set of criteria includes a criterion that is met when the computer system is currently playing first media, initiating playback of the first media at the first external device, including:
decreasing a first audio characteristic of the first media at the computer system; and
while decreasing the first audio characteristic of the first media at the computer system, causing an increase of a second audio characteristic of the first media at the first external device.

18. A non-transitory computer-readable storage medium storing one or more programs configured to be executed by one or more processors of a computer system that is in communication with a first external device, the one or more programs including instructions for:
detecting a change in distance between the computer system and the first external device; and
in response to detecting the change in distance:
in accordance with a determination that a current distance of the computer system from the first external device is less than a first threshold distance but greater than a second threshold distance, generating feedback that indicates that a first operation associated with media will be performed when the second threshold distance is reached, wherein the feedback varies based at least in part on a distance of the computer system to the first external device, including:
in accordance with a determination that the change in distance includes movement of the computer system toward the first external device, changing a current value for a feedback parameter of the feedback in a first direction; and in accordance with a determination that the change in distance includes in accordance with a determination that the change in distance includes movement of the computer system away from the first external device, changing the current value for the feedback parameter of the feedback in a second direction that is different from the first direction; and in accordance with a determination that the current distance of the computer system from the first external device is less than the second threshold distance, performing the first operation at the first external device.

19. The computer-readable storage medium of claim 18, wherein:
the computer system is in communication with a display generation component, and generating feedback includes displaying, via the display generation component, a first visual feedback.

20. The computer-readable storage medium of claim 19, wherein changing the current value for the feedback parameter of the feedback in the first direction includes increasing an amount of blur of at least a portion of a user interface.

21. The computer-readable storage medium of claim 19, wherein changing the current value for the feedback parameter of the feedback in the first direction includes increasing a size of a first user interface object.

22. The computer-readable storage medium of claim 21, the one or more programs further including instructions for:
while the computer system is a first distance from the first external device, and while displaying the first user interface object having a first state and a first size, detecting a second change in distance:
in accordance with a determination that the current distance of the computer system from the first external device is less than the first threshold distance but greater than the second threshold distance:
in accordance with a determination that the current distance is a second distance from the first external device, wherein the second distance is less than the first distance, displaying the first user interface object having the first state and a second size greater than the first size; and
in accordance with a determination that the current distance is a third distance from the first external device, wherein the third distance is less than the second distance, displaying the first user interface object having the first state and a third size greater than the second size; and
in accordance with a determination that the current distance of the computer system from the first external device is less than the second threshold distance, displaying the first user interface object transitioning from the first state to a second state different from the first state.

23. The computer-readable storage medium of claim 19, wherein changing the current value for the feedback parameter of the feedback in the first direction includes increasing a size of a representation of the first external device.

24. The computer-readable storage medium of claim 19, wherein changing the current value for the feedback parameter of the feedback in the first direction includes displaying a representation of media content moving toward a representation of the first external device.

25. The computer-readable storage medium of claim 18, wherein generating feedback includes causing display of a second visual feedback at the first external device.

26. The computer-readable storage medium of claim 25, wherein changing the current value for the feedback parameter of the feedback in the first direction includes causing an increase in one or more of:
a size of the first set of one or more graphical elements displayed at the first external device; and
a brightness of the first set of one or more graphical elements displayed at the first external device.

27. The computer-readable storage medium of claim 25, wherein changing the current value for the feedback parameter in the first direction includes causing a change in a set of one or more colors of a second set of one or more graphical elements displayed at the first external device.

28. The computer-readable storage medium of claim 18, wherein:
the computer system is in communication with a tactile output generator; and
generating feedback includes generating, via the tactile output generator, a tactile output at the computer system.

29. The computer-readable storage medium of claim 28, wherein:
changing the current value for the feedback parameter of the feedback in the first direction includes increasing at least one of a magnitude, frequency, and/or rate of repetition of the tactile output, and
changing the current value for the feedback parameter of the feedback in the second direction includes decreasing at least one of the magnitude, frequency, and/or rate of repetition of the tactile output.

30. The computer-readable storage medium of claim 18, wherein:
the computer system is in communication with an audio output device, and
generating feedback includes generating, via the audio output device, a first audio feedback at the computer system.

31. The computer-readable storage medium of claim 30, wherein changing the current value for the feedback parameter of the feedback in the first direction includes decreasing an output volume of audio output at the computer system.

32. The computer-readable storage medium of claim 30, wherein while the first audio feedback is generated at the computer system, second audio feedback is generated at the first external device.

33. The computer-readable storage medium of claim 18, the one or more programs further including instructions for, in response to detecting the change in distance:
in accordance with a determination that the current distance of the computer system from the first external device is less than the second threshold distance, ceasing to vary the current value for the feedback parameter based on movement of the computer system relative to the first external device.

34. The computer-readable storage medium of claim 18, wherein performing the first operation includes:
in accordance with a determination that a second set of criteria is met, wherein the second set of criteria includes a criterion that is met when the computer system is currently playing first media, initiating playback of the first media at the first external device, including:
decreasing a first audio characteristic of the first media at the computer system; and while decreasing the first audio characteristic of the first media at the computer system, causing an increase of a second audio characteristic of the first media at the first external device.

35. A method, comprising:
at a computer system that is in communication with a first external device:
detecting a change in distance between the computer system and the first external device; and
in response to detecting the change in distance:
in accordance with a determination that a current distance of the computer system from the first external device is less than a first threshold distance but greater than a second threshold distance, generating feedback that indicates that a first operation associated with media will be performed when the second threshold distance is reached, wherein the feedback varies based at least in part on a distance of the computer system to the first external device, including:
in accordance with a determination that the change in distance includes movement of the computer system toward the first external device, changing a current value for a feedback parameter of the feedback in a first direction; and
in accordance with a determination that the change in distance includes in accordance with a determination that the change in distance includes movement of the computer system away from the first external device, changing the current value for the feedback parameter of the feedback in a second direction that is different from the first direction; and
in accordance with a determination that the current distance of the computer system from the first external device is less than the second threshold distance, performing the first operation at the first external device.

36. The method of claim 35, wherein:
the computer system is in communication with a display generation component, and generating feedback includes displaying, via the display generation component, a first visual feedback.

37. The method of claim 36, wherein changing the current value for the feedback parameter of the feedback in the first direction includes increasing an amount of blur of at least a portion of a user interface.

38. The method of claim 36, wherein changing the current value for the feedback parameter of the feedback in the first direction includes increasing a size of a first user interface object.

39. The method of claim 38, the method further comprising:
while the computer system is a first distance from the first external device, and while displaying the first user interface object having a first state and a first size, detecting a second change in distance:
in accordance with a determination that the current distance of the computer system from the first external device is less than the first threshold distance but greater than the second threshold distance:
in accordance with a determination that the current distance is a second distance from the first external device, wherein the second distance is less than the first distance, displaying the first user interface object having the first state and a second size greater than the first size; and
in accordance with a determination that the current distance is a third distance from the first external device, wherein the third distance is less than the second distance, displaying the first user interface object having the first state and a third size greater than the second size; and
in accordance with a determination that the current distance of the computer system from the first external device is less than the second threshold distance, displaying the first user interface object transitioning from the first state to a second state different from the first state.

40. The method of claim 36, wherein changing the current value for the feedback parameter of the feedback in the first direction includes increasing a size of a representation of the first external device.

41. The method of claim 36, wherein changing the current value for the feedback parameter of the feedback in the first direction includes displaying a representation of media content moving toward a representation of the first external device.

42. The method of claim 35, wherein generating feedback includes causing display of a second visual feedback at the first external device.

43. The method of claim 42, wherein changing the current value for the feedback parameter of the feedback in the first direction includes causing an increase in one or more of:
a size of the first set of one or more graphical elements displayed at the first external device; and
a brightness of the first set of one or more graphical elements displayed at the first external device.

44. The method of claim 42, wherein changing the current value for the feedback parameter in the first direction includes causing a change in a set of one or more colors of a second set of one or more graphical elements displayed at the first external device.

45. The method of claim 35, wherein:
the computer system is in communication with a tactile output generator; and
generating feedback includes generating, via the tactile output generator, a tactile output at the computer system.

46. The method of claim 45, wherein:
changing the current value for the feedback parameter of the feedback in the first direction includes increasing at least one of a magnitude, frequency, and/or rate of repetition of the tactile output, and
changing the current value for the feedback parameter of the feedback in the second direction includes decreasing at least one of the magnitude, frequency, and/or rate of repetition of the tactile output.

47. The method of claim 35, wherein:
the computer system is in communication with an audio output device, and
generating feedback includes generating, via the audio output device, a first audio feedback at the computer system.

48. The method of claim 47, wherein changing the current value for the feedback parameter of the feedback in the first direction includes decreasing an output volume of audio output at the computer system.

49. The method of claim 47, wherein while the first audio feedback is generated at the computer system, second audio feedback is generated at the first external device.

50. The method of claim 35, the method further comprising, in response to detecting the change in distance:
in accordance with a determination that the current distance of the computer system from the first external device is less than the second threshold distance, ceasing to vary the current value for the feedback parameter based on movement of the computer system relative to the first external device.

51. The method of claim 35, wherein performing the first operation includes:
in accordance with a determination that a second set of criteria is met, wherein the second set of criteria includes a criterion that is met when the computer system is currently playing first media, initiating playback of the first media at the first external device, including:
decreasing a first audio characteristic of the first media at the computer system; and
while decreasing the first audio characteristic of the first media at the computer system, causing an increase of a second audio characteristic of the first media at the first external device.

* * * * *

UNITED STATES PATENT AND TRADEMARK OFFICE
CERTIFICATE OF CORRECTION

| | |
|---|---|
| PATENT NO. | : 11,782,598 B2 |
| APPLICATION NO. | : 17/867317 |
| DATED | : October 10, 2023 |
| INVENTOR(S) | : Taylor G. Carrigan et al. |

It is certified that error appears in the above-identified patent and that said Letters Patent is hereby corrected as shown below:

In the Claims

In Column 100, Lines 53-54, in Claim 1, after "includes" delete "in accordance with a determination that the change in distance includes".

In Column 103, Lines 5-6, in Claim 18, after "includes" delete "in accordance with a determination that the change in distance includes".

In Column 105, Lines 26-27, in Claim 35, after "includes" delete "in accordance with a determination that the change in distance includes".

Signed and Sealed this
Fifth Day of December, 2023

Katherine Kelly Vidal
*Director of the United States Patent and Trademark Office*